(12) United States Patent
Woodruff et al.

(10) Patent No.: US 7,227,715 B2
(45) Date of Patent: Jun. 5, 2007

(54) MAGAZINE-BASED DATA CARTRIDGE LIBRARY

(75) Inventors: Jennifer L. Woodruff, Erie, CO (US); Ronald M. Permut, Louisville, CO (US); Nathan C. Thompson, Boulder, CO (US); Matthew T. Starr, Lafayette, CO (US); Christopher A. Pollard, Monument, CO (US); Marek W. Christer, Loveland, CO (US); Peter J. Kumpon, Denver, CO (US)

(73) Assignee: Spectra Logic Corporation, Boulder, CO (US)

(*) Notice: Subject to any disclaimer, the term of this patent is extended or adjusted under 35 U.S.C. 154(b) by 176 days.

(21) Appl. No.: 10/604,122

(22) Filed: Jun. 26, 2003

(65) Prior Publication Data

US 2004/0223253 A1    Nov. 11, 2004

Related U.S. Application Data

(63) Continuation-in-part of application No. 09/682,800, filed on Oct. 19, 2001, now Pat. No. 6,639,751.

(51) Int. Cl.
*G11B 15/68* (2006.01)
(52) U.S. Cl. ....................................... 360/92
(58) Field of Classification Search .................. 360/92
See application file for complete search history.

(56) References Cited

U.S. PATENT DOCUMENTS

| | | | |
|---|---|---|---|
| 4,386,382 A | 5/1983 | Cutler et al. ................... 360/92 |
| 5,157,564 A | 10/1992 | Theobald et al. .............. 360/92 |
| 5,235,474 A * | 8/1993 | Searle .......................... 360/71 |
| 5,684,654 A | 11/1997 | Searle et al. ................... 360/92 |
| 5,718,339 A * | 2/1998 | Woodruff .................. 211/41.12 |
| 5,729,464 A * | 3/1998 | Dimitri ....................... 700/215 |
| 5,768,047 A * | 6/1998 | Ulrich et al. ................. 360/92 |
| 5,818,723 A | 10/1998 | Dimitri .................. 364/478.02 |
| 5,867,344 A | 2/1999 | Ellis et al. .................... 360/92 |
| 5,892,750 A * | 4/1999 | Barkley et al. .......... 369/30.43 |
| 5,995,320 A | 11/1999 | Ostwald ....................... 360/92 |
| 6,034,928 A | 3/2000 | Inoue .......................... 369/36 |
| 6,215,611 B1 | 4/2001 | Gibbons ....................... 360/92 |
| 6,411,462 B1 | 6/2002 | Ostwald et al. ............... 360/92 |
| 6,639,751 B2 | 10/2003 | Brace et al. .................. 360/92 |
| 2003/0076618 A1 | 4/2003 | Brace et al. .................. 360/92 |
| 2003/0076619 A1* | 4/2003 | Gariepy et al. ............... 360/92 |
| 2004/0105187 A1 | 6/2004 | Woodruff et al. |
| 2004/0264037 A1 | 12/2004 | Downey et al. |

(Continued)

FOREIGN PATENT DOCUMENTS

WO    WO 2005/010661 A2    2/2005

OTHER PUBLICATIONS

U.S. Appl. No. 10/950,613, Starr et al.

(Continued)

*Primary Examiner*—Allen Cao

(57) ABSTRACT

The present invention provides a magazine-based data cartridge library that, in one embodiment, comprises a plurality of shelves that are capable of holding a plurality of data cartridge magazines, one or more drives, a magazine transport for moving magazines within the cabinet, and a cartridge transport for moving data cartridges between a magazine and a drive.

49 Claims, 136 Drawing Sheets

U.S. PATENT DOCUMENTS

| | | |
|---|---|---|
| 2004/0264038 A1 | 12/2004 | Heineman et al. |
| 2004/0264039 A1 | 12/2004 | Armagost et al. |
| 2004/0264040 A1 | 12/2004 | Armagost et al. |
| 2004/0264041 A1 | 12/2004 | Kumpon et al. |
| 2004/0264042 A1 | 12/2004 | Pollard et al. |
| 2005/0007692 A1 | 1/2005 | Thompson et al. |
| 2005/0047258 A1 | 3/2005 | Starr et al. |
| 2005/0057847 A1 | 3/2005 | Armagost et al. |
| 2005/0063089 A1 | 3/2005 | Starr et al. |
| 2005/0065637 A1 | 3/2005 | Lantry et al. |
| 2005/0185323 A1 | 8/2005 | Brace et al. |
| 2005/0195517 A1 | 9/2005 | Brace et al. |
| 2005/0195518 A1 | 9/2005 | Starr et al. |
| 2005/0195519 A1 | 9/2005 | Kumpon et al. |
| 2005/0195520 A1 | 9/2005 | Starr et al. |
| 2005/0219964 A1 | 10/2005 | Pollard et al. |
| 2005/0246484 A1 | 11/2005 | Lantry et al. |
| 2005/0267627 A1 | 12/2005 | Lantry et al. |

OTHER PUBLICATIONS

U.S. Appl. No. 10/951,321, Wong.
U.S. Appl. No. 10/980,594, Fenske et al.
U.S. Appl. No. 11/011,812, Starr et al.
U.S. Appl. No. 11/019,911, Curtis et al.
U.S. Appl. No. 11/037,985, Permut et al.
U.S. Appl. No. 11/040,937, Starr et al.
U.S. Appl. No. 11/089,749.
U.S. Appl. No. 11/123,725, Rector et al.
U.S. Appl. No. 11/126,025, Rector et al.
U.S. Appl. No. 11/145,768, Downey et al.
U.S. Appl. No. 11/230,146, Starr et al.
U.S. Appl. No. 11/240,893, Starr et al.
U.S. Appl. No. 11/264,920, Lantry et al.
PCT Application No. US05/45168, Dec. 2005, Spectra Logic Corporation.
PCT Application No. US05/46447, Dec. 2005, Spectra Logic Corporation.

* cited by examiner

MAGAZINE-BASED DATA CARTRIDGE LIBRARY

The present invention is directed to a magazine-based data cartridge library that is capable of moving data cartridge magazines within the library, as well as moving individual cartridges within the library.

Figure 1:
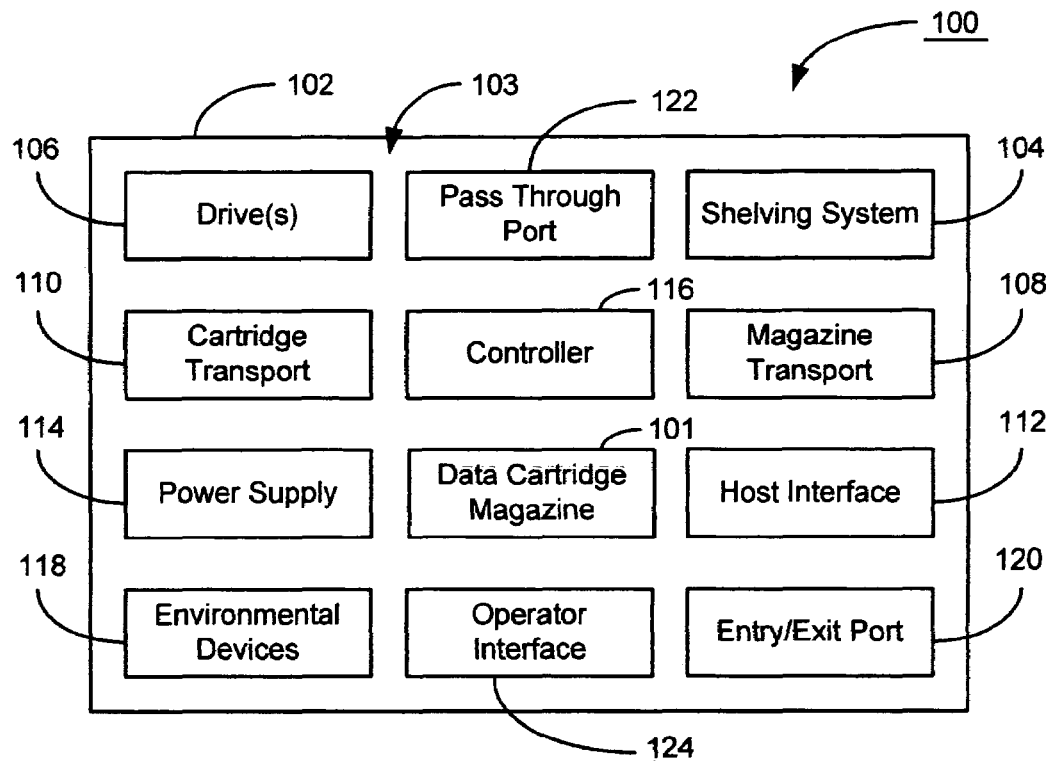
Figure 2A:
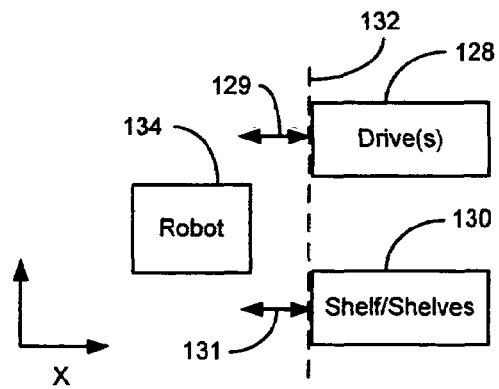
Figure 2B:
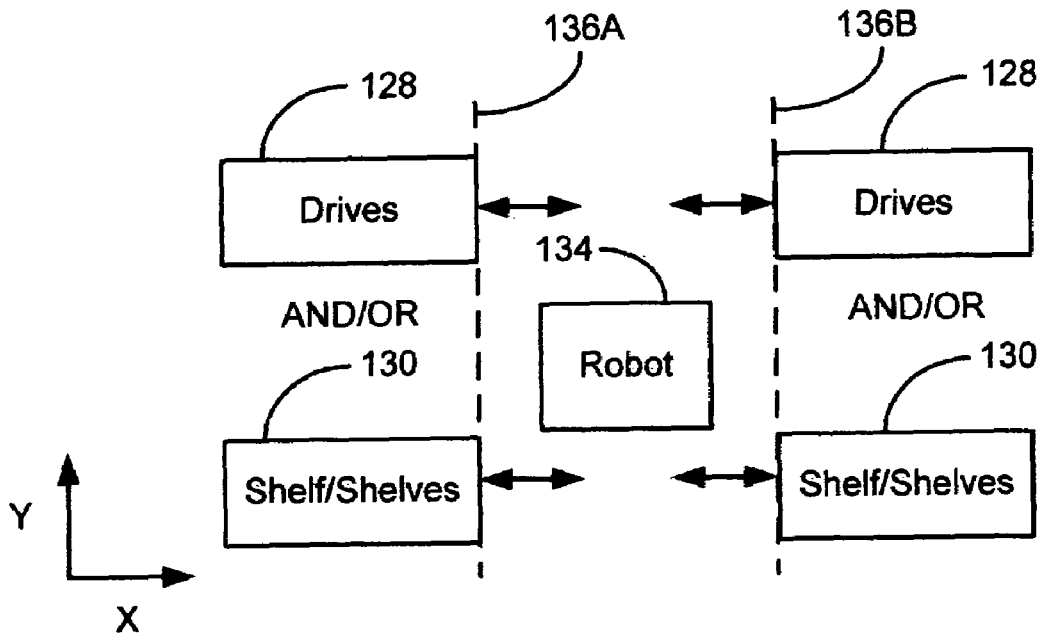
Figure 2C:
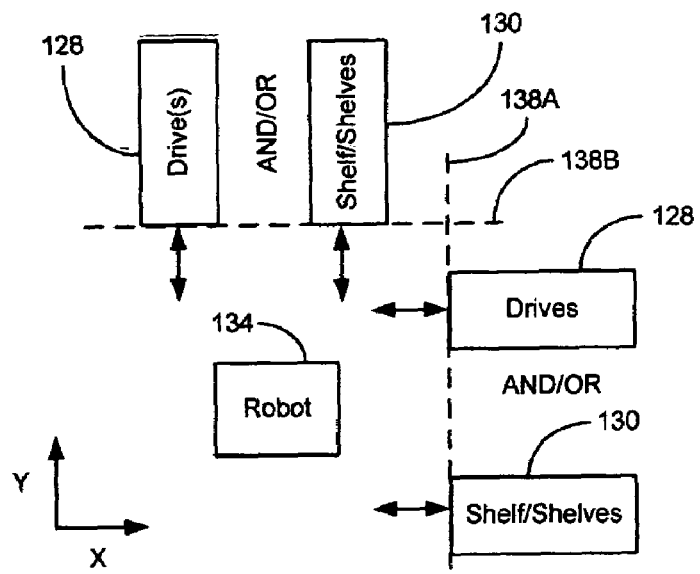
Figure 2D:
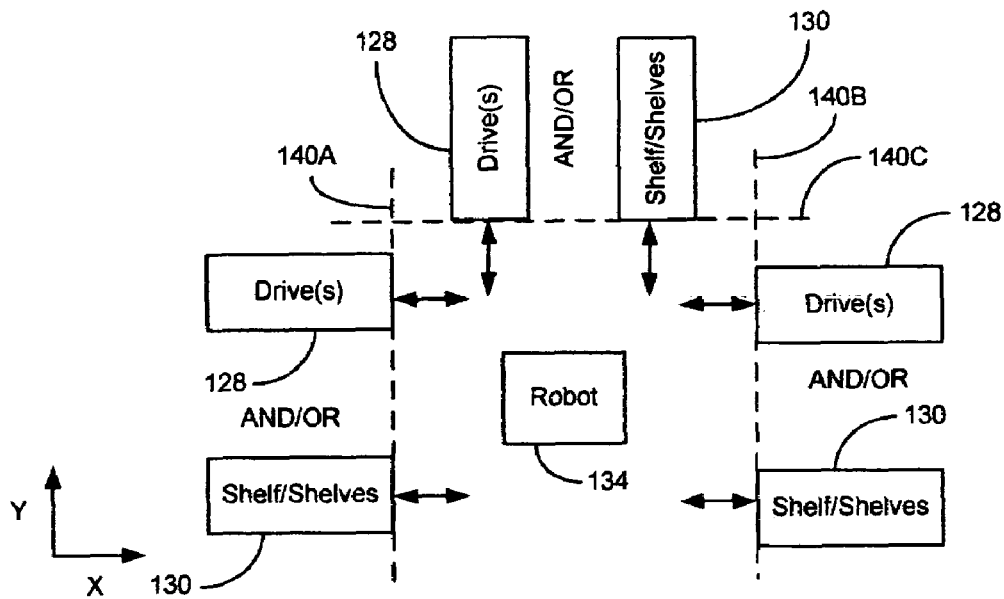
Figure 2E:
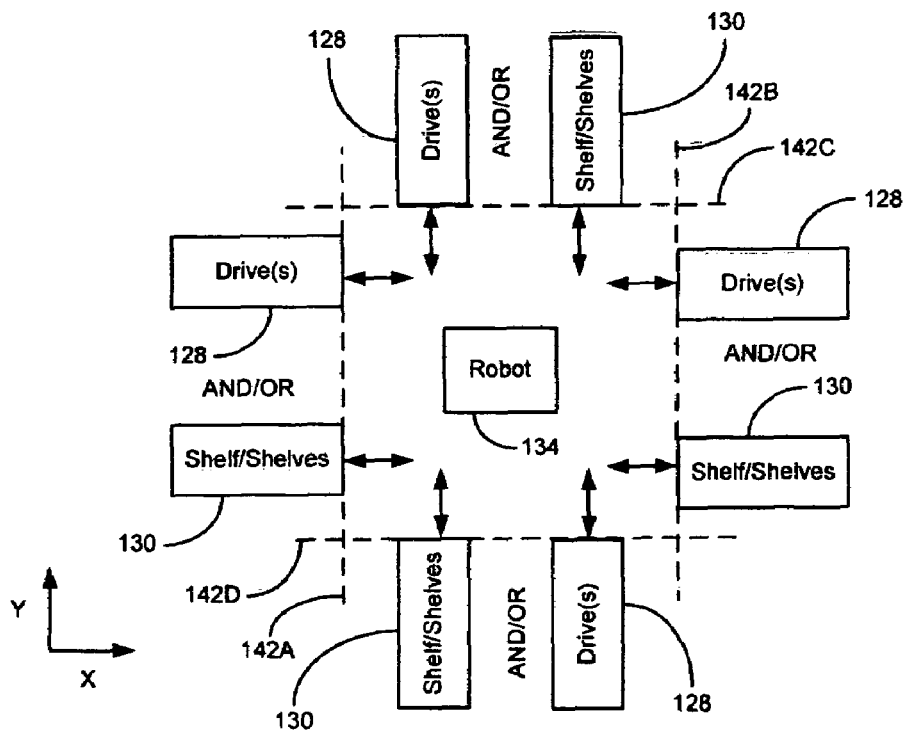

With reference to FIG. 1, the present invention is directed to a magazine-based data cartridge library 100 comprised of: (a) a frame 102 for supporting the other elements of the library; (b) a shelving system 104 for supporting at least two data cartridge magazines 101 wherein a data cartridge magazine 101 is adapted to hold a plurality of data cartridges (not shown); (c) one or more drives 106 that are each capable of writing and/or reading data to/from a recording medium in a data cartridge; (d) a magazine transport 108 for moving a magazine 101 within the library 100; (e) a cartridge transport 110 for moving a data cartridge between a magazine 101 and a drive 106; and (f) an interface 112 for communicating with a host computer (not shown) that uses the library 101 to store data.

As noted, the frame 102 provides a support for the other elements of the library 100. In addition, the frame 102 may comprise one or more exterior surfaces that form a cabinet for enclosing most of the components of the library 100. [The frame may further define an interior space 103]. Typically, the cabinet establishes an environment whose temperature can be controlled for the benefit of the elements of the library 100 housed within the cabinet. The cabinet also commonly serves as a barrier to contaminants that could adversely affect the operation of the elements housed within the library 100. Additionally, the cabinet is also useful in preventing an operator from accessing the space within the cabinet during operation of the library 100 and potentially being injured by the moving elements within the library 100.

There are a number of devices that do not necessarily need to be part of the magazine-based-data cartridge library 100 (i.e., not supported by the frame 102) but are nonetheless needed for the library 100 to function and, as a consequence, typically are part of the library 100. Among these devices are a power supply system 114 (which may be comprised of multiple power supplies) and a controller 116 for managing the operations of the library 100. Environmental devices 118, such as fans, fins, heat pipes, etc., are additionally incorporated into the library 100 to manage excess heat build-up beyond what the library 100 is able to passively dissipate.

Some embodiments of the present invention can include additional features for enhancing library 100 functionality, such as an entry/exit port 120, a pass-through port 122 and an operator interface 124, to name three examples. An entry/exit port 120 can facilitate movement of a magazine in and out of the library 100, a pass-through port 122 can facilitate movement of a magazine between two libraries (such as when adjacent and working together to share at least one magazine), and an operator interface 124 can facilitate operator command interaction with the library 100.

There are several possible layouts for the magazine-based cartridge library 100, consistent with embodiments of the present invention. Many of these layouts can be characterized or typed as rectilinear or circular/cylindrical. In a rectilinear type, magazine-based data cartridge library 100, at least the drive or drives 106 and the shelf or shelves of the shelf system 104 are laid out along: (a) a straight line or plane; or (b) along multiple straight lines or planes that are parallel and/or perpendicular to one another as will be further elaborated in the disclosure of FIGS. 2A–2E. More specifically, in a rectilinear type library, the face of a drive 106, comprising a receptacle for receiving a data cartridge (not shown), is oriented such that the direction that the data cartridge is displaced when the cartridge is either inserted or extracted from the receptacle by the cartridge transport 110 is substantially perpendicular to a straight line or plane. Similarly, a shelf of the shelf system 104 in the rectilinear type library is oriented such that the direction that a magazine 101 is displaced when the magazine 101 is either associated with a shelf of the shelf system 104 or removed from a shelf of the shelf system 104 by the magazine transport 108, is substantially perpendicular to a straight line or plane. Typically, most of the other elements of the library 100 are also laid out in the same manner.

FIGS. 2A–2E are plan views of five different rectilinear type layouts for the magazine-based data cartridge library 100. In the layout illustrated in FIG. 2A, a drive 128 (or drives) and/or a shelf 130 (or shelves) are oriented along a straight line/plane 132. A robot 134 is provided that cumulatively represents the magazine transport 108 and the cartridge transport 110. In this embodiment, the robot 134 is capable of accessing the drive(s) 128 for purposes of inserting or extracting data cartridges (not shown) as indicated by the two-way arrow 129. The robot 134 is further capable of accessing the shelf/shelves 130 to displace a magazine 101, such as to remove for example, as indicated by the two-way arrow 131. With respect to the rectilinear type layouts shown in FIGS. 2B–2E, the drive 128 and shelf 130 elements retain the same reference numbers as those elements bear in FIG. 2A. Additionally, the two-way arrows, such as arrow 131, indicate an access locations to drive 128 and shelf 130 elements. In the embodiment illustrated in FIG. 2B, at least one drive 128 and/or at least one shelf 130 is/are laid out along line/plane 136A, and at least one drive 128 and/or at least one shelf 130 is/are laid out along line/plane 136B, which is parallel to line/plane 136A. In the embodiment illustrated in FIG. 2C, at least one drive 128 and/or at least one shelf 130 is/are laid out along line/plane 138A, and at least one drive 128 and/or at least one shelf 130 is/are laid out along line/plane 138B, which is perpendicular to line/plane 138A. With respect to the embodiment of FIG. 2D, at least one drive 128 and/or at least one shelf 130 is/are laid out along each of lines/planes 140A, 140B and 140C, with lines/planes 140A and 140B being parallel to each other and perpendicular to line/plane 140C. In the embodiment illustrated in FIG. 2E, at least one drive 128 and/or at least one shelf 130 is/are laid out along each of lines/planes 142A–142D, with lines/planes 142A, 142B being parallel to one-another, and with lines/planes 142C, 142D being parallel to one another and perpendicular to the parallel lines/planes 142A, 142B. It should be appreciated that each of the embodiments comprises at least one drive 128. Further, each embodiment comprises at least one shelf 130 that is capable of supporting two or more magazines 101, from FIG. 1, or multiple shelves 130 that cumulatively support two or more magazines 101. It should also be appreciated that the illustrated location of a drive 128 or shelf 130 along a line/plane is merely illustrative and that the actual location of a drive 128 or shelf 130 can be anywhere along a line/plane. It should also be appreciated that, while the robot 134 cumulatively represents the magazine transport 108 and cartridge transport 110, the magazine transport 108 and the cartridge transport 110 may share one or more elements or be entirely separate from one another. It should be further appreciated that there may be other rectilinear layouts for the magazine-based data cartridge library 100 capable of cooperating with a magazine transport 108.

Referring back to the elements of FIG. 1, in a circular/cylindrical type, magazine-based data cartridge library 100, the drive or drives 106 and shelf or shelves of the shelf system 104 are laid out along radial lines that have a common center and/or along one circular arc or multiple, concentric circular arcs. More specifically, in a circular type library, the face of a drive 106 comprises a receptacle for receiving a data cartridge (not shown) is oriented such that the direction that the data cartridge is displaced when the cartridge is either inserted or extracted from the receptacle is either: (a) substantially along a radial line/plane, (b) substantially along a line/plane that is parallel to a radial line/plane, or (c) along a line that is tangent to a circular arc as will be further elaborated in the disclosure of FIGS. 3A–3G. Similarly, a shelf of the shelf system 104 in a circular type library is oriented such that the direction that a magazine 101 is displaced when the magazine 101 is either associated with a shelf or removed from a shelf of the shelf system 104 by the magazine transport 108 is either: (a) substantially along a radial line/plane, (b) substantially along a line/plane that is parallel to a radial line/plane, or (b) along a line that is tangent to a circular arc.

Figure 3A:
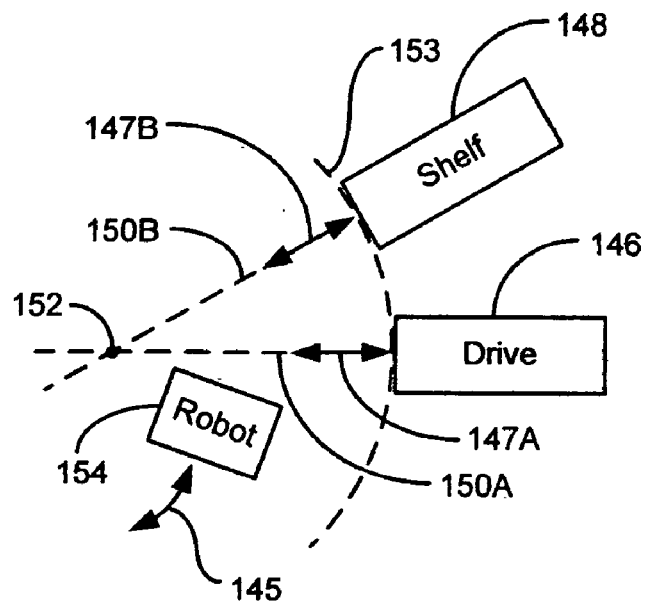
Figure 3B:
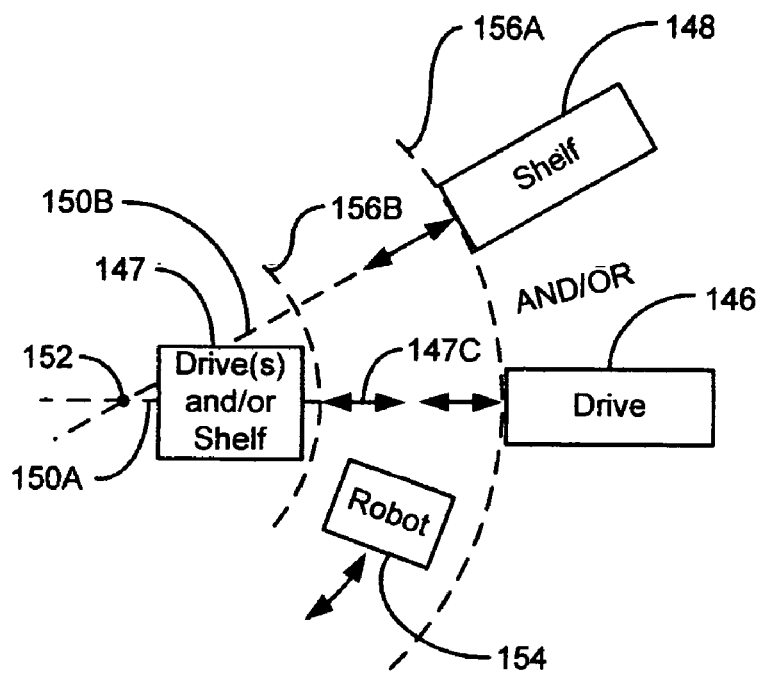
Figure 3C:
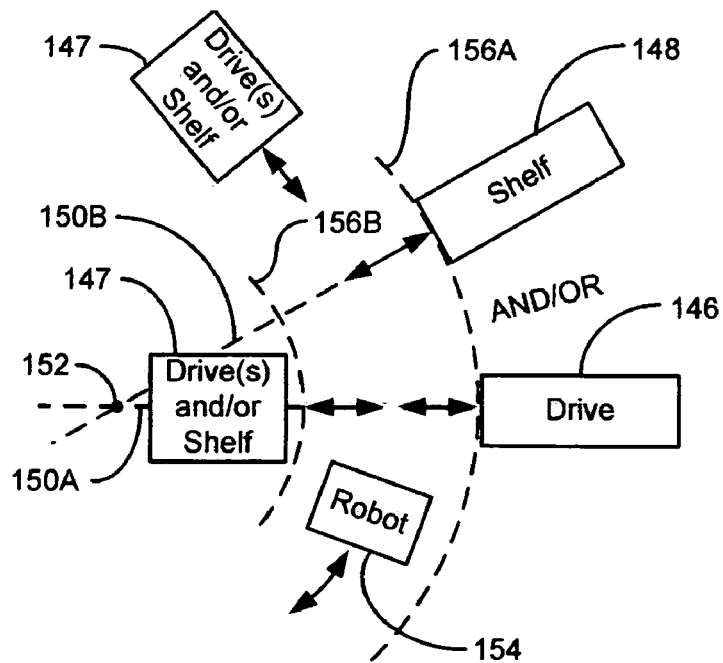
Figure 3D:
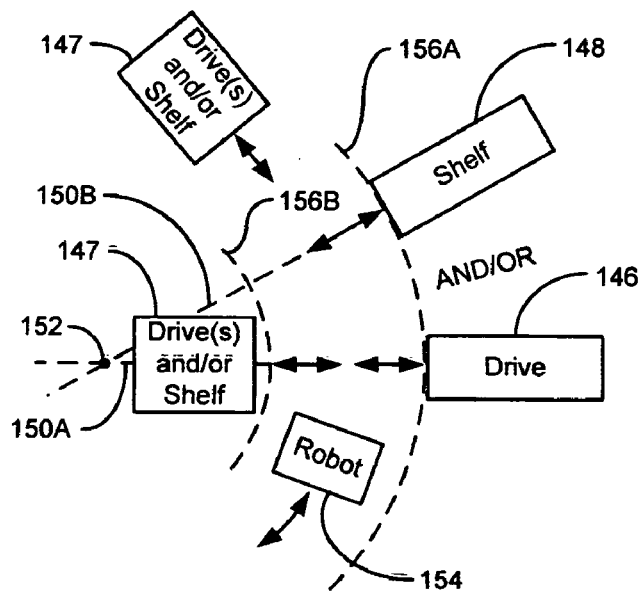
Figure 3E:
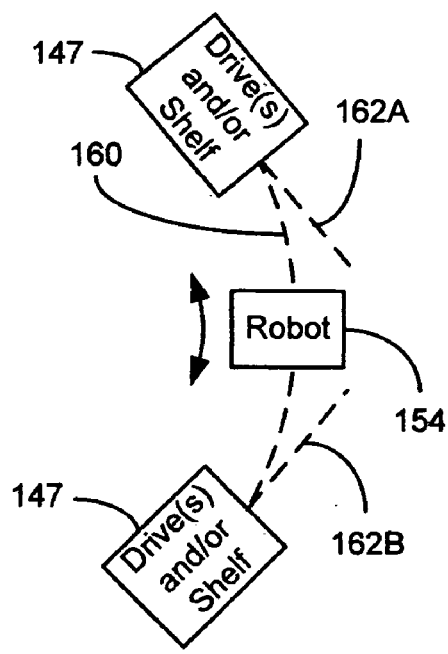
Figure 3F:
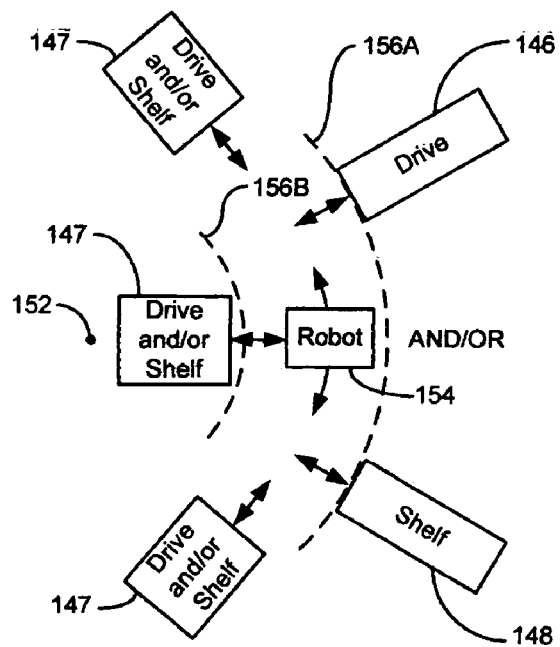
Figure 3G:
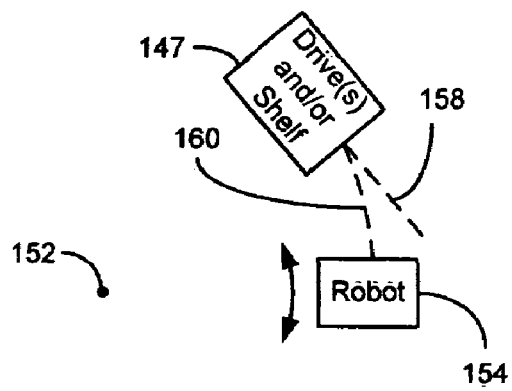

FIGS. 3A–3G are plan views of seven different circular/cylindrical type layouts for the magazine-based data cartridge library 100. In the layout illustrated in FIG. 3A, a drive 146 (or drives) and/or shelf 148 (or shelves) are respectively oriented along radial lines 150A, 150B that have a common center 152 and along a circular/cylindrical arc 153. A robot 154 is provided that cumulatively represents the magazine transport 108 and the cartridge transport 110 of FIG. 1. The robot 154 is capable of accessing the shelf 148 disposed along the circular/cylindrical arc 153 for transferring one or more data cartridge magazines 101 to and from the shelf 140 as indicated by the two-way arrow 147B. The robot 154 is also capable of accessing the drive 146 also disposed along the circular/cylindrical arc 153 for transferring one or more data cartridges (not shown) to and from the drive 146 as indicated by the two-way arrow 147A. As illustrated in this embodiment, the robot 154 is adapted to accessing the drive 146 and shelf 148 by moving along an arc following the circular/cylindrical arc 153 for as shown by the two-way arrow 145. With respect to the circular/cylindrical type layouts shown in FIGS. 3B–3G, the term drive 146 refers to one or multiple drives and the term shelf 148 refers to one or more shelves. Additionally, reference numbers for elements common to the various embodiments have been retained as a matter of convenience. In the embodiment illustrated in FIG. 3B, at least one drive 146 and/or at least one shelf 148 is/are laid out along a radial line(s) 150A and 150B respectively and along a first circular/cylindrical arc 156A, and at least one drive and/or at least one shelf collectively shown by a drive(s) and/or shelf block 147 is/are laid out along a radial line(s), herein radial line 150A, and along a second circular/cylindrical arc 156B that is concentric to the circular arc 156A. The robot 154 moves in a space that is located between the two concentric arcs 156A, 156B. It should be appreciated that the embodiments illustrated in FIGS. 3A and 3B are each capable of being implemented such that the shelf or shelves 148 and drive or drives 146 are laid out along a circular/cylindrical arc 156A that defines a complete or substantially complete circle or cylinder. In the embodiment illustrated in FIG. 3C, at least one drive 146 and/or at least one shelf 148 is/are laid out along radial lines 150A and 150B respectively and along a circular/cylindrical arc 156A, and at least one drive and/or shelf 147 is/are laid out along a tangent line 158 to a circular/cylindrical arc 160 that typically represents the path traveled by an element of the robot 154. The robot 154 is capable of accessing the drive(s) and/or shelf 147 as indicated by the two-way arrow 147D. The embodiment illustrated in FIG. 3D is a combination of the characteristics or features noted with respect to the embodiments shown in FIGS. 3B and 3C. In the embodiment illustrated in FIG. 3E, at least one drive and/or shelf 147 is/are laid out along a tangent line 162A to the circular/cylindrical arc 160, and at least one drive and/or shelf 147 is laid out along a tangent line 162B to the circular/cylindrical arc 160. The embodiment illustrated in FIG. 3F is a combination of the characteristics or features noted with respect to the embodiment shown in FIGS. 3B and 3E. In the embodiment illustrated in FIG. 3G, at least one drive and/or shelf 147 is/are laid out along the tangent line 158 of the circular/cylindrical arc 160. In yet a further embodiment (not shown), at least one drive and/or shelf 147 are located along each of two or more circular arcs, such as the two concentric arcs 156A, 156B, with a common center 152 wherein an element of the robot 154 is cable of moving between the arcs. It should be appreciated that each of the embodiments comprises at least one drive 146. Further, each embodiment comprises at least one shelf 148 capable of supporting two or more magazines 101 or multiple shelves 148 that cumulatively support two or more magazines 101. It should also be appreciated that the illustrated location of a drive 146 or shelf 148 along a circular/cylindrical arc, such as arc 156A, is merely illustrative and that the actual location of a drive 146 or shelf 148 can be anywhere along the circular/cylindrical arc. It should also be appreciated that, while the robot 154 cumulatively represents the magazine transport 108 and cartridge transport 110, the magazine transport 108 and the cartridge transport 110 may share one or more elements or be entirely separate from one another. It should be further appreciated that there may be other circular layouts for the magazine-based data cartridge library 100 with features capable of cooperating with a magazine transport 108.

Figure 4A:
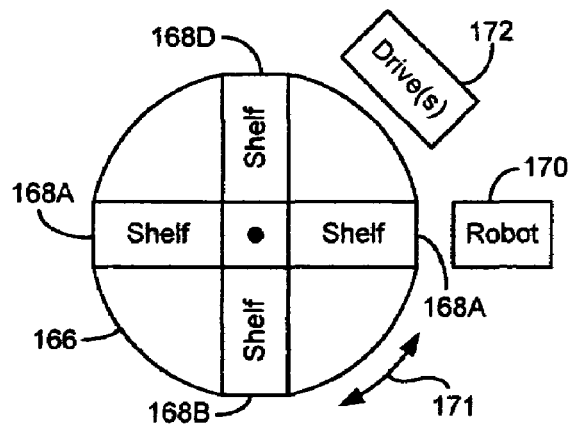
Figure 4B:
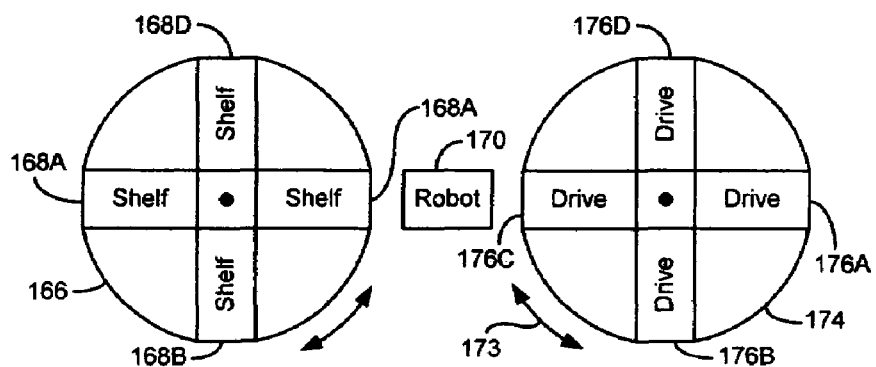

Yet another possible layout for the magazine-based data cartridge library 100 of FIG. 1 is a movable-shelf type in which at least two shelves of the shelf system 104 are moveable to facilitate the positioning of the shelves 104 relative to the magazine transport 108. FIG. 4A is a plan view of one embodiment of a movable-shelf layout for the magazine-based data cartridge library 100. The embodiment comprises a rotating shelf structure 166 with shelves 168A–D, a robot 170 that cumulatively represents the magazine transport 108 and cartridge transport 110, and one or more stationary drives 172. In operation, the shelf structure 166 is rotated, as indicated by the two-way arrow 171, to place one of the shelves 168A–D in the same plane as the robot 170 so that the robot 170 can perform a magazine 101 or cartridge (not shown) transfer operation. In an alternative embodiment, one or more drives are also associated with the rotating shelf structure 166. FIG. 4B is a plan view of another embodiment of a movable-shelf layout for the magazine-based library 100 that includes movable drives 176A–D. Elements common to this embodiment and the embodiment in FIG. 4A have been given the same reference numbers. The embodiment shown in FIG. 4B comprises the further element of a rotating drive structure 174 that is capable of holding multiple drives 176A–D. As illustrated herein, a drive, such as 176C, can be rotated, as shown by the two-way arrow 173, into a position capable of cooperating with the robot 170 to transfer a data cartridge (not shown) between the drive 176C and the robot 170. In other embodiments, one or more drives are associated with the rotating shelf structure 166 and/or one or more shelves 168A–D are associated with the rotating drive structure 174. Although not illustrated, another possible layout for the magazine-based data cartridge library 100 is movable-drive type that is comprised of a stationary shelf system, such as the shelf/shelves 130 of FIG. 2A, and movable drives, such as the rotating drive structure 174 of FIG. 4B, for example. It should be appreciated that each of the embodiments of FIGS. 4A and 4B comprise at least one drive, such as drive 172 of FIG. 4A. Further, each embodiment of FIGS. 4A and 4B comprise at least one shelf, such as the shelf 168A capable of supporting two or more magazines 101 or multiple shelves, such as 168A–D, that cumulatively support two or more magazines 101. Moreover, while the illustrate embodiments contemplate that the rotating elements rotate about a vertical axis, rotation about a horizontal axis is also feasible. It should also be appreciated that, while the robot 170 cumulatively represents the magazine transport 108 and cartridge transport 110, the magazine transport 108 and the cartridge transport 110 may share one or more elements or be entirely separate from one another. It should be further appreciated that there may be other movable-shelf layouts for the magazine-based data cartridge library 100 capable of cooperating with a magazine transport 108.

The magazine-based data cartridge library 100 is also capable of being implemented in a layout that is a combination of two or more of the rectilinear type, circular type, movable-shelf type, and movable-drive type layouts.

Figure 5A:
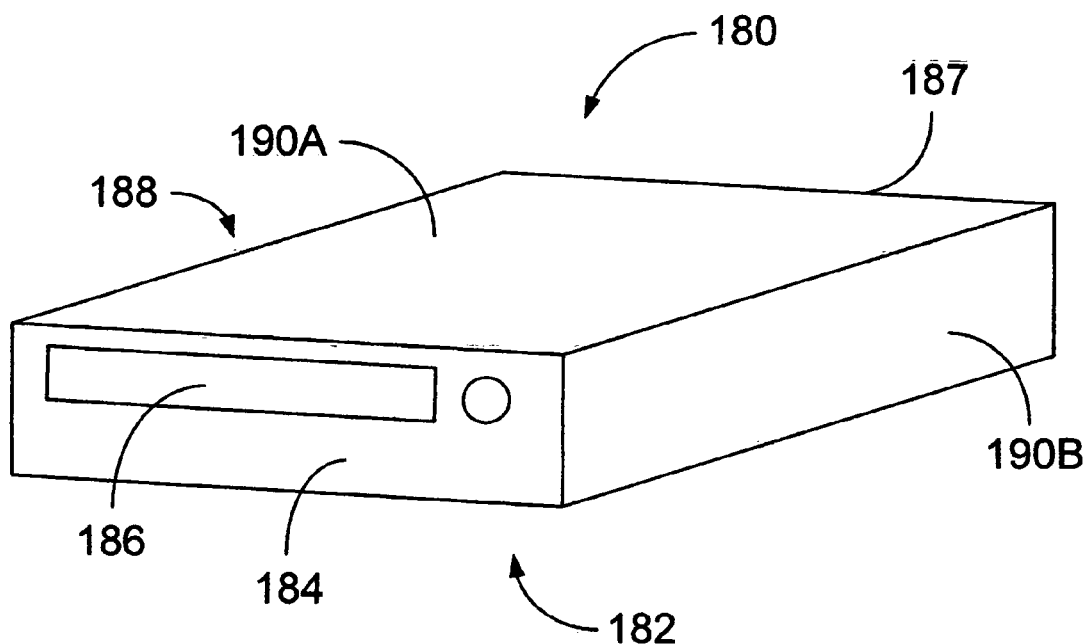
Figure 5B:
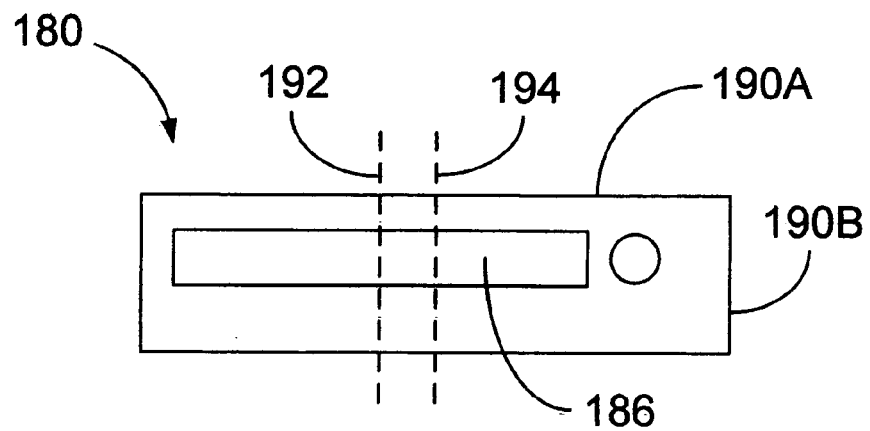
Figure 5C:
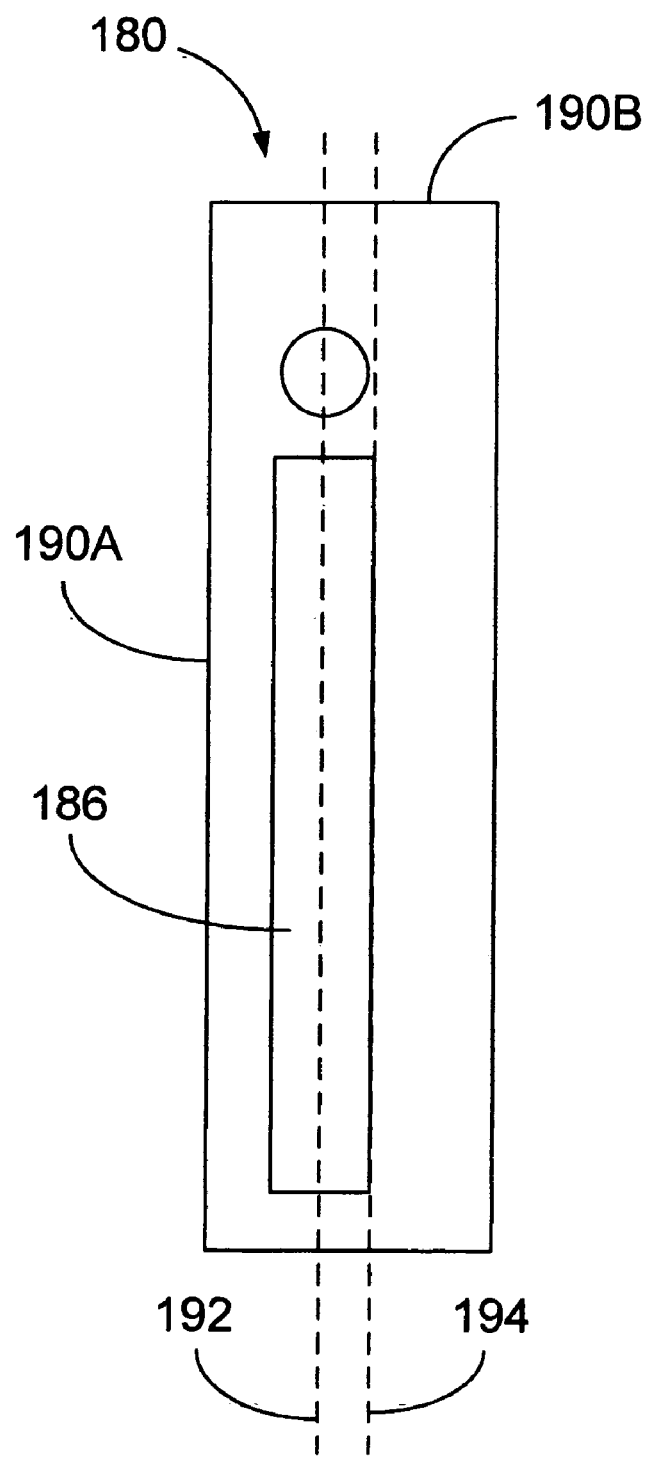
Figure 6A:
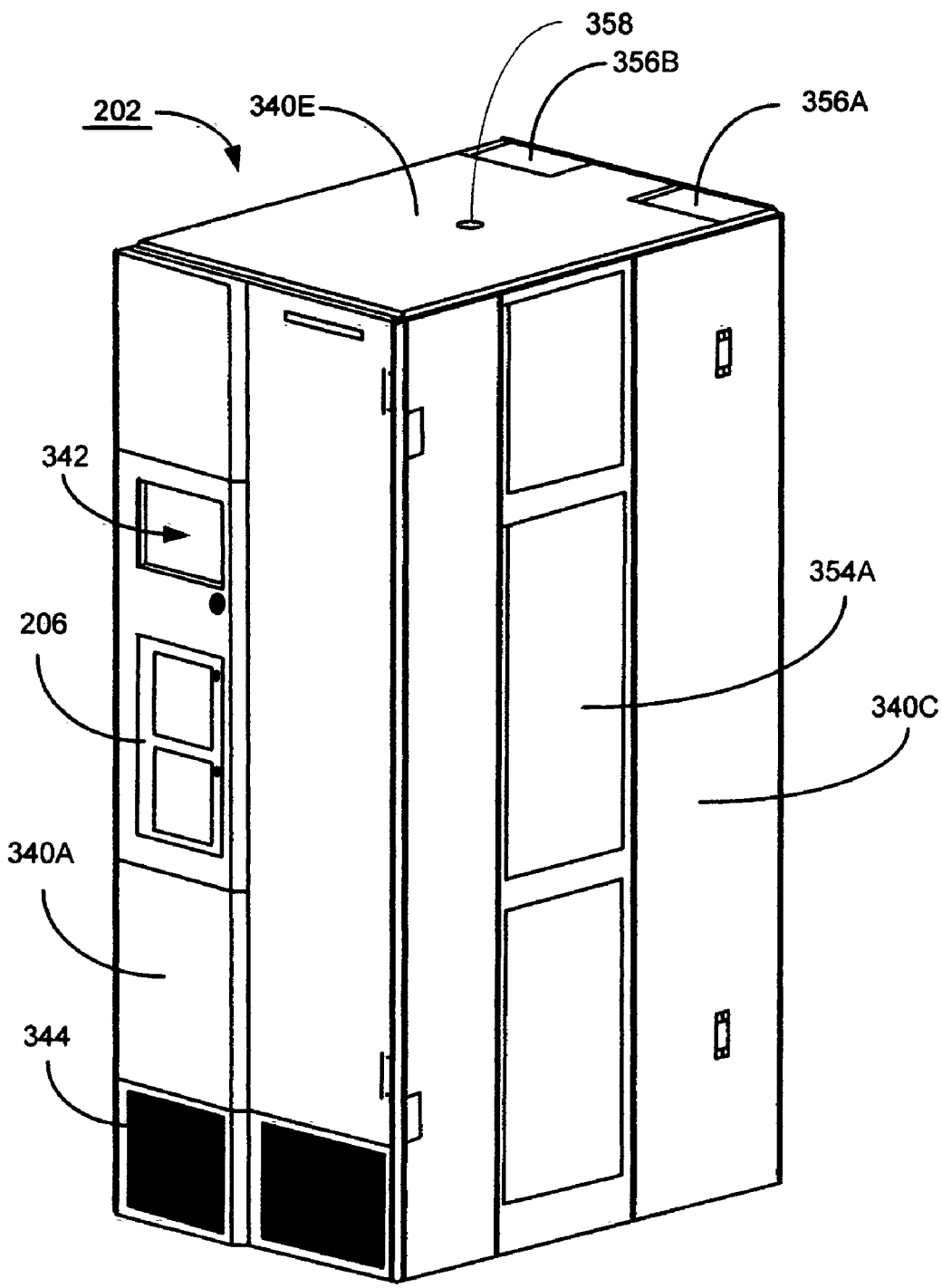
Figure 6B:
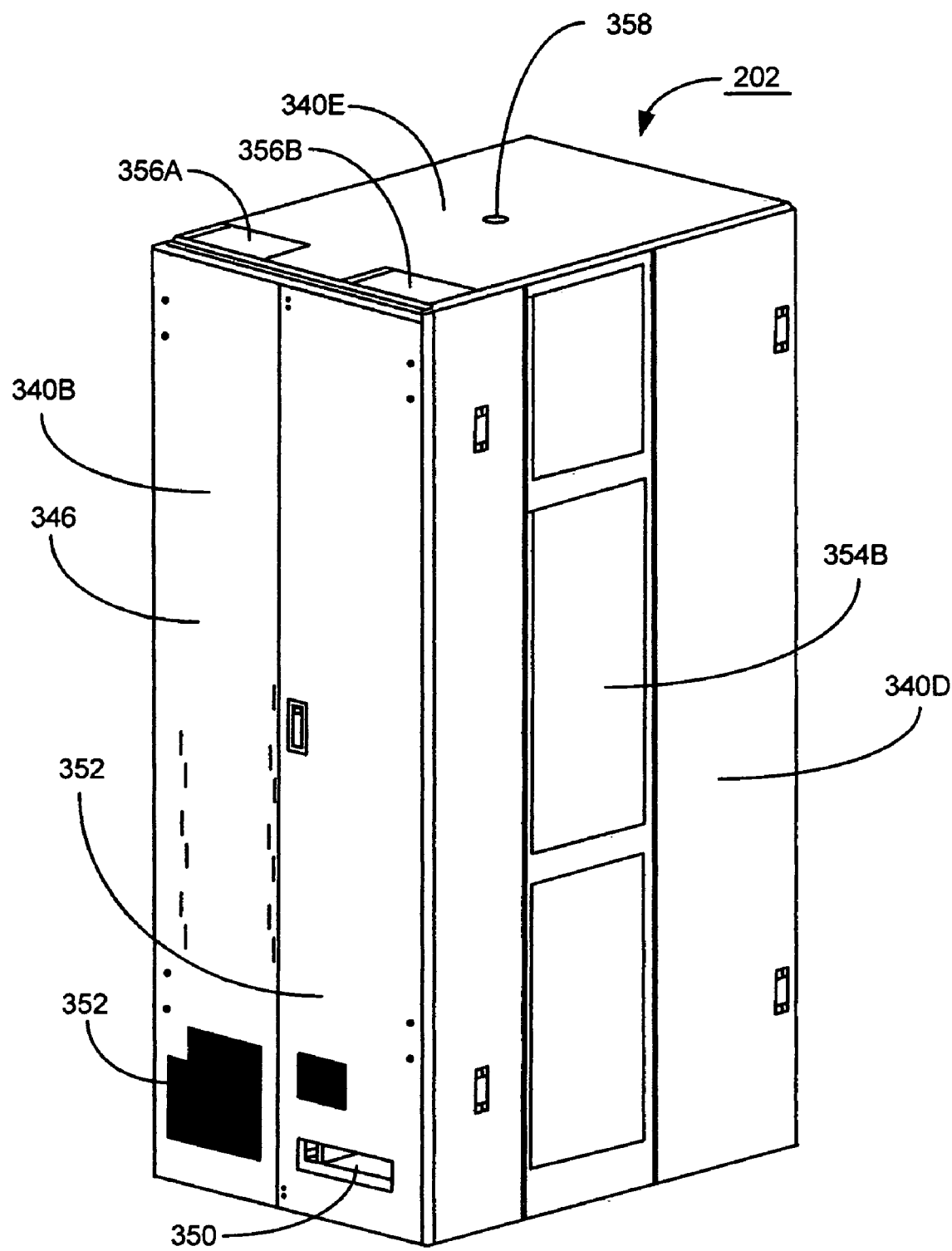
Figure 6C:
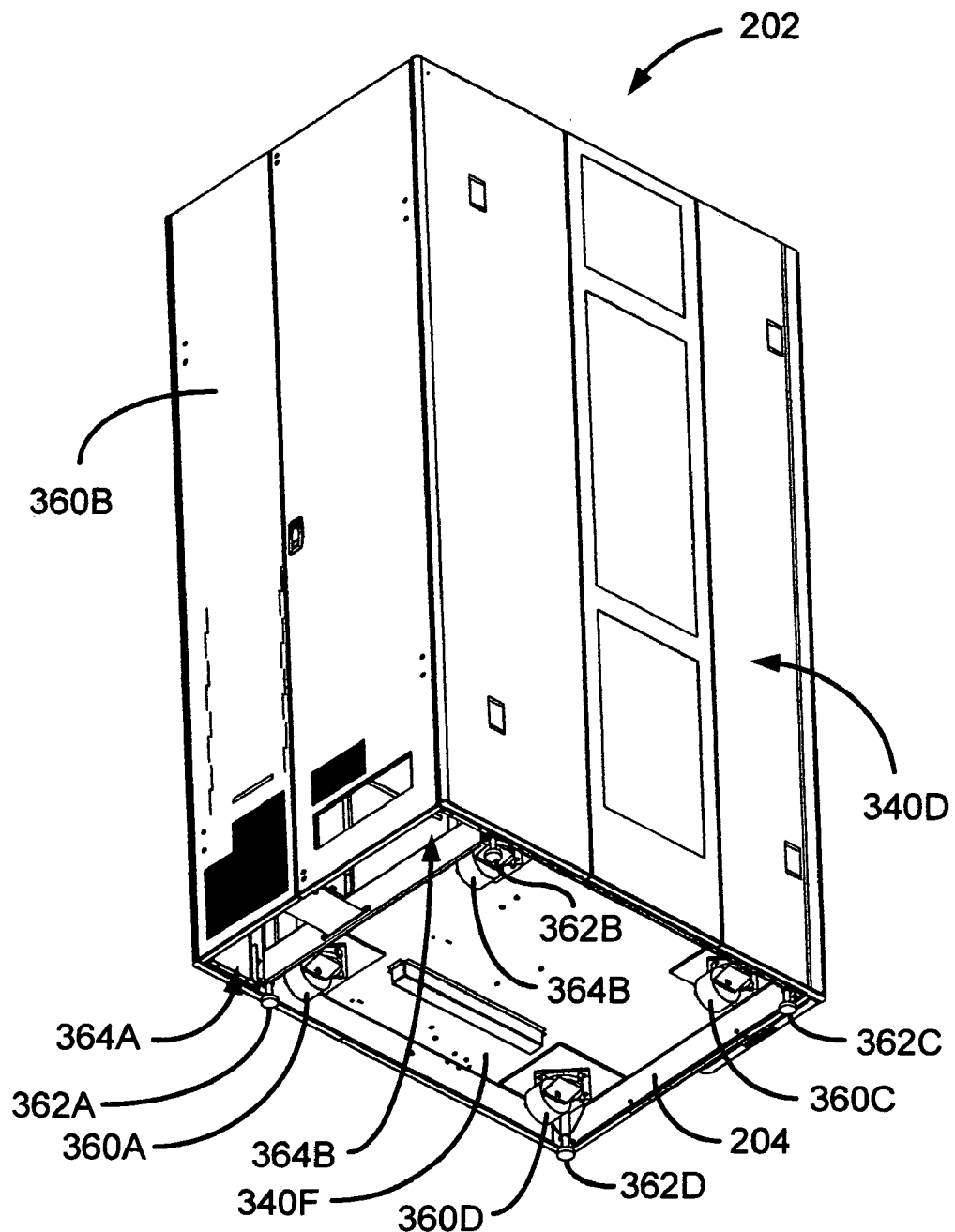

FIG. 5A illustrates a typical drive 180 that is employed in the magazine-based data cartridge library 100. The drive 180 is capable of writing data to and/or reading data from a recording medium that is located within a cartridge 224, shown in FIGS. 9A–B. Typically, the drive 180 is capable of both writing data to and reading data from a recording medium located in the library 100. The drive 180 is comprised of a housing 182 with a front surface 184 that has a receptacle 186 for receiving a cartridge 224. The housing 182 further comprises a back surface 187 and side surface 188 that is comprised of a first surface 190A, a second surface (not shown) that is substantially parallel to the first surface, a third surface 190B that is substantially perpendicular to the first surface 190A, and a fourth surface (not shown) that is substantially parallel to the third surface 190B. Typically, the drive 180 is situated in the library 100 such that the first surface 190A lies in a horizontal plane or in a vertical plane. When the receptacle 186 is longer in one dimension than the other and extends in a direction that is substantially parallel to the first surface 190A, these orientations result in the long dimension of the receptacle 186 extending either horizontally or vertically. FIG. 5B illustrates the drive 180 with an orientation in which the long dimension of the receptacle 186 extends horizontally. In a circular/cylindrical type implementation, either a horizontal receptacle center line 192 or a horizontal drive center line 194 of the drive 180 is typically located: (a) substantially along a radial line/plane, such as radial line 150A of FIG. 3A for example, (b) substantially along a line/plane that is parallel to a radial line/plane, or (b) along a line that is tangent to a circular arc, such as tangent line 158 of FIG. 3C. FIG. 5C illustrates the drive 180 in an orientation in which the long dimension of the receptacle 186 extends vertically. In a circular/cylindrical type implementation, either a vertical receptacle center line 196 or a vertical drive center line 198 of the drive 180 is typically located: (a) substantially along a radial line/plane, (b) substantially along a line/plane that is parallel to a radial line/plane, or (b) along a line that is tangent to a circular arc.

It should be appreciated that the magazine-based data cartridge library 100 is capable of being adapted to any type of drive 106 that is capable of writing date to and/or reading data from a recording medium located in a cartridge. Concomitantly, the magazine-based data cartridge library 100 is also adaptable to any type of data cartridge. For example, the library 100 is capable of being applied to a cartridge with a recording medium that is either a disk, a tape, or a non-moving recording medium (e.g., a solid state memory). Further, the library 100 is capable of being applied to cartridge with a recording medium that is magnetic, optical, magneto-optical or any other type of recording medium. The magazine-based data cartridge library 100 is further capable of being adapted for use with recording mediums that are not located in a cartridge, e.g., CDs.

In many cases, the magazine-based data cartridge library 100 operates on magazine 101 that, unlike the magazines 101 used in cartridge-based data cartridge libraries 100, comprises a structure that allows the magazine 101 to be engaged by the magazine transport 108 so that the transport 108 can move the magazine 101 within the library 100.

With reference to FIGS. 6A–6C, 7A–7B and 8A–8B, an embodiment of a magazine-based data cartridge library 202 (hereinafter referred to as library 202) is described. Generally, the library 202 is comprised of: (a) an embodiment of a frame 204 for supporting elements of the library 202; (b) an embodiment of an entry/exit port 206; (c) an embodiment of a shelf system 208; (d) an embodiment of drives 180; (e) an embodiment of a magazine transport 212; (f) an embodiment of a cartridge transport 214; (g) an embodiment of a power supply system 216; (h) an embodiment of a control system 218; and (i) an embodiment of fans 220 for cooling the library 202. Unless otherwise specified, the LTO data cartridge 224 adapted for use with the LTO magazine 270 will be used herein generically for illustrative purposes.

Figure 7A:
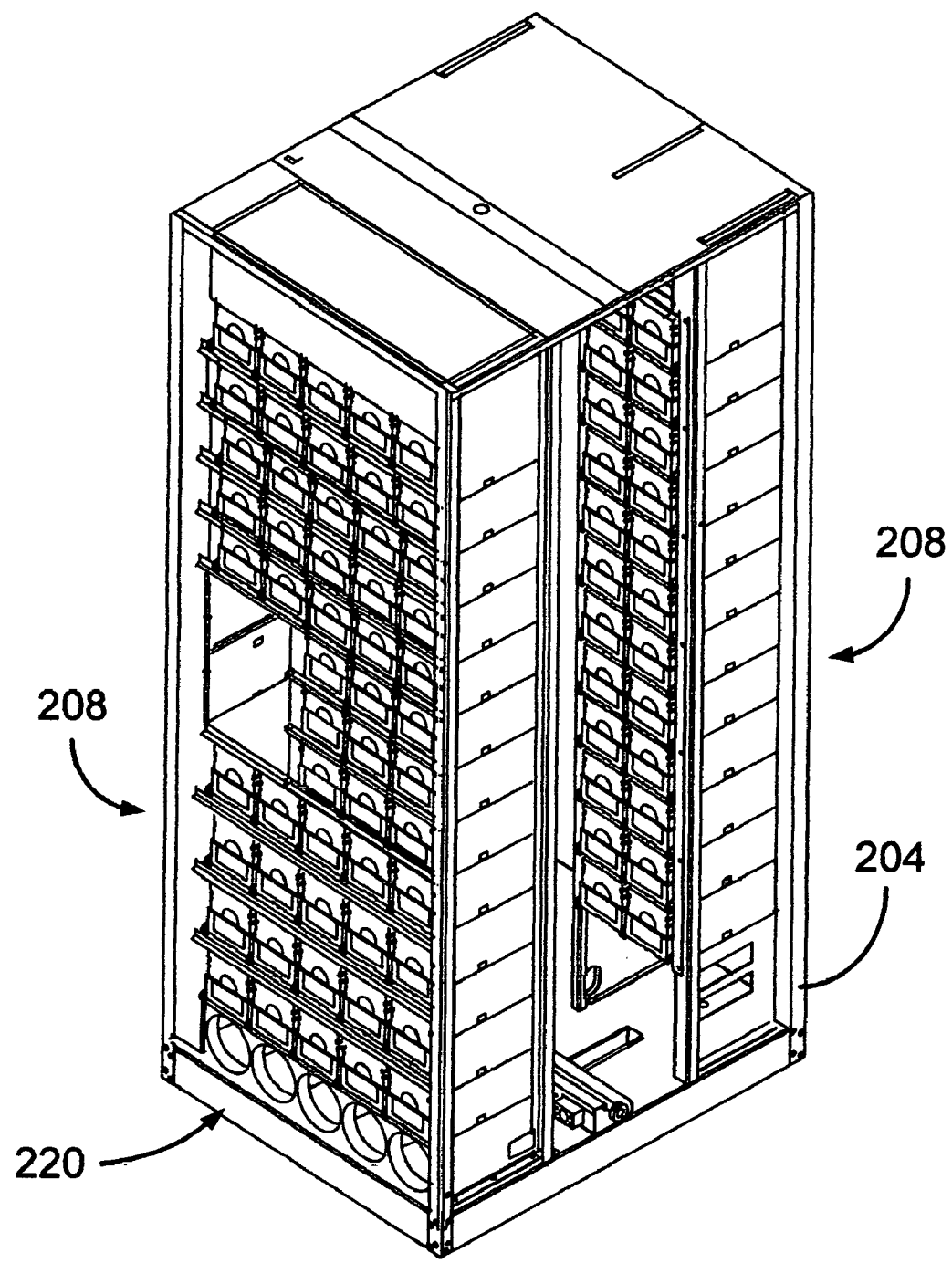
Figure 8A:
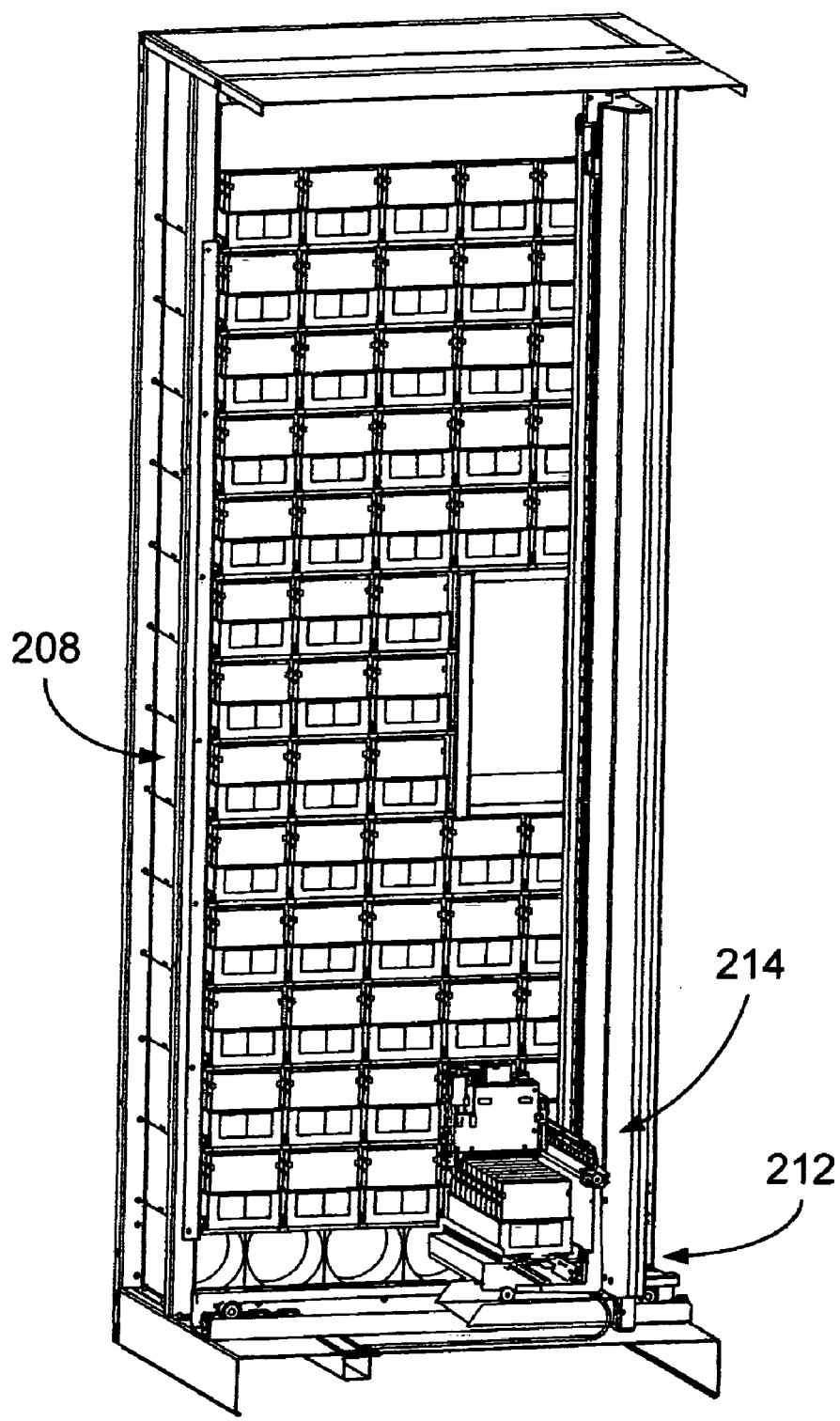
Figure 8B:
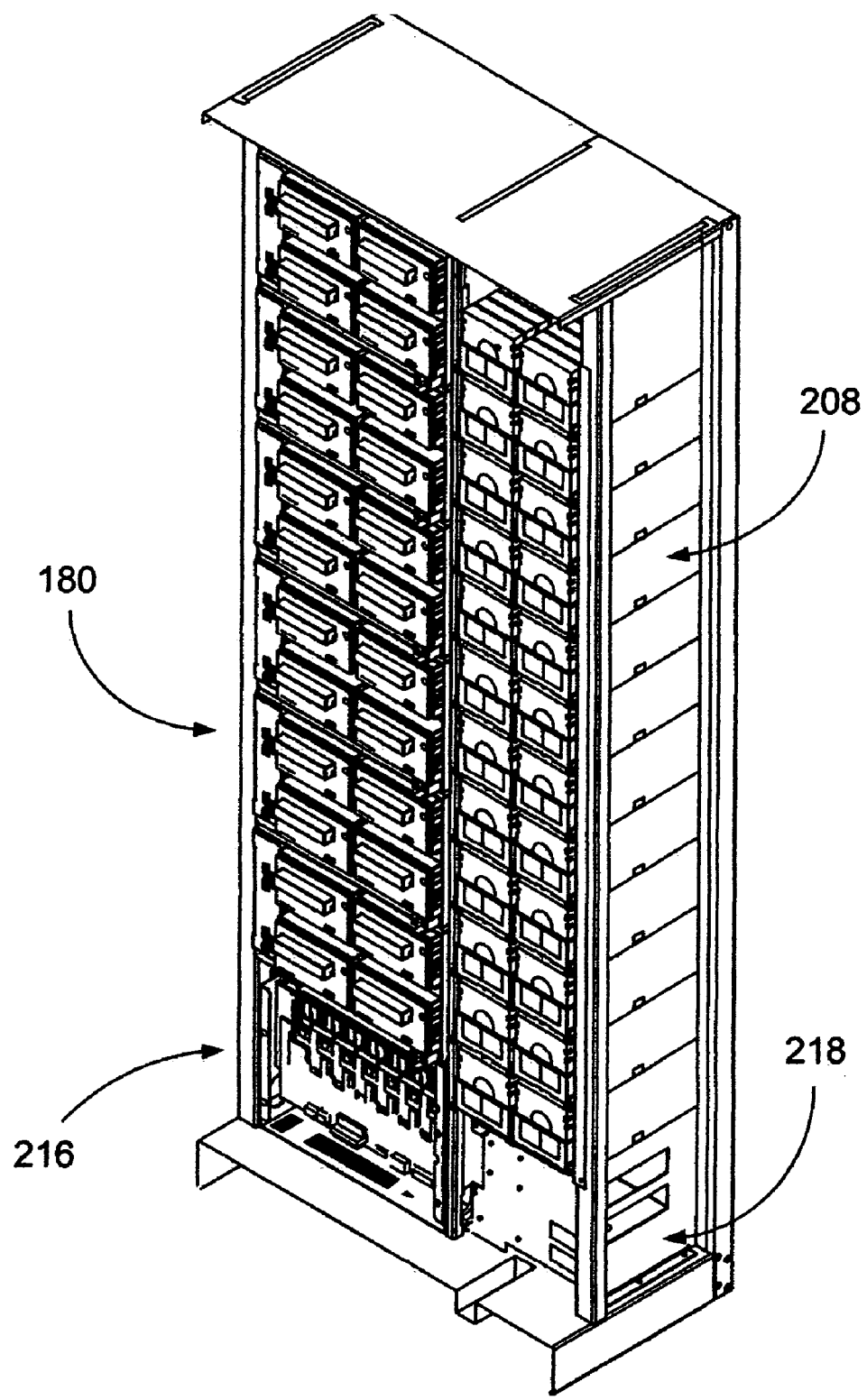

Before describing the library 202 in greater detail, the data cartridges 224, as shown in FIG. 8B, and magazines 270, as shown in FIG. 7A, that the library 202 is adapted to manipulate are described. The library 202 is adapted for operating on magnetic tape cartridges 224 and magazines 270 that contain the tape cartridges 224. Specifically, the library 202 is adapted for operating on cartridges 224 that conform to the following cartridge formats: (a) LTO (linear tape open), (b) SAIT (super advanced intelligent tape, and (c) DLT (digital linear tape). Typically, the library 202 is only used to store magazines 270 that are each used to hold cartridges 224 with the same cartridge format. For instance, the library 202 may be used to store magazines 270 that are each used to hold LTO tape cartridges 224. However, the library 202 is capable of storing magazines 270 that are used to hold cartridges 224 of different types. For instance, the library 202 is capable of storing a magazine 270 that holds LTO tape cartridges 224 and another magazine 320, shown in FIG. 14A, that holds DLT tapes 254, shown in FIG. 11A. Typically, the library 202 is used to store a magazine 270 where the magazine 270 is only used to hold tape cartridges 224 that conform to a single format. For instance, the library 202 may be used to store a magazine 270 that is only used to hold LTO tape cartridges. However, the library 202 is capable of storing a magazine 270 that is used to hold cartridges 224 of different formats. For instance, the library 202 is capable of storing a magazine 270 that is used to hold LTO and SAIT tape cartridges 224, 240.

Figure 9A:
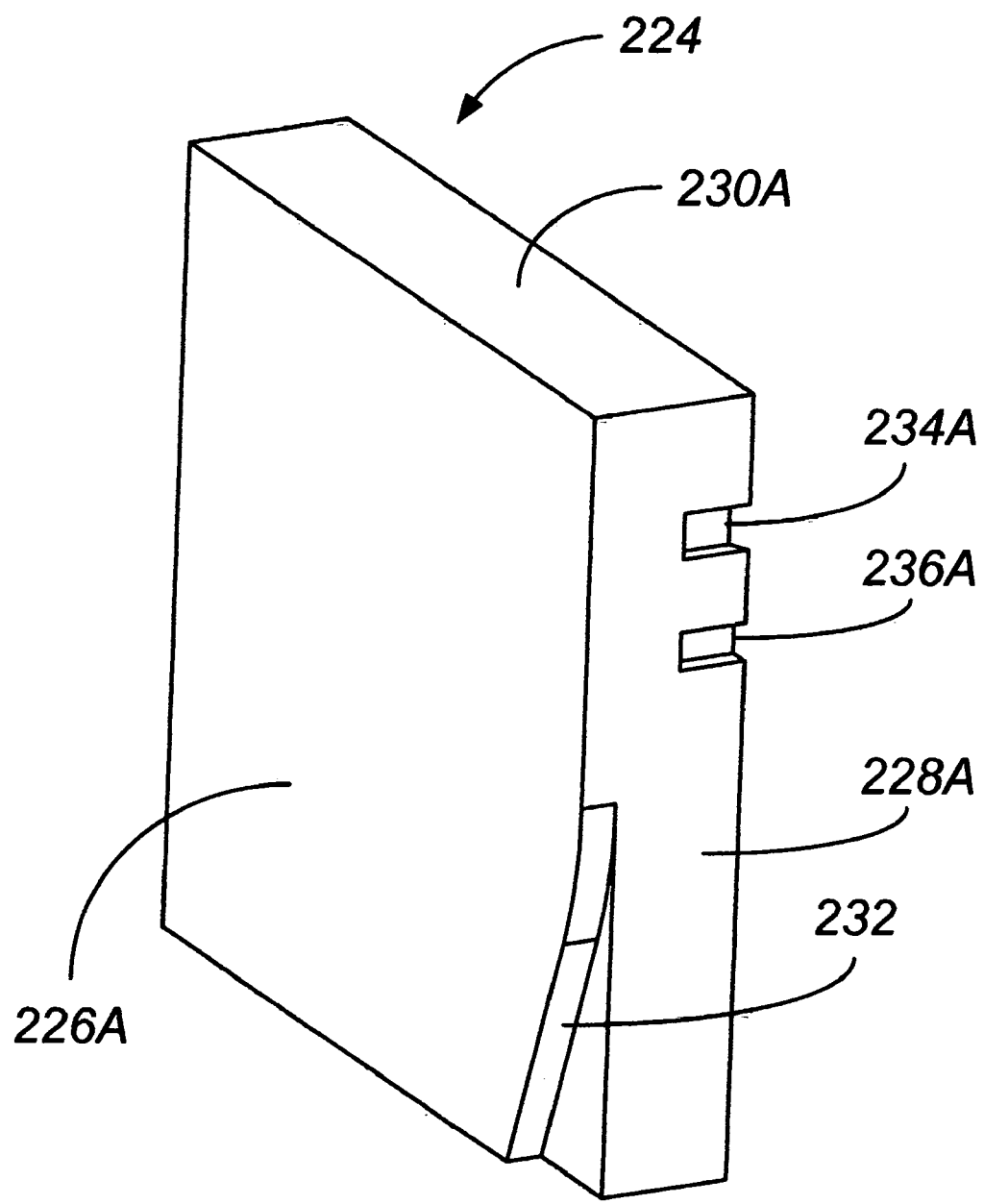
Figure 9B:
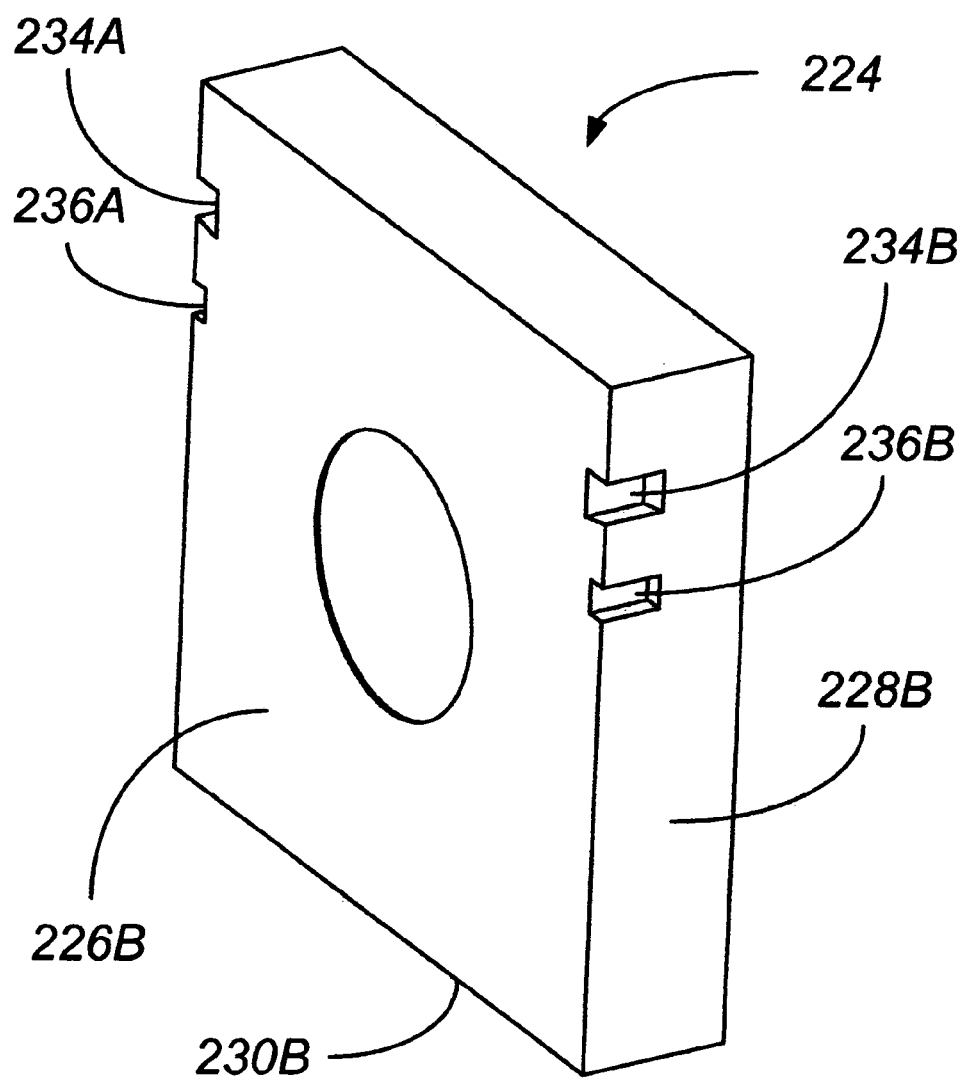

With reference to FIGS. 9A–9B, an LTO tape cartridge 224 comprises a first cartridge face 226A, a second cartridge face 226B, a first cartridge side 228A, a second cartridge side 228B, a first cartridge end 230A, and a second cartridge end 230B. The distance between the first and second cartridge faces 226A, 226B defines the height of the LTO tape cartridge 224, which is 0.85 in. The distance between the first and second side surfaces 228A, 228B defines the width of the LTO tape cartridge 224, which is 4.15 in. The distance between the first and second ends 230A, 230B defines the depth of the LTO tape cartridge 224, which is 4.02 in. The LTO tape cartridge 224 further comprises an orientation feature 232 that provides a basis for properly orientating the cartridge 224 for insertion in to an LTO tape drive (not shown) so that data can be read from and/or written to the recording medium within the cartridge 224. The orientation feature 232 also provides a basis for orienting all of the LTO tape cartridges 224 stored in a particular magazine, such as the magazine 270 of FIG. 7A, in the same manner. The cartridge 224 also comprises a first pair of gripper notches 234A, 234B and a second pair of gripper notches 236A, 236B, with one or both pair of notches typically used by a device (not shown) that grips the cartridge 224 during transport between a magazine 270 and a drive, such as the drive/s 180 of FIG. 7B.

Figure 10A:
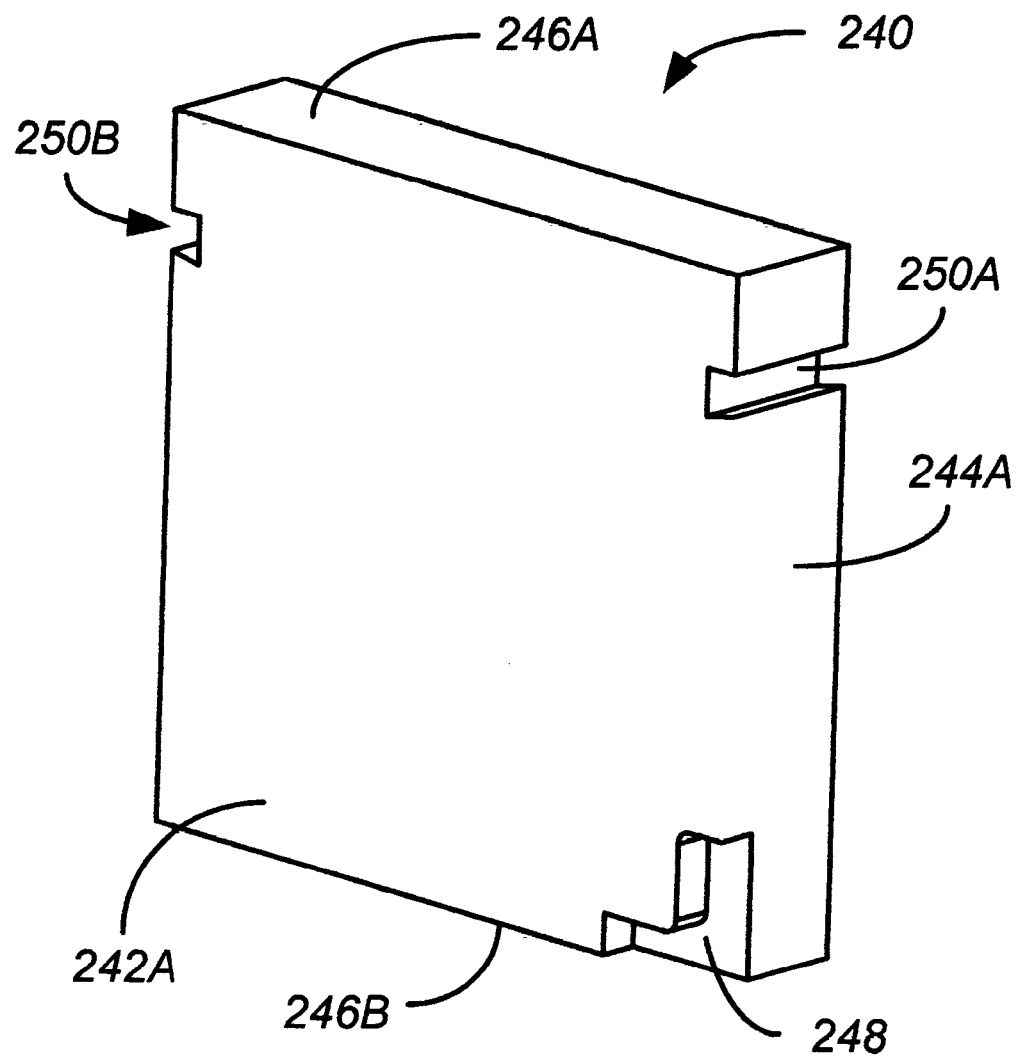
Figure 10B:
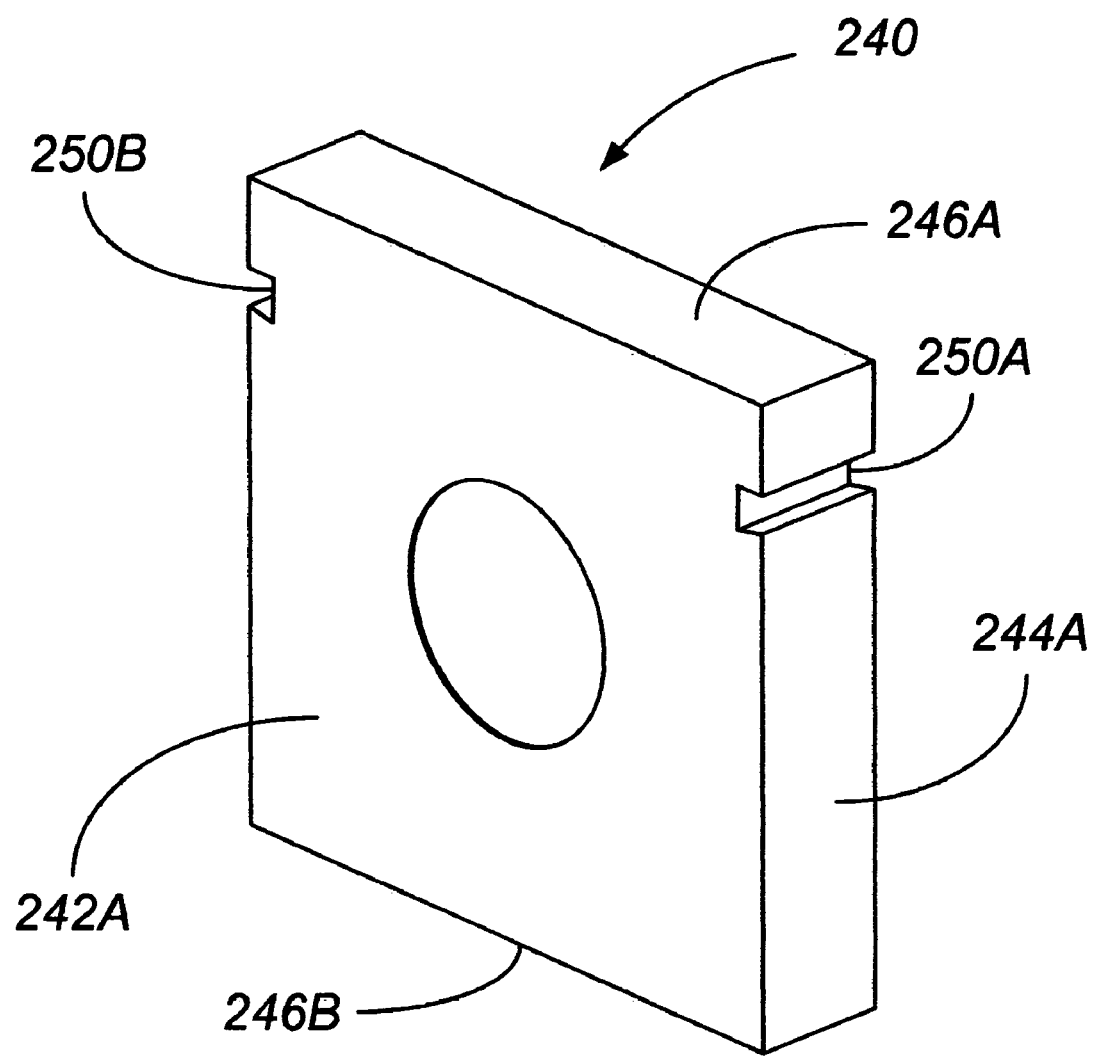

With reference to FIGS. 10A–10B, a SAIT tape cartridge 240 comprises a first cartridge face 242A, a second cartridge face 242B, a first cartridge side 244A, a second cartridge side 244B, a first cartridge end 246A, and a second cartridge end 246B. The distance between the first and second cartridge faces 242A, 242B defines the height of the cartridge 240, which is 0.85 in. The distance between the first and second side surfaces 244A, 244B defines the width of the cartridge 240, which is 4.15 in. The distance between the first and second ends 246A, 246B defines the depth of the cartridge 240, which is 4.02 in. The cartridge 240 further comprises an orientation feature 248 that provides a basis for properly orientating the cartridge 240 for insertion in to an SAIT tape drive (not shown) so that data can be read from and/or written to the recording medium within the cartridge 240. The orientation feature 248 also provides a basis for orienting all of the SAIT tape cartridges 240 stored in a particular magazine, such as the magazine 270 of FIG. 7A, in the same manner. The cartridge 240 also comprises a pair of gripper notches 250A, 250B, which are typically used by a device (not shown) that grips the cartridge 240 during transport between a magazine 270 and a drive, such as the drive/s 180 of FIG. 7B.

Figure 11A:
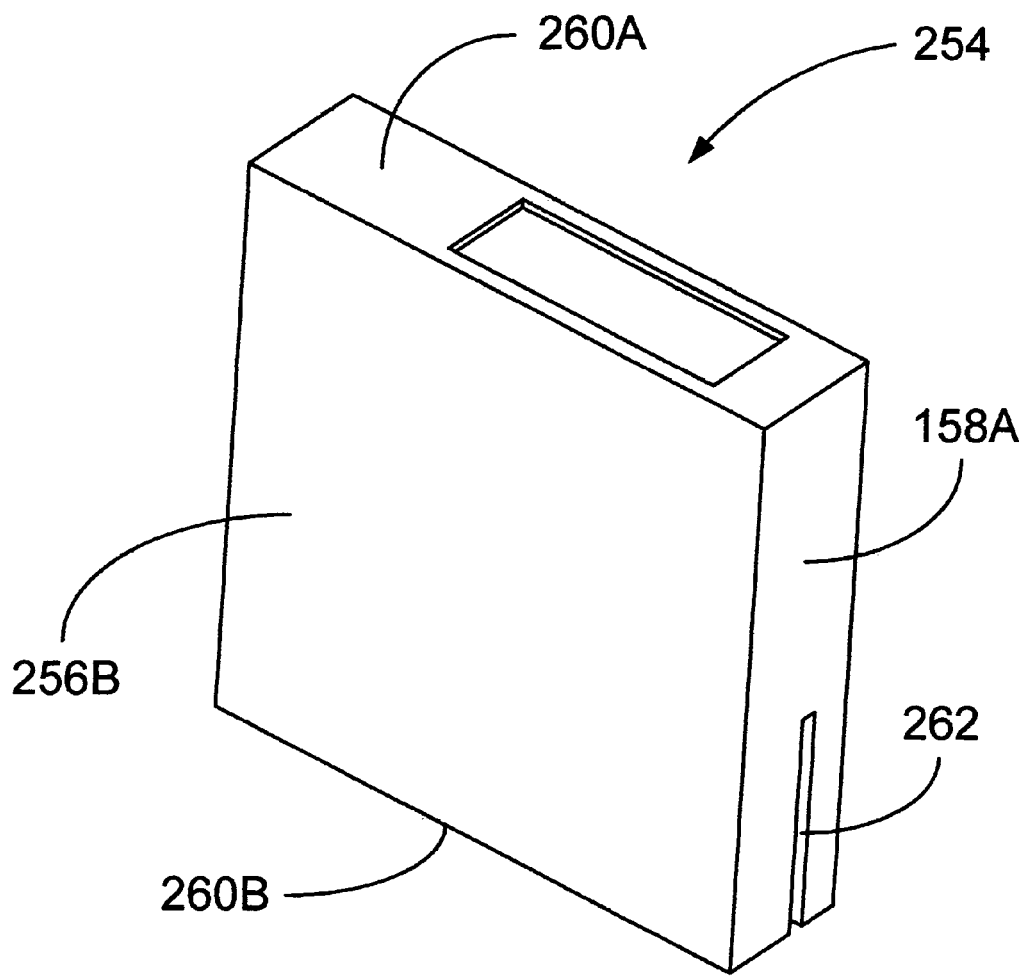
Figure 11B:
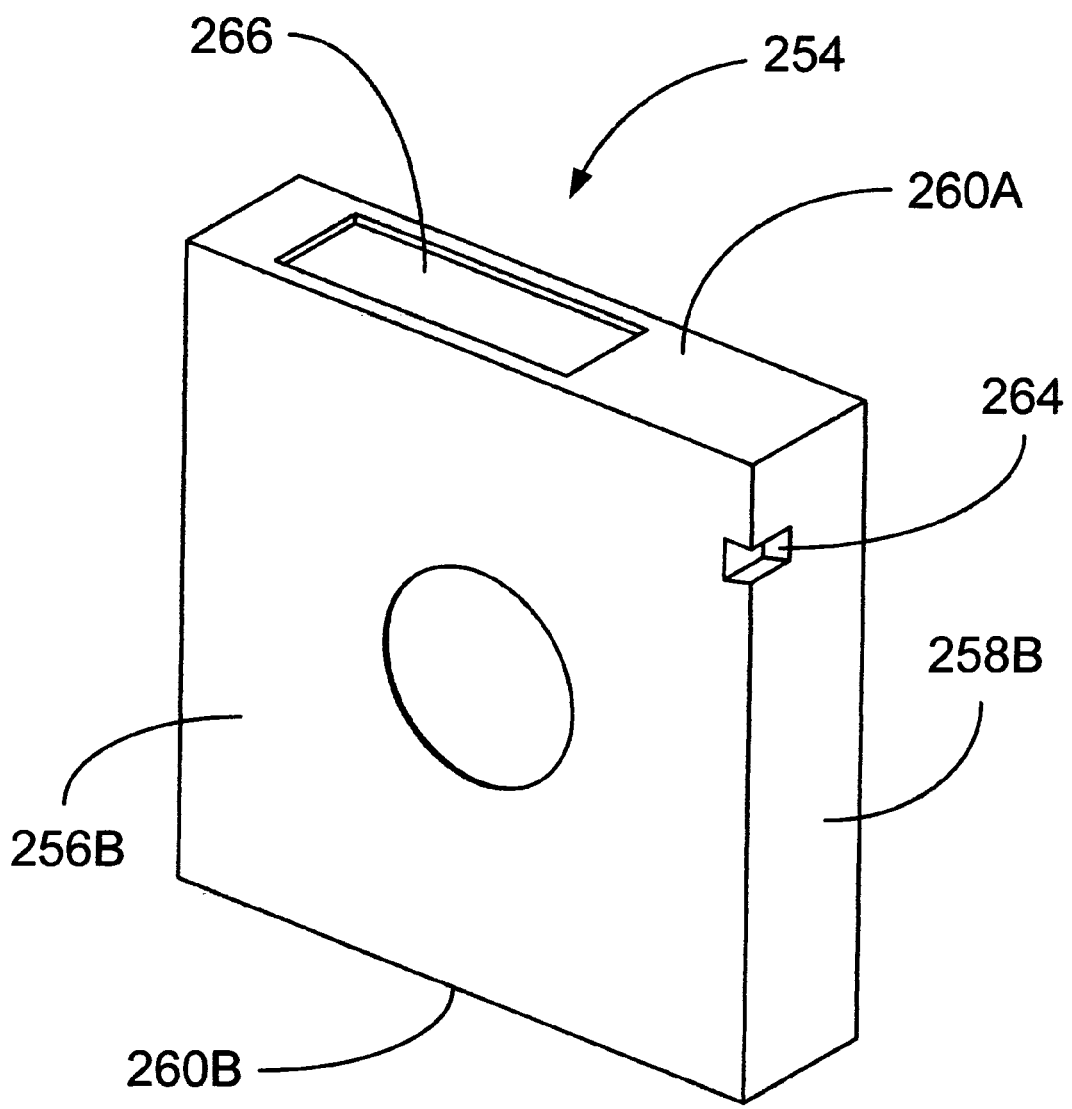

With reference to FIGS. 11A–11B, a DLT tape cartridge 254 comprises a first cartridge face 256A, a second cartridge face 256B, a first cartridge side 258A, a second cartridge side 258B, a first cartridge end 260A, and a second cartridge end 260B. The distance between the first and second cartridge faces 256A, 256B defines the height of the cartridge 254, which is 1.00 in. The distance between the first and second side surfaces 258A, 258B defines the width of the cartridge 254, which is 4.15 in. The distance between the first and second ends 260A, 260B defines the depth of the cartridge 254, which is 4.16 in. The cartridge 254 further comprises an orientation feature 262 that provides a basis for properly orientating the cartridge 254 for insertion into a DLT tape drive (not shown) so that data can be read from and/or written to the recording medium within the cartridge 254. The orientation feature in an actual DLT cartridge 254 is somewhat more complex than the feature shown in FIG. 11A. The orientation feature 262 also provides a basis for orienting all of the DLT tape cartridges 254 stored in a particular magazine, such as the magazine 270 of FIG. 7A, in the same manner. The cartridge 254 also comprises a single gripper notch 264, which is typically used by a device (not shown) that grips the cartridge 254 during transport between a magazine 270 and a drive, such as the drive/s 180 of FIG. 7B. The DLT tape cartridge 254 further comprises a recess 266 in the first end 260A that is typically used for to hold a label, such as a bar-code label, that is used to identify the cartridge 254.

Generally, as will be further elaborated in the description of FIGS. 12A–12D, a magazine, such as an LTO/SAIT accommodating magazine 270, is adapted to hold multiple cartridges, such as LTO and/or SAIT tape cartridges 224 and 240 from FIGS. 11A and 11B for example. The magazine-based library 202 of FIGS. 6A–6C, 7A–7B and 8A–8B will be used for illustrative purposes herein. The magazine 270 is adapted to be moved within the library 202 by the magazine transport 212. An engagement structure (not shown) adapted to cooperate with the magazine transport 212 is capable of displacing the magazine 270 towards and away from a shelf system 208 adapted to support the magazine 270 for archival purposes within the library 202. A magazine, such as the magazine 270, can be an open box like structure, such as a shoe box without a top, with partitions adapted to accommodate a specific cartridge form factor, such as a DLT 254 or LTO 224 form factor. On one embodiment, the magazine 270 is adapted to accommodate a single row of cartridges, such as an LTO 224 cartridge 224. In yet another embodiment, the magazine 270 can be arranged to accommodate two or more rows of cartridges.

Generally, the magazines employed within the library 202 are designed so that when a magazine 270 is operatively situated in the library 202, any tape cartridges 224 held by the magazine 270 are oriented such that the face of the cartridge with the greatest surface area, such as the first cartridge face 256A of DLT tape cartridge 254 from FIG. 11A, lies in a vertical plane.

Figure 12A:
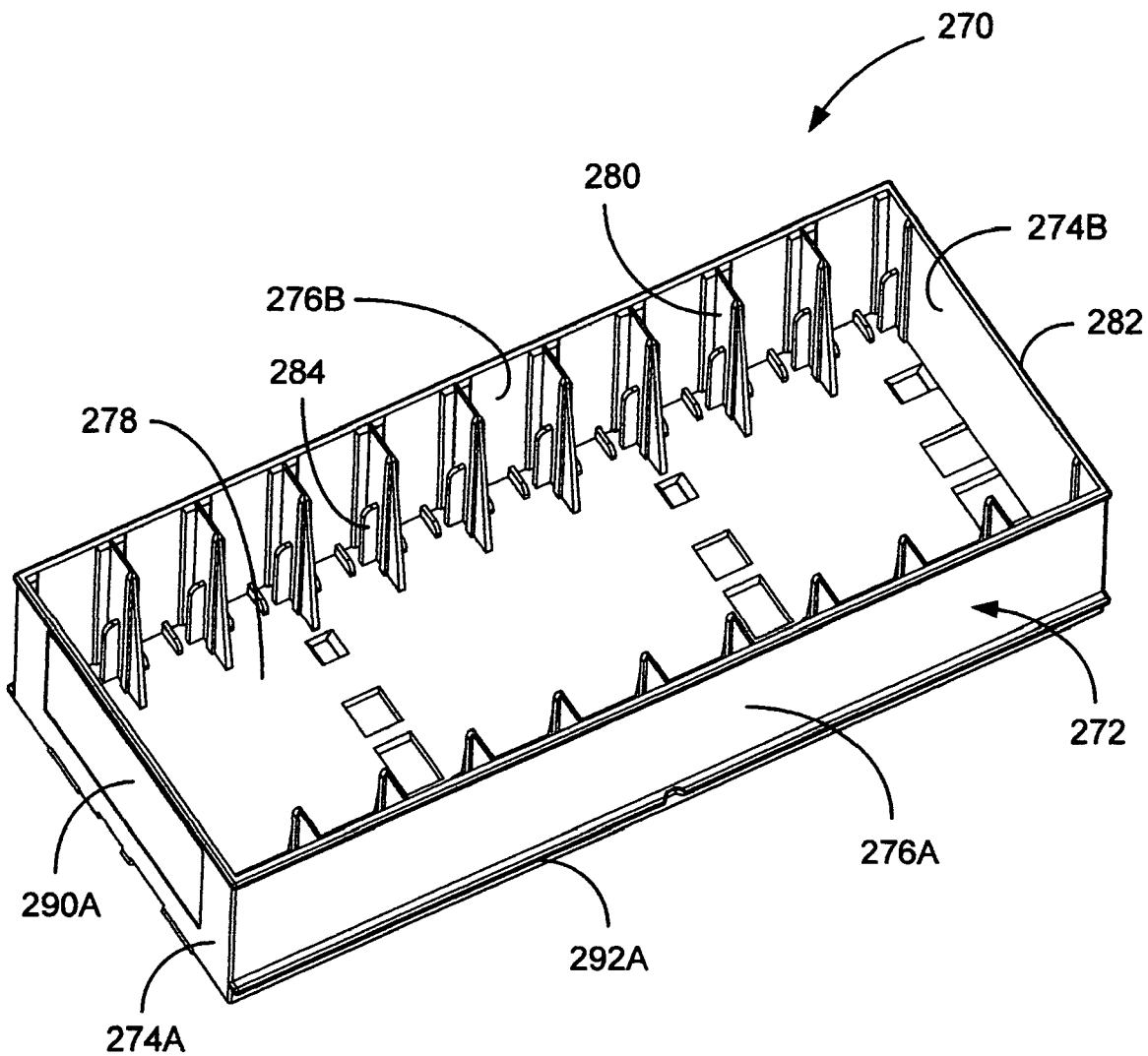
Figure 12B:
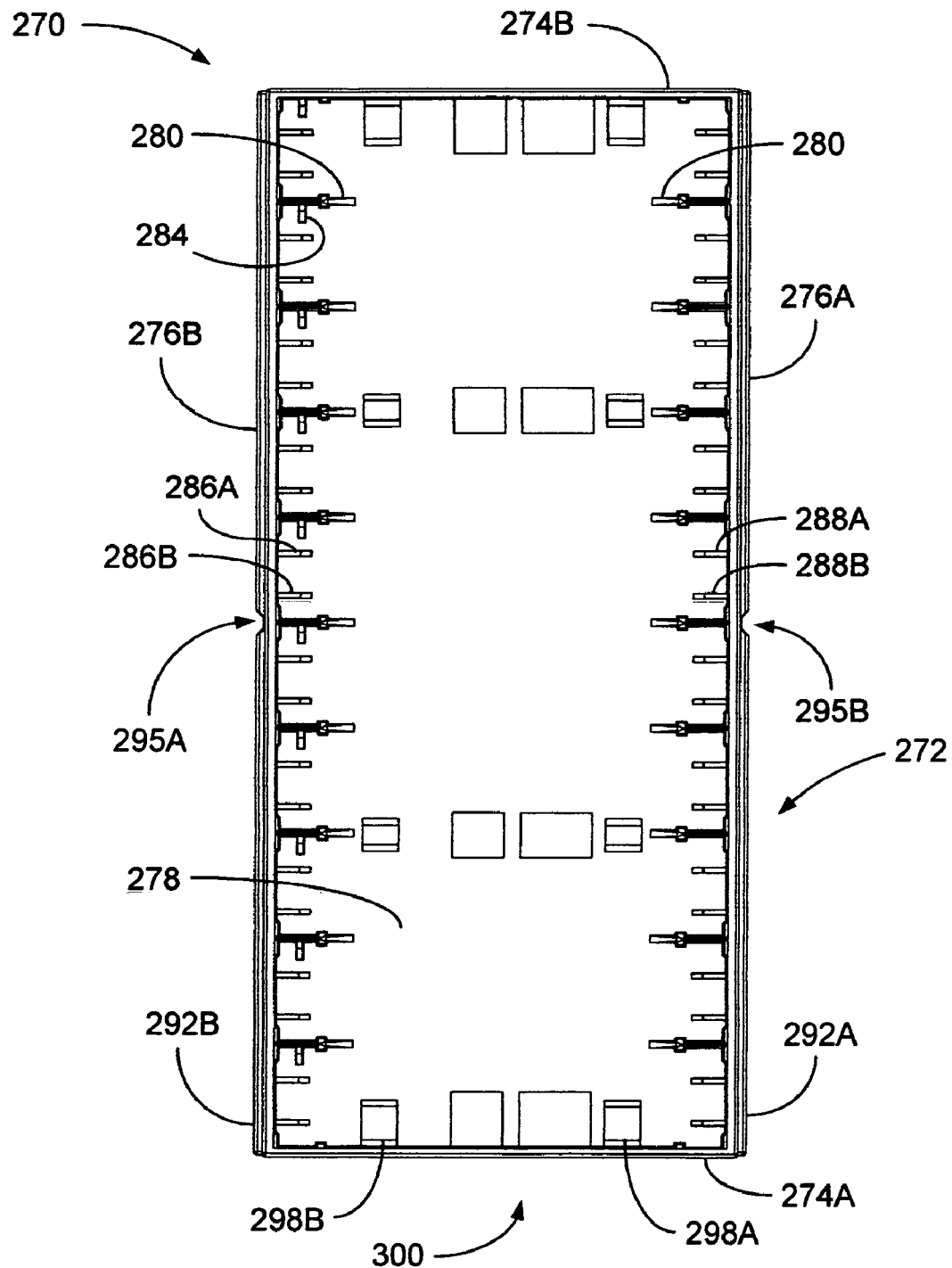
Figure 12C:
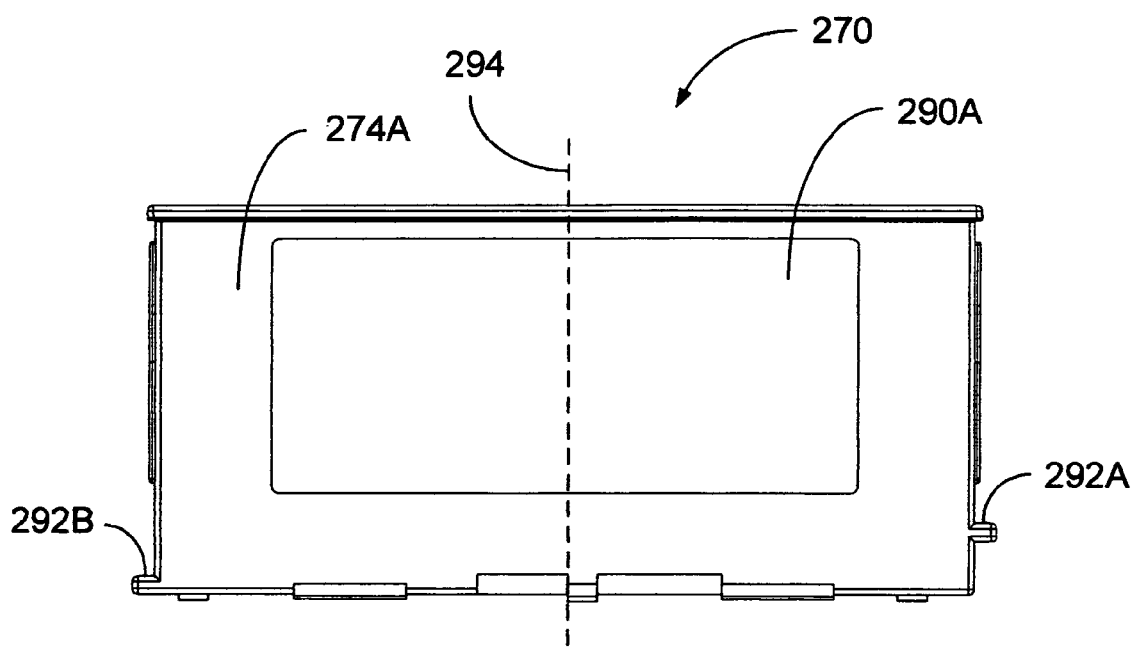
Figure 13A:
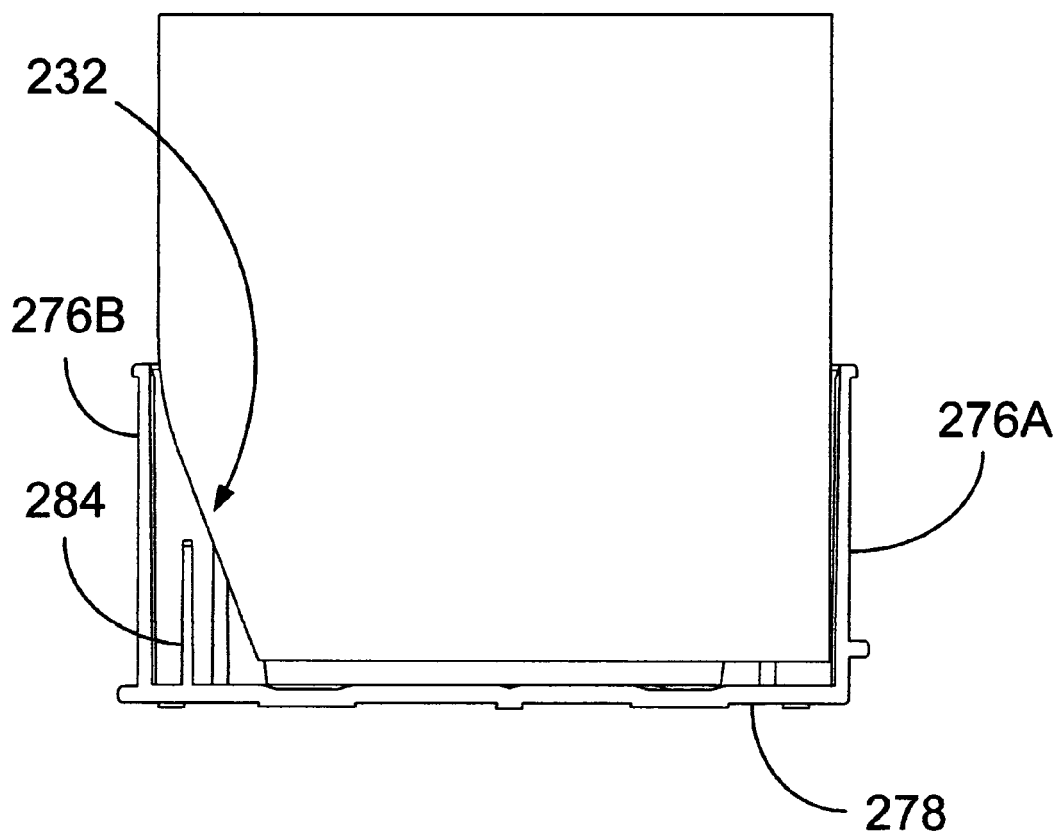
Figure 13B:
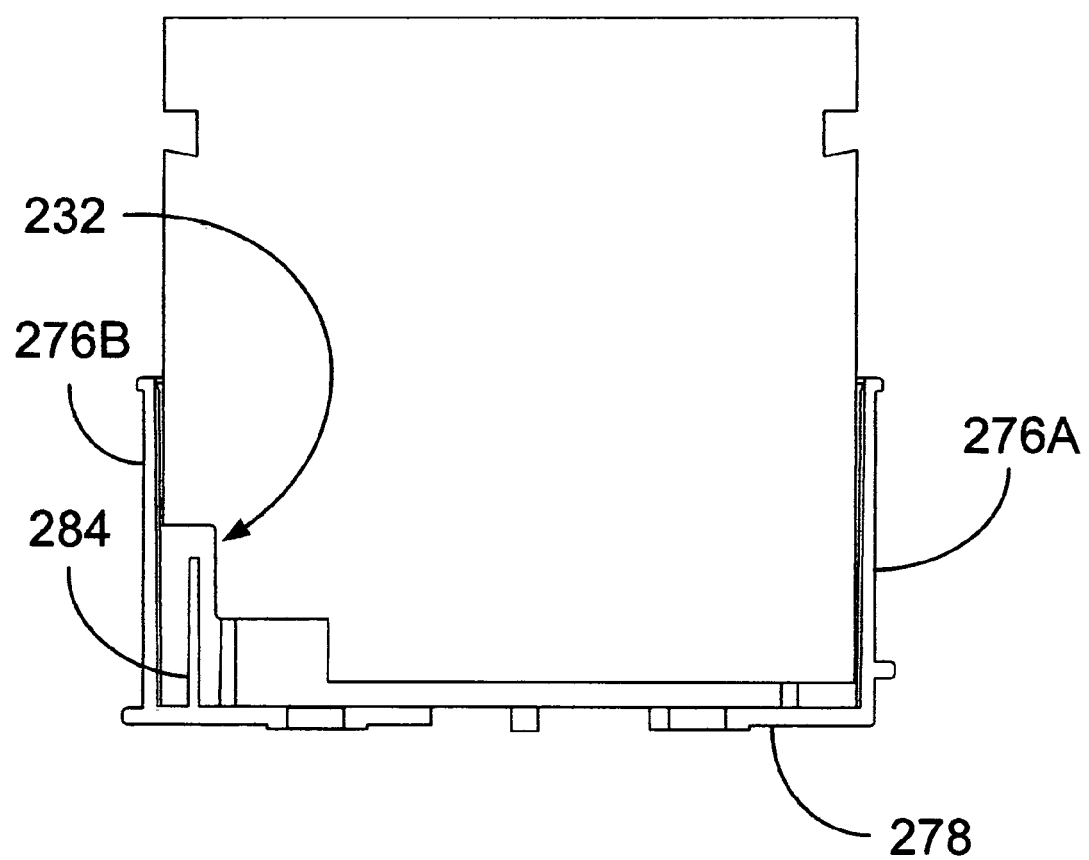
Figure 14A:
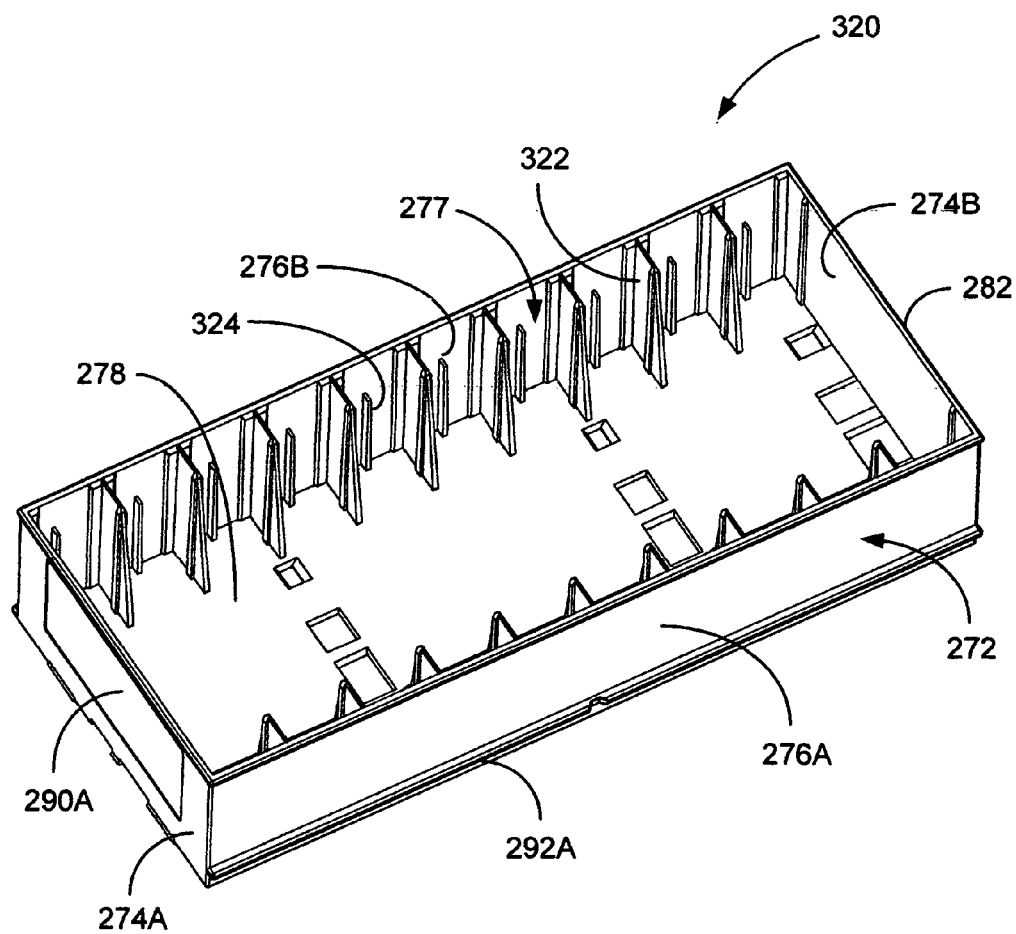

With reference to FIGS. 12A–12D, an embodiment of an LTO/SAIT magazine 270 that is capable of accommodating LTO and/or SAIT tape cartridges 224 and 240 is described. The magazine 270 comprises: (a) a closed-loop side surface 272 that is comprised of a first and second end sides 274A, 274B, and first and second lateral sides 276A, 276B; (b) a bottom side 278; (c) a top side 271; and (d) a plurality of partitioning elements 280 that divide a space defined by the side surface 272 and bottom side 278 into ten slots. The first and second end sides 274A, 274B, and the first and second lateral sides 276A, 276B extend between the bottom side 278 and an edge 282 that defines the opening through which cartridges, such as the LTO cartridges 224, are inserted into and extracted from the magazine 270. Associated with each slot is an orientation structure 284 that is used to ensure that all of the LTO and/or SAIT cartridges 224 and 240 held by the magazine 270 have a predetermined orientation. FIGS. 13A and 13B respectively illustrate the interaction of the orientation feature 232 of an LTO cartridge 224 with the orientation structure 284 and the orientation feature 248 of the SAIT cartridge 240 with the orientation structure 284. Also associated with each slot are first pair of stand-offs 286A, 286B and a second pair of stand-offs 288A, 288B that position the notches, such as 234A or 250A, of either an LTO or SAIT tape cartridge 224 and 240 at a distance from the bottom side 278 that is substantially the same as the distance between the bottom surface of a DLT tape cartridge magazine 320, as shown in FIG. 14A, and the notch 264 of a DLT cartridge 254 held therein. Consequently, regardless of whether an LTO, SAIT or DLT tape cartridge 224, 240 or 254 is presented to the cartridge transport 214, the respective notch or notches, such as 234A and 236A from the LTO cartridge 224, of the cartridge are at substantially the same distance from the bottom 278 of the magazine 270 or 320.

This simplifies the design of the cartridge transport 214. The distance between the first and second end sides 274A, 274B is approximately equal to the distance between the front and backs surfaces of an LTO or SAIT drive (generically shown in FIG. 5A as front surface 184 and back surface 187 of a generic drive), i.e., within about 20% of the distance between the front and back surface of such a drive.

Associated with the first end side 274A of the magazine 270 is a recess 290A for accommodating a label that is used to identify the magazine 270 or distinguish the magazine 270 from other magazines in the library 202. A recess 290B for accommodating an adhesive label is also associated with the second end side 274B. The recesses 290A and 290B are associated with the first and second end surfaces 274A and 274B because, when the magazine 270 is operatively positioned on a shelf of the shelf system 208 in the library 202, either the first end side 274A or the second end side 274B will be exposed or visible so that any label residing in the recess 290A and 290B can be read. One alternative to the use of a recess 290A and 290B adapted to hold an adhesive label is a sleeve or slot structure capable of holding a non-adhesive label. Another alternative to the use of a recess is a radio frequency identification tag (RFID tag). An RFID tag can either be substantially permanently fixed to the magazine 270 or removable. Further, the RFID tag can either have a permanent identification code or be programmable. Moreover, the RFID tag, unlike a bar-code label, does not necessarily require an unobstructed "line of sight" with a RFID tag reader to be read. Consequently, a single RFID tag may be sufficient.

The magazine 270 further comprises a first and second rails 292A, 292B that are respectively associated with the first and second lateral sides 276A, 276B. The LTO data cartridge 224 will be used generically herein for purposes of illustration unless otherwise specified. With reference to FIG. 12C, the first and second rails 292A, 292B are located so as to establish an asymmetry that is used to position the magazine 270 with a predetermined orientation within the library 202. More specifically, the first and second rails 292A, 292B are asymmetric with respect to a plane 294 that bisects the magazine 270. The ability to position the magazine 270 with a predetermined orientation within the library 202 and to position the cartridges 224 held by the magazine 270 with a predetermined orientation, in turn, substantially ensures that the cartridges 224 will also be presented to the cartridge transport 214 in the same orientation. Other structures that establish an asymmetry relative to other planes are also feasible. The rails 292A, 292B also facilitate the guiding of the magazine 270 within the library 202 (e.g., guiding the magazine 270 to a particular location on a shelf of the shelf system 208) and prevent the magazine 270 from being displaced in certain directions. Respectively associated with the rails 292A, 292B are notches 295A, 295B. The notches 295A, 295B are used with complementary structures associated with the magazine transport 212 to hold the magazine 270 in place when the magazine 270 is associated with the transport 214.

Figure 12D:
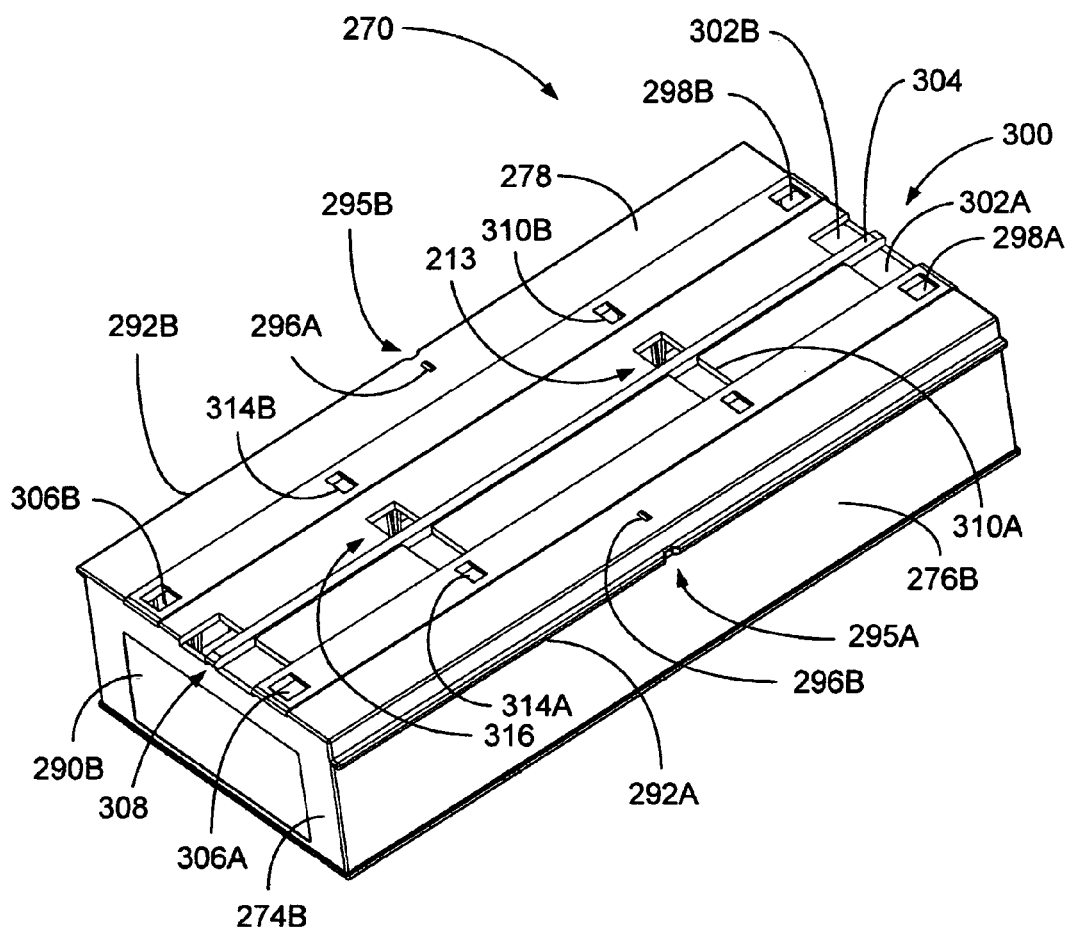

With reference to FIG. 12D, associated with the bottom side 278 of the magazine 270 are a pair of detents 296A, 296B that cooperate with complementary structures associated with a shelf of the shelf system 208 to prevent the magazine 270 from being displaced away from a shelf of the shelf system 208 in an uncontrolled manner, i.e., being displaced away from the shelf by something other than the magazine transport 212. The detents 296A, 296B and the complementary structures associated with a shelf of the shelf system 208 form a passive latch (i.e., a latch without any moving parts). A latch can also be realized by swapping the detents 296A, 296B and the complementary structures, i.e., associating the detents 296A, 296B with the shelf of the shelf system 208 and the complementary structures (such as the receptacle 530 comprised by the cleat 522A as shown in FIG. 22B with the magazine 270. Also feasible is an active latch in which either an element associated with the magazine 270 or an element associated with the shelf of the shelf system 208 includes a moving component. Typically, the moving element comprises an element that operates in a spring-like fashion to allow the latch to be engaged and disengaged when desired. An example of an active latch mechanism is disclosed in U.S. patent application Publication Ser. No. 2003/0,076,618 A1.

The magazine 270 further comprises a first pair of engagement holes 298A, 298B that are utilized by the magazine transport 212 to displace the magazine 270 towards or away from a shelf in the shelf system 208. More specifically, the magazine transport 212 "hooks" the holes 298A, 298B and then pulls and/or pushes the magazine 270 towards or away from a shelf in the shelf system 208. Associated with the first pair of engagement holes 298A, 298B is a first engagement flag structure 300 that is comprised of a pair of holes 302A, 302B, that are separated by a bar 304. The engagement flag structure 300 operates such that when magazine transport 212 has engaged the magazine 270, the bar 304 breaks a beam of light and when the magazine transport 212 is not engaging the magazine 270, the bar 304 does not break the beam of light. As an alternative to the engagement flag structure 300, the exterior surface of the bottom side 278 of the magazine 270 can be used to indicate when the magazine transport 212 is engaging the magazine 270 and when the magazine transport 212 is not engaging the magazine 270. To elaborate, the bottom side 278 can be used as a reflective surface that can be used to determine whether or not the magazine 270 has been engaged by the magazine transport 212.

The magazine 270 further comprises a second pair of engagement holes 306A, 306B, and a second engagement flag structure 308 that are used in the same manner as the first pair of engagement holes 298A, 298B and the first engagement flag structure 300. Two sets of engagement holes 298A, 298B, 306A, 306B are utilized because when the magazine 270 is associated with a shelf in the shelf system 208 on one side of the magazine transport 212, the first pair of engagement holes 298A, 298B is accessible but the second pair of engagement holes 306A, 306B is not readily accessible. Conversely, when the magazine 270 is associated with a shelf in the shelf system 208 that is located on the opposite side of the magazine transport 212, the second pair of engagement holes 306A, 306B is accessible but the first pair of engagement holes 298A, 298B is not readily accessible. Presently, the magazine 270 has a third pair of engagement holes 310A, 310B with an associated third engagement flag structure 312 and a fourth pair of engagement holes 314A, 314B and an associated fourth engagement flag structure 316 that are capable of being used by the magazine transport 212 to move the magazine 270 but are not currently utilized. It should be appreciated that other structures that are capable of being "hooked" are feasible. For instance, a single hole is feasible. Also, feasible are one or multiple indentations and one or multiple protrusions. Further, while the magazine transport 212 "hooks" the magazine 270, it should be appreciated that the magazine 270 can be adapted to facilitate engagement of the magazine 270 by a device that grasps the magazine 270 between two arms. Possible structures to facilitate grasping of the magazine 270 comprise a pair of holes in the magazine 270, a pair of indentations in the magazine 270, and a pair of protrusions that extend outward from one or more surfaces of the magazine 270.

Figure 14B:
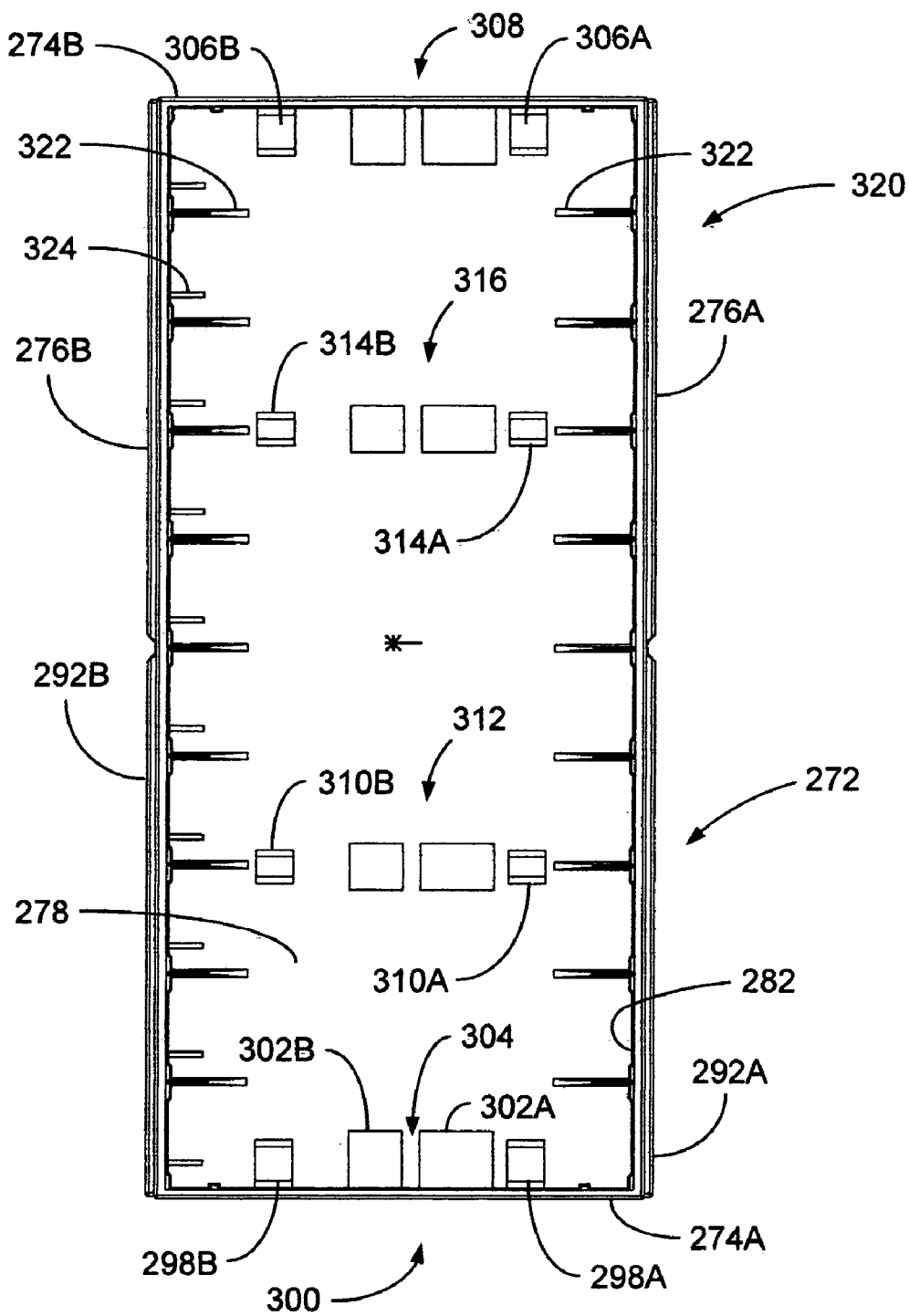
Figure 15:
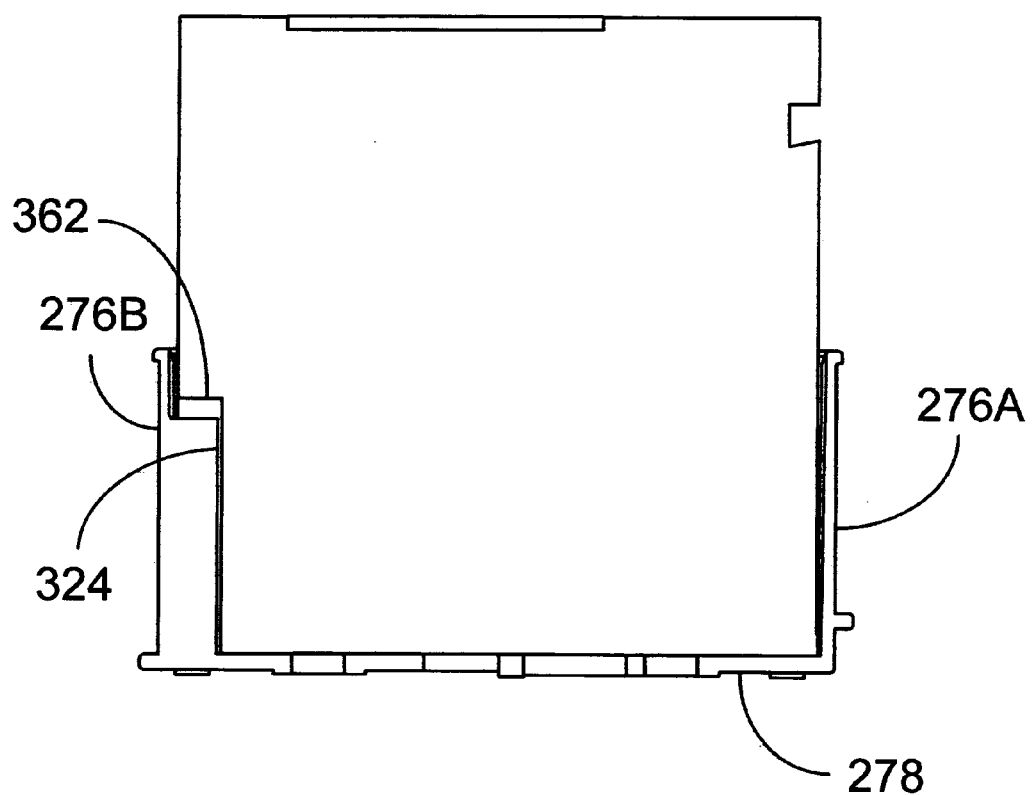

With reference to FIGS. 14A–14B, an embodiment of a DLT magazine 320 that is capable of accommodating DLT tape cartridges 254 is described. The DLT magazine 320 is substantially identical to the LTO/SAIT magazine 270. Consequently, those elements of the DLT magazine 320 that are common to both the DLT magazine 320 and LTO/SAIT 270 are not described further. Further, in describing the DLT magazine 320, elements of the DLT magazine 320 that are substantially identical to elements in the LTO/SAIT magazine 270 will bear the same reference number as those substantially identical elements in the LTO/SAIT magazine 270. The DLT magazine 320, in addition to the elements that are common to the LTO/SAIT magazine 270, comprises partitioning elements 322 that divide the interior space of the magazine into nine slots 277. Associated with each slot 277 is an orientation structure 324 that is used to ensure that all of the DLT cartridges 254 held by the magazine 320 have a predetermined orientation. FIG. 15 illustrates the interaction of the orientation feature 262 of a DLT cartridge 254 with the orientation feature 324 of the magazine 320. It should also be noted that the DLT magazine 320 does not employ any stand-offs.

Figure 16:
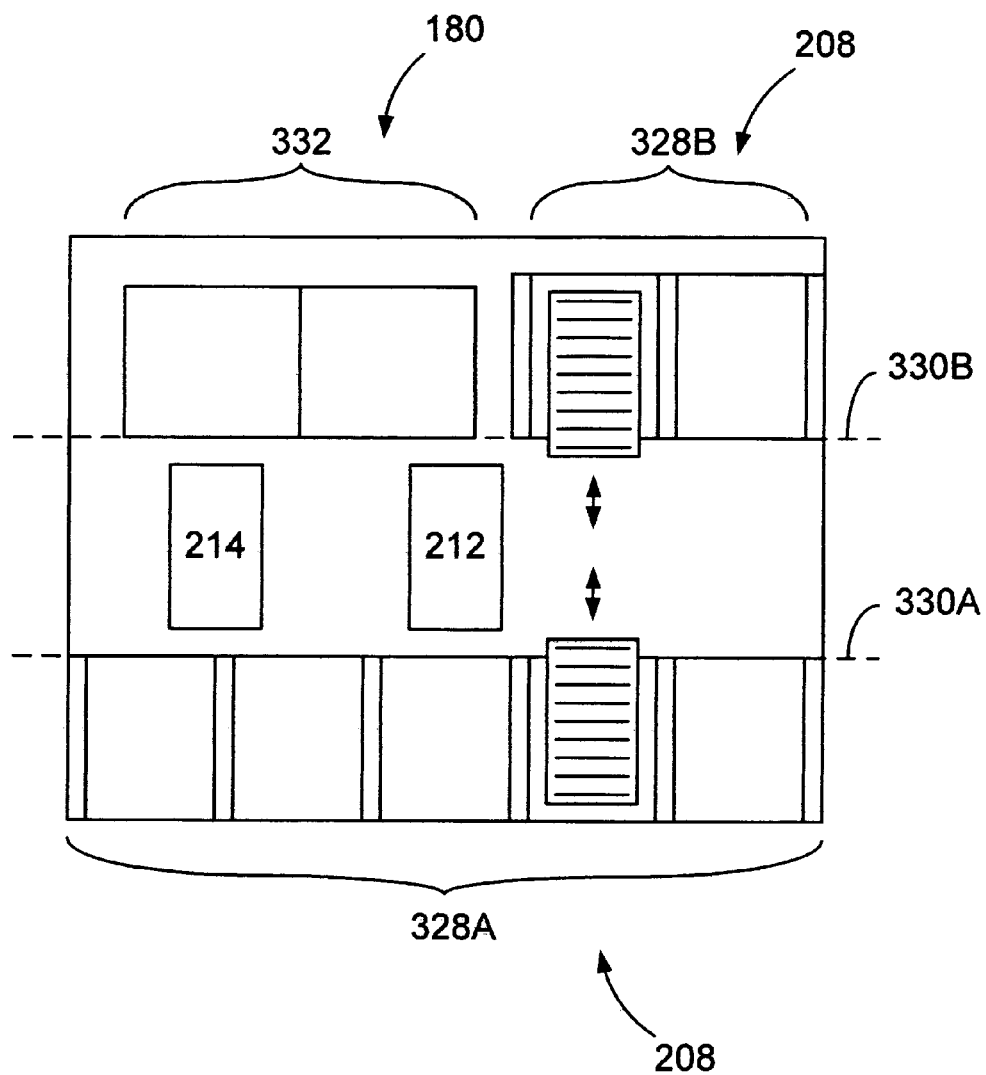

Having described the cartridges 224, 240 or 254 and magazines 270 and 320 on which the library 202 operates, the general layout of the library 202 is now described. As shown in FIG. 16, the layout of the library 202 is a rectilinear layout that conforms to the specifications for the rectilinear layout illustrated in FIG. 2B. More specifically, the shelf system 208 comprises five columns of shelving 328A located along a first plane 330A, two columns of shelving 328B located along a second plane 330B, and two columns of drives 332 located along the second plane 330B. The magazine transport 212 and cartridge transport 214 are each located in the space between the first and second planes 330A, 330B and each 212 and 214 move at least within a portion of the space between the first and second planes 330A, 330B. Most of the other elements of the library 202 also conform to the rectilinear layout. Specifically, the entry/exit port 206 is located within the five columns of shelving 328A and along the first plane 330A; the power supply 216 is located below the two columns of drives 332 and either along the second plane 330B or along a parallel plane; the control system 218 is located below the two columns of shelving 328B and either along the second plane 330B or along a parallel plane; and the fans 220 are located under the five columns of shelving 328A and either along the first plane 330A or a parallel plane.

In addition to the general layout of the library 202, the user has a choice about the function of certain space in the library 202. To elaborate and with reference to FIG. 7B, the library 202 comprises a user-definable space 332 with six stations that are each capable of accommodating either one of two types of modules. As shown in conjunction with FIG. 23B, each of the stations is capable of accommodating a drive bay module 540, that holds up to four drives, such as 548A–D, or a magazine bay module that provides shelving for up to four magazines 270. A user-definable space with less than six stations is feasible. Further, if multiple stations are employed, each station does not need to have the same dimensions. For instance, a station could accommodate either only one drive 180 or provide shelving for only one magazine 270.

With reference to FIGS. 6A–6C, 7A–7B and 8A, 8B, the frame 204 comprises elements that define the edges of a box-like structure and the surfaces of the box-like structure, [therein defining an interior space]. The surfaces comprise a front surface 340A, a back surface 340B, a first side surface 340C, a second side surface 340D, a top surface 340E, and a bottom surface 340F. Associated with the front surface 340A are the entry/exit port 206, an operator interface 342 that is implemented with a touch screen, and a grill structure 344 that covers the fans 220. Associated with the back surface 340B are a fixed panel 346 that is located adjacent to a series of shelves 208, a hinged door panel 348 that provides access to the drives 180 and the power supply 216, an opening 350 through which an AC cable(s) is/are connected to the power supply 216, and a grill 352 for promoting air circulation within the library 202. The first side surface 340C is removable so that the library 202 can be cascaded with at least one add-on unit to expand the library 202. Also associated with the first side surface 340C is a first clear panel 354A that allows an operator to view the interior of the library 202. Similarly, a second clear panel 354B is associated with the second side surface 340D. The top surface 340E includes a pair of knockouts 356A, 356B that can be used to receive one or more AC cables that are connected to the power supply 216 and/or one or more computer cables that are used to connect the library 202 to a host computer. Also associated with the top surface 340E is a fire suppression system hole 358 for receiving a nozzle or other device for dispensing a fire retardant into the library 202. Associated with the bottom surface 340F are casters 360A, 360B, 360C and 360D that facilitate movement of the library 202 and adjustable stands 362A, 362B, 362C and 362D that allow the library 202 to be leveled after the library 202 has been positioned in a relatively permanent location. Further associated with the bottom surface 340F are openings 364A, 364B for receiving one or more AC cables that are connected to the power supply 216 and/or a computer cable(s) that are used to connect the library 202 to a host computer.

The library 202 has a depth of 43.16 in. as measured from the front surface 340A to the back surface 340B, a width of 30.50 in. as measured from the first side surface 340C to the second side surface; and a height of 74.25 in. as measured from the top surface 340E to the bottom surface 340F.

Generally, the entry/exit port 206 serves to move magazines 270 between: (a) an environment that is exterior to the library 202 and accessible to a user, or operator, and (b) a space located within the library 202 and accessible by the magazine transport 212. When the entry/exit port 206 is exposed to the exterior environment such that an operator can either remove a magazine 270 that has been conveyed from the space within the library 202 or place a magazine 270 in the entry/exit port 206 for conveyance to the space within the library 202, the port 206 is in a first state. Similarly, when the port 206 is exposed to the space located within the library 202 such that the magazine transport 212 can either remove a magazine 270 that is in the space or place a magazine 270 in the space (typically, for conveyance to the exterior environment) the magazine 270 is in a second state.

Figure 17A:
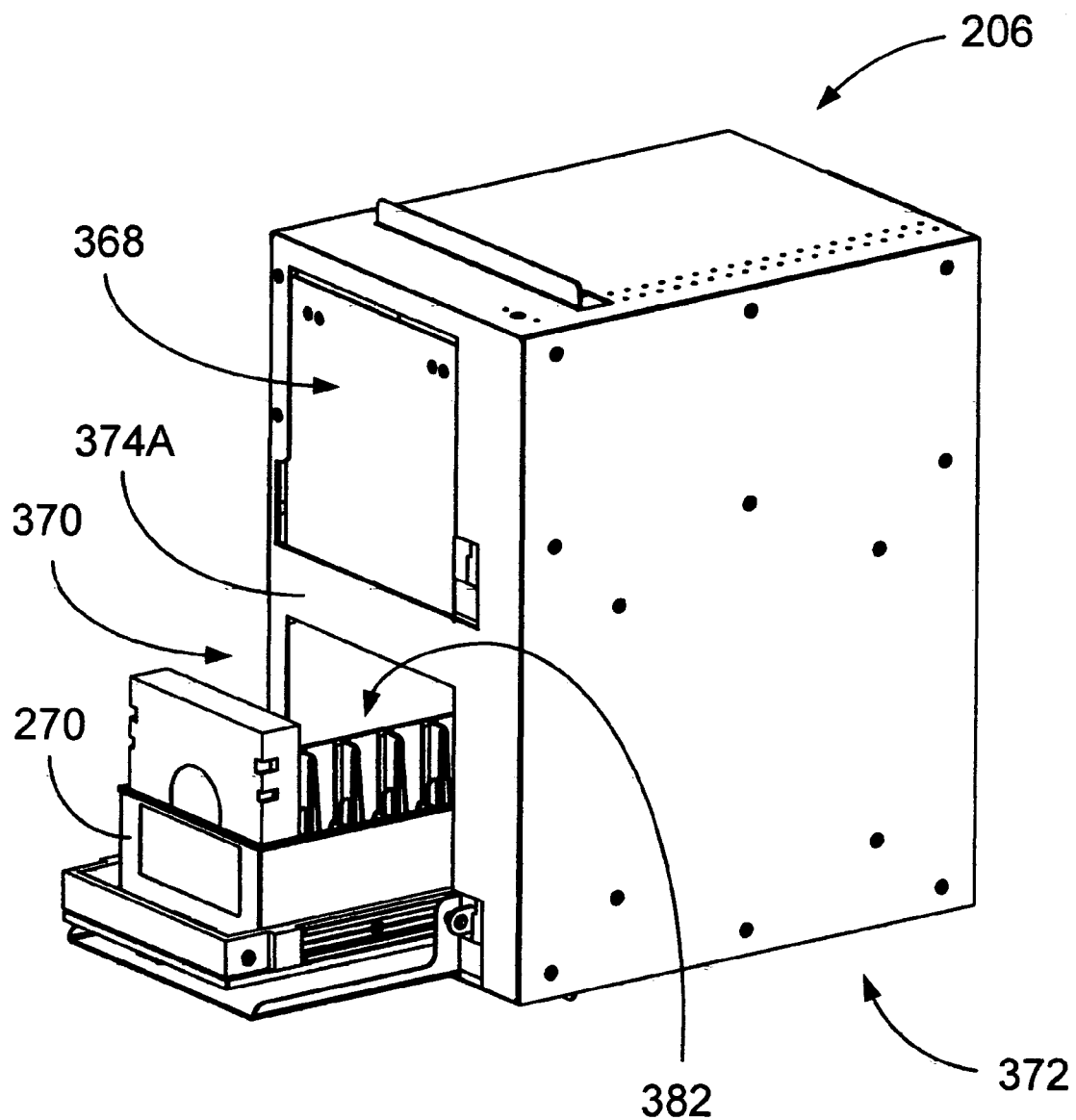
Figure 17B:
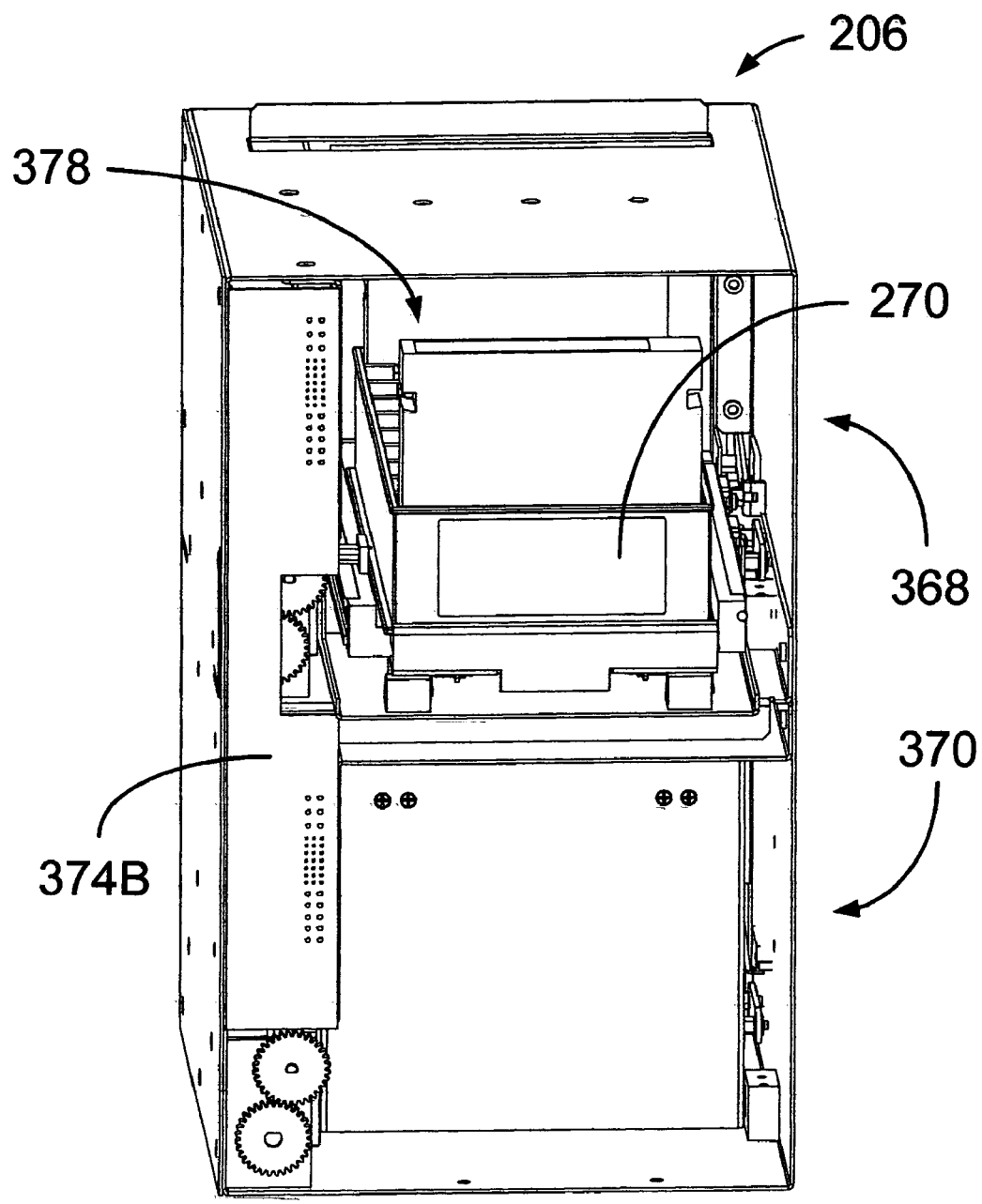

With reference to FIGS. 17A and 17B, the entry/exit port 206 is comprised of a first entry/exit port 368 and a second entry/exit port 370 that operates independently of the first entry/exit port 368. The first and second entry/exit ports 368, 370 provide greater throughput than a single entry/exit port, i.e., more magazines 270 can be moved between the exterior environment and the spaces within the library 202 associated with the first and second entry/exit ports 368, 370 over a given time period than is possible with a single exit/entry port of the same design. In addition, the first and second entry ports 368, 370 provide redundancy. Consequently, if one of the first and second entry/exit ports 368, 370 should become disabled, the other port can, in many cases, still be used to transport magazines 270. A library 202 with a single entry/exit port is also practicable. With continuing reference to FIGS. 17A and 17B, the entry exit port 206 comprises a chassis 372 with an exterior side 374A that is exposed to the exterior environment or adjacent to the front side 340A and an interior side 374B that is exposed to the magazine transport 212 and is substantially located along the plane 330A. In the illustrated embodiment, the first entry/exit port 368 is in the second state, i.e., a magazine 270 can be removed from a space 378 by the magazine transport 212 or a magazine 270 (assuming magazine 270 is no longer present in the space) can be inserted into the space 378 by the magazine transport 212. Conversely, the second entry/exit port 370 is in the first state, i.e., an operator can remove a magazine 270 from the port 370 or an operator can associate a magazine 270 (assuming magazine 270 is no longer present) with the port 370 for transport to the space 382.

Figure 18A:
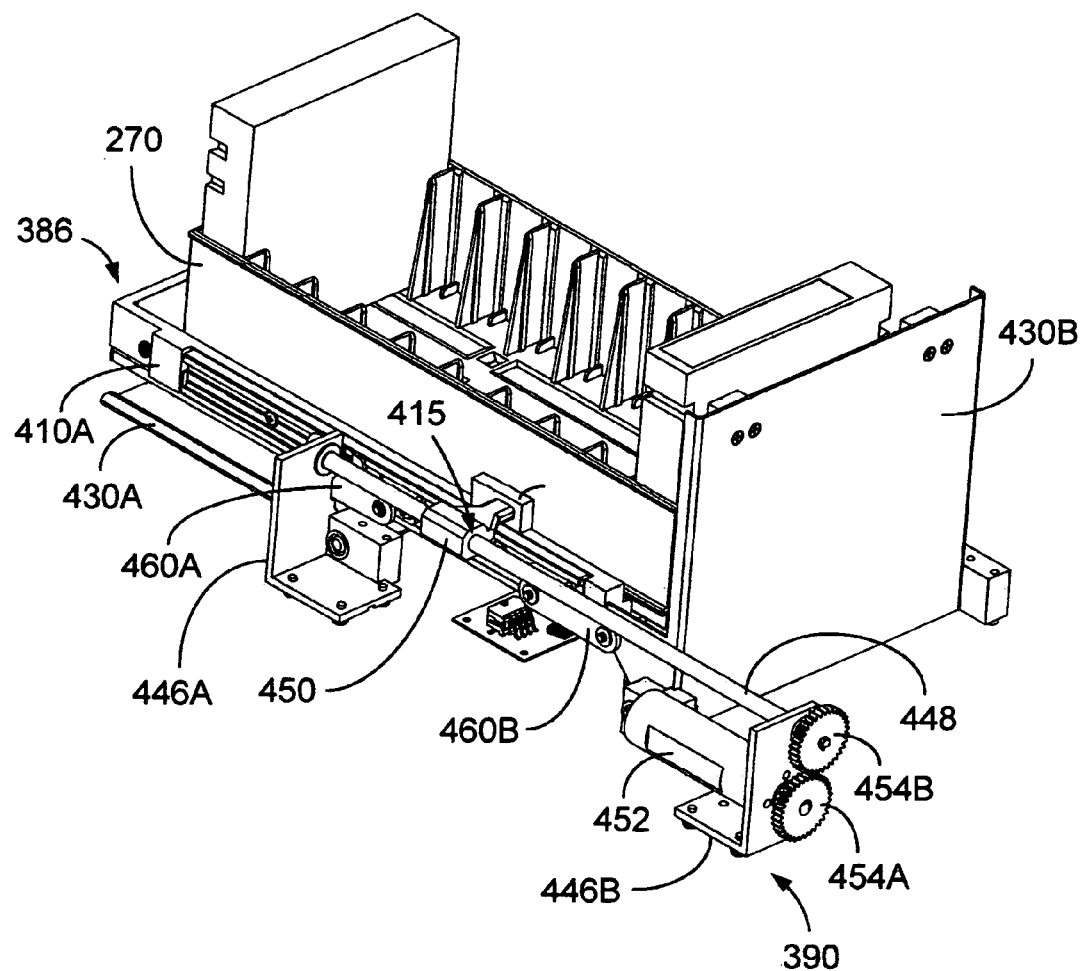
Figure 18B:
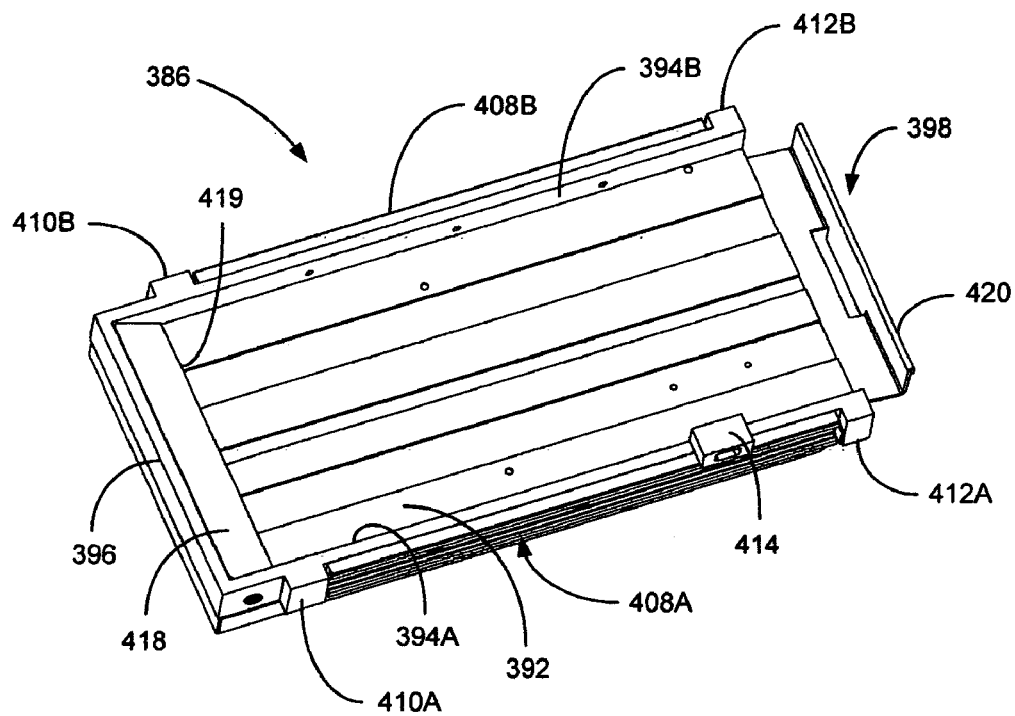
Figure 18C:
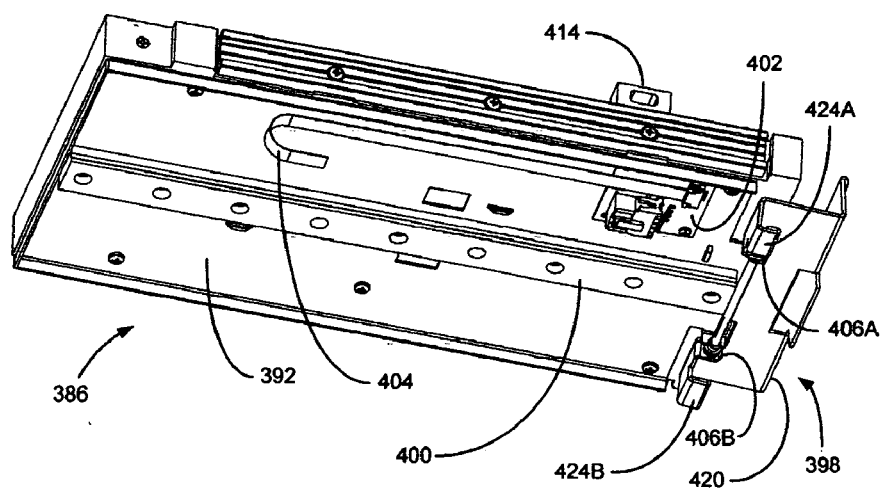
Figure 18D:
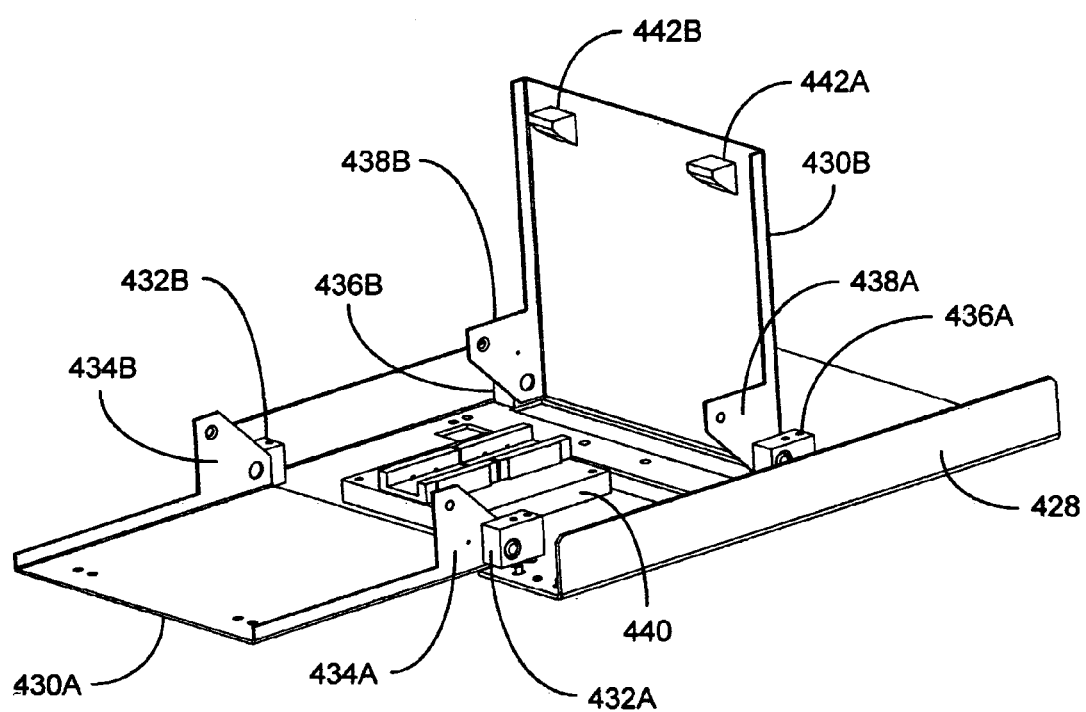
Figure 18E:
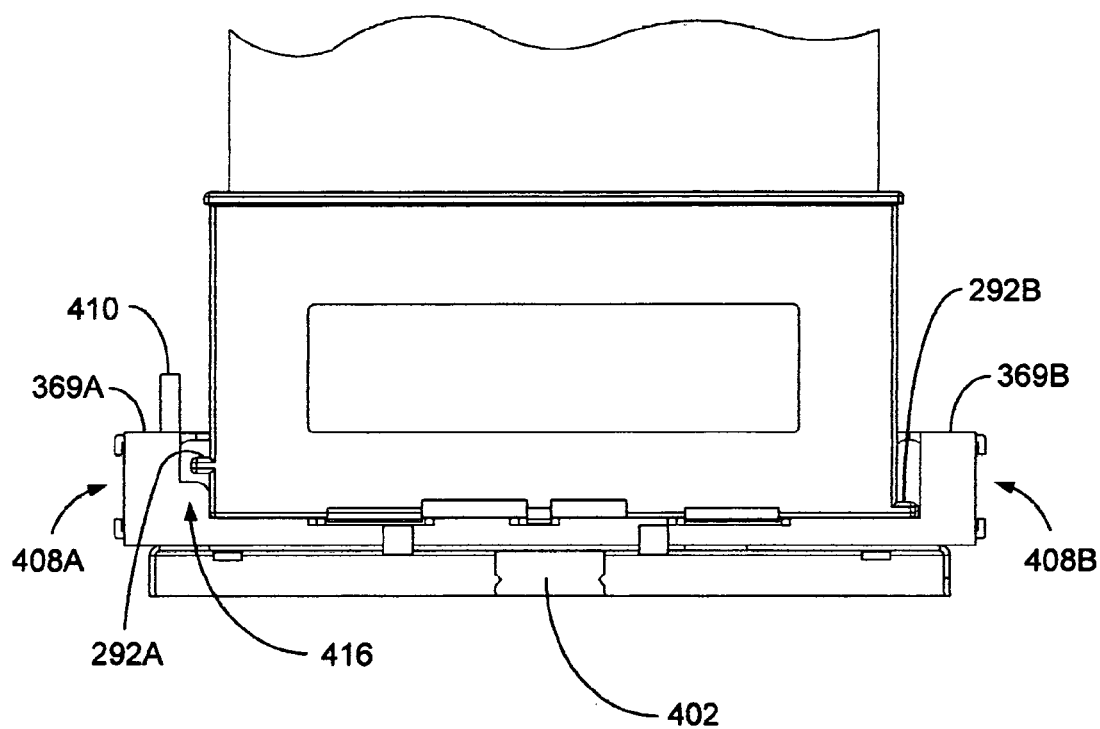
Figure 18F:
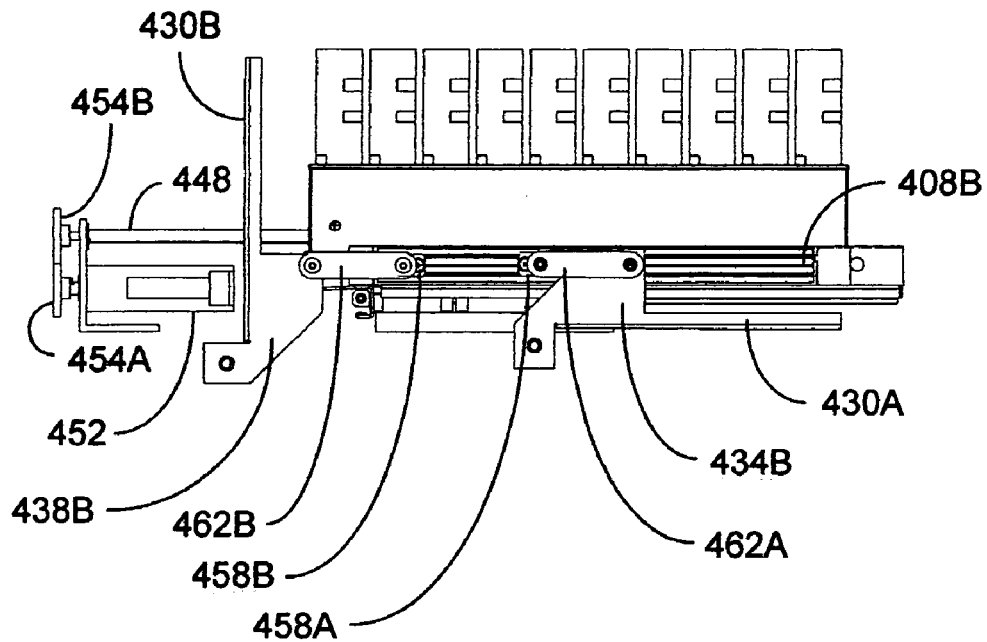

The first entry/exit port 368 is substantially identical to the second entry/exit port 370. Consequently, the first entry/exit port 368 is described with the understanding that the description is also applicable to the second entry/exit port 370. Generally, the first entry/exit port 368 utilizes a support, such as the tray 386 of FIG. 18A, to move a magazine 270 between: (a) a first location at which an operator can either associate a magazine 270 with the support or remove a magazine 270 from the support; and (b) a second location at the magazine transport 212 can either remove a magazine 270 from the support or associate a magazine 270 with the support. Further, the first entry/exit port 368 also utilizes a door system for preventing an operator from accessing the interior of the library 202 and possibly getting injured by one of the moving elements. The door system is comprised of an interior door 430B and an exterior door 430A (as shown in FIG. 18D). The door system operates such that when the support is in the first location, shown in FIG. 17A, such that an operator can either associate a magazine 270 with the support or remove a magazine 270 from the support, the exterior door 430A is open and the interior door 430B is closed or closing to prevent the operator from accessing the interior of the library 202. Conversely, when the support is in the second location (as shown in FIG. 17B), such that the magazine transport 212 can either associate a magazine 270 with the support or remove a magazine 270 from the support, the interior door 430B is open to provide the magazine transport 212 with access to the support and the exterior door 430A is closed or closing to prevent an operator from accessing the interior of the library 202.

With reference to FIGS. 18A–18E, the first entry/exit port 368 is generally comprised of: (a) a tray 386 for supporting a magazine 270; (b) a door assembly 388 that comprises an exterior door 430A and an interior door 430B, is attached to the chassis 372, and used to support the tray 386; and (c) an actuator system 390 for moving the tray 386, the exterior door 430A, and the interior door 430B.

The tray 386 is comprised of a bottom side 392, first and second side walls 394A, 394B, an exterior end wall 396 and a movable end wall 398. The bottom side 392, first and second side walls 394A, 394B and exterior end wall 396 define a shallow interior space for supporting a magazine 270. The first and second side walls 394A, 394B prevent the magazine 270 from moving laterally. The movable end wall 398 prevents a magazine 270 from moving in the direction of movable end wall 398 under certain conditions but permits a magazine 270 to move in the direction of the movable end wall 398 under other circumstances. To elaborate, the movable end wall 398 is moveable between a first position and a second position. In the first position, the movable end wall 398 prevents a magazine 270 that is located in the interior space from moving in the direction of the movable wall 398. The movable end wall 398 performs this preventive function when the tray 386 is moving between the first location and the second location, e.g., when a magazine 270 is being inserted into the library 202 from the exterior environment. In this situation, the magazine 270 acquires momentum that, if the moveable end wall 398 were not in the first position, could potentially cause the magazine 270 to slide on the tray 386 and into the space in which the magazine transport 212 and cartridge transport 214 operate, potentially damaging the library 202. In the second position, the movable end wall 398 allows the magazine transport device 212 to either place a magazine 270 on the tray 386 or remove a magazine 270 from the tray 386. The movable end wall 398 is placed in the second position after the tray 386 has been moved to the second location, i.e., the location at which the magazine transporter 212 is able to either load the tray 386 with a magazine 270 or remove a magazine 270 from the tray 386, or at a time before the tray 386 has reached the second location but at which it is unlikely that any momentum imparted to the magazine 270 is likely to carry the magazine 270 into the magazine transporter 212 or cartridge transport 214 operational space.

Associated with the bottom side 392 of the tray 386 is a linear rail 400 that mates with a rail block located on the door assembly 388 to allow the tray 386 to slide between the first and second locations. Also associated with the bottom side 392 is a sensor assembly 402 that is used to sense the possible presence of a magazine 270 in the interior space of the tray 386 and a flex cable 404 that allow the signals produced by the sensor assembly 402 to be conveyed to the control system 218. Further associated with the bottom side 392 is a pair of brackets 406A, 406B to which the movable end wall 398 is mounted.

Associated with the first and second side walls 394A, 394B are guides 408A, 408B that form part of a linkage that is used to move the exterior and interior doors 430A, 430B between the open and closed positions. A first pair of end blocks 410A, 410B are located at the ends of the guides 408A, 408B that are located adjacent to the exterior end wall 396. A second pair of end blocks 412A, 412B are located at the ends of the guides 408A, 408B that are located adjacent to the movable end wall 398. A drive block 414 that is used to receive the motive forces from the actuator system 390 that cause the tray 386 to slide between the first and second locations is associated with the first side wall 394A. Also associated with the first side wall 394A is an orientation feature 416 that is used in conjunction with the rails 292A, 292B of a magazine 270 to substantially ensure that a magazine 270 that an operator places in the interior space of the tray 386 has a desired orientation. To elaborate, if an operator places a magazine 270 in the interior space of the tray 386 with magazine 270 oriented such that the rails 292A is disposed adjacent to the orientation feature 416, the magazine 270 is properly oriented and the bottom side 278 of the magazine 270 lies flush with the bottom side 392 of the tray 386. If, however, an operator places a magazine 270 in the interior space of the tray 386 with the magazine 270 oriented such that the rail 292B is disposed adjacent to the orientation feature 416, the magazine 270 is not properly oriented and the bottom side 278 of the magazine 270 will not lie flush with the bottom side 392 of the tray 386. Further, the sensors associated with the sensor assembly 402 are able to detect this condition and provide the control system 218 with this information so that the control system 218 can prevent the tray 386 from being moved until the magazine 270 is properly oriented. In one embodiment, the sensor assembly 402 comprises two optical sensors that are disposed laterally across the tray 386. Another sensor is operatively attached to the chassis 372 adjacent to the exterior door 430A and operates to sense the presence of an object adjacent to the door 430A. The signals produced by the two optical sensors and the door sensor are capable of being used to determine if a magazine 270 is not present in the tray 386, if a properly loaded magazine 270 is present in the tray 386, an improperly loaded magazine 270 is present in the tray 386, or something other than a magazine 270 is present in or adjacent to the tray 386.

Associated with the exterior end wall 396 is a sloped surface 418 that facilitates insertion of a magazine 270 into the interior space of the tray 386 when the tray 386 is in the first location. The sloped surface 418 terminates before reaching the bottom side 392 so that a corner 419 is formed for receiving the corner formed by the end side 274A and bottom side 278 of a magazine 270. Further, when the movable end wall 398 is in the first position and a magazine 270 is in the interior space of the tray 386, the magazine 270 is clamped between the corner 419 and the movable end wall 398.

The movable end wall 398 is comprised of an S-shaped member 420 that is pivotally attached to the brackets 406A, 406B. A spring (not shown) biases the S-shaped member 420 so that the S-shaped member 420 is in the first position, as shown in FIG. 18C, to prevent a magazine 270 from entering the operational space of the magazine transport 212 and cartridge transport 214 in an uncontrolled fashion. The S-shaped member 420 further comprises a camming surfaces 424A, 424B that cooperate with camming elements associated with the door assembly 388 to move the S-shaped member 420 into the second position, shown in FIG. 19E, so that the magazine transport 212 can either remove a magazine 270 from the tray 386 or associate a magazine 270 with the tray 386.

With reference to FIG. 18D, the door assembly 388 comprises a door mounting plate 428, exterior door 430A, and an interior door 430B. The exterior door 430A is pivotally connected to the door mounting plate 428 via mounting blocks 432A, 432B, which constrain the exterior door 430A to rotate about a horizontal axis. The exterior door 430A comprises first and second connection flanges 434A, 434B for establishing pivotal connections with a linkage that is used to move the door 430A. Similarly, the interior door 430B is pivotally connected to the door mounting plate 428 via mounting blocks 436A, 436B, which constrain the interior door 430B to rotate about a horizontal axis. The interior door 430B comprises first and second connection flanges 438A, 438B for establishing pivotal connections with a linkage that is used to move the door 430B. Also comprising the door assembly 388 is a rail block 440 that cooperates with the linear rail 400 of the tray 386 to allow the tray 386 to slide between the first and second locations. The door assembly 388 further comprises a pair of cam elements 442A, 442B that interact with a camming surfaces 424A, 424B associated with the movable end wall 398 to move the S-shaped member 420 to the second position so that the magazine transport 412 can either remove a magazine 270 from the tray 386 or place a magazine 270 on the tray 386.

The actuator system 390 operates to move the tray 386 between the first and second positions and to move the exterior and interior doors 430A, 430B between open and closed positions. Moreover, the actuator system 390 coordinates the opening and closing of the interior doors 430A, 430B with the movement of the tray 386 between the first and second positions. To elaborate, the actuator system 390 operates such that during the time that the tray 386 is moving from the first location to the second location (e.g., when a magazine 270 is being inserted into the library 202), the exterior door 430A moves between open and closed positions and the interior door 430B moves between closed and open positions. Conversely, the actuator system 390 operates such that during the time that the tray 386 is moving from the second location to the first location (e.g., when a magazine 270 is being extracted from the library 202), the exterior door 430A moves between closed and open positions and the interior door 430B moves between the open and closed positions.

The actuator system 390 comprises a pair of brackets 446A, 446B that support a lead screw 448, a nut 450 that is attached to the lead screw 448 and has a post that engages a hole 415 in the drive block 414, an electric motor 452, and a pair of gears 454A, 454B that transmit a rotational force produced by the electric motor 452 to the lead screw 448. Further comprising the actuator system 390 is a first pair of slotted blocks 456A, 456B (see FIG. 19A) that are operatively associated with the guide 408A. A second pair of slotted blocks 458A, 458B that are operatively associated with the guide 408B. The actuator system 390 further comprises a first pair of links 460A, 460B that, respectively, pivotally connect the first connection flange 434A of the exterior door 430A with the slotted block 456A and the first connection flange 438A of the interior door 430B with the slotted block 456B. Similarly, a second pair of links 462A, 462B, respectively, pivotally connects the second connection flange 434B of the exterior door 430A with the slotted block 458A and the second connection flange 438B of the interior door 430B with the slotted block 458B. The position of the tray 386 is provided by a detector that operates to detect the presence of a flag associated with the tray 386 when the tray 386 is at a home position and an encoder associated with the motor 452. Other position detecting schemes are feasible.

With reference to FIGS. 19A–19F, the operation of the entry/exit port 368 in moving a magazine 270 between an environment in which the tray 386 is accessible by an operator to a space that is accessible to the magazine transport 212 (i.e., in direction 468) is described.

Figure 19A:
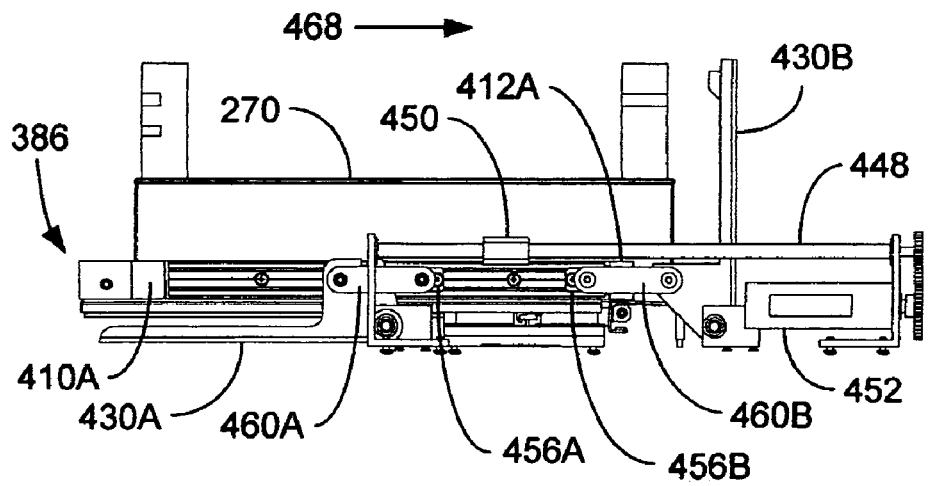

With reference to FIG. 19A, the entry/exit port 368 is in the first state, i.e., the tray 386 is at a location at which an operator can associate a magazine 270 with the tray 386. For illustration, the magazine 270 has been associated with the tray 386. In this regard, the spring associated with the movable end wall 398 has placed the S-shaped member 420 in the first position. As a consequence, the magazine 270 is prevented from sliding in the direction 468. Further, the magazine 270 is clamped between the corner 419 and the S-shaped member 420. At this point, the exterior door 430A is open and the interior door 430B is closed. Additionally, the slotted block 456B is either contacting the rail end block 412A or very close to the rail end block 412A.

Figure 19B:
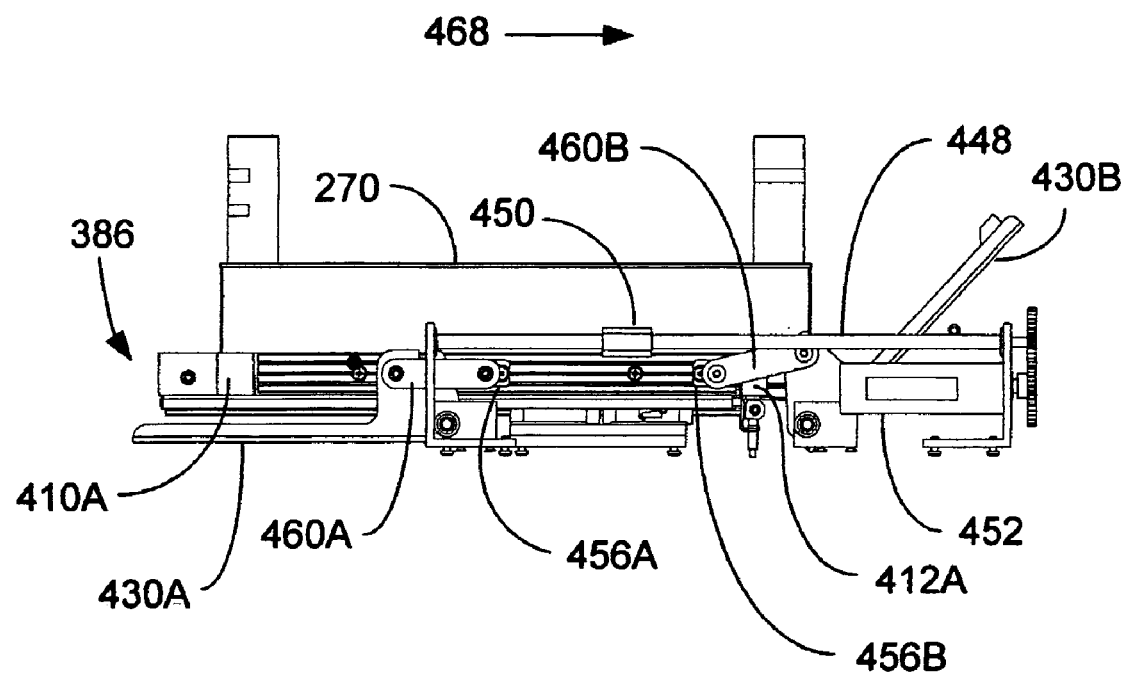

With reference to FIG. 19B, the actuator system 390 has begun to move the tray 386 in the direction 468, the exterior door 430A is still open and the interior door 430B has moved from the closed position towards the open position. More specifically, the electric motor 452 has been used to produce a rotational force that has been transmitted by the pair of gears 454A, 454B to the lead screw 448. The rotation of the lead screw 448 has caused the nut 450 to move towards the electric motor 452. The nut 450, in turn, has applied a force to the tray 386 via the drive block 414 that has caused the tray 386 to slide over the rail block 440 and towards the electric motor 452. As the tray 386 has moved towards the electric motor 452, either gravity or contact with the tray 386 has caused the interior door 430B to begin rotating towards the open position. However, interaction between the rail end block 412A and the slotted block 456B, which is connected to the interior door via the link 460B, has controlled the movement of the interior door 430B.

Figure 19C:
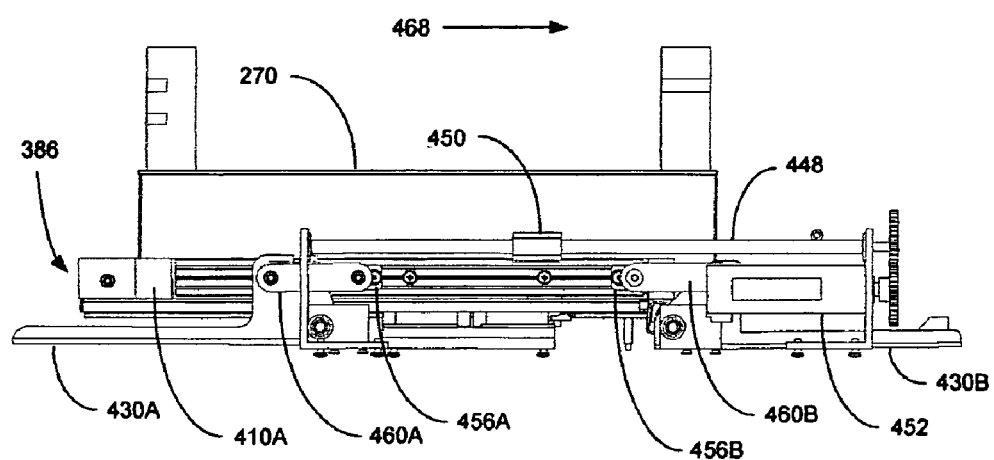

With reference to FIG. 19C, the actuator system 390 has continued to move the tray 386 in the direction 468, the exterior door 430A is still in the open position and the interior door 430B is now also in the open position. More specifically, the electric motor 452 has continued to move the tray 386 in the manner described with respect to FIG. 19B. Further, the interaction between the rail end block 412A and the slotted block 456B has continued to control the movement of the interior door 430B between the closed position and the open position.

Figure 19D:
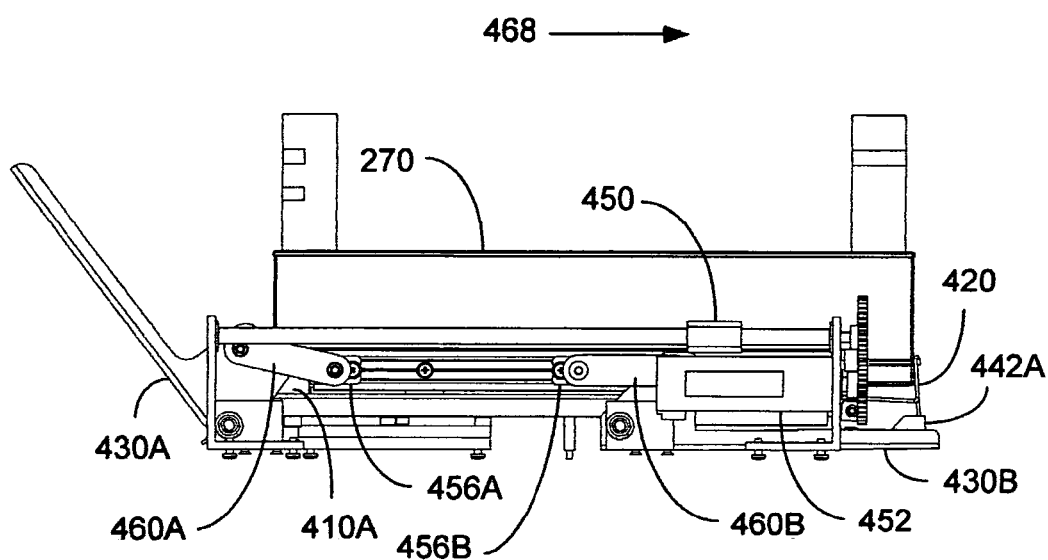

With reference to FIG. 19D, the actuator system 390 has continued to move the tray 386 in the direction 468, the exterior door 430A has now begun to move from the open position towards the closed position, and the interior door 430B remains in the open position. More specifically, the electric motor 452 has continued to move the tray 386 in the manner described with respect to FIG. 19B. In addition, the movement of the tray 386 has caused the rail end block 410A to begin applying a motive force to the slotted block 456A. In turn, the slotted block 456A, due to the connection with the exterior door 430A via the link 460A, has begun to cause the exterior door 430A to rotate towards the closed position.

Figure 19E:
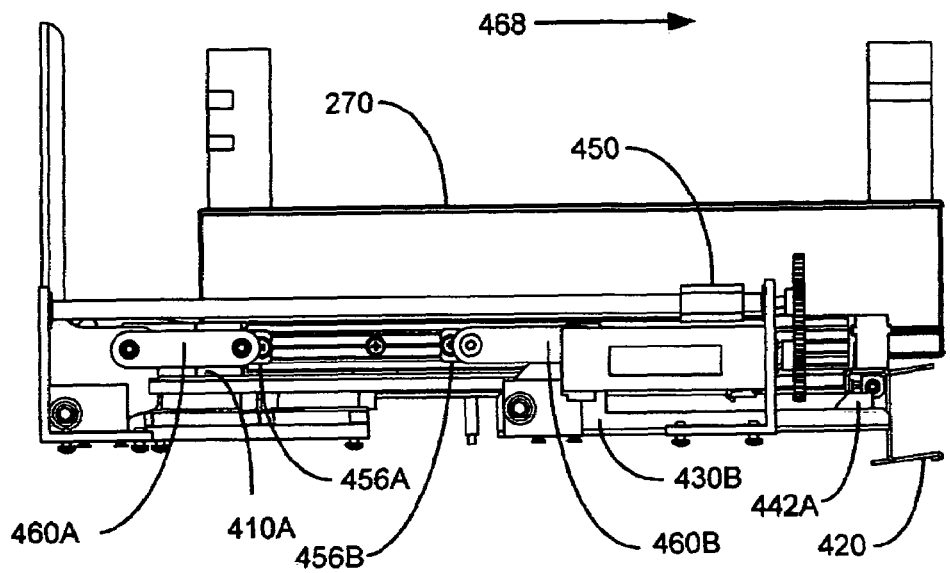

With reference to FIG. 19E, the actuator system 390 has continued to move the tray 386 in the direction 468, the exterior door 430A is now in the closed position, the interior door 430B remains in the open position, and the S-shaped member 420 has been moved to the second position so that the magazine transport 212 can engage the magazine 270. More specifically, the electric motor 452 has continued to move the tray 386 in the manner described with respect to FIG. 19B. In addition, the movement of the tray 386 has caused the rail end block 410A to continue applying a motive force to the slotted block 456A. In turn, the slotted block 456A, due to the connection with the exterior door 430A via the link 460A, has caused the exterior door 430A to rotate to the closed position. In addition, the movement of the tray 386 has caused the cam elements 442A, 442B to engage the camming surfaces 424A, 424B of the S-shaped member 420 and rotate the S-shaped member such that the magazine 270 can be removed from the tray 386 by the magazine transport 212. At this point, the entry/exit port 368 is in the second state.

It should be appreciated by one skilled in the art that to extract a magazine 270 from the library 202 using the entry/exit port 368, the sequence of operations illustrated in FIGS. 19A–19E is reversed.

It should also be appreciated by one skilled in the art that the entry/exit port 368 is capable of being modified in a number of ways, provided a magazine 270 transport is provided that is able to place a magazine 270 in the port 368 or remove a magazine 270 from the port 368. The following sets forth some of these other embodiments. For example, the tray 386 is a support for a magazine 270 that primarily supports a magazine 270 from below. Depending upon the design of a magazine 270, a support that contacts one or both of the sides 276A, 276B of a magazine 270 or the top surface (not shown) of a magazine embodiment is feasible. Further, the tray 386 employs the orientation feature 416 to substantially ensure that magazine embodiments that employ the asymmetrical rails 292A, 292B are properly inserted into the tray 386. The entry/exit port 368 is capable of being adapted to magazine embodiments that employ a different orientation feature.

Additionally, structures other than the movable end wall 398 can be employed to prevent undesired movement of a magazine 270. For instance, a device that clamps the side surface, such as side 276A, of the magazine 270 can be employed. If a particular magazine embodiment has top and bottom surfaces, a device that clamps these surfaces is also feasible. Another alternative to preventing undesired movement of a magazine 270 is to provide a structure that engages a feature of the magazine 270, such as a hole, indentation or protrusion. Further, a movable end wall in which the magazine transport 212, rather than the entry/exit port 368, causes the wall to move between positions is feasible.

Furthermore, while the actuation system 390 employs the electric motor 452 and linkages to cause the tray 386, exterior door 430A and interior door 430B, to move in a coordinated fashion, other approaches are feasible. For example in one embodiment, a system in which separate electrical motors or other motive components (such as solenoids) are associated with the magazine support, such as the tray 386 in one embodiment, and each of the doors 430A, 430B is feasible. In this case, coordination of the movements of the tray 386 and the doors 430A, 430B is achieved by controlling the motors or other motive components. Similarly, a system in which an electrical motor or other motive component is associated with the magazine support and another motor or motive component is associated with the combination of the two doors 430A, 430B is feasible. In this case, the operation of the two doors 430A, 430B is coordinated by a mechanical linkage extending between the doors 430A, 430B, and the movements of the support and the doors 430A, 430B is coordinated by appropriately controlling the motors or other motive components. It should also be appreciated that designs employing linear actuators (such as solenoids) are feasible. Further, other approaches for moving the magazine holder or support, such as a belt-and-pulley and rack-and-pinion systems, are feasible.

Figure 20A:
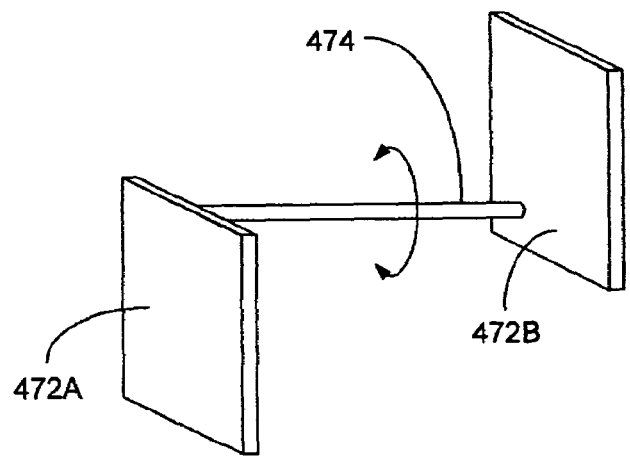

Additionally, while the entry/exit port 368 employs planar doors 430A, 430B that each rotate about horizontal axes that are parallel to the planes of the doors 430A, 430B, many other designs are feasible. For example, designs in which a door 430A, 430B rotates about an axis that is parallel to the plane of the door 430A, 430B but not a horizontal axis (e.g., a vertical axis) is feasible. Designs in which a door 430A, 430B rotates about an axis that is substantially perpendicular to the plane of the door 430A, 430B are also feasible. An example of such a design is shown in FIG. 20A. In this design, both an exterior door 472A and an interior door 472B that resides in a plane that is substantially parallel to the plane of the exterior door 472A rotate about an axis that is perpendicular to the planes of both of the doors 430A, 430B. In addition, the exterior door 472A and the interior door 472B are angularly or rotationally offset. Coordination of the opening and closing of the doors 430A, 430B is achieved by a rod 474 that connects the doors 430A, 430B. It should be noted that with such a design, the exterior door 472A and the interior door 472B move simultaneously.

Figure 20B:
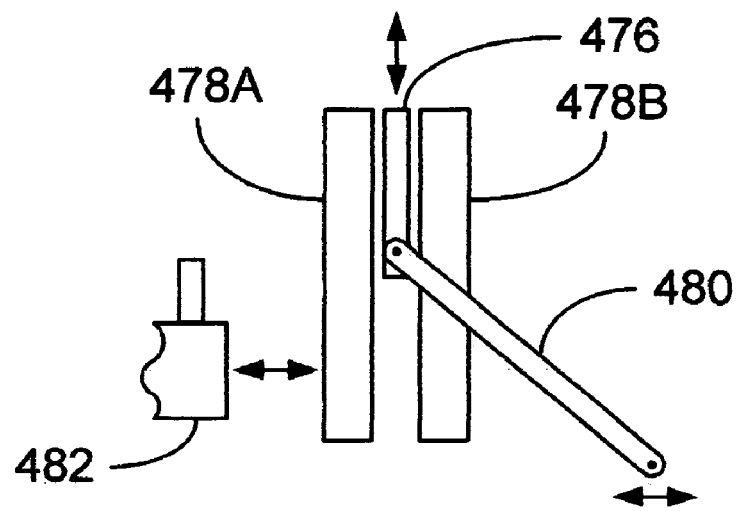
Figure 20C:
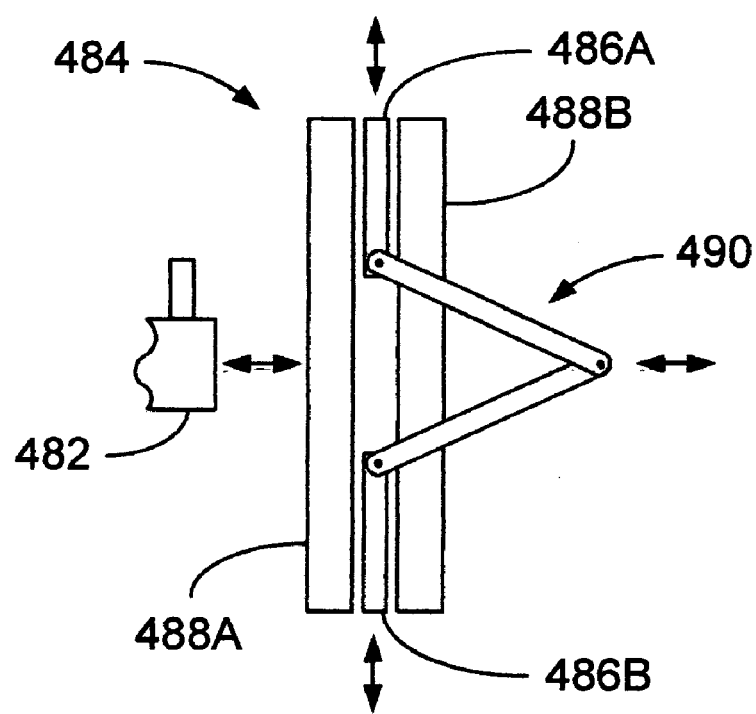
Figure 20D:
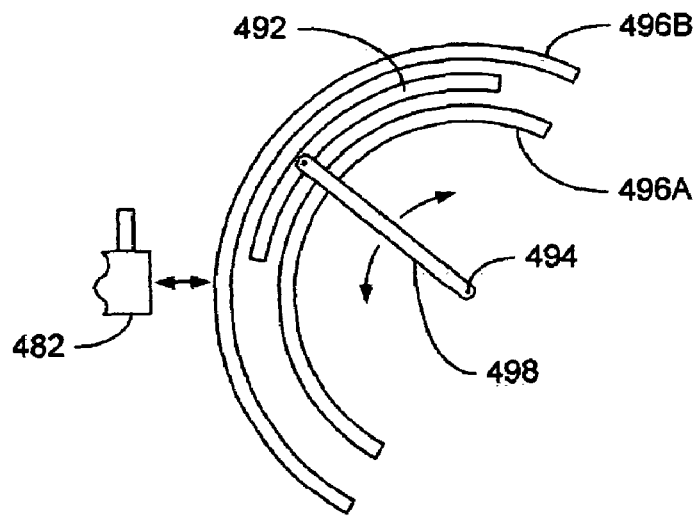
Figure 20E:
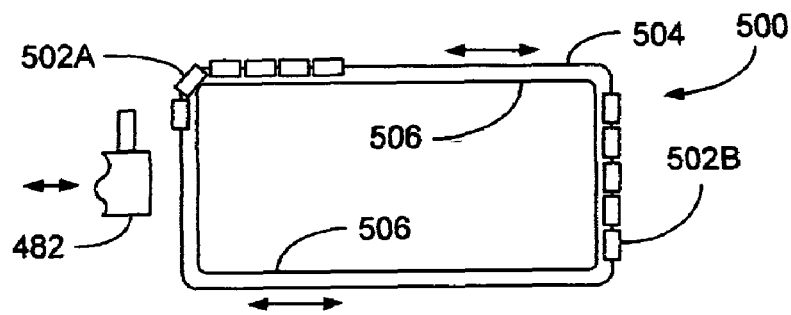

Consequently, when one of the doors such as the exterior door 430A, is moving from the open position to the closed position, the other door, such as the interior door 430B, is moving from the closed position to the open position. Also feasible are designs in which a door embodiment is linearly translated between open and closed positions, rather than rotated between open and closed positions. An example of such a design is shown in FIG. 20B. In this design, a door 476 is disposed between a pair of guides 478A, 478B that constrain the door 476 to move linearly between open and closed positions. A linkage 480 is used to apply the forces needed to move the door 476 between open and closed positions. In FIG. 20B, the door 476 is in an open position so that a magazine 482 can pass through the door structure. Also feasible are door embodiments in which a door is comprised for two or more elements. An example of such a design is shown in FIG. 20C. In this design, a door structure 484 is comprised of a pair of doors 486A, 486B that are constrained to move linearly by guides 488A, 488B. A linkage 490 is used to transmit the forces that cause the doors 486A, 486B to move: (a) towards each other to achieve a closed position, and (b) away from each other to achieve an open position. Further feasible are door embodiments that employ non-planar doors. An example of such a design is shown in FIG. 20D. In this design, a curved door 492 is constrained to rotate about an axis 494 by a pair of curved guides 496A, 496B and a linkage 498. Also feasible is a "roll top" door embodiment. An example of door structure that utilizes roll top doors is shown in FIG. 20E. In this embodiment, a door structure 500 is comprised of a pair of roll-top doors 502A, 502B that are connected to one another by a flexible cable structure 504. A guide structure 506 defines a track around which the doors 502A, 502B. This design also allows for overlap in the times during which one of the doors, such as door 502A, is transitioning between an open position and a closed position and the other door, such as door 502B, is transitioning between a closed position and an open position.

While the entry/exit port 368 employs a movable tray 386, an entry/exit port embodiment that employs a cartridge holder embodiment that does not move is also feasible.

Figure 21A:
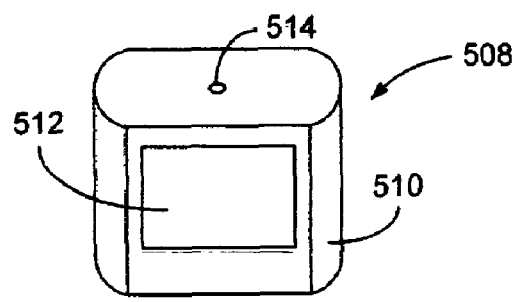
Figure 21B:
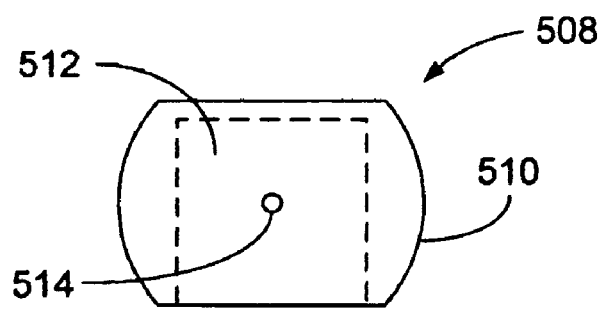

An alternative embodiment to an entry/exit port 368 that employs a pair of doors, such as the interior and exterior doors 430A, 430B, is a carousel entry/exit port. An example of a carousel entry/exit port is shown in FIGS. 21A–21B. In this embodiment, a carousel entry/exit port 508 is comprised of a housing 510 that defines a port 512 for holding a magazine 270. The housing 510 rotates about an axis 514. Rotation is accomplished by an electric motor (not shown). In operation, the carousel exit/entry port 508 rotates between a first location at which an operator can either remove a magazine 270 from the port 512 or associate a magazine 270 with the port 512 and a second location at which a magazine transport device, such as the magazine transport device 212, can either remove a magazine 270 from the port 512 or associate a magazine 270 with the port 512.

Generally, the shelf system 208 serves to support magazines 270 in the library 202 in a preferred or desired orientation. The shelf system 208 orients magazines 270 in the library such that: (a) the magazines 270 are parallel to one another: (b) any cartridges 224 contained in the magazines 270 are oriented to facilitate insertion and extraction by the cartridge transport 214; and (c) a high data density footprint is achieved. Furthermore, the shelf system 208; each of the shelves comprising the shelf system 208 is capable of supporting multiple magazines 270. However, a shelf system 208 with a shelf that is only capable of accommodating a single magazine 270 is feasible.

With reference to FIG. 16, the shelf system 208 is comprised of the five columns of shelving 328A and the two columns of shelving 328B. With reference to FIGS. 7A–7B and 8A–8B, the five columns of shelving 328A are realized by ten, horizontally extending shelves that are each capable of supporting up to five magazines 270 and three, horizontally extending shelves that are each capable of supporting up to three magazines 270. The two columns of shelving 328B are realized by twelve, horizontally extending shelves that are each capable of supporting up to two magazines 270.

Figure 22A:
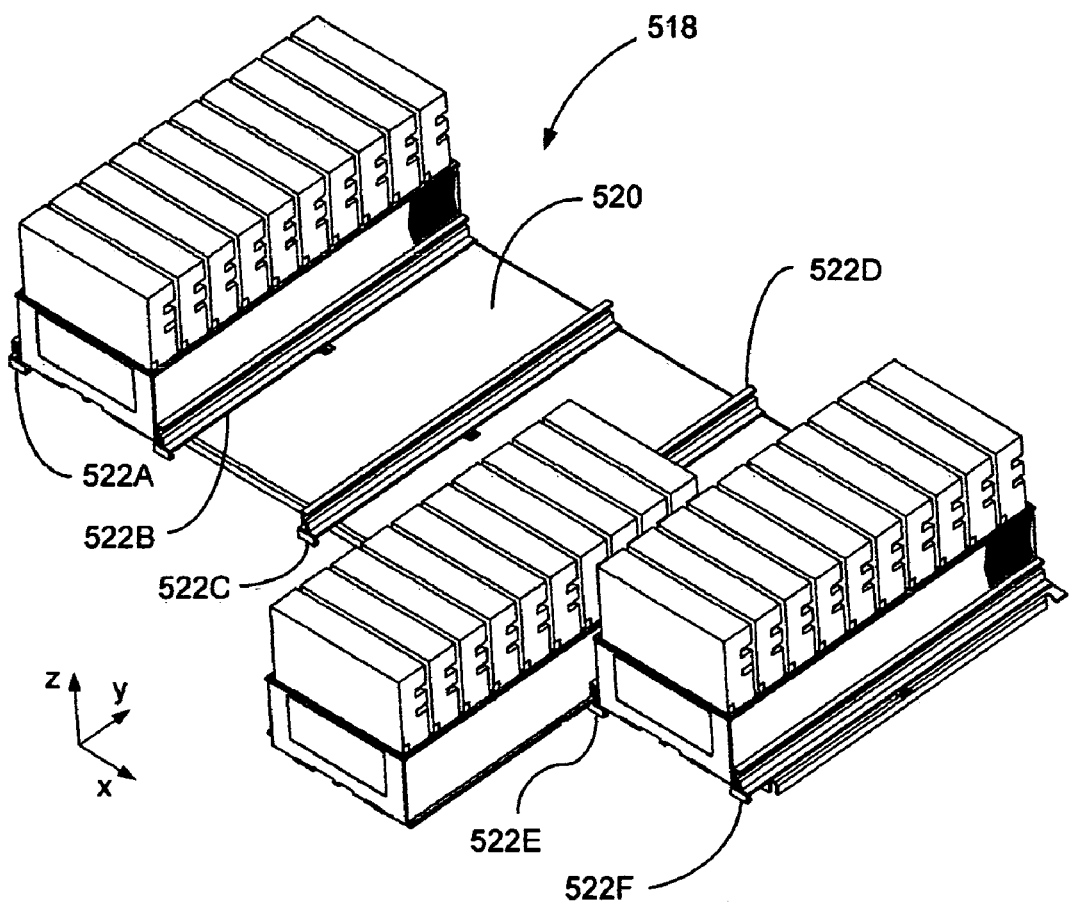
Figure 22B:
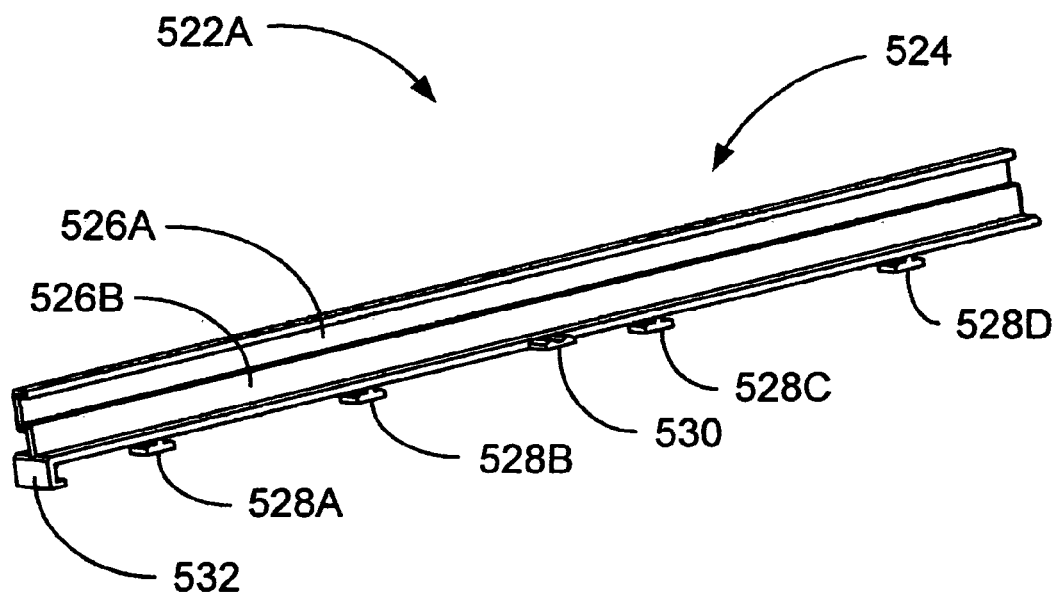

FIG. 22A illustrates a shelf 518 that is capable of accommodating up to five magazines 270. Shelf 518 is described with the understanding that the description is also applicable, with appropriate modifications, to the shelves that are capable of accommodating different numbers of magazines 270, such as the shelves in the library 202 that are capable of accommodating up to three magazines 270 and up to two magazines 270. The shelf 518 comprises a planar member 520 for supporting magazines 270 from underneath. The shelf 518 further comprises six cleats 522A–F that serve a number of purposes. Specifically, the cleats 522A–F: (a) divide the shelf 518 into five cells, each of which is capable of accommodating a single magazine 270; (b) constrain any magazines 270 supported by the shelf 518 to be oriented substantially parallel to one another; (c) constrain any magazines 270 supported by the shelf 518 to be oriented such that any cartridges in the magazines 270 are all oriented in the same manner to facilitate insertion and extraction of the cartridges 224 by the cartridge transport 214; (d) prevent, due to the spacing between consecutive cleats, lateral displacements (i.e., displacements along the x-axis) of any magazines 270 supported by the shelf 518; (e) prevent vertical displacements (i.e., displacements along the z-axis) of any magazines 270 supported by the shelf 518; (f) resist undesired horizontal displacements (i.e., displacements along the y-axis) of a magazine 270 supported by the shelf 518; (g) constrain the direction that a magazine 270 is either moved towards the shelf 518 or away from the shelf 518 to horizontal displacements (i.e., displacements along the y-axis).

With reference to FIG. 22B, the cleat 522A is described with the understanding that the description is also applicable to cleats 522B, 522C, 522D, 522E and 522F. The cleat 522A is comprised of a dual guide structure 524 with an upper guide 526A for receiving the rail 292A of a magazine 270 and a lower guide 526B for receiving the rail 292B of a magazine 270. The cleat 522A also comprises prongs 528A, 528B, 528C and 528D that engage holes (not shown) in the planar member 520 and operate to hold the cleat 522A in place on the planar member 520. Additionally, the cleat 522A comprises a receptacle 530 (which also extends away from the side 524 of the cleat 522A not seen in FIG. 22B) for accommodating one of the detents 296A, 296B associated with a magazine 270, and when accommodating one of the detents 296A, 296B, operating to resist undesired horizontal displacements of the magazine 270. The cleat 522A also comprises an end surface 532 that is detectable by the magazine 270 transport 512 and facilitates positioning of the magazine transport 512 relative to the shelf 512 and relative to a particular magazine 270 supported by the shelf 512. The end surface 532 presently has a reflective character that makes the end surface distinguishable from the adjacent features. A contrasting color approach is also feasible, as well as a tactile approach.

Figure 22C:
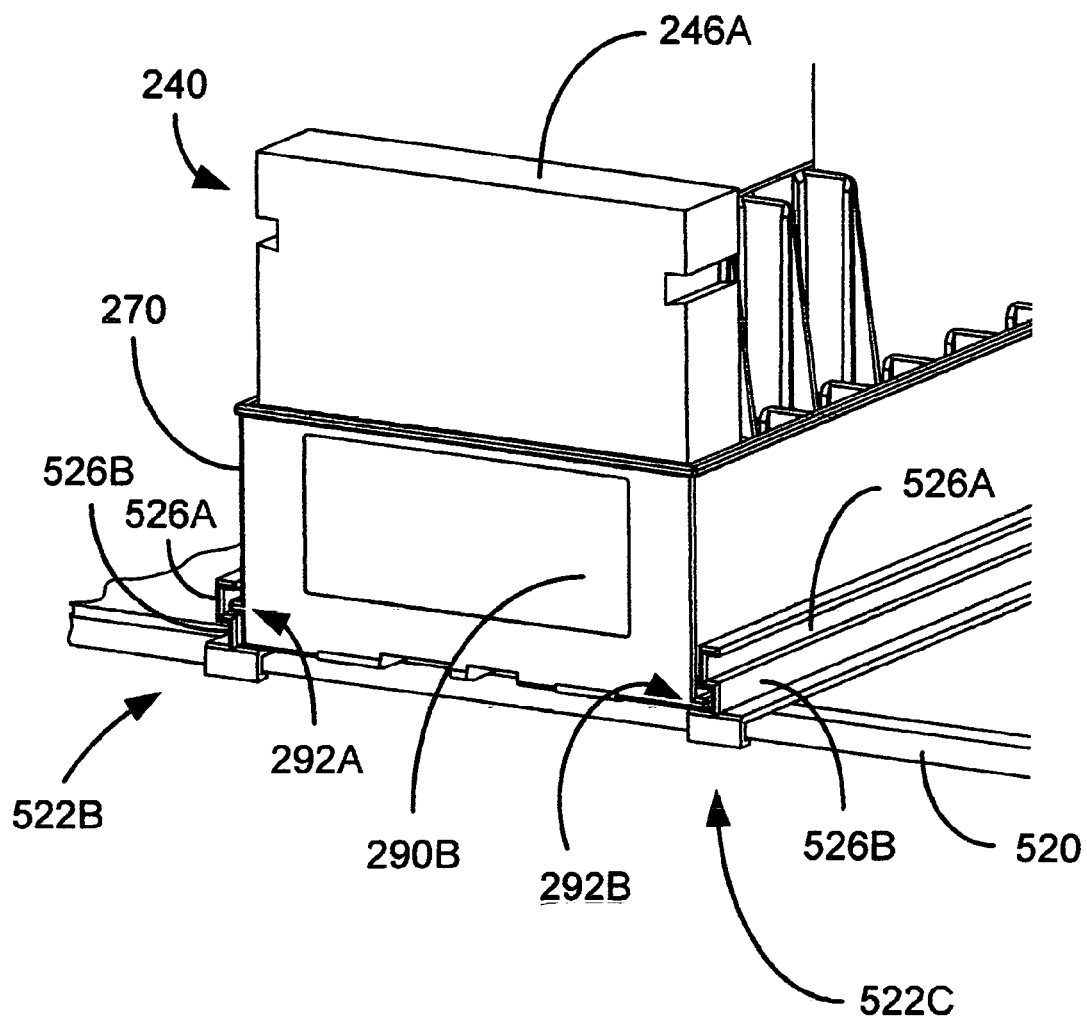

FIG. 22C demonstrates the manner in which two cleats 522B and 522C cooperate to achieve some of the previously noted purposes. The operation of cleats 522B and 522C on a magazine 270 is described with the understanding that other pairs of cleats operate in a substantially similar manner. The cleats 522B and 522C are spaced from one another such that the upper guide 526A of cleat 522B captures the rail 292A of the magazine 270 and the lower guide 526B of the cleat 522C captures the rail 292B of the magazine 270. As a consequence, the cleats 522B and 522C cooperate to prevent the magazine 270 from being laterally and vertically displaced. Additionally, the cleats 522B, 522C limit displacements of the magazine 270 to horizontal displacements along the y-axis. Although not shown in FIG. 22C, it should be appreciated that the detents 296A, 296B of the magazine 270 are respectively engaging the receptacle 530 associated with the cleat 522B and the receptacle 530 associated with the cleat 522C to prevent undesired horizontal displacements of the magazine 270. Further, the cleats 522B, 522C cause the magazine 270 to be oriented such that a cartridge 224 has a particular orientation on the shelf 518 and within the library 202. To elaborate, as previously noted, each magazine 270 has an orientation structure associated with each slot that substantially ensures that all of the SAIT cartridges 240 stored by the magazine 270 have the same orientation in the magazine 270. The rails of the magazines 292A, 292B cooperate with the guides 526A, 526B associated with the pair of cleats 522B, 522C to substantially ensure that the magazine 270 has a particular orientation on the shelf 518. As a consequence, the guides 526A, 526B also substantially ensure that the cartridge 240 has a particular orientation on the shelf 518 and within the library 202. Further, since all of the cleats 522A–522F are oriented on the planar member 520 in the same way, all of the magazines 270 supported by the planar member 520 have the same orientation and all of the cartridges 240 contained by all of the magazines 270 have the same orientation, as shown in FIG. 22A. It should be further appreciated that the shelf 518 and the magazine 270 cooperate such that the cartridge 224 is oriented in the library 202 such that the faces of the cartridge 224 with the greatest surface areas (in this particular case, faces 226A, 226B of the LTO data cartridge 224) each lie in a vertical plane. Moreover, each pair of cleats substantially ensures that the cartridges 224 contained in any magazines 270 are oriented such that the faces 226A, 226B of the cartridge 224 with the greatest surface areas each lie in a vertical plane that is substantially perpendicular to the axis or direction in which the cleats 522B, 522C allow the magazine 270 to be displaced, namely, along the y-axis. Orienting the cartridges 224 in this manner contributes to a high data density footprint.

With continuing reference to FIG. 22C, it should also be appreciated that cleats 522B and 522C each serve as a guide for a magazine 270 that may be disposed on the planar member 520 adjacent to the magazine 270. To elaborate, the upper guide 526A of cleat 522B serves to capture the rail 292A of the magazine 270 and the lower guide 526B of the cleat 522B will serve to capture the rail 292B of any magazine 270 that is disposed on the planar member 520 immediately adjacent to one side of the magazine 270. Likewise, the lower guide 526B of the cleat 522C serves to capture the rail 292B of the magazine 270 and the upper guide 526A of the cleat 522C will serve to capture the rail 292A of any magazine 270 that is disposed on the planar member 520 immediately adjacent to the other side of the magazine 270.

With reference to FIGS. 7A–7B and 8A–8B, each shelf of the shelf system 208 that has an immediately overlying shelf is vertically spaced from the immediately overlying shelf by a distance that is only slightly greater than the distance between the bottom side 278 of the magazine 270 and the surface associated with a cartridge 224 that is properly located in the magazine 270 and furthest from the bottom side 278 of the magazine 270. This spacing between shelves also contributes to achieving a high data density footprint.

It should also be appreciated that the shelf system 208 is capable of being modified in a number of ways. The following sets forth, without limitation, some possible modifications or alternative embodiments. For example, a shelf system embodiment is feasible in which each shelf is capable of supporting only a single magazine 270. An alternative embodiment is a shelf system that employs a structure other than a planar member to support one or more magazines 270. For instance, a shelf that utilizes two, L-shaped brackets to support a magazine 270 is feasible. Further, in yet another alternative embodiment, a shelf system in which a shelf provides support to a magazine 270 other than from a location below the magazine 270 is also practicable. Depending upon the design of a magazine 270, a shelf that provides support to: (a) one side of the magazine 270; (b) both of sides of a magazine 270; or (c) the top surface of a magazine 270 is feasible. An embodiment of a shelf that is tilted to prevent undesired displacements of a magazine 270 is also practicable. Such a shelf would avoid the need for a latch structure, such as receptacle 530. Further, a shelf embodiment that incorporates an active latch or retention structure that is actuated by a magazine transport embodiment is also possible. A shelf system in which there is greater vertical spacing between shelves is practicable but in most cases will compromise the data density footprint of the library 202. Further, the shelf system 208 holds magazines 270 in a grid array or X-Y array. A shelf system 208 embodiment that holds magazines 270 in different arrays is also feasible. Another embodiment of a shelf system comprises one or more fixed slots each for holding a cartridge 224. Among the types of cartridges that can be held in such a fixed slot is a "cleaning" cartridge, i.e., a cartridge that is adapted to clean reading and writing heads associated with a drive 180.

As shown in FIG. 8B, each of the drives 180 has a horizontal orientation with the long dimension of the receptacle for receiving a cartridge 224 extending horizontally. It should be appreciated that it is feasible for each of the drives 180 to have a different orientation, such as vertical orientation. It is also possible to have one or more drives 180 with one orientation and one or more drives 180 with a different orientation. It should also be appreciated that the orientation or orientations of the drives 180, the orientation or orientations of cartridges 224 stored in the library 202, and the orientations of the drives 180 relative to the cartridges 224 generally dictate the manner in which the cartridge transport 212 must manipulate the cartridges 224.

180Typically, all of the drives 180 are one of an LTO, SAIT and DLT tape drive. The library 202 is capable of being adapted to accommodate other tape drives. Moreover, the library 202 is adaptable to drives that operate on other types of cartridges, such as disk cartridges, cartridges comprising a disk drive.

With reference to FIG. 8B, the library 202 is capable of accommodating up to twenty-four, full height drives, where each of the drives is one of an LTO, SAIT or DLT tape drive. The library 202 is also capable of accommodating up to forty-eight, half-height drives, where each of the drives is one of an LTO, SAIT or DLT tape drive. The library 202 is capable of being modified to accommodate greater or lesser numbers of drives. However, the library 202 must have at least one drive to be functional. Also feasible are combinations of full-height and half-height drives.

As shown in FIGS. 24A–F, each of the drives 180 in the library 202 is mounted in a drive bay assembly, such as the drive bay assembly 540, that provides the ability to relatively quickly mount and demount a drive 180 from the library 202. Generally, this ability is achieved using: (a) a sled, such as 548A used herein as a generic sled element for illustrative purposes, that is capable of holding a drive 180; (b) a housing, such as the drive bay housing 550, for receiving the sled 548A; and (c) a plug structure, such as the plug assembly 588, that allows a drive 180 that has been attached to a sled 548A to be mounted by inserting the sled 548A into the housing and demounted by removing the sled 548A from the housing.

Figure 23A:
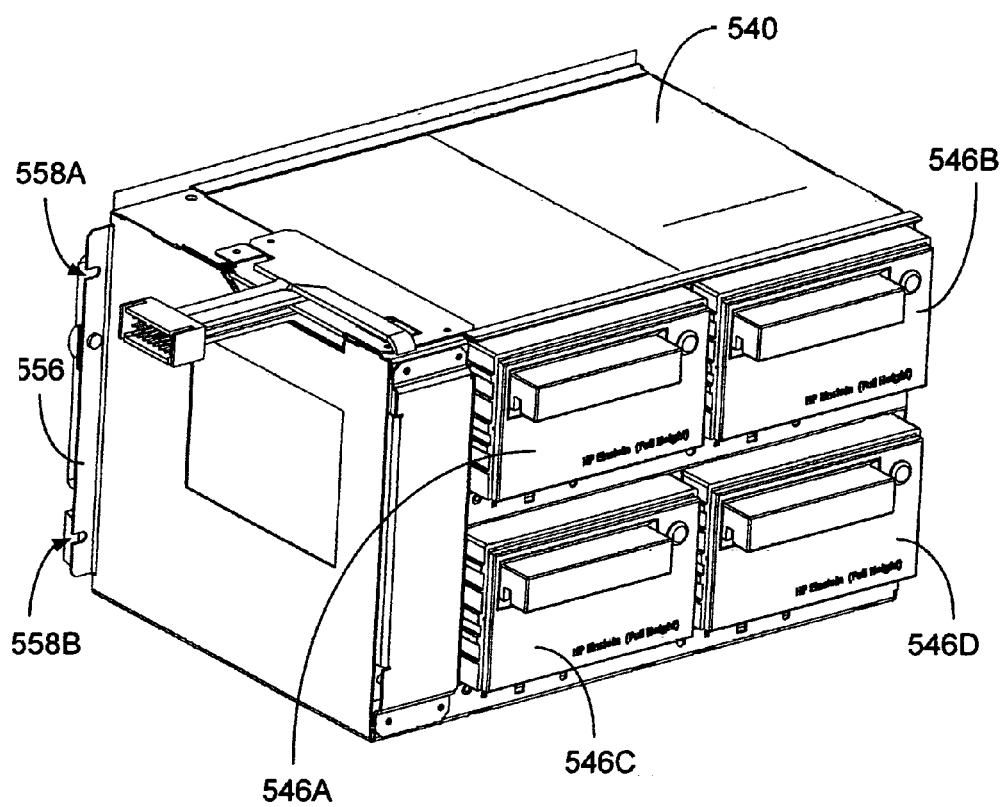
Figure 23B:
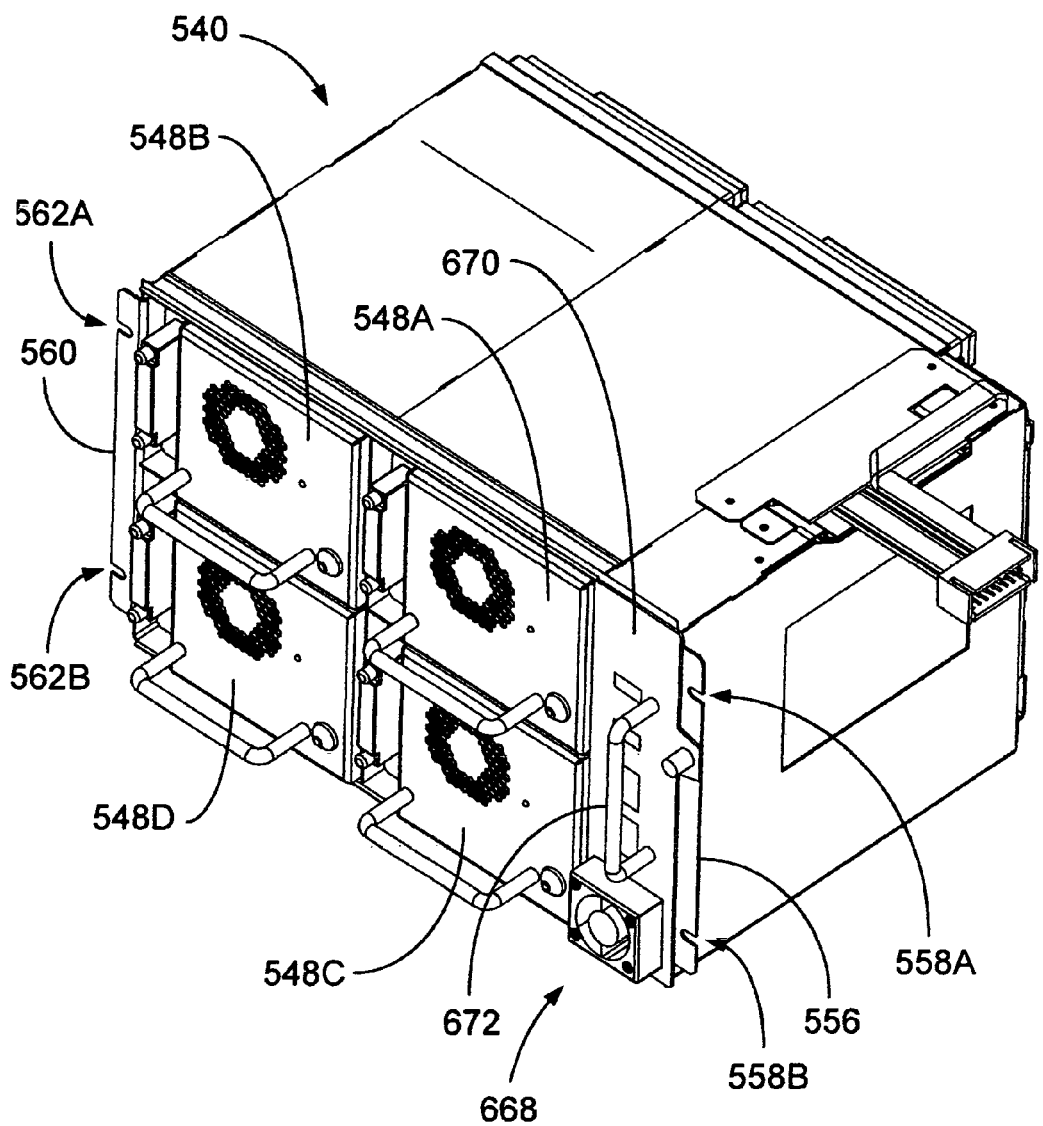
Figure 23C:
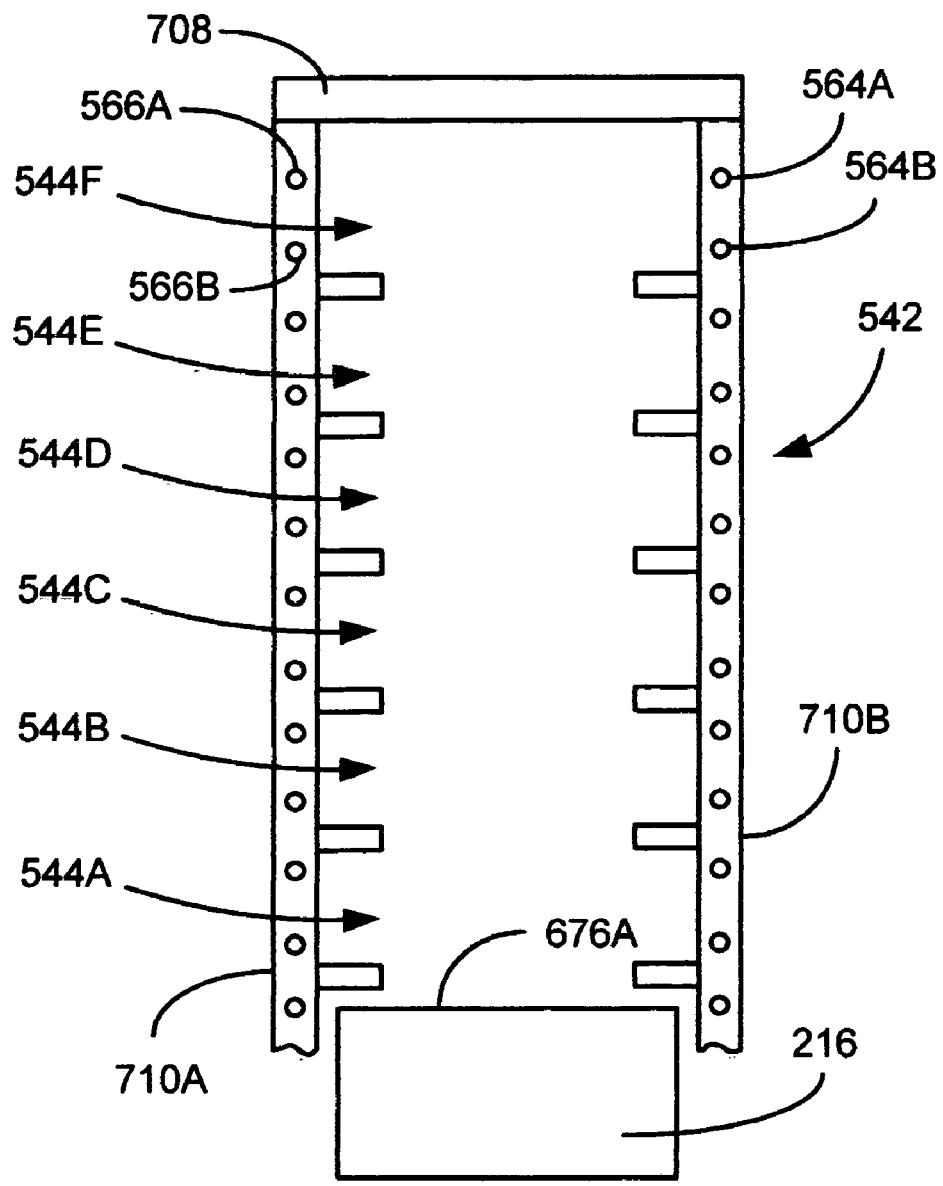

With reference to FIGS. 23A–23C, an embodiment of a drive bay assembly 540 is described. The drive bay assembly 540 is capable of accommodating up to four, full-height drives or up to eight, half-height drives, and various combinations of full-height and half-height drives. The drive bay assembly 540 is mounted to a ladder frame 542 that defines six compartments 544A–544F that are each capable of accommodating one of the drive bay assembly 540. Generally, when the drive bay assembly 540 is mounted in one of the compartments 544A, 544B, 544C, 544D, 544E and 544F and a drive 180 is mounted in the drive bay assembly 540, the receptacle 186 of the drive 180 is positioned so that the cartridge transport 214 can insert a cartridge 224 into and extract a cartridge 224 from the drive 180. The sled 548A holding the drive 180 is accessible to an operator by opening the hinged door 348. Consequently, the operator is able to remove the sled, or drive bay assembly 540 comprising the four sleds 548A–D in one embodiment, and associated drive 180 from the library 202 without substantial exposure to the magazine transport 212 or cartridge transport 214. Similarly, the operator is also able to insert a sled, or drive bay assembly 540 comprising the four sleds 548A–D in one embodiment, and a drive 180 into the library 202 without having any substantial exposure to the magazine transport 212 or the cartridge transport 214. FIG. 23A illustrates the drive bay assembly 540 populated with four drives 546A, 546B, 546C and 546D that, if the drive bay assembly 540 were mounted to the ladder frame 542, would be positioned for insertion and extraction of cartridges 224 by the cartridge transport 214. Similarly, FIG. 23B illustrates the drive bay assembly 540, with the assembly's four sleds 548A, 548B, 548C and 548D that, if the drive bay assembly 540 were mounted to the ladder frame 542, would be positioned for extraction and insertion operations by an operator.

With reference to FIGS. 24A–24F, the drive bay assembly 540 is comprised of a housing 550 that defines four drive bays 552A, 552B, 552C and 552D that are each capable of accommodating a single drive 180. The housing 550 also defines a quad unit interface processor bay 554 for holding a Quad unit Interface Processor ("QIP") 668 that is used to receive power, control and data signals and distribute the signals to any drives residing in the housing 550. The housing 550 further includes a first mounting flange 556 with a first pair of notches 558A, 558B and a second mounting flange 560 with a second pair of notches 562A, 562B. The first pair of notches 558A, 558B and second pair of notches 562A, 562B respectively corresponds with a first pair of threaded holes 564A, 564B and a second pair of threaded holes 566A, 566B associated with each compartment of the ladder frame 542. To mount the drive bay assembly 540 to the ladder frame 542, the notches 558A, 558B of the mounting flange 556 and the notches 562A, 562B of the mounting flange 560 are respectively aligned with the threaded holes 564A, 564B, 566A and 566B of the ladder frame 542 and then bolts or screws are used to secure the drive bay assembly 540 to the ladder frame 542. Demounting of the drive bay assembly 540 from the ladder frame 542 is accomplished by removing the bolts or screws.

Figure 24A:
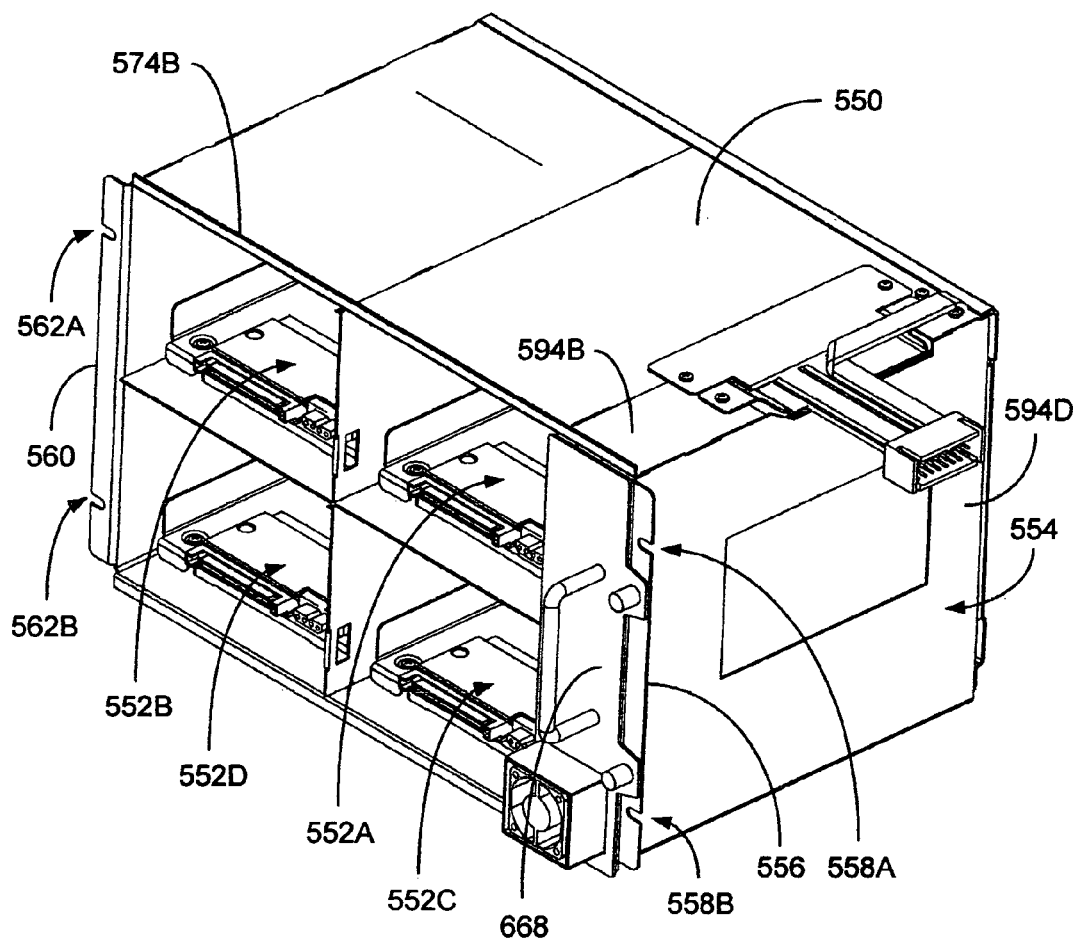
Figure 24B:
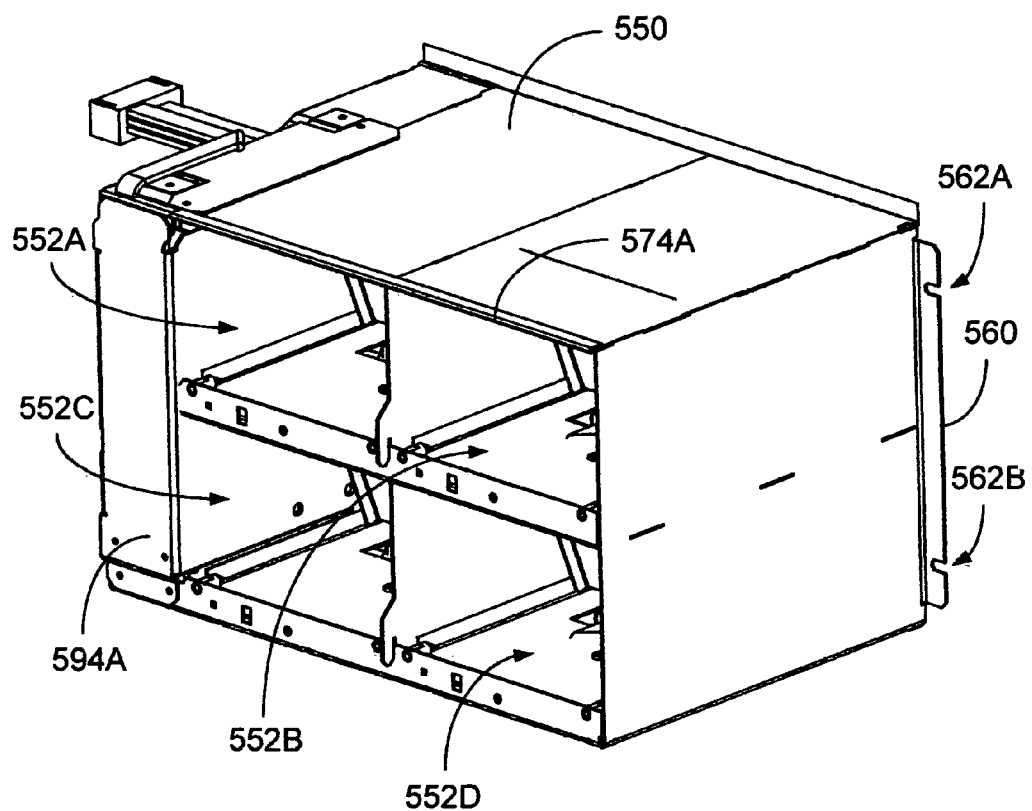
Figure 24C:
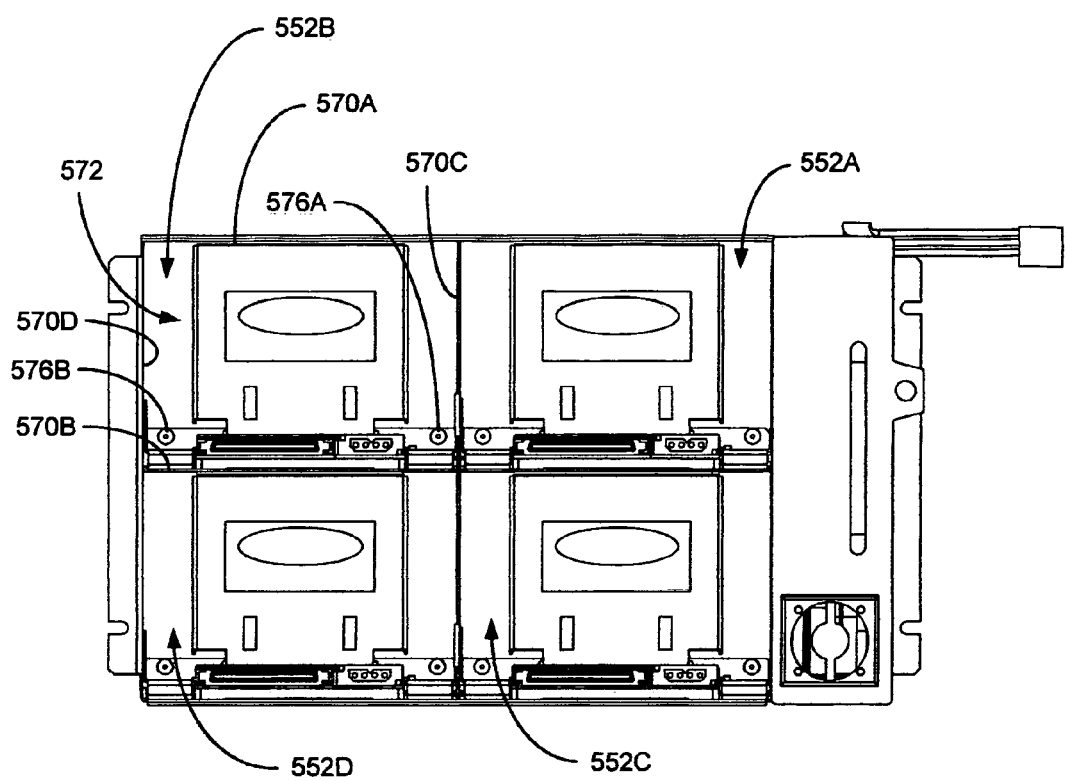
Figure 24D:
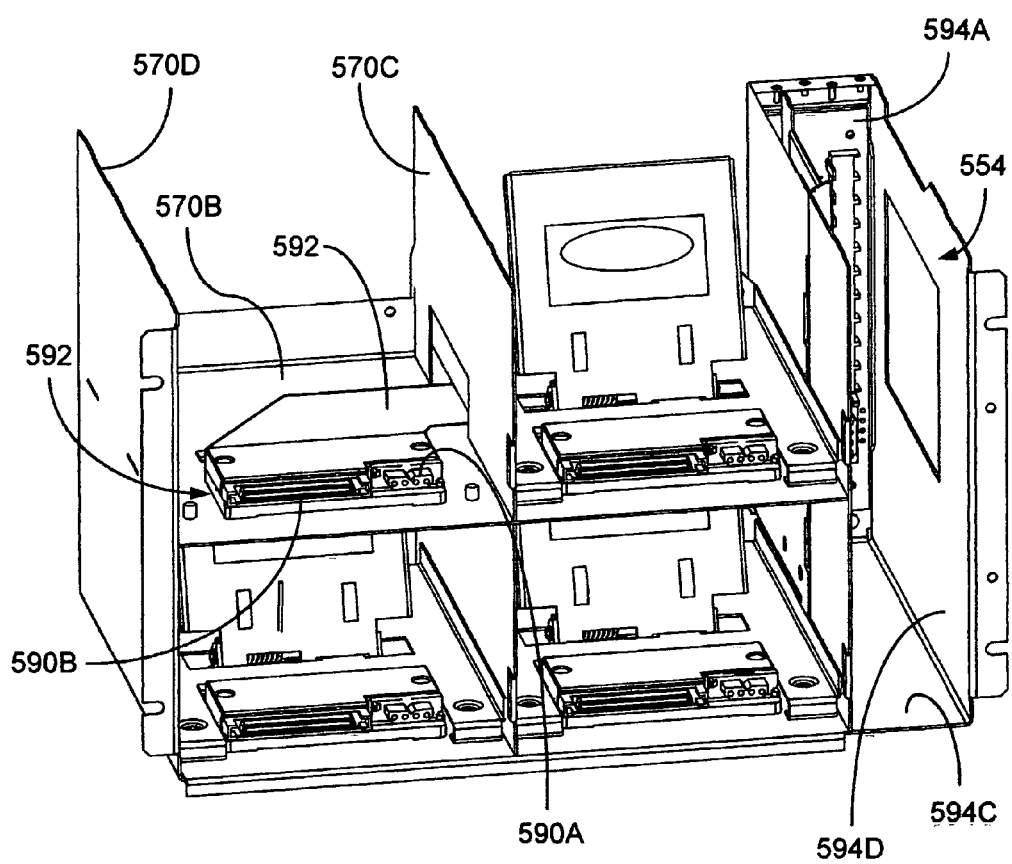
Figure 24E:
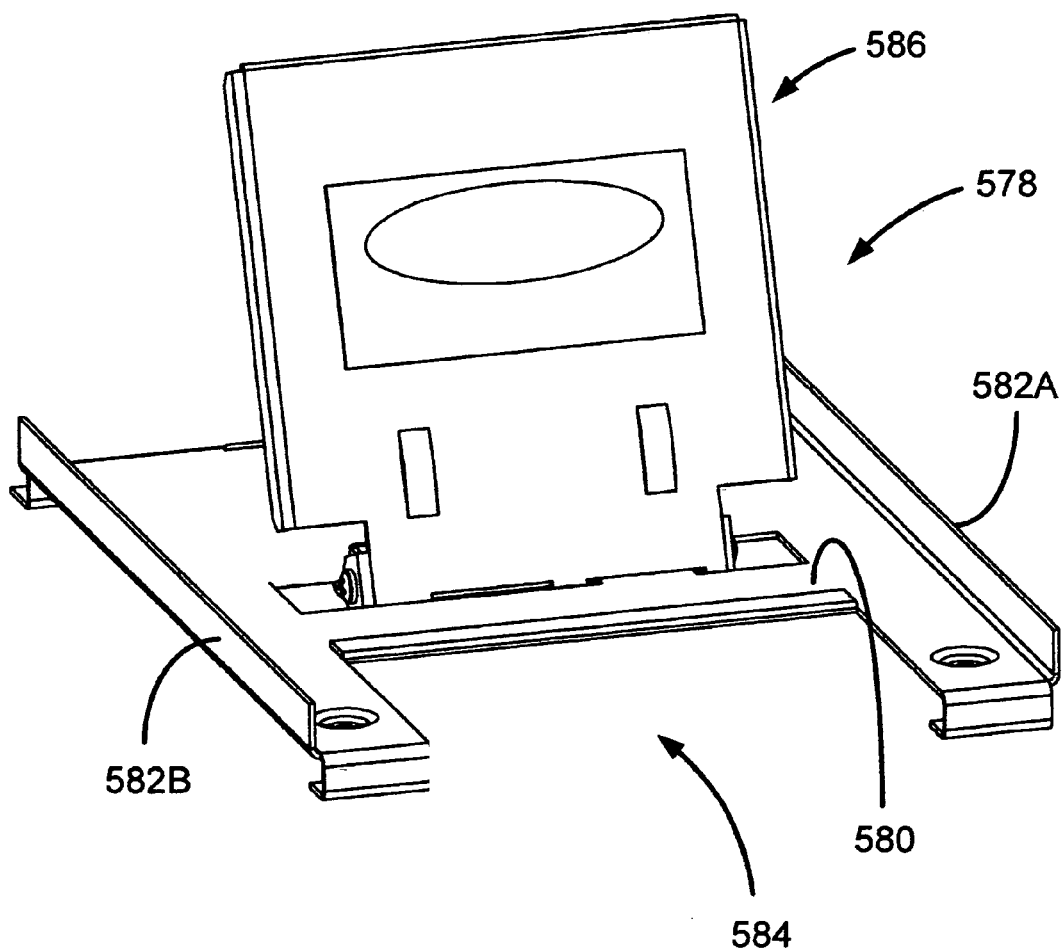
Figure 24F:
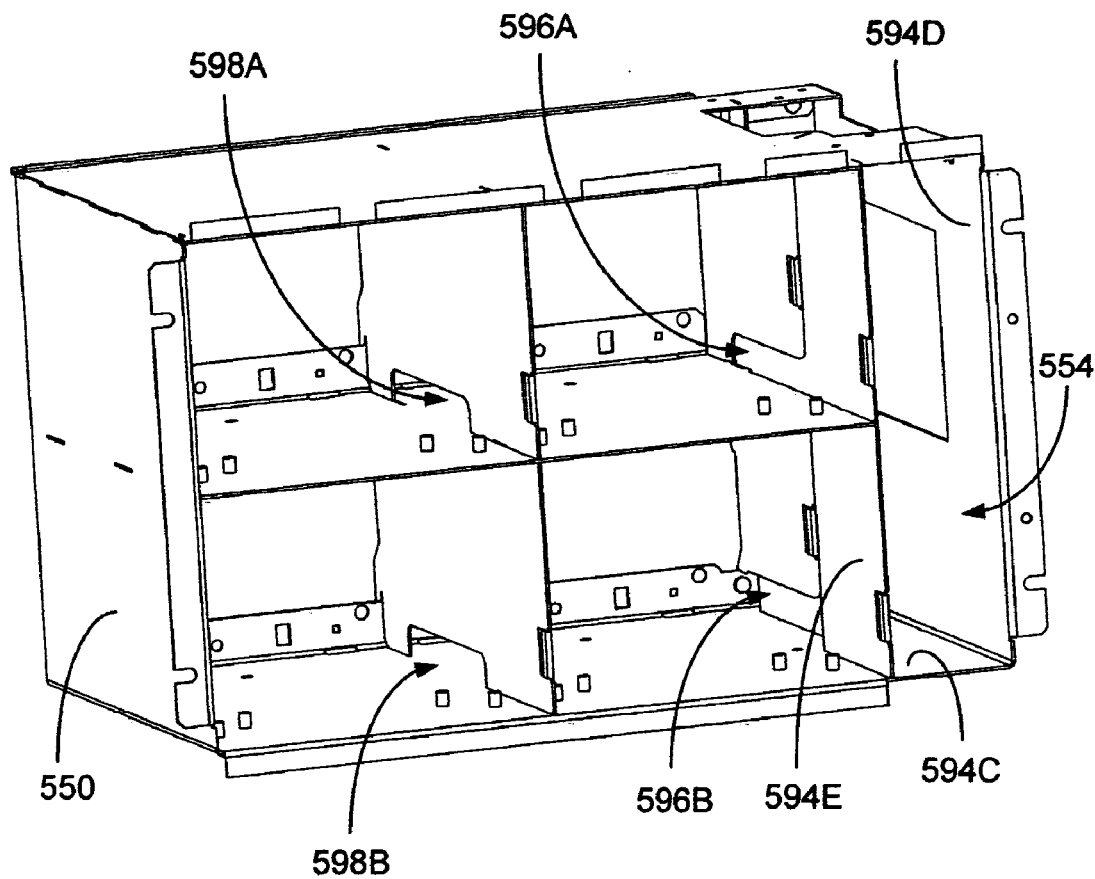

The drive bays 552A–552D are substantially identical to one another. Consequently, only drive bay 552B is described with the understanding that the description is also applicable to the other drive bays. Drive bay 552B is comprised of a top wall 570A, a bottom wall 570B, a first side wall 570C, and a second side wall 570D that define an interior space 572 for accommodating a sled 548B, a first open side 574A, and a second open side 574B. When the drive bay assembly 540 is mounted in the library 202, the first open side 574A is adjacent to the space within which the cartridge transport 214 operates and the second open side 574B is adjacent to the hinged door panel 348. Associated with the first open side 574A are a pair of alignment pins 576A, 576B that cooperate with a pair of alignment holes (not shown) associated with the sled 548B to align the sled 548B in the bay 552B. Associated with the bottom wall 570B is a sled guide 578. The sled guide 578 comprises a base member 580 and two side members 582A, 582B that cooperatively form a guide for a sled 548B. The base member 580 also defines a plug notch 584 that accommodates a plug, such as the plug assembly 588, that is also associated with the bottom wall 570B. The base member 580 is supported above the bottom wall 570B to form a space for accommodating the conductors, such as the plugs 590A and 590B, that provide power, control and data signals to a drive associated with a sled 548B. A spring-loaded flag 586 is attached to the base member 580. In operation, the spring associated with the flag 586 causes the flag 586 to be oriented as shown in FIG. 24C when no sled 548B is associated with the drive bay 552B. In this orientation, the flag 586 prevents or inhibits an operator from reaching through the drive bay 552B and into the space where the magazine transport 212 and/or cartridge transport 214 could possibly injure the operator. When a sled 548B is inserted into the drive bay 552B, the insertion of the sled causes the flag 586 to rotate towards the base member 580. Also associated with the bottom wall 570B is a plug assembly 588 that comprises a first female plug 590A for receiving one or more power-related signals for a drive 180, a second female plug 590B for receiving control and/or data signals for a drive 180, and a multi-conductor ribbon cable 592 for conveying the power-related signals and the control and/or data signals to and from the QIP 668.

The QIP bay 554 has a front side wall 594A, top side wall 594B, bottom side wall 594C, first side wall 594D, and second side wall 594E. The front side wall 594A accommodates a plug interface (not shown) that mates with a plug interface associated with the QIP 668 and with one or more plugs (not shown) that is/are connected to the ribbon cables associated with the plug assemblies of each of the drive bays 552A–552D. The second side wall 594E and the first side walls associated with the drive bays 552A, 552C respectively define gaps for the ribbon cables 592 associated with the plug assemblies 588 of each of the drive bays 552A–552D. The gap 596A receives the ribbon cables 592 associated with the plug assemblies 588 of drive bays 552A, 552B. The gap 596B receives the ribbon cables 592 associated with the plug assemblies 588 of drive bays 552C, 552D. The ribbon cable 592 associated with the drive bay 552B extends through a passageway 598A and under the base member 570B of the sled guide 578 associated with drive bay 552A to reach the gap 596A. Similarly, the ribbon cable 592 associated with the drive bay 552D extends through the passageway 598B and under the base member 570B of the sled guide 578 associated with drive bay 552C to reach the gap 596B.

Figure 25:
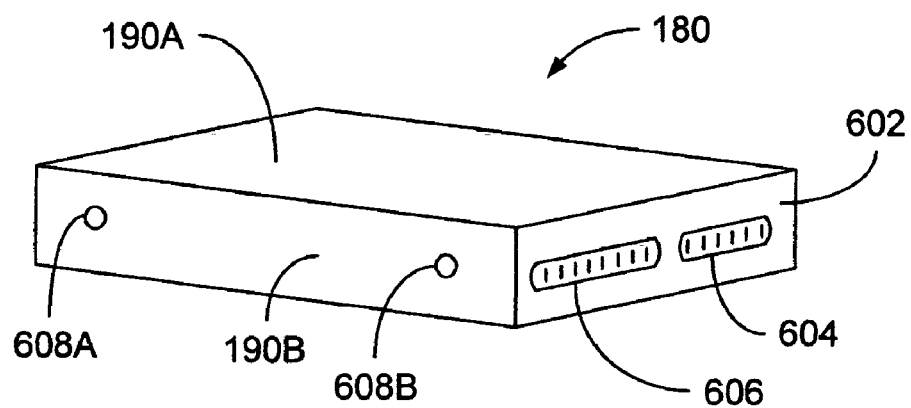

The drive bay assembly 540 further comprises the four sleds 548A, 548B, 548C and 548D, which are substantially identical to one another. Consequently, only sled 548A is described in combination with one drive bay 552A with the understanding that the description is also applicable to sleds 548B–548D and sleds 552B–D. As will be appreciated to one skilled in the art, one drive sled, such as 548A is capable of cooperating with any of the drive bays 552A–D. Before describing the sled 548A, the plug interface associated with a typical drive 180 is described. With reference to FIG. 25, the typical drive 180 (see FIGS. 5A–5C) comprises a back surface 602 that typically comprises a power plug 604 for receiving a power signal (typically, +5V and +12V signals) and a control/data plug 606 for receiving control signals and data signals. In the absence of the drive bay assembly 540, the drive 180 would be oriented in the library 202 such that the receptacle 186 would be accessible by the cartridge transport 214. Typically, the drive 180 would also be fixed to a frame within the library 202 with screws that engage a first pair of threaded holes 608A, 608B associated with the third surface 190B of the drive and a second pair of threaded holes (not shown) associated with the opposite surface of the drive 180. In such a situation, removal of the drive 180 from the library 202 would require that: (a) the cable that provides power to the drive 180 be disconnected from the power plug 604, which typically involves unscrewing screws or unlatching latches in addition to manipulating the cabling; (b) the cable that provides control and data signals to the drive 180 be disconnected from the control/data plug 606, which also typically involves unscrewing screws or unlatching latches in addition to manipulating the cabling; and (c) the screws connecting the drive 180 to the sled 548A be removed.

With the foregoing description of the plug interface of a typical drive 180 and the manner in which the drive 180 is typically fixed in place in a library 202 in mind, the sled 548A generally serves to: (a) provide a structure to which a drive 180 can be fixedly mounted; and (b) provide a plug interface for the drive 180 that faces the opposite direction from plug interface associated with the drive 180. As a consequence, when the sled 548A is used in combination with the drive bay 552A or any other drive bay 552B–D of the housing 550, a drive 180 held by the sled 548A can be removed from the library 202 without having to undo screws or other fasteners, as required by the conventional approach. Further, when the sled 548A and an associated drive 180 are removed from the library 202, the electrical connections with the drive 180 are severed by removing the sled 548A from the drive bay 552A. Conversely, a drive 180 can be inserted into the library 202 using the sled 548A and the drive bay 552A without having to manipulate screws or fasteners in the manner required by the conventional approach. Further, during such an insertion, the electrical connections for the drive 180 are established by inserting the sled 548A into the drive bay 552A.

Figure 26A:
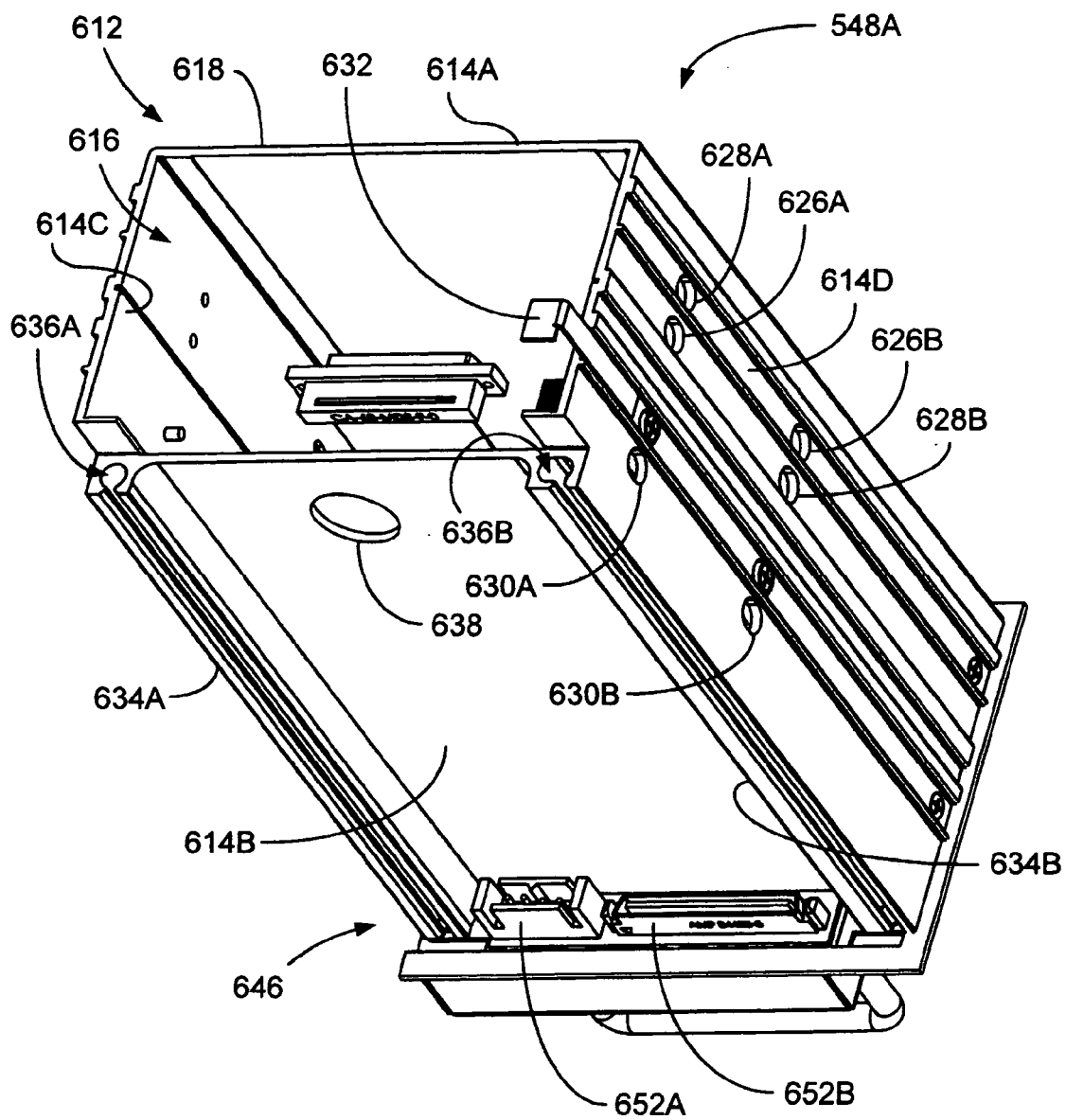
Figure 26B:
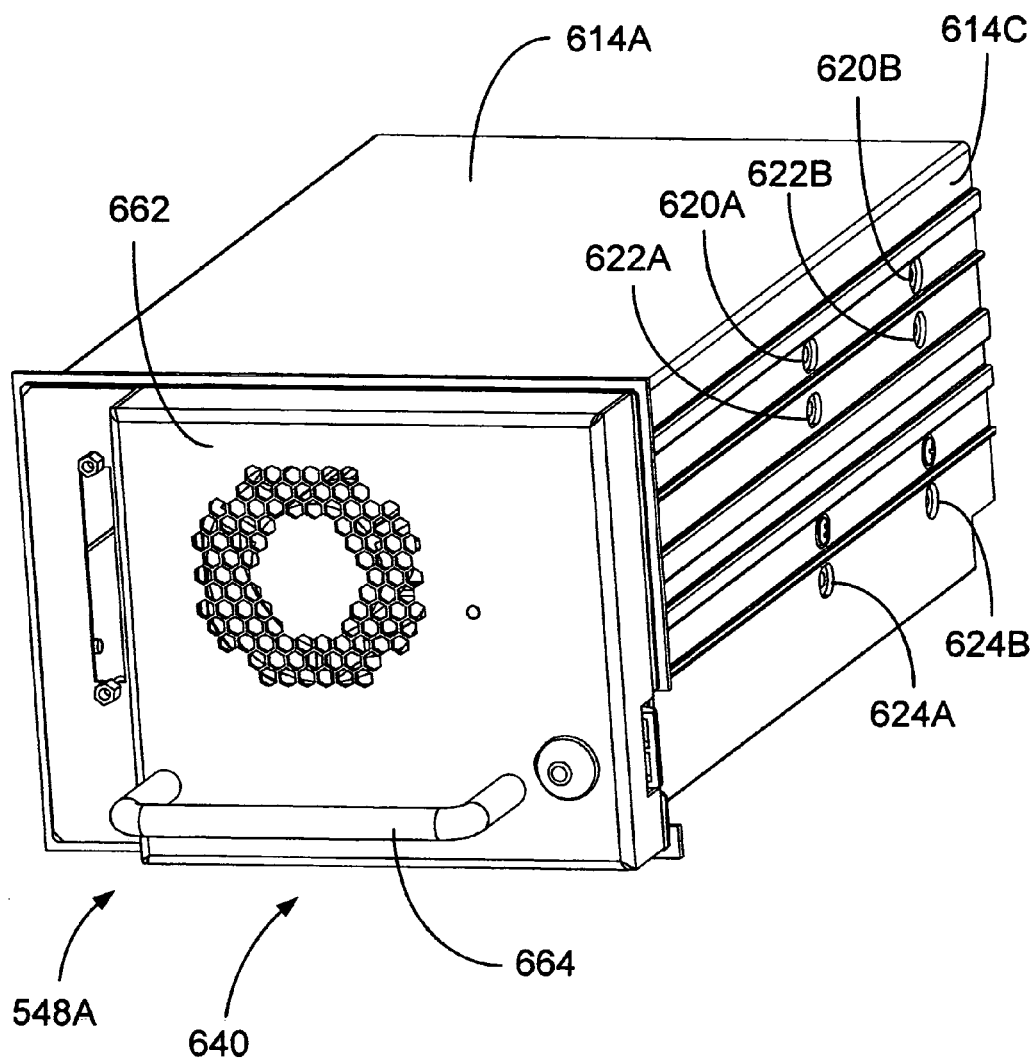
Figure 26C:
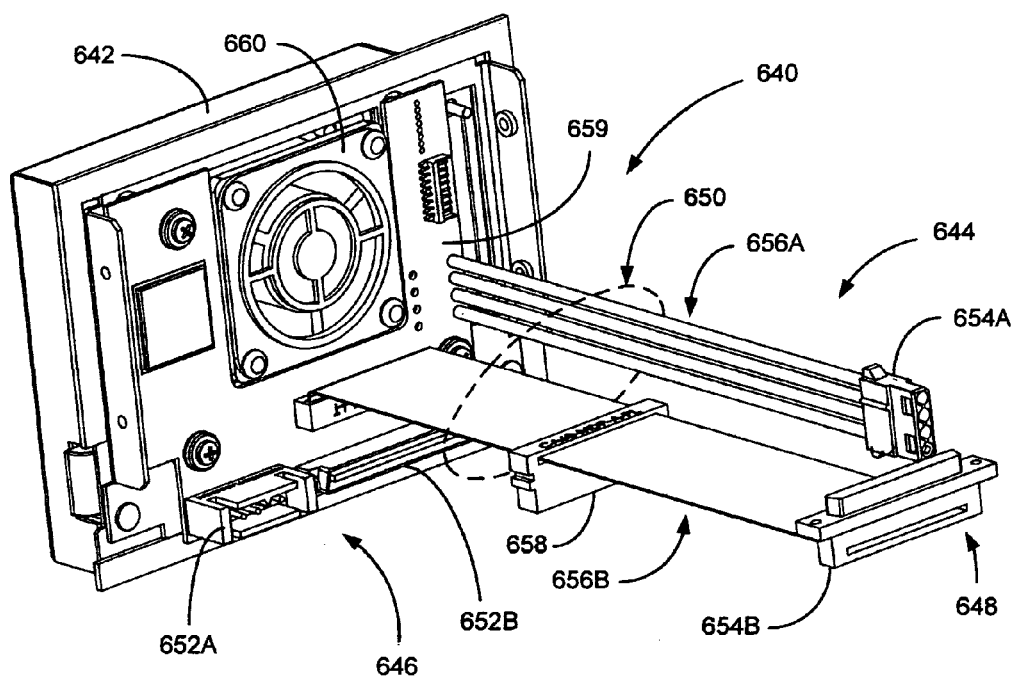

With reference to FIGS. 26A–26C, the sled 548A comprises a housing 612 that is capable of accommodating a full-height LTO, SAIT or DLT tape drive or two, half-height LTO, SAIT or DLT tapes drives. The housing 612 comprises a top wall 614A, bottom wall 614B, first side wall 614C, and second side wall 614D that define an interior space 616 for holding a full-height drive or two, half-height drives and an opening 618 for receiving the drive or drives into the interior space. Associated with the first side wall 614C are three pairs of holes 620A, 620B, 622A, 622B, 624A and 624B. Similarly, associated with the second side wall 614D are three pairs of holes 626A, 626B, 628A, 628B, 630A and 630B. These holes 620A, 620B, 622A, 622B, 624A, 624B, 626A, 626B, 628A, 628B, 630A and 630B allow most, if not all, of the presently known LTO, SAIT and DLT tape drives, both full-height and half-height, to be mounted in the housing 612. Also, associated with the second side wall 614D is a reference flag 632 for use by the magazine transport 212 and/or the cartridge transport 214 in locating a sled 548A and any drive held by the sled 548A. Associated with the bottom wall 614B are a pair of rails 634A, 634B. The rails 634A, 634B are spaced so as to be received by the guide formed by the base member 580 and two side members 582A, 582B of the sled guide 578. The rails 634A, 634B respectively include receptacles 636A, 636B. The receptacles 636A, 636B respectively receive the alignment pins 576A, 576B when the sled 548A is properly inserted into the drive bay 552A. A hole 638 that provides access to a "tape wind" screw of a drive 180 located in the housing 612 is also associated with the bottom wall 614B of the housing 612.

The sled 548A further comprises a back wall assembly 640 that adjoins the top wall 614A, bottom wall 614B, first side wall 614C, and second side wall 614D. The back wall assembly 640 comprises a housing 642 that supports a plug structure 644 for connecting a drive 180 held by the housing 612 with the plug assembly 588 associated with any one of the drive bays 552A–552D. The plug structure 644 comprises: (a) a first plug interface 646 that is located to engage the plug assembly 588 associated with the drive bay 552A when the sled 548A is properly aligned and inserted into the drive bay 552A; (b) a second plug interface 648 for engage the plug interface associated with the back surface 602 of a drive 180; and (c) conductors 650 extending between the first and second plug interfaces 646, 648. More specifically, the first plug interface 646 comprises a first power plug 652A and a first data/control plug 652B that are respectively located to engage the power plug 590A and data/control plug 590B of the plug assembly 588 when the sled 548A is properly inserted into the drive bay 552A. The second plug interface 648 comprises a second power plug 654A and a second data/control plug 654B for respectively engaging the power plug 604 and data/control plugs 606 associated with the back surface 602 of a drive 180. The conductors 650 comprise: (a) power conductors 656A that connect the first power plug 652A and the second power plug 654A; and (b) data/control conductors 656B that connect the first data/control plug 652B and the second data/control plug 654B. For accommodating two, half height drives, the second plug interface 648 further comprises an additional data/control plug 658 and an additional power plug (not shown) that passes through holes 659 of the housing 642.

Also associated with the housing 642 is a fan 660 that is used to cool any drive 180 located within the housing 612 by causing air to move from the interior space 616 of the housing 612 to the exterior of the housing 612 via a grill 662. Further associated with the housing 642 is a handle 664 that facilitates insertion/removal of the sled 548A into/from the drive bay 552A.

By way of example, use of the drive bay assembly 540 comprises mechanically associating a drive 180 with a sled 548 by using screws to attach the drive 180 to the housing 612 and electrically associating the drive 180 with the sled 548 using the second plug interface 648. Once the drive 180 has been mechanically and electrically associated with the sled 548A, the drive 180 can be associated with the library 202 by inserting the sled 548A into one of the drive bays 552A–552D, such as 552A for example, and dissociated from the library 202 by removing the sled 548A from the drive bay 552A.

The drive bay assembly 540 further comprises a QIP 668 that is housed in the QIP bay 554 and operates to distribute power, control signals and data to each of the drive bays 552A–552D. The QIP 668 comprises a back panel 670 with a handle 672 that facilitates insertion/extraction of the QIP 668 into/from the QIP bay 554.

It should will be appreciated by one skilled in the art that the drive bay assembly 540 suitable is capable of numerous modifications. The following sets forth, with limitation, some possible modifications. For instance, a drive bay assembly 540 is feasible in which the drive bay housing 550 is not susceptible to being readily mounted and demounted from the frame 542 of a library 202. Further, a drive bay assembly 540 is feasible that has a different number of drive bays, such as the drive bay 552A. Additionally, a drive bay assembly 540 that is adapted to hold one or more drives 180 in an orientation other than a horizontal orientation is feasible in one embodiment. Further, a drive bay, such as the drive bay 552A, that accommodates different types of drives, such as disk drive, is also practicable. In yet another alternative embodiment, a drive bay 540 without a QIP bay 554 and/or QIP 668 is likewise feasible. Further, it should also be appreciated that a drive bay assembly 540 is not required for a functional magazine-based data cartridge library 202.

Generally, the power supply system 216 provides DC power to the drives 180 using a flat conductor 686 that has a substantially rectangular cross-section, rather than a conventional conductor that has circular cross-section. The use of a flat conductor 686 allows the space within a library 202 to be more efficiently used or used to accommodate more cartridges 224 and/or more drives 180.

With reference to FIGS. 27A–27D, the power supply system 216 comprises a power supply 217 comprised of a box-like housing structure with a top side 676A, bottom side 676B, front side 676C, back side 676D, first side 676E, and second side 676F. Associated with the front side 676C are seven power supply bays 678 each capable of accommodating a sub-power supply (not shown). Generally, the power supply 217 includes a sub-power supply in one of the bays 678 for providing DC power to elements in the library 202 other than the drives 180. The six other bays 678 are populated with sub-power supplies depending on the number of drive bay assemblies 540 that are attached to the ladder frame 542. Generally, one sub-power supply is required for each drive bay assembly 540 attached to the ladder frame 542. Also associated with the front side 676C of the power supply 217 is a pair of AC receptacles 680, with each receptacle 680 capable of accommodating an AC plug through which AC power is provided to the power supply 216 for conversion to DC power. Also associated with the front side 676C, is a set of breakers 682 that operate to sever the connection with the source of AC power when the power supply 216 is in an undesirable operating state, such as when the power supply 216 is drawing too much current from the AC source. The first side wall comprises a slot for accommodating an embodiment of a flat electrical power conductor 686 that has a first flat exterior face 686A and a second flat exterior face 686B that extends substantially parallel to the first flat exterior face 686B.

The flat, electrical power conductor 686 extends vertically and adjacent to one side of the ladder frame 542. In the illustrated embodiment, only one vertical standard 688 of the ladder frame 542 is shown. The flat, electrical power conductor 686 is supported by a channel member 690, which is attached to the ladder frame 542. The channel member 690, in addition to supporting the flat, electrical power conductor 686, also supports six power plugs 692A, 692B, 692C, 692D, 692F and 692F, one plug for each of the compartments 544A, 544B, 544C, 554D, 554E and 544F of the ladder frame 542. Each compartment 544A–544F of the ladder frame 542 is capable of accommodating a drive bay assembly 540 that, in turn, is capable of accommodating up to four full height drives and up to eight half-height drives.

The flat, electrical power conductor 686 is attached to the channel member 690 using a plurality of hole hangers 694 that are attached to the conductor 686 and that each fit over a stud 696 extending from the channel member 690. The electrical connection between the flat, electrical power conductor 686 and each of the plugs 692A–692F is achieved with taps 698A, 698B, 698C and 698D that are each connected to one of the planar electrical conductors comprising the flat, electrical power conductor 686. To elaborate, any of the drives 180 that can be associated with a drive bay assembly 540 and the QIP 668 associated with a drive bay assembly 540 presently require a +5V signal, a +12V signal, and two ground paths (one for each of the voltage signals). Consequently, the flat, electrical power conductor 686 is a laminate of four electrical conductors, one for each of the two voltage signals and one for each of the two ground paths. If the library 202 is modified so that different electrical signals are required, the flat, electrical power conductor 686 can be modified accordingly.

Figure 27A:
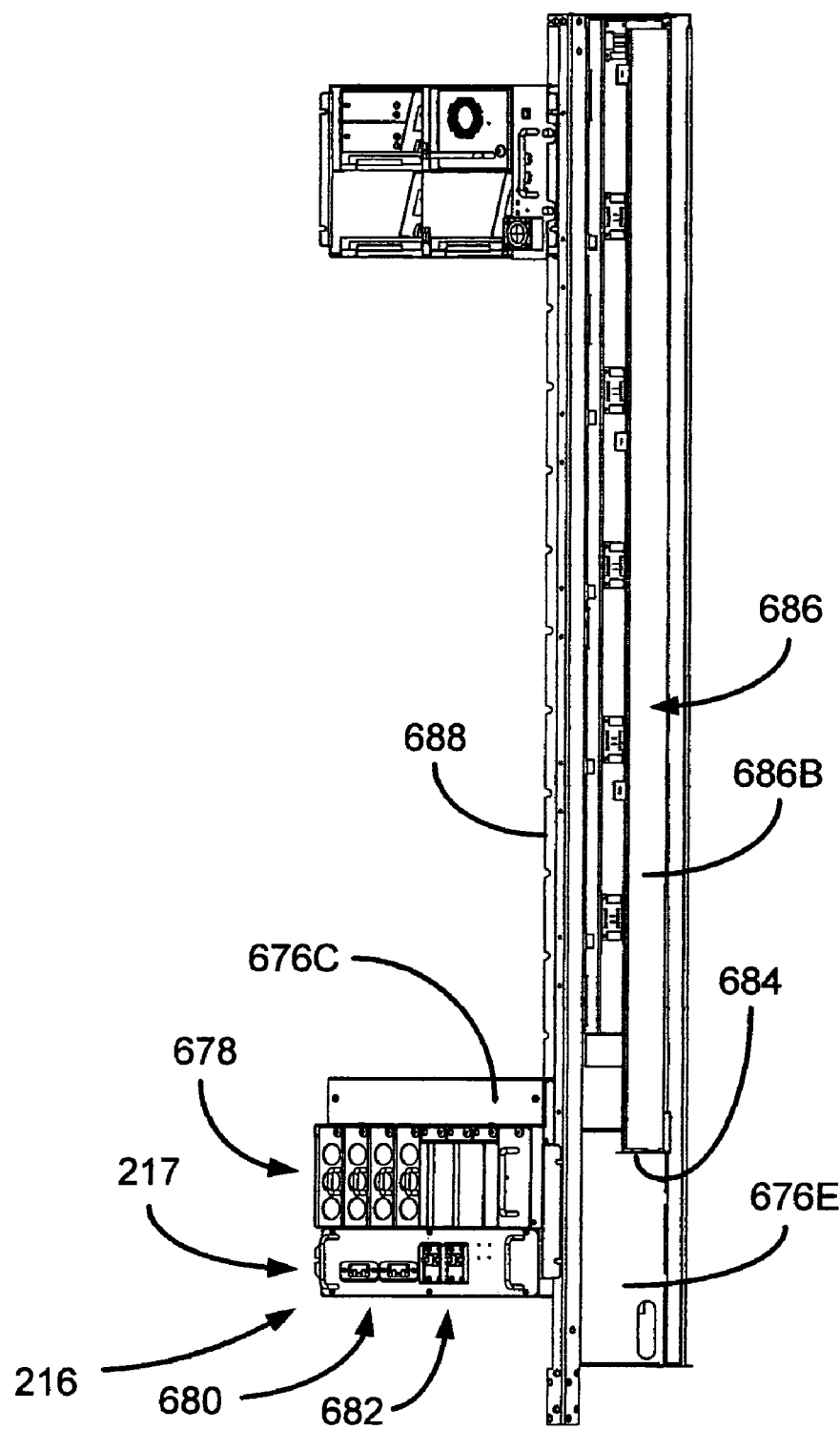
Figure 27B:
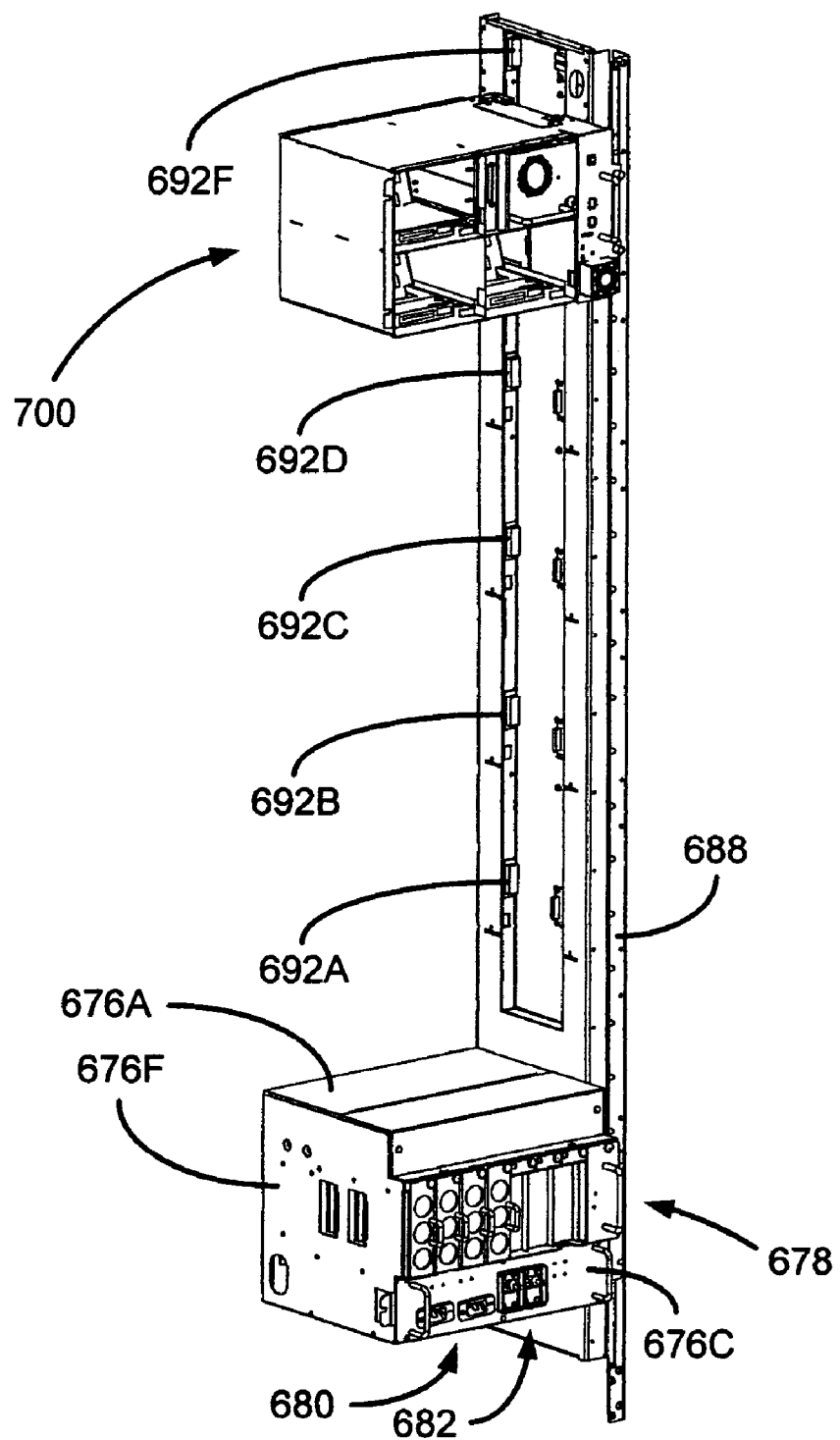
Figure 27C:
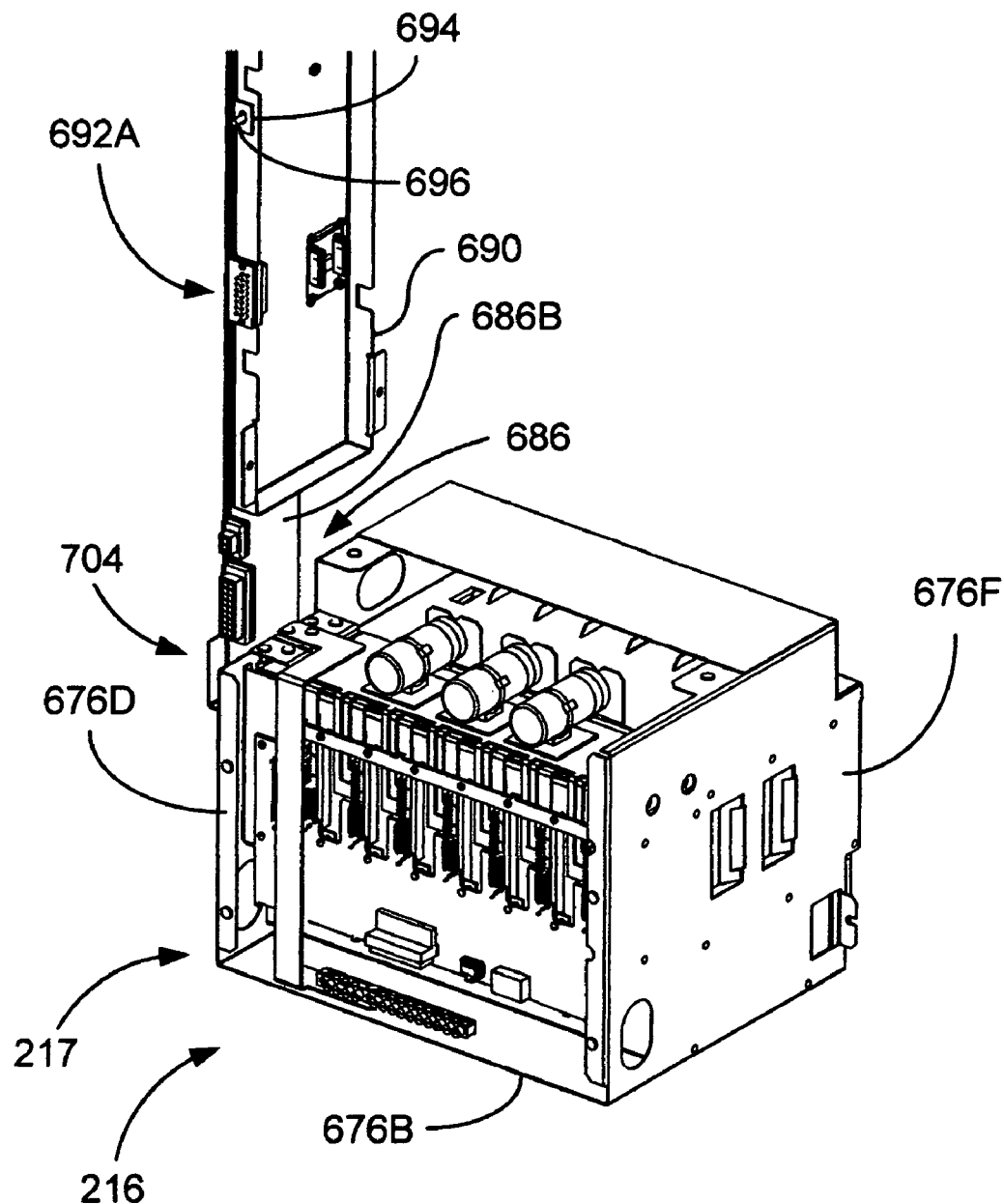
Figure 27D:
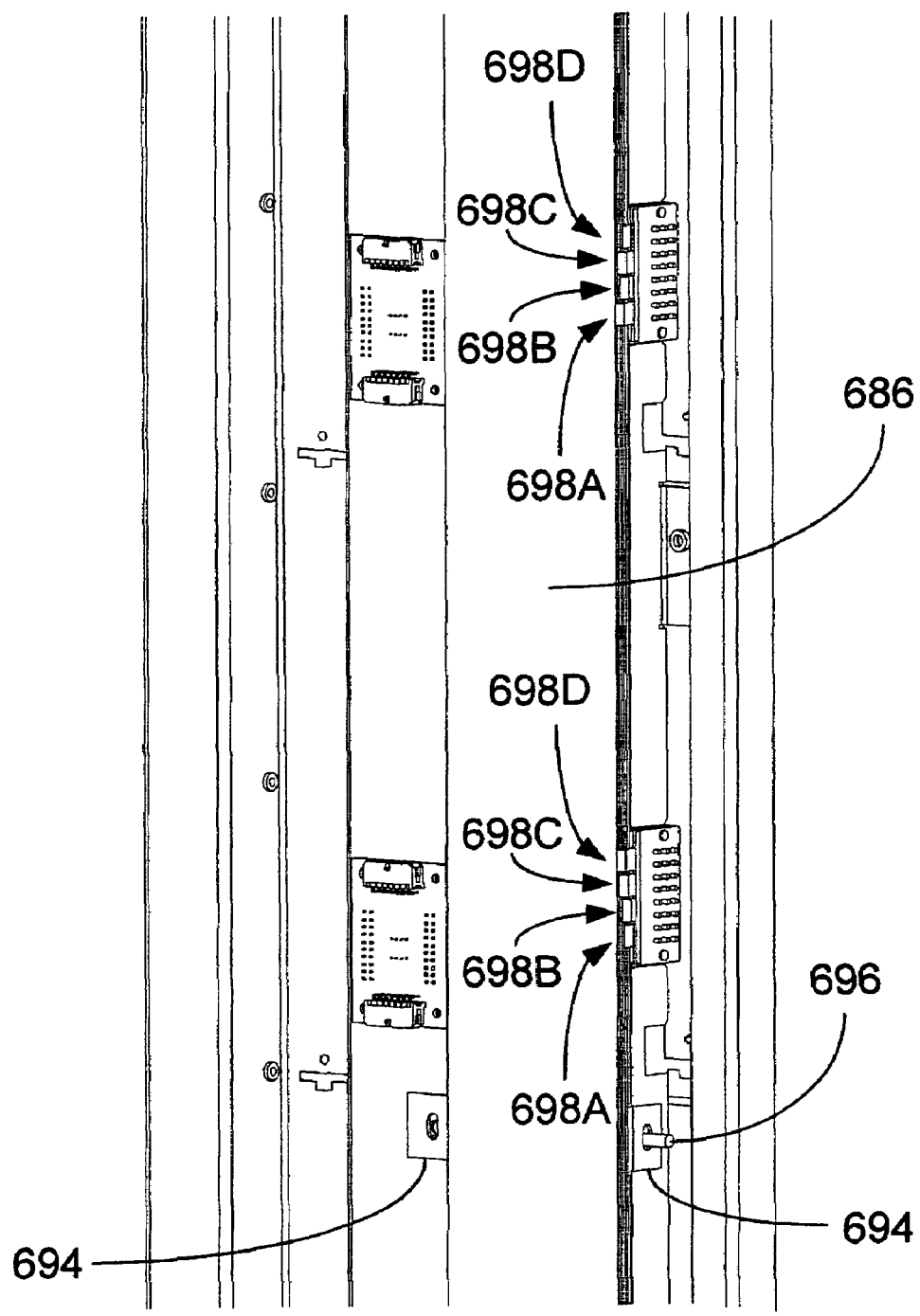
Figure 27E:
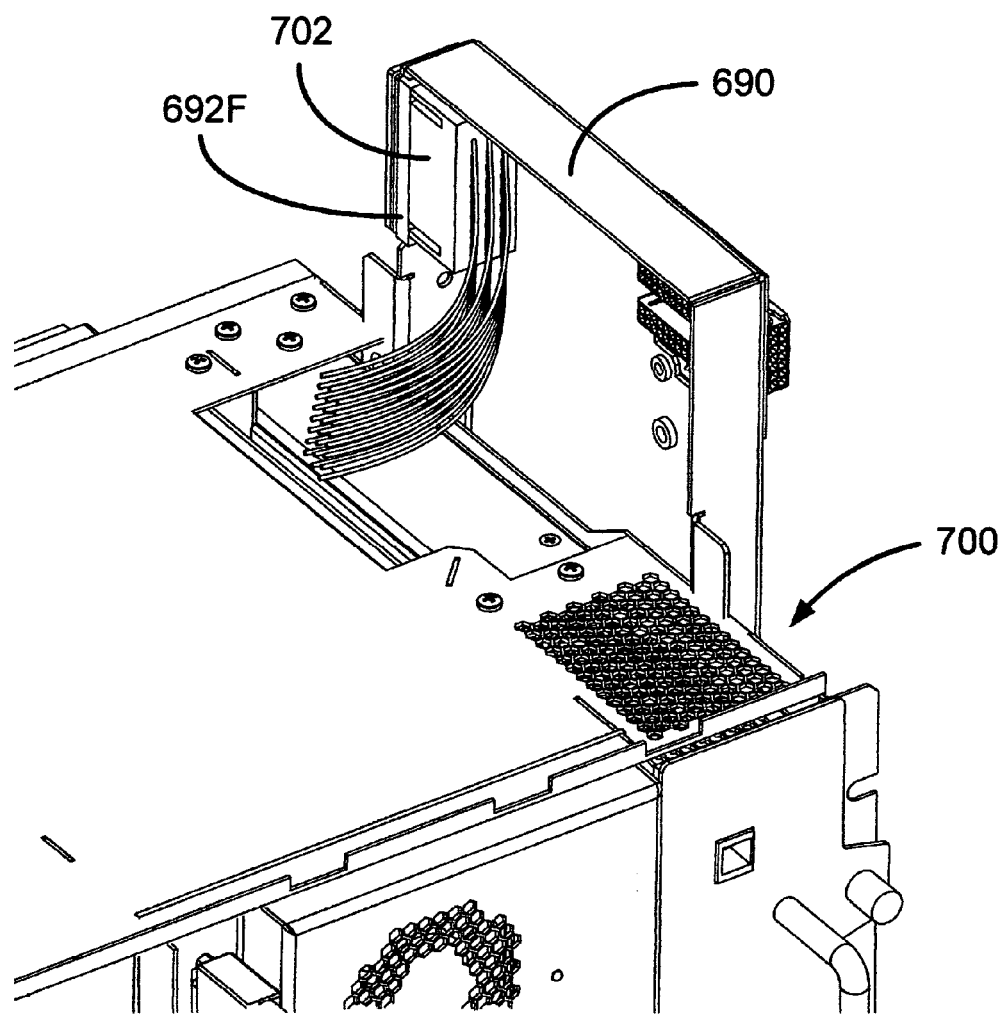

As shown in FIG. 27E, an electrical power connection is established between the flat, electrical power conductor 686 and a drive bay assembly 700 in compartment 544F using a plug 702 that is associated with the QIP 668 of the drive bay assembly 700 and that mates with the plug 692F. An electrical connection is established between the flat, electrical conductor 686 and the power supply 216 by a tap assembly 704 that extends between the conductor 686 and the points in the power supply 216 that provide the necessary voltage signals and ground paths. It should be appreciated that the tap assembly 704 comprises a horizontally extending flat power conductor.

The distance between the first and second flat external faces 686A, 686B of the flat, electrical power conductor 686 is approximately 0.32 inches. In contrast, if a conventional round cable or bundled group of round cables were designed to be able to provide power to the same twenty-four drives 180, the cable or group of cables would have a cross-sectional measurement on the order of 3–4 inches.

It should be appreciated that the substantially rectangular cross-section shape of the flat, electrical power conductor 686 is complementary to the shapes of most of the other elements in the library 202. As a consequence, the flat, electrical power conductor 686 facilitates the layout of the library 202. In this regard, the flat surfaces 686A, 686B are located so as extend substantially parallel or perpendicular to many of the surfaces associated with elements residing in the library 202. For instance, the flat surfaces 686A, 686B extend substantially parallel or perpendicular to the exterior surfaces of the housing 550 of the drive bay assembly 700. A horizontally extending flat, electrical power conductor, should one be needed, is also likely to facilitate the layout of a library 202.

It will be appreciated by one skilled in the art that the flat, electrical power conductor 686 provides benefits in addition to spatial and/or layout related benefits. Namely, the power conductor 686 has a large capacitance that allows power to be provided to the drives in a highly responsive manner. Further, "noise" generated by the electrical power conductor 686 is lower than conventional means. In addition, relative to the conventional round conductors, the flat electrical power conductor 686 utilizes fewer connectors and/or plugs resulting in additional noise reduction. It will be further appreciated to one skilled in the art that a flat, electrical power conductor 686 can also be applied to a cartridge-based library.

Figure 7B:
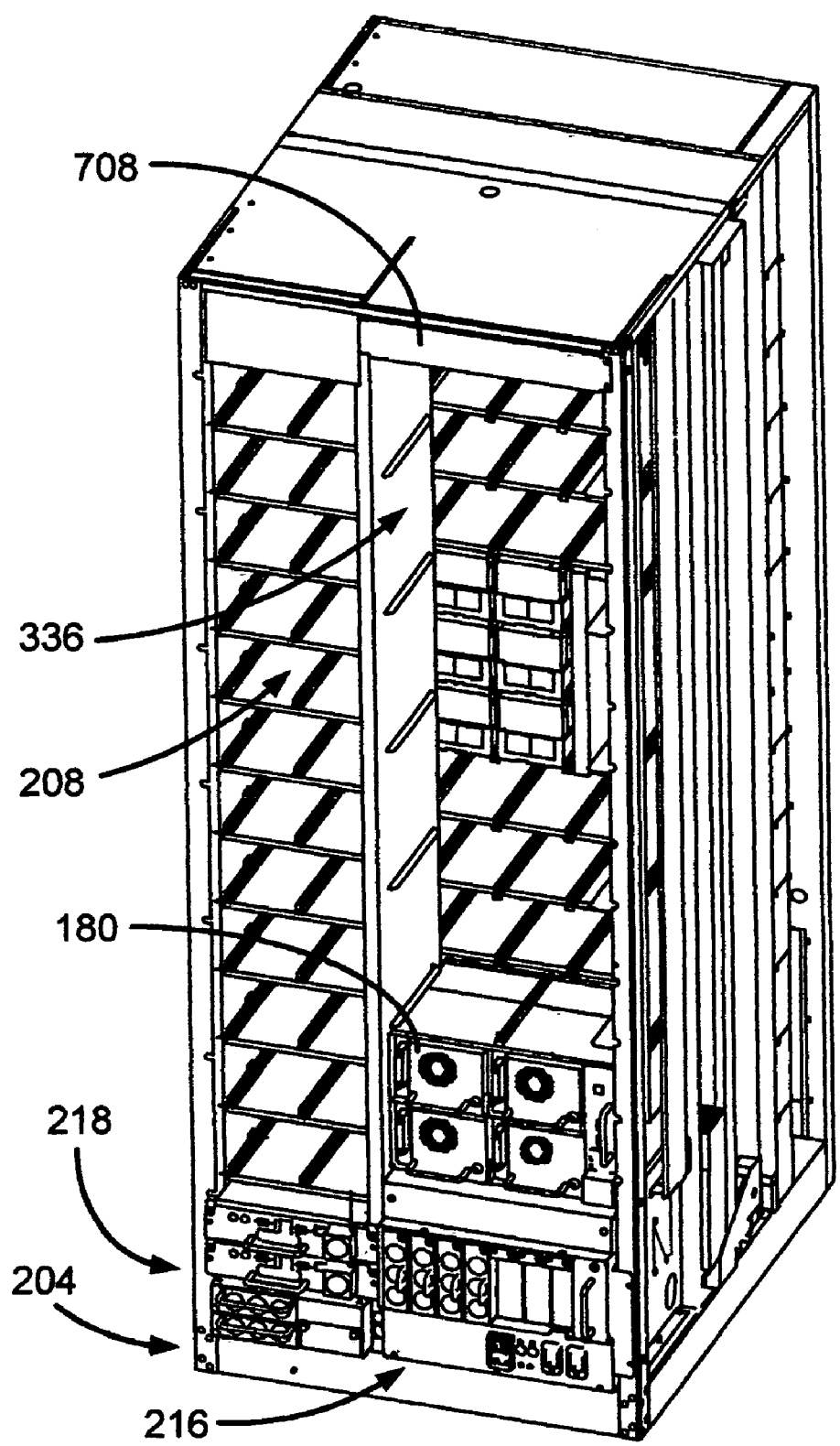

With reference to FIGS. 7B and 23C, the user definable space 336 is a space in which the operator of the library 202 has a choice as to the identity of the functional element or elements of the library 202 that occupies all or a portion of the space.

The extent of the user definable space 336 of the library 202 is largely defined by the ladder frame 542. To elaborate, the user definable space 336: (a) extends vertically from approximately the top side 676A of the power supply 216 (which is located immediately under the lower-most compartment of the ladder frame 542, namely, compartment 544A) to the bottom side of cross-member 708, and (b) extends laterally between first and second sides 710A, 710B of the ladder frame 542. With reference to FIG. 16, the depth of the user definable space 336 extends from plane 330B to a substantially parallel plane located adjacent to the back surface 340B of the library 202. Further, the ladder frame 542 substantially divides the user-definable space 336 into six, equally sized spaces, namely, the compartments 544A–544F.

As previously noted, each of the compartments 544A–544F is capable of accommodating one of the drive bay assembly 540. Moreover, the ladder frame 542 and the first and second mounting flanges 556, 560 facilitate the mounting and demounting of the drive bay assembly 540 from any one of the compartments 544A–544F. To reiterate, mounting of the drive bay assembly 540 in one of the compartments 544A–544F is accomplished by aligning: (a) the first pair of notches 558A, 558B associated with the first mounting flange 556 of the drive bay assembly 540 and the first pair of threaded holes 556A, 556B associated with a selected one of the compartments 544A–544F; and (b) the second pair of notches 562A, 562B associated with the second mounting flange 560 of the drive bay assembly 540 and the second pair of threaded holes 566A, 566B associated with the selected one of the compartments 544A–544F. Once the notches are aligned, bolts or screws are then used to secure the drive bay assembly 540 to the ladder frame 542. Demounting of the drive bay assembly 540 from the ladder frame 542 is accomplished by first removing the bolts or screws, and then removing the drive bay assembly 540 from the ladder frame 542.

Figure 28A:
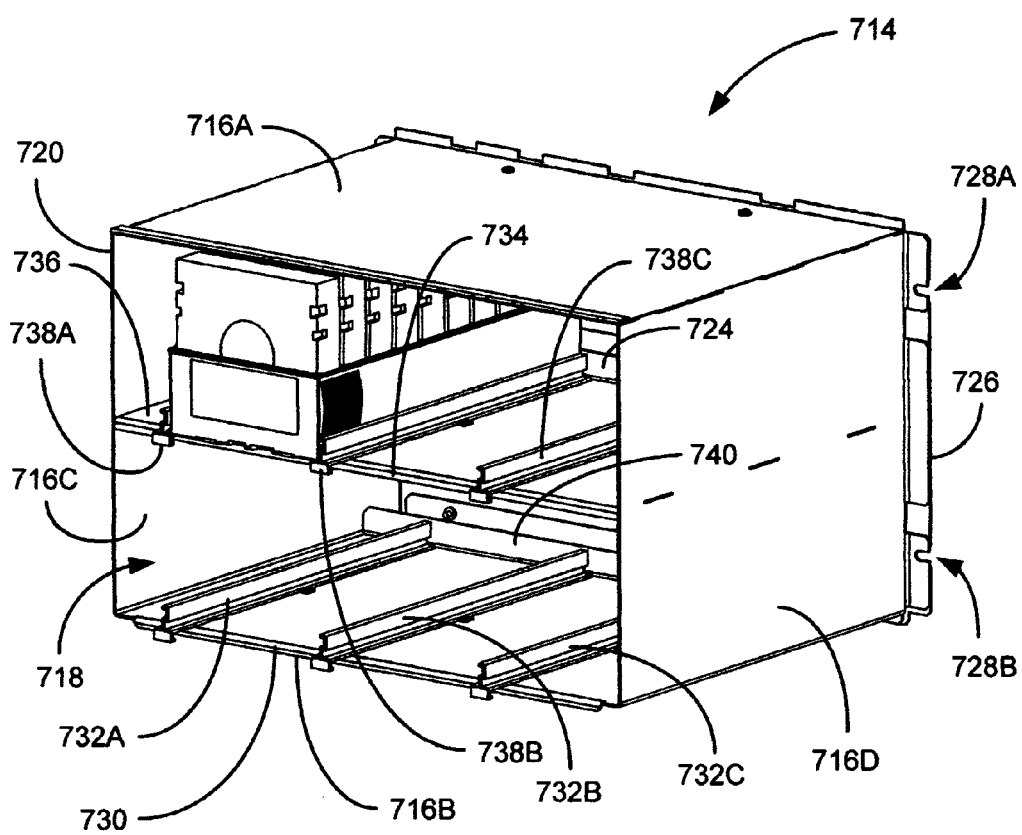
Figure 28B:
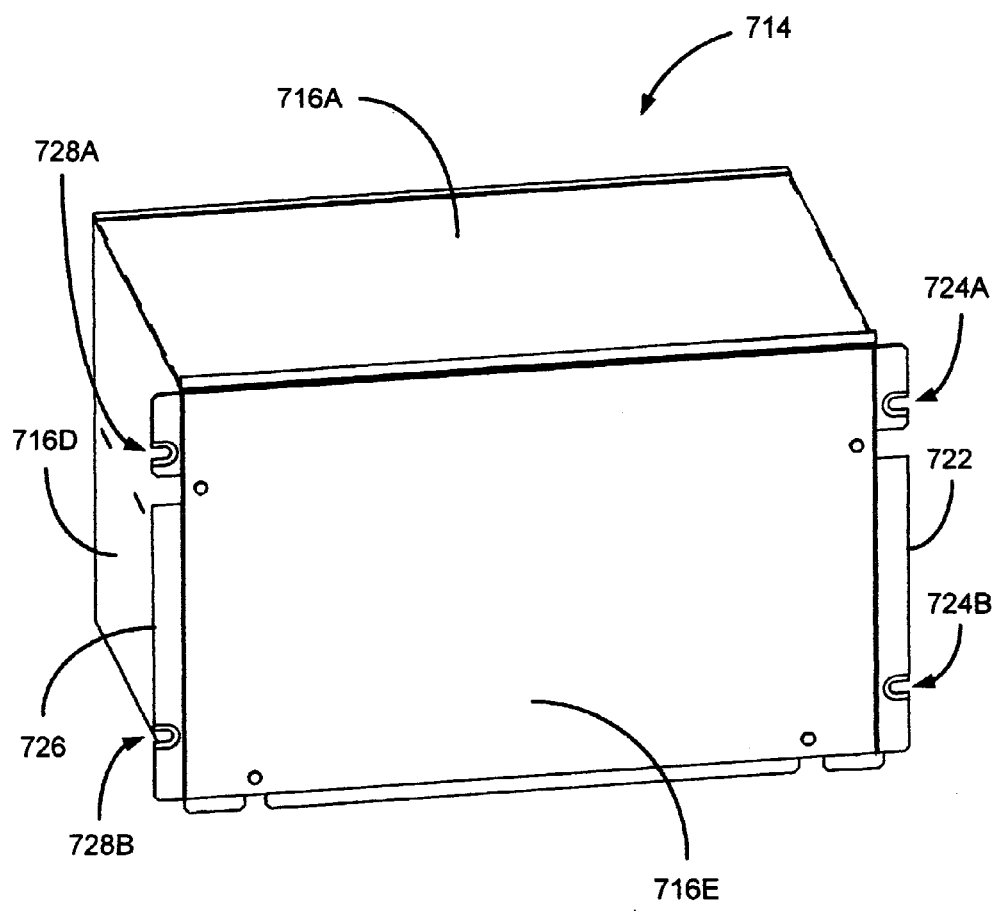

With reference to FIGS. 28A–28B, each of the compartments 544A–544F is also capable of accommodating a magazine bay assembly 714 that provides two shelves, namely first and second shelves 730 and 734, that are each capable of accommodating two magazines 270. The magazine bay assembly 714 comprises a housing with a top wall 716A, a bottom wall 716B, a first side wall 716C, a second side wall 716D, and a back wall 716E that define an interior space 718 for holding up to four magazines 270. The top wall 716A, bottom wall 716B, first side wall 716C and second side wall 716D also define an opening 720 through which any magazines 270 can be inserted into and removed from the interior space 718.

The magazine bay assembly 714 further comprises a first mounting flange 722 with a first pair of notches 724A, 724B, and a second mounting flange 726 with a second pair of notches 728A, 728B. Mounting of the magazine bay assembly 714 to the ladder frame 542 and demounting the magazine bay assembly 714 from the ladder frame 542 are done in substantially the same manner as the drive bay assembly 540 is mounted and demounted from the ladder frame 542. Consequently, the mounting and demounting of the magazine bay assembly 714 is not described further.

The magazine bay assembly 714 further comprises a first shelf 730 capable of accommodating up to two magazines 270. The first shelf 730 is formed from the bottom wall 716B and three cleats 732A, 732B and 732C that are each substantially identical to the previously described cleat 522A. The magazine bay assembly 714 further comprises a second shelf 734 that is also capable of accommodating up to two magazines 270. The second shelf 734 is formed from: (a) a planar member 736 that extends between and is attached to the first and second side walls 716C, 716D; and (b) three cleats 738A, 738B and 738C, that are each substantially identical to the previously described cleat 522A. The operation of each of the first and second shelves 730, 734 is substantially identical to the operation of the previously described shelf 518. Consequently, the operation of the shelves 730, 734 is not described. It should, however, be noted that located between the back wall 716E and the cleats 732A–732C is a bias element 740 that applies a force to the cleats 732A–732C that prevents the cleats 732A–732C from coming out of the holes (not shown) that receive the cleats 732A–732C in the bottom wall 716B. A bias element 742 performs the same function with respect to cleats 738A–738C. Such bias elements 742 are also present in the fixed shelving of the shelf system 208 in the library 202 and perform the same bias function.

Based on the foregoing, a user or operator is able to choose whether a drive bay assembly 540 or a magazine bay assembly 714 resides in each of the compartments 544A–544F associated wit the user-definable space 336. Moreover, altering a choice is, due to the mounting structures employed, relatively easy.

It will be appreciated by one skilled in the art that: (a) the user-definable space 336 is a fixed space; (b) the compartments 554A–F each have a fixed size, a fixed location and substantially the same size as the other compartments; and (c) the drive bay assembly 540 and the magazine bay assembly 714 are also of substantially of the same size. A number of modifications to the user-definable space 336 or alternative embodiments are feasible. Among the possible modifications or alternative embodiments are, without limitation, a user definable space that has an alterable size; compartments of varying number, location, and/or size; and/or assemblies for placing in the space that are of different sizes are feasible. Further, other mounting structures are feasible. For example, a ladder frame 542 or similar structure with a mounting structure that provides a high degree of flexibility as to the location that a module is mounted is feasible.

Generally, the magazine transport 212 is comprised of: (a) a magazine picker 880 that operates to move a magazine 270 to and from a magazine storage location, such as a shelf from the shelf system 208 in the library 202; and (b) an elevator 750 that operates to move the magazine picker 880 adjacent to the locations in the library 202 at which magazines 270 can be stored. It will be appreciated by one skilled in the art that the locations in a magazine-based library 202 at which magazines 270 can be stored include:

(a) a fixed shelf or shelves 208; (b) an entry/exit port 206; and (c) a pass-through port, such as the magazine pass-through port 1358 from FIG. 45A. Further, in certain embodiments, the elevator 750 also positions the magazine picker 880 adjacent to the drive 180 or drives in the library 202.

With reference to FIGS. 29A–29H, the magazine transport 212 comprises an elevator 750 for moving a magazine picker 880 along horizontal and vertical axes so that the magazine picker 880 can be positioned adjacent to the entry/exit port 206, any shelf of the shelf system 208, and any of the drives 180. In this regard, the elevator 750 comprises: (a) a vertical axis assembly 752 for moving a magazine picker 880 vertically within the library 202, and (b) a horizontal axis assembly 754 for moving the magazine picker 880 horizontally within the library 202. The vertical axis assembly 752 supports or carries the magazine picker 880 and generally extends from a first end 756A to a second end 756B.

Generally, the horizontal axis assembly 754 supports the first and second ends 756A, 756B of the vertical axis assembly 752 and is capable of applying a horizontal driving force to each of the first and second ends 756A, 756B to horizontally displace the vertical axis assembly 752 within the library 202. In this regard, the horizontal axis assembly 754 comprises: (a) top assembly 758A for supporting and applying a horizontal force to the first end 756A of the vertical axis assembly 752; (b) a bottom assembly 758B for supporting and applying a horizontal force to the second end 756B of the vertical axis assembly 752; and (c) a coordination assembly 758C for coordinating the application of horizontal forces to the first and second ends 756A, 756B of the vertical axis assembly 752 by the top assembly 758A and the bottom assembly 758B.

Figure 29A:
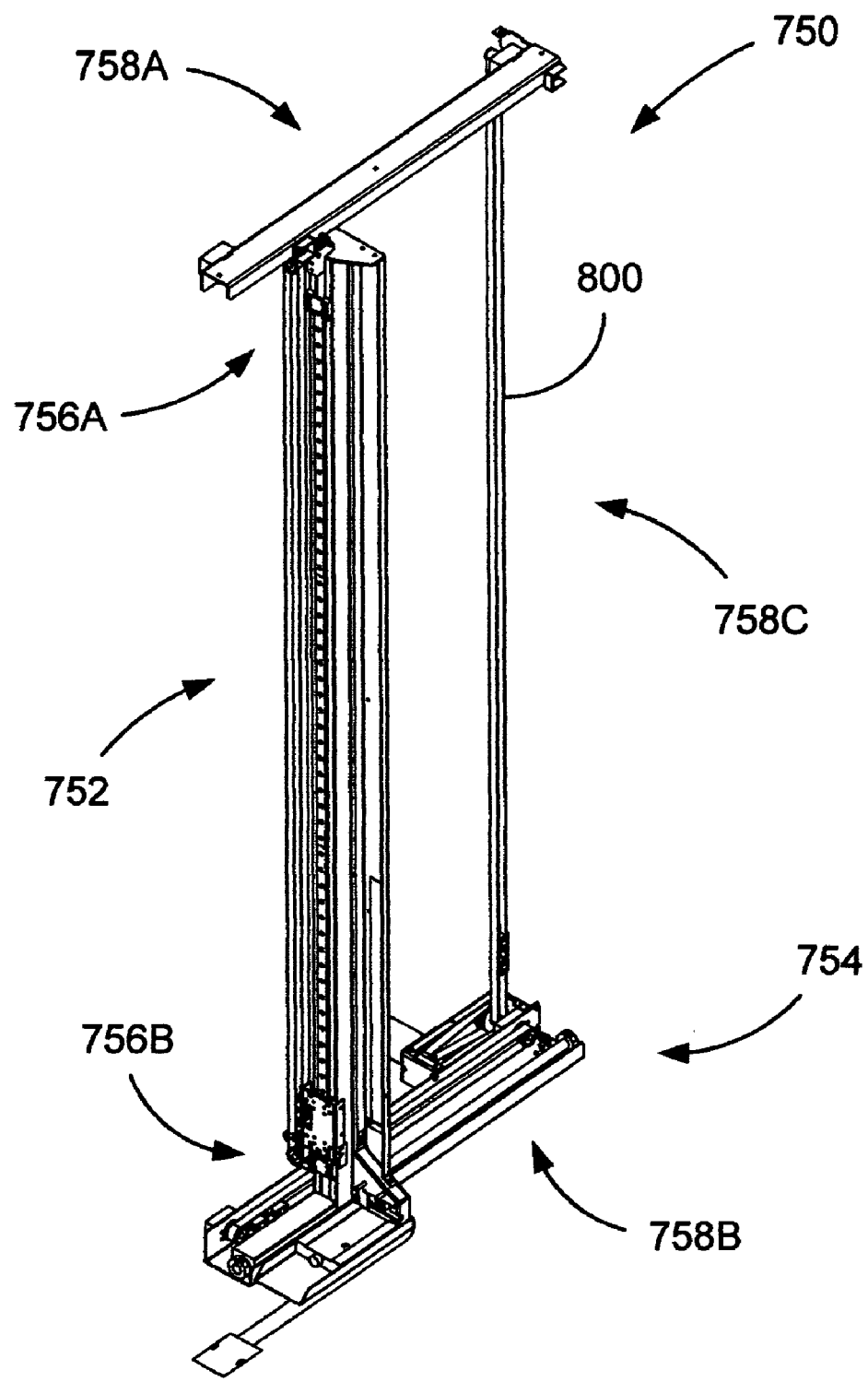
Figure 29B:
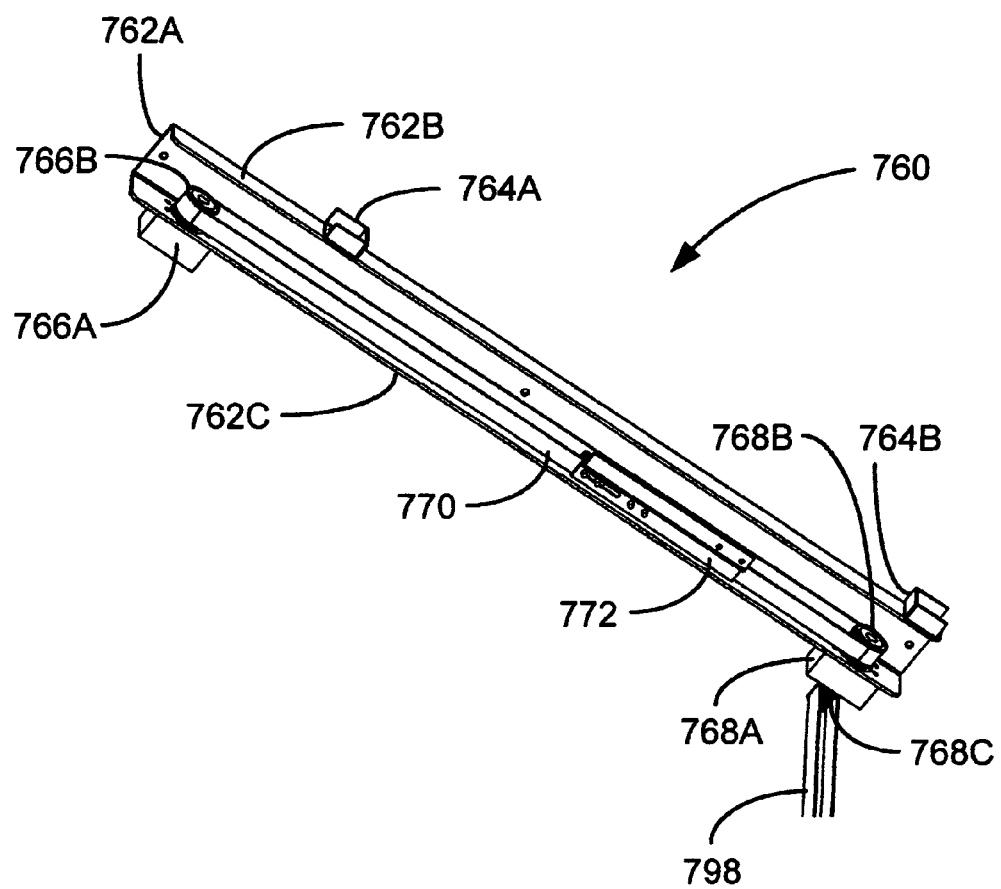

With reference to FIG. 29B, the top assembly 758A comprises a U-shaped channel 760 with a first side, second side 762B and third side 762C. The first side 762A is operatively attached to the interior side of the top surface 340E of the frame 102. The second side 762B serves as a guide for a set of rollers 816A, 816B associated with the first end 756A of the vertical axis assembly 752. In addition, the second side 762B also supports a pair of horizontal stops 764A, 764B that cooperate with a stop block 820 that is associated with the first end 756A of the vertical axis assembly 752 to limit the horizontal extent over which the horizontal axis assembly 754 can move the vertical axis assembly 752. The third side 762C supports a first pulley block 766A and associated pulley 766B. In addition, the third side supports a second pulley block 768A and associated pulleys 768B, 768C. Extending between the pulley 766B and the pulley 768B is a belt 770. Associated with the belt 770 is a mount 772 for connecting the belt 700 to the first end 756A of the vertical axis assembly 752. The mount 772 also incorporates a structure that allows the tension of the belt 770 to be adjusted. The pulley 768C is associated with another belt 798 that is used to: (a) transmit the forces that are used to horizontally displace the first end 756A of the vertical axis assembly 752 via the belt 770 and mount 772; and (b) coordinate the operation of the top assembly 758A with the bottom assembly 758B.

Figure 29C:
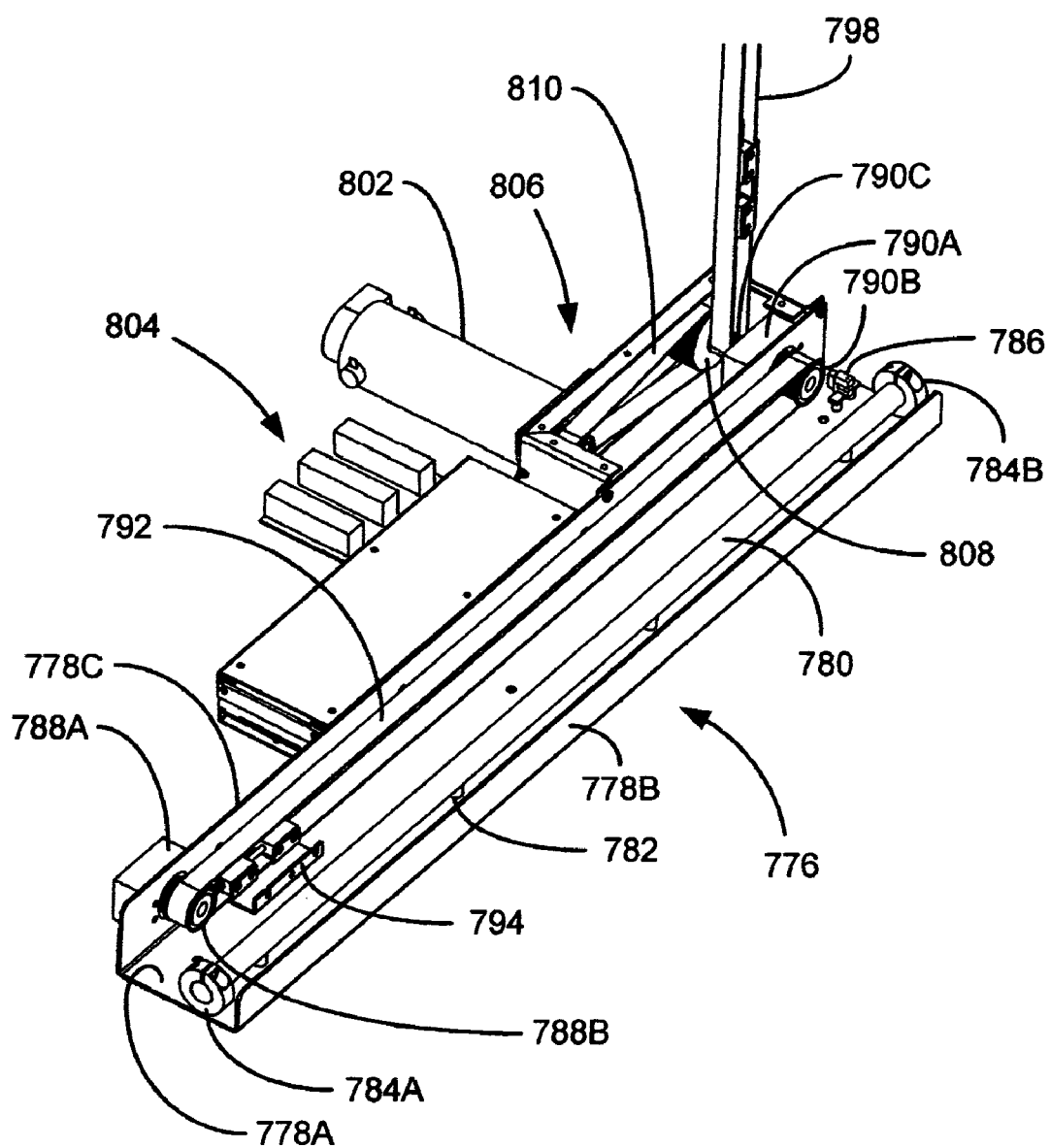
Figure 29D:
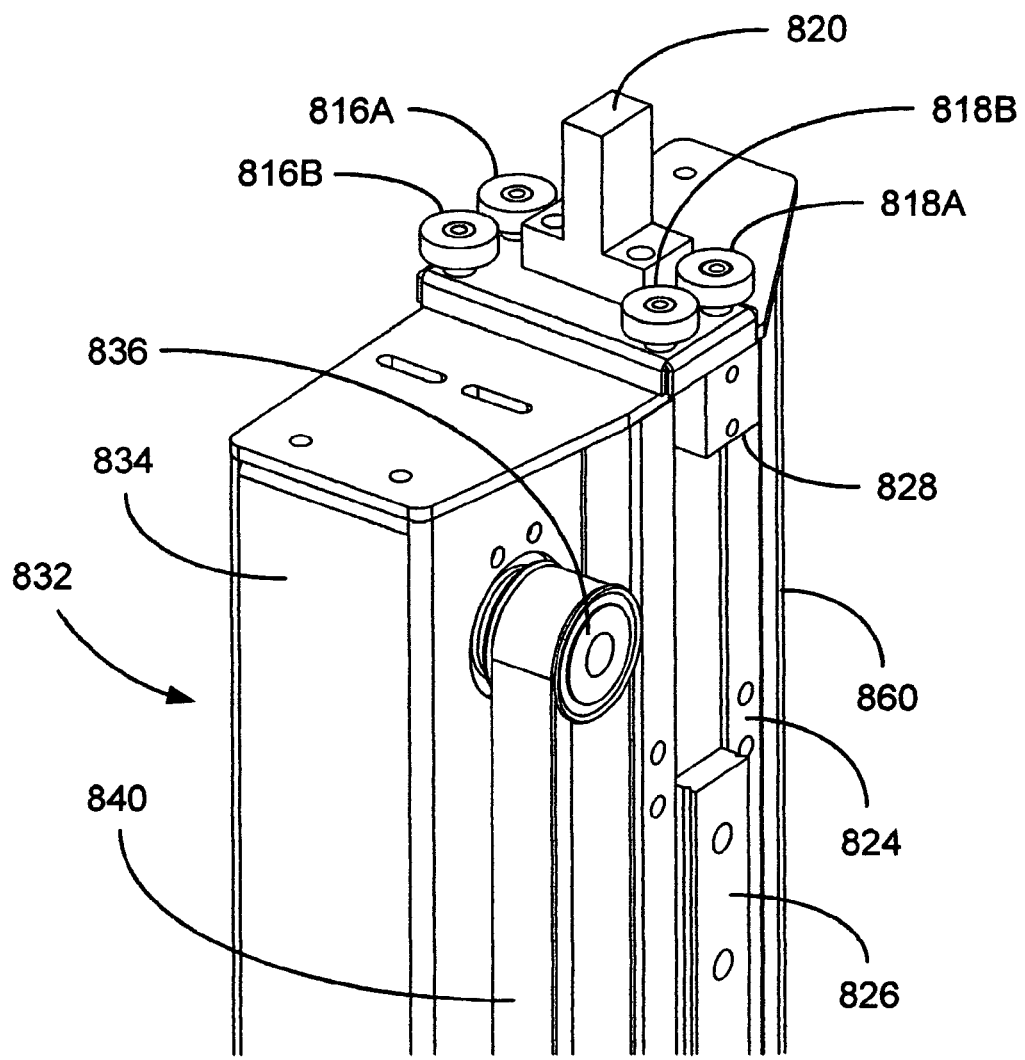
Figure 29E:
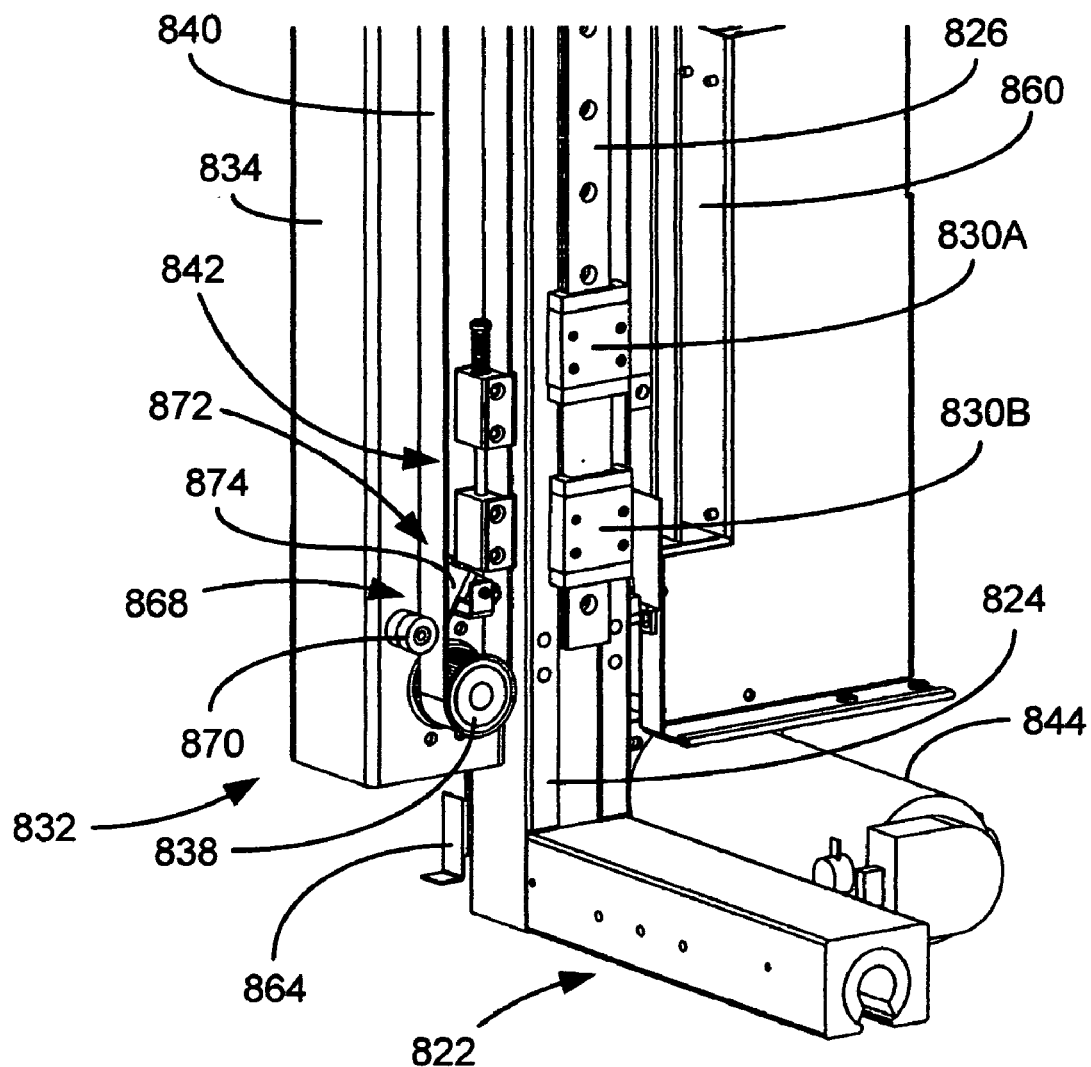
Figure 29F:
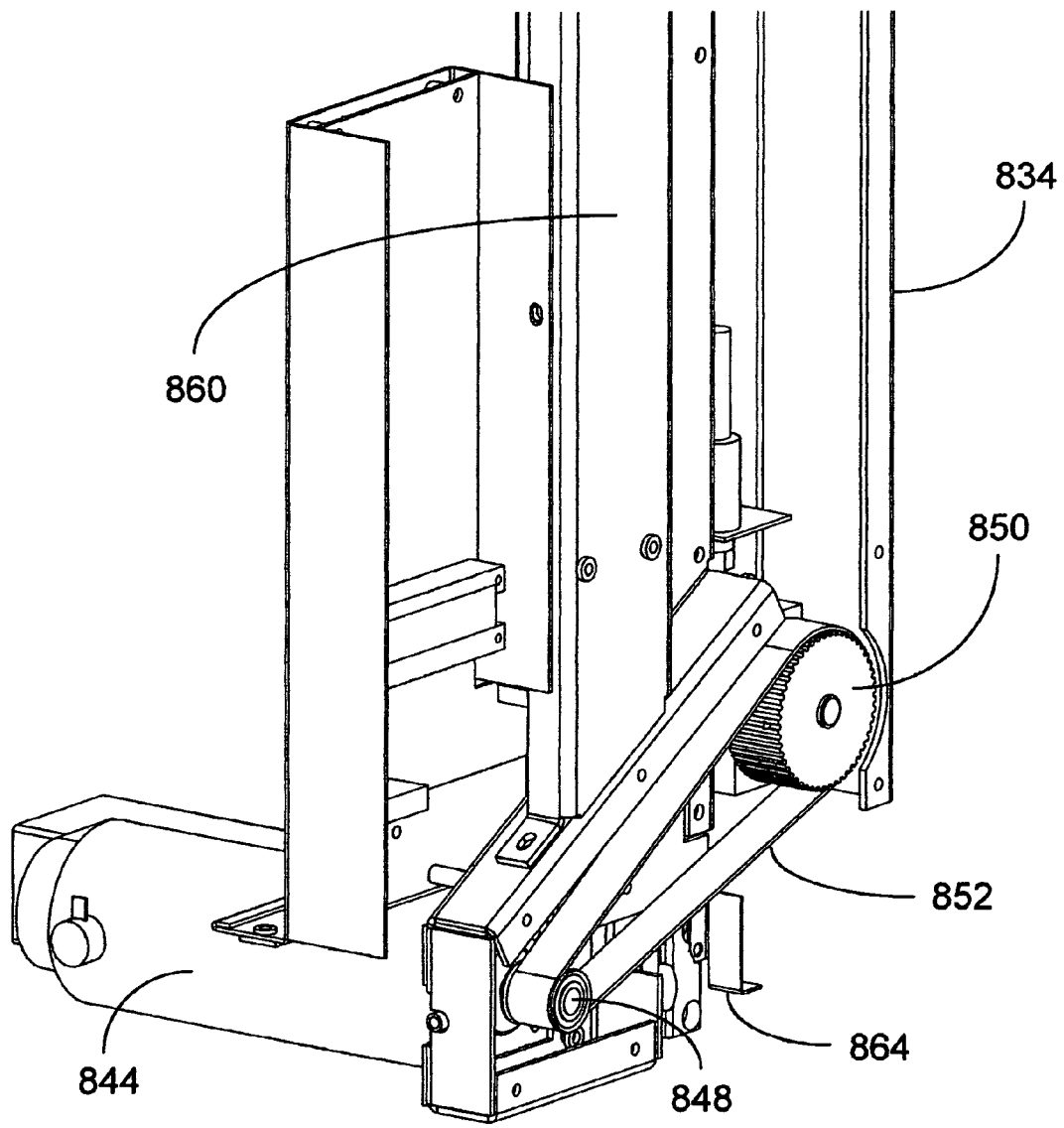

With reference to FIG. 29C, the bottom assembly 758B comprises a U-shaped channel 776 with a first side 778A, second side 778B and third side 778C. The first side 778A is operatively attached to the interior side of the bottom surface 340F of the frame 102 and supports a guide shaft 780 that receives a linear bearing 822 associated with the second end 756B of the vertical axis assembly 752. The guide shaft 780 is supported by a set of stand-offs 782 that are operatively connected to the first side 778A. The guide shaft 780 also comprises a pair of guide stops 784A, 784B that limit the horizontal extent over which the horizontal axis assembly 754 can move the vertical axis assembly 752. The first side 778A also supports a home position sensor 786 that detects when the vertical axis assembly 752 is positioned adjacent to the end of the guide shaft 780. The third side 778C supports a first pulley block 788A and associated pulley 788B. In addition, the third side 778C supports a second pulley block 790A and associated pulleys 790B, 790C. Extending between the pulley 788B and the pulley 790B is a belt 792. Associated with the belt 792 is a mount 794 for connecting the belt 792 to the second end 756B of the vertical axis assembly 752. The mount 794 also incorporates a structure that allows the tension of the belt 792 to be adjusted. The pulley 790C is associated with another belt 798 that is used to: (a) transmit the forces that are used to horizontally displace the first end 756A of the vertical axis assembly 752 via the belt 770 and mount 772; and (b) coordinate the operation of the top assembly 758A with the bottom assembly 758B.

With reference to FIGS. 29A–29C, the coordinating assembly 758C comprises the pulley 768C associated with the top assembly 758A, the pulley 790C associated with the bottom assembly 758, and a belt 798 that extends between the pulley 768C and the pulley 790C. As can be appreciated, the coordinating assembly 758C interfaces with the top assembly 758A and the bottom assembly 758B so that movements of the mount 772 associated with the top assembly 758A and the mount 794 associated with the bottom assembly 758C are mirrored. As a consequence, when the first and second ends 756A, 756B of the vertical axis assembly 752 are respectively attached to the mounts 772, 790 and a motive force is applied to the mounts 772, 790, the first and second ends 756A, 756B are displaced in the same manner. It should also be noted that the belt 798 is enclosed within a housing 800.

Also associated with the bottom assembly 758B are a DC electrical motor 802 and associated motor controller 804 that are used to provide the motive force for horizontally displacing the vertical axis assembly 752. To elaborate, any rotational force produced by the electrical motor 802 is transmitted by a motor drive pulley system 806 comprised of a pulley (not shown) that is connected to the electrical motor 802, a drive pulley 808, and a belt 810 extending between the pulleys 808 and (not shown). The drive pulley 808 resides on the same axle (not shown) that the pulley 790C and 790B reside. Consequently, rotation of the drive pulley 808 produces a corresponding rotation of the pulleys 790B, 790C. Rotation of the pulley 790B causes the mount 794 to be horizontally displaced. Similarly, rotation of the pulley 790C ultimately causes the mount 772 to be horizontally displaced in a manner that mirrors the horizontal displacement of the mount 794. The home position sensor 786 is used in conjunction with an encoder associated with the electrical motor 802 or other position sensor known in the art to determine the horizontal location of the vertical axis assembly 752.

With reference to FIGS. 29D–29H in conjunction with FIGS. 30A–30G, the vertical axis assembly 752 generally comprises: (a) structures that interface the vertical axis assembly 752 with the top and bottom assemblies 758A, 758B; (b) a rail structure that supports a carriage 882 that holds the magazine picker 880 and defines the vertical extent through which the carriage 882 and associated magazine picker 880 can be displaced; and (c) an actuation system that provides the motive force for vertically displacing the carriage 880 along the rail structure.

With the foregoing general description in mind, the vertical axis assembly 752 comprises a first pair of guide roller bearings 816A, 816B and a second pair of guide roller bearing 818A, 818B for interfacing the vertical axis assembly 752 with the top assembly 758A of the horizontal axis assembly 752. More specifically, the second side 762B of the U-shaped channel 760 associated with the top assembly 758A is received between the first pair of guide roller bearing 816A, 816B and between the second pair of guide roller bearings 816A, 816B to interface the vertical axis assembly 752 with the top assembly 758A of the horizontal axis assembly 752. A stop block 820 located adjacent to the roller bearings cooperates with the horizontal stops 764A, 764B of the top assembly 758A to limit the horizontal displacement of the vertical axis assembly 752. The vertical axis assembly 752 further comprises a linear bearing assembly 822 that receives the guide shaft 780 to interface the vertical axis assembly 752 to the bottom assembly 758B of the horizontal axis assembly 752.

The vertical axis assembly 752 further comprises a rail mount 824 that holds a linear rail 826 that can be displaced along the length of the rail mount 824. An upper rail stop 828 defines the upper limit along the rail mount 824 that the linear rail 826 can be displaced. The linear bearing assembly 822 defines the lower limit along the rail mount 824 that the linear rail 826 can be displaced. Associated with the linear rail 826 is a pair of carriage blocks 830A, 830B that provide an interface for a carriage bracket 854 that connects the linear rail 826 to the actuation system and to the carriage 882 that supports the magazine picker 880.

The vertical axis assembly 752 further comprises a pulley system 832 is used to vertically displace the linear rail 826 along the rail mount 826. The system 832 comprises a housing 834 that supports an upper pulley 836 and a lower pulley 838. Extending between the upper pulley 836 and the lower pulley 838 is a belt 840. Associated with the belt 840 is a mount 842 for connecting the belt 780 to the carriage bracket 854 that is, in turn, connected to the carriage blocks 830A, 830B associated with the linear rail 826. The mount 842 also comprises a structure for tensioning the belt 780.

The vertical axis assembly 752 further comprises a DC electric motor 844 and motor controller 846 for providing the motive force for moving the linear rail 826 along the rail mount 826. To elaborate, any rotation force produced by the DC electric motor 844 is transmitted to the lower pulley 838 of the pulley system 832 by another pulley system comprised of a motor pulley 848, a drive pulley 850 that is attached to the same axle as the lower pulley 838, and a belt 852 that extends between the motor pulley 848 and the drive pulley 850. Rotation of the lower pulley 838, in turn, causes the linear rail 826 to be displaced along the rail mount 826.

Figure 29G:
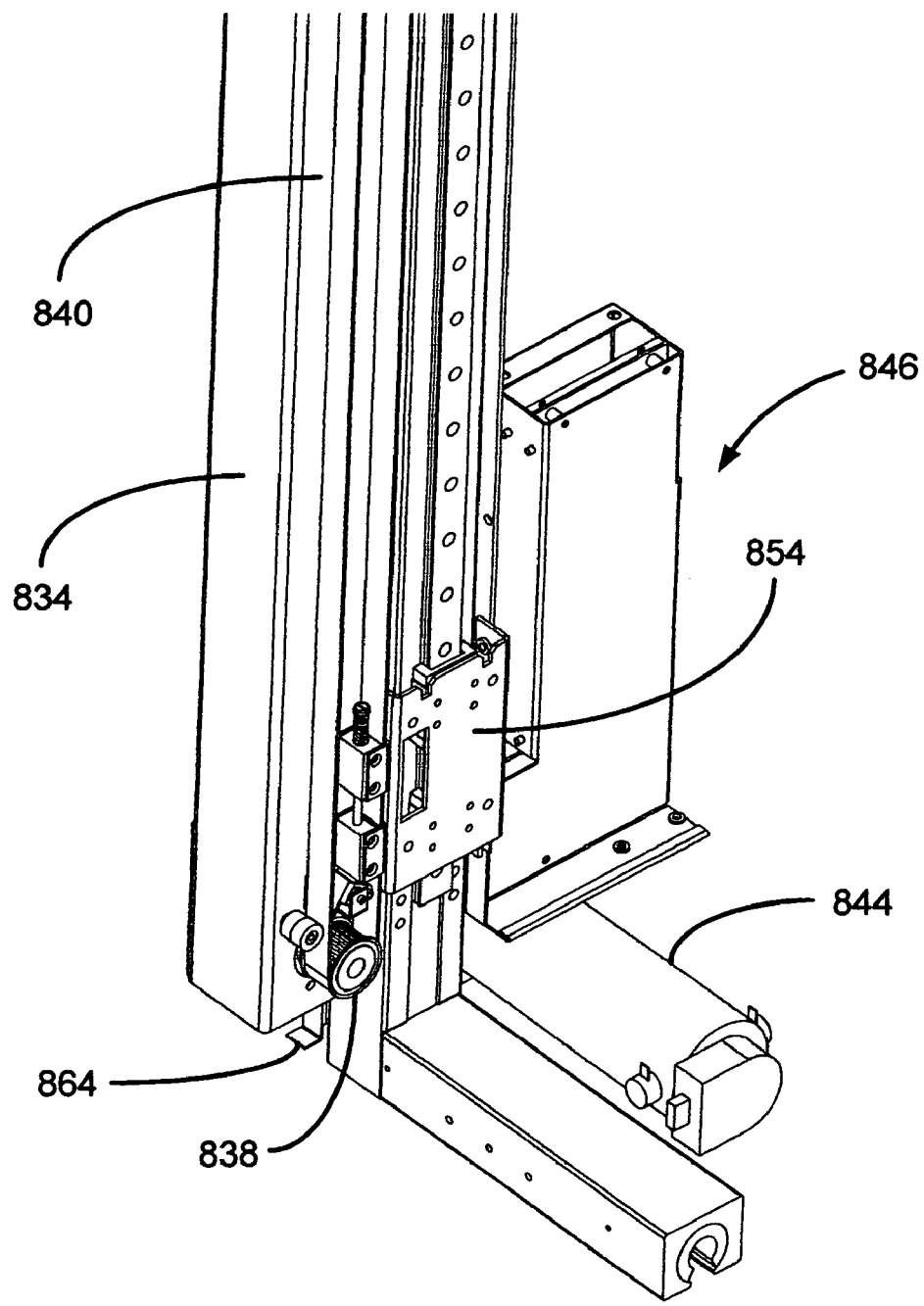
Figure 29H:
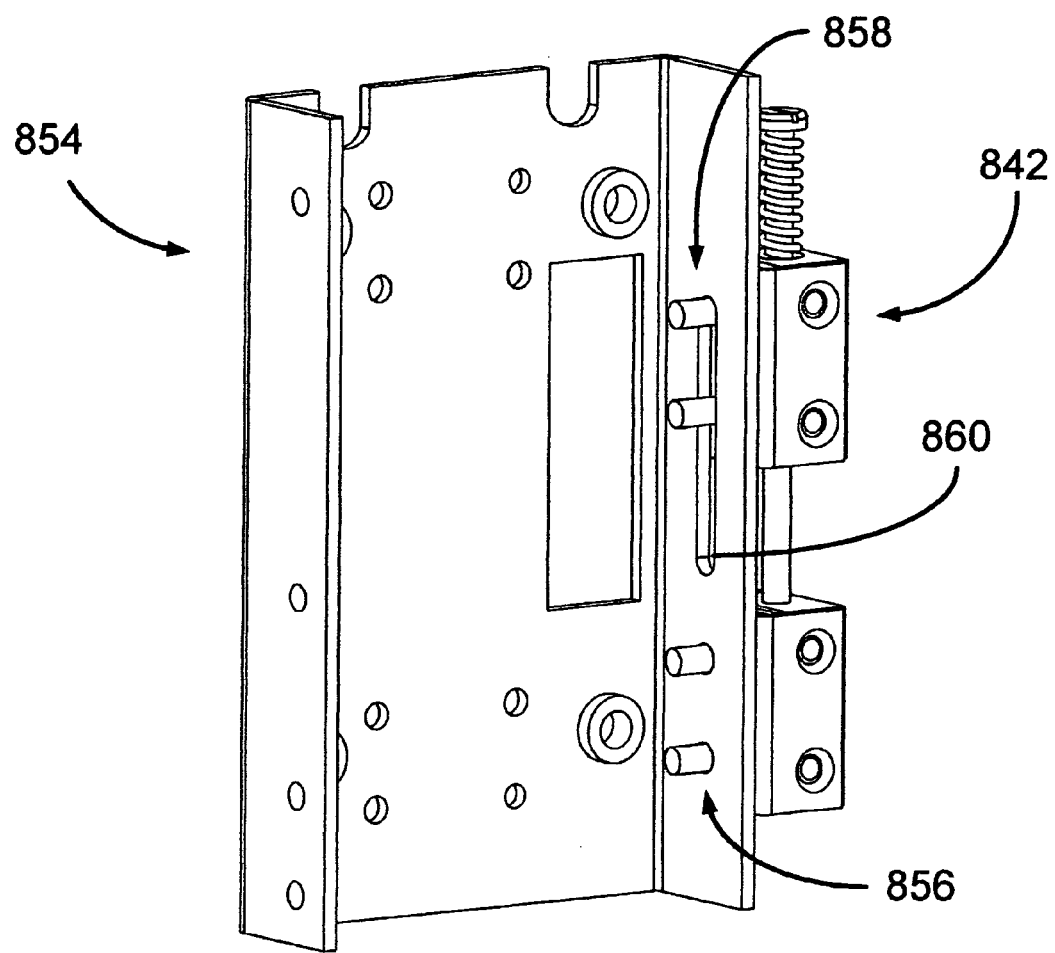

With reference to FIGS. 29G–29H, the vertical axis assembly 752 further comprises a carriage bracket 854 that is used to: (a) mechanically connect the linear rail 826 and the belt 840; and (b) mechanically connects the linear-rail 826 to a carriage 882 that supports the magazine picker 880. To elaborate, the carriage bracket 854 is connected to the linear rail 826 by screws (not shown) that pass through holes in the carriage bracket 854 and engage threaded holes in the carriage blocks 830A, 830B, which are fixedly attached to the linear rail 826. The carriage bracket 854 is connected to the belt 840 by: (a) a first pair of pins 856 that are associated with the mount 842 and pass through a pair of holes associated with the bracket 854; and (b) a second pair of pins 858 that are associated with the mount 842 and pass through a single slot 860 associated with the bracket 854. The slot 860 allows the second pair of pins 858 to move when the tensioning device associated with the mount 842 is actuated and still maintain a connection with the bracket 854.

The vertical axis assembly 752 also comprises a channel guide 860 that holds a flex cable that is used to transmit signals between the control system 218 and magazine picker 880 (as well as any other elements associated with the magazine picker 880) as the magazine picker 880 is vertically displaced.

Further comprising the vertical axis assembly 752 is a flag 864 that interacts with the home position sensor 786 to indicate when the vertical axis assembly 752 is located adjacent to the end of the guide shaft 780. To elaborate, the flag 864 interrupts an optical signal output by the home position sensor 786 to indicate when the vertical axis assembly is located adjacent to the end of the guide shaft 780. Other sensing schemes are feasible.

The vertical axis assembly 752 further comprises a brake mechanism 868 that operates to engage the belt 840 during a loss of power and thereby prevent the magazine picker 880 from dropping to the bottom of the library 202 and potentially being damaged or damaging other components of the library 202. The brake mechanism 868 comprises a roller 870 and a solenoid actuated brake assembly 872 that includes a brake shoe 874. The brake mechanism 868 operates so that when power is removed from the library 202, the solenoid actuated brake assembly 872 causes the brake shoe 874 to move so that the belt 840 is pinched between the brake shoe 874 and the roller 870, thereby preventing further movement of the belt 840. Conversely, when power is being applied to the library 202, the solenoid actuated brake mechanism 872 operates to hold the brake shoe 874 away from the belt 840 so that the belt 840 can be moved as needed for the operation of the library 202.

The vertical location of the carriage 882 or related elements is provided using an encoder associated with the DC motor 844 or other position sensors known in the art.

It should be appreciated that the elevating function within the library 202 and other magazine-based data cartridge libraries can be accomplished with a number of different elevator designs. For example, a counter-weight elevator is feasible.

With reference to FIGS. 30A–30G, the magazine transport 212 comprises a magazine picker 880 for moving a magazine 270 towards and away from a magazine storage location, such as a shelf in the shelf system 208, once the picker 880 has been positioned adjacent to the storage location by the elevator 750. Generally, the magazine picker 880 comprises: (a) a magazine support 884 for supporting a magazine 270 during movement of the magazine 270 towards and away from a storage location in the library 202; and (b) a magazine transport device 212 for moving a magazine 270 between the magazine support 884 and a storage location in the library 202.

Figure 30A:
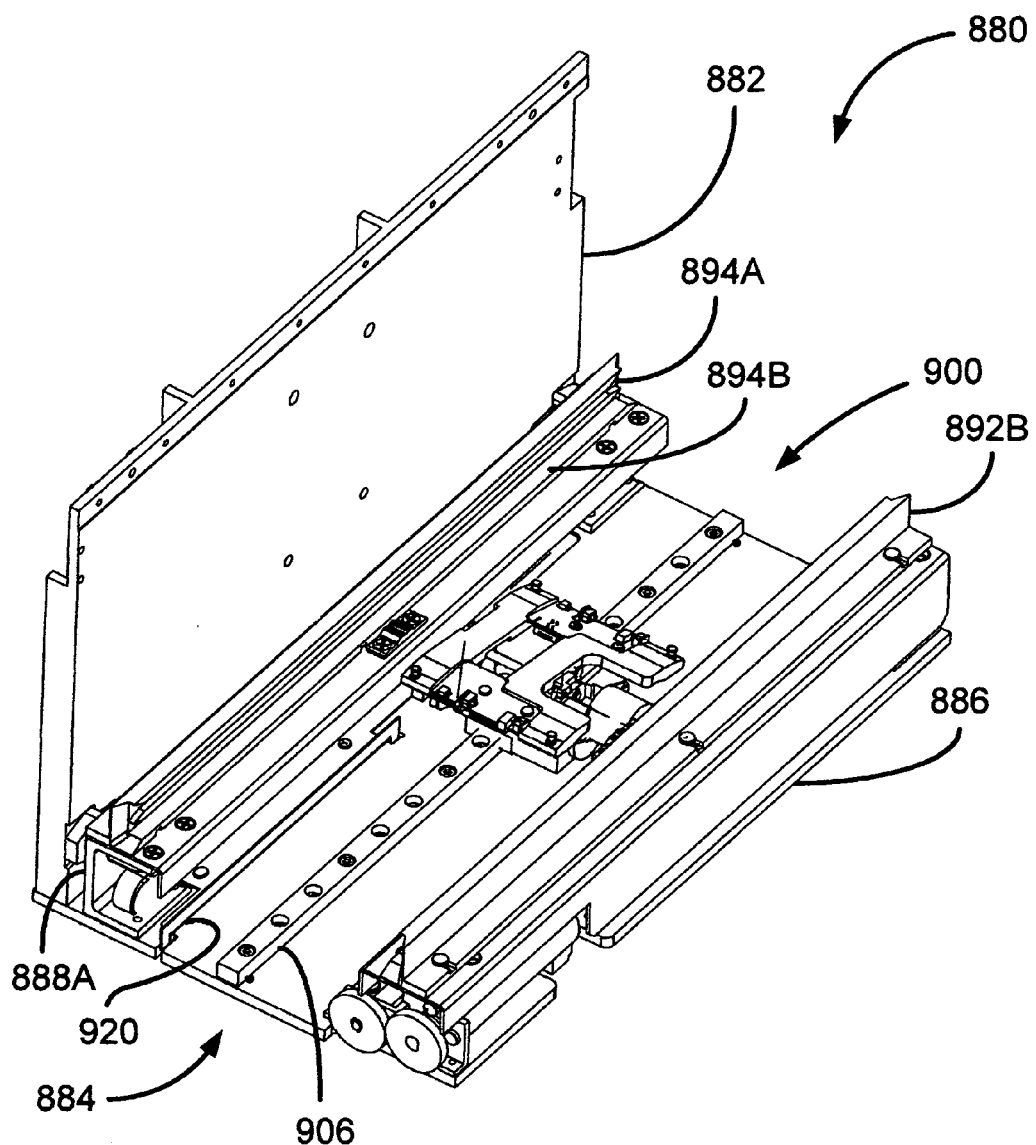
Figure 30B:
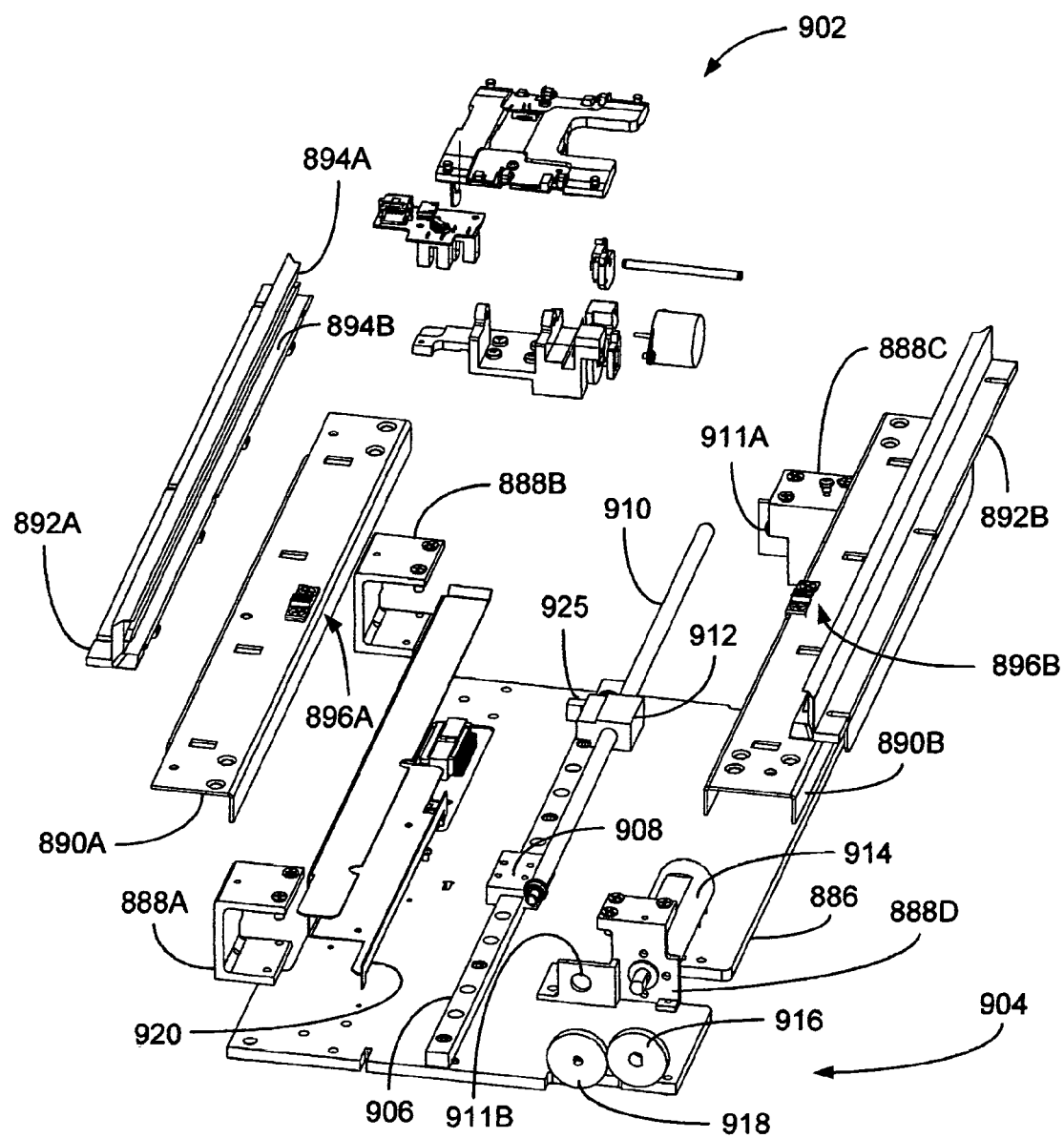
Figure 30C:
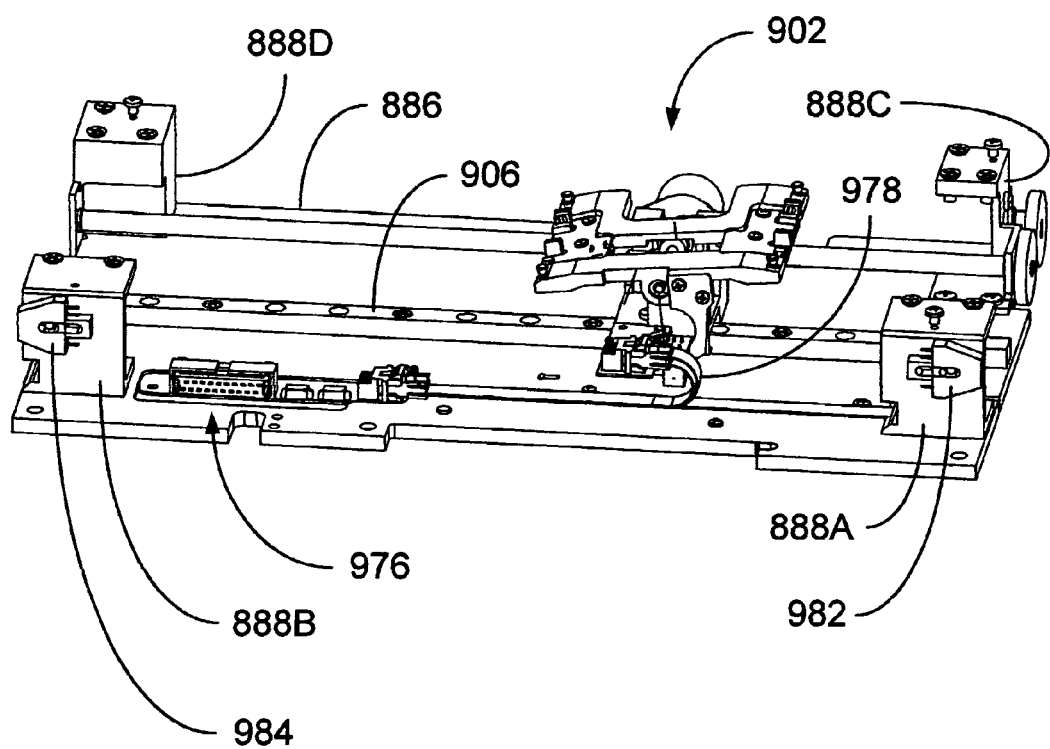
Figure 30D:
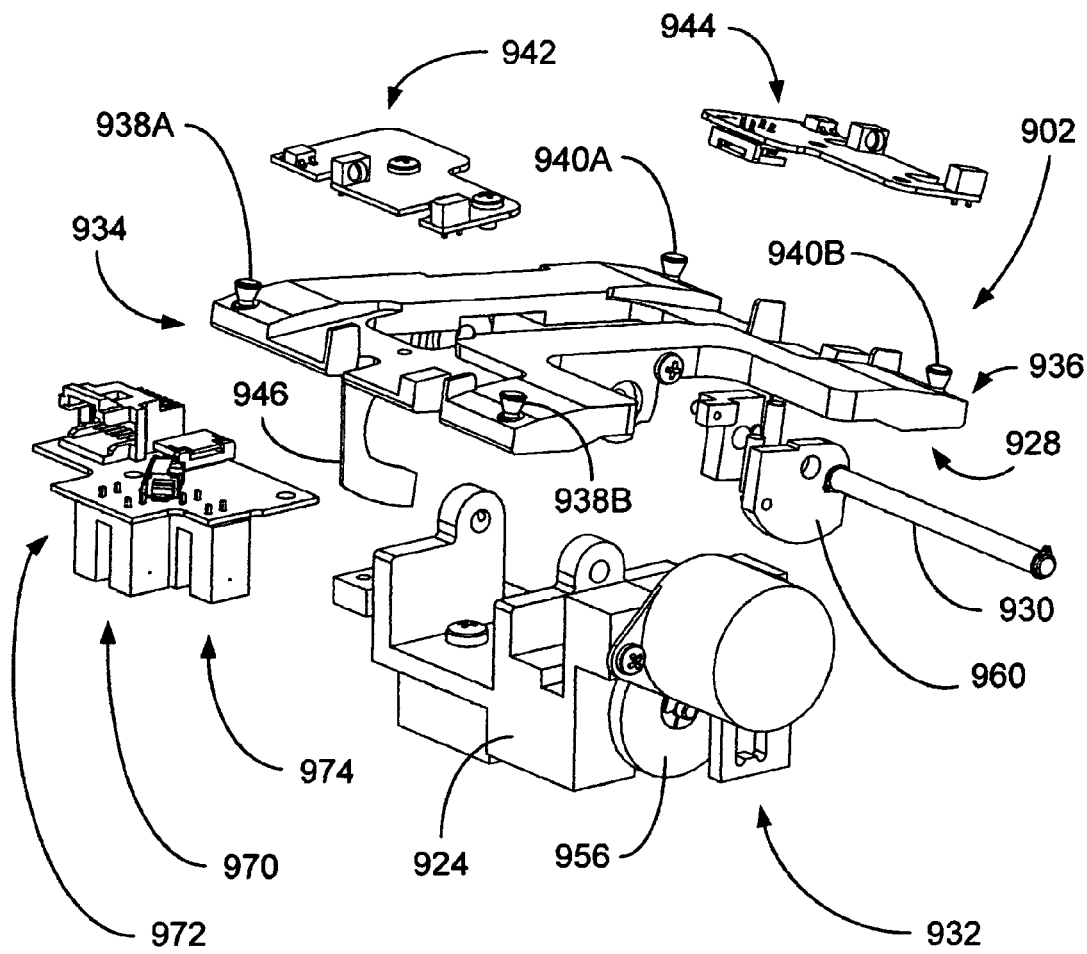
Figure 30E:
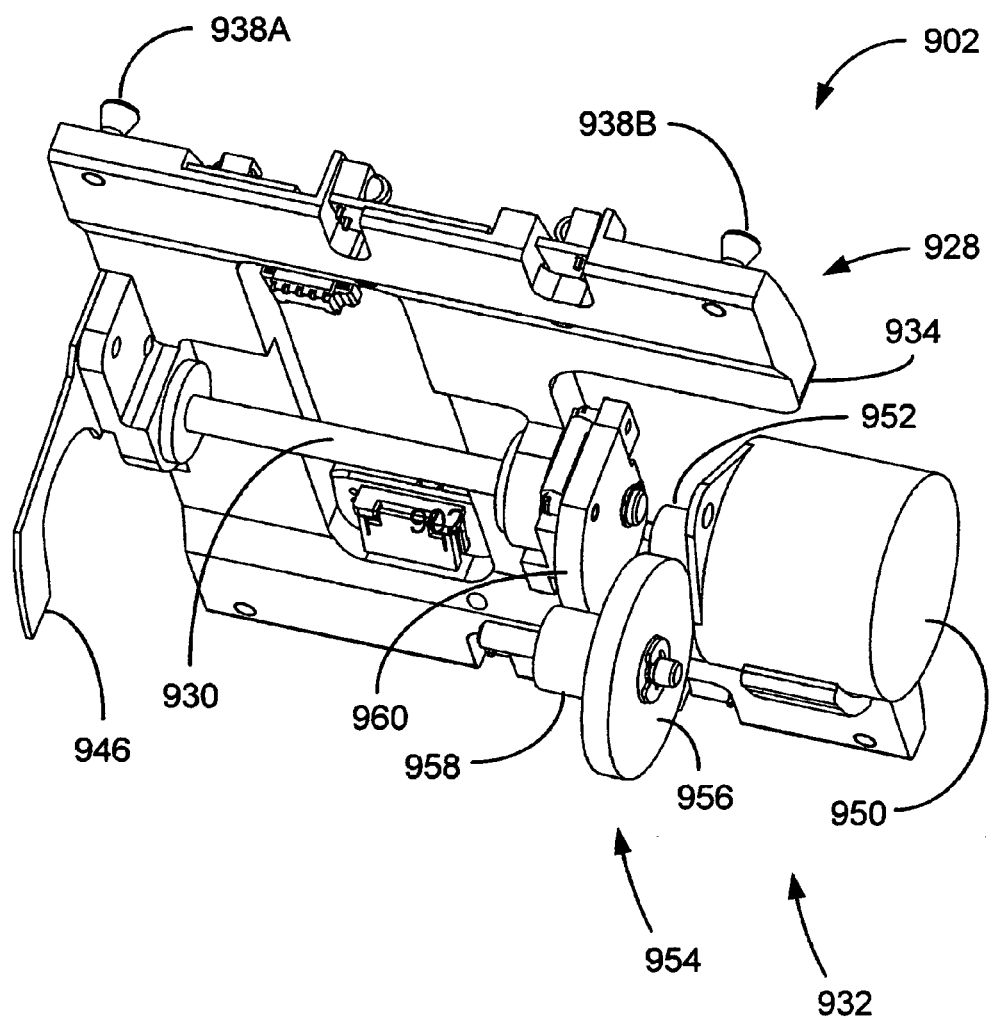
Figure 30F:
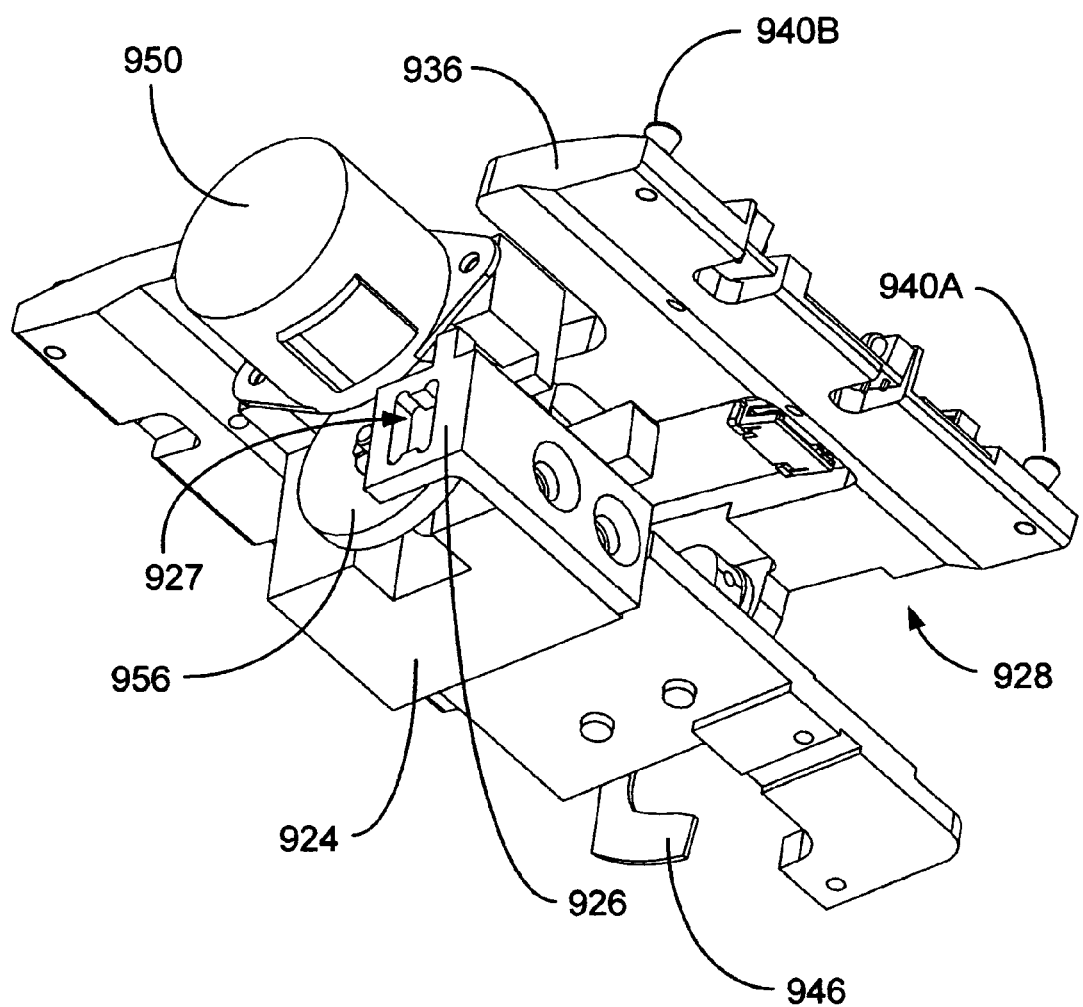
Figure 30G:
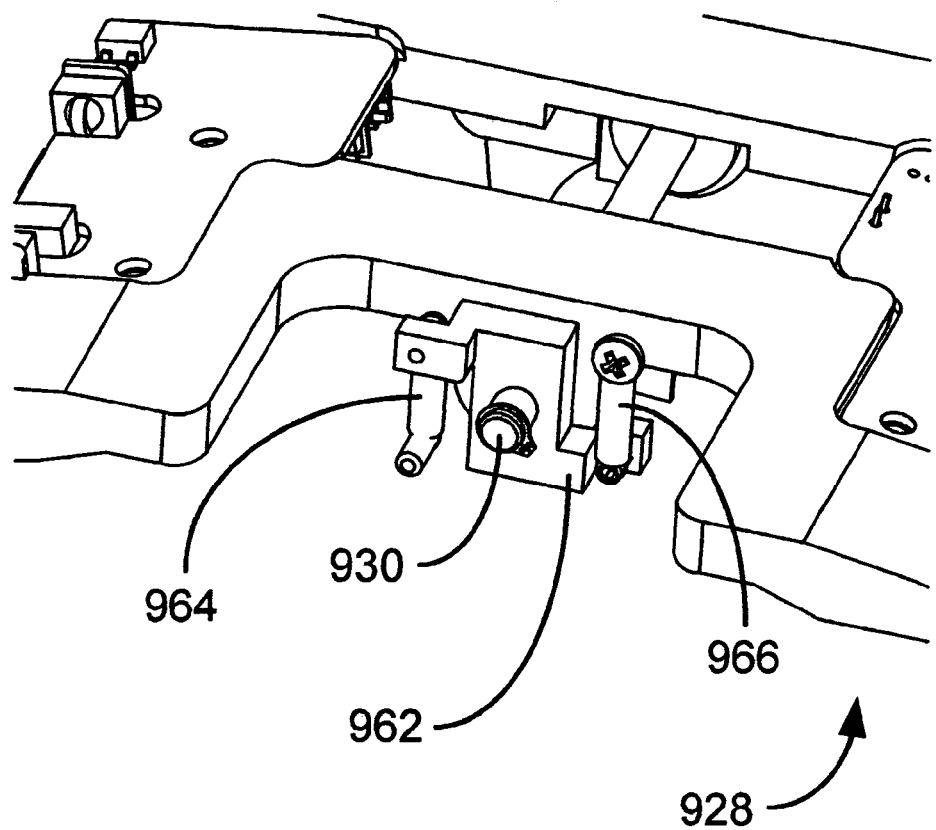

Before describing the magazine picker 880, the structure for attaching the magazine picker 880 to the vertical axis assembly 752 is described. With reference to FIG. 30A, the magazine picker 880 is operatively connected to a carriage 882 that is, in turn, connected to the carriage bracket 854 associated with the vertical axis assembly 752.

The magazine picker 880 comprises a support structure 884 for supporting a magazine 270 during transport of the magazine 270 towards and away from a storage location in the library 202. The support structure 884 comprises: (a) a base plate 886; (b) four brackets 888A, 888B, 888C and 888D mounted to the base plate 886; (c) a pair of rail mounting plates 890A, 890B, with the rail mounting plate 890A supported by the brackets 888A, 888B and the rail mounting plate 890B supported by the brackets 888C, 888D; (d) a pair of rails 892A, 892B, with the rail 892A being attached to the rail mounting bracket 890A, and the rail 892B attached to the rail mounting bracket 890B. Each of the rails 892A, 892B comprises two grooves 894A, 894B, one for accommodating rail 292A of a magazine 270 and one for accommodating rail 292B of a magazine 270. In library 202, the shelf system 208 is configured so that all of the magazines 270 stored in the library 202 have the same orientation. Consequently, only one of the grooves 894A, 894B associated with each of the 892A, 892B is utilized. For example, groove 894A of rail 892A may be used to accommodate rail 292A of a magazine 270, and groove 894B of the rail 892A would not be utilized. Continuing with the example, groove 894B of rail 892B would accommodate rail 292B of a magazine 270, and groove 894A of the rail 892B would not be utilized. The rail mounting plates 890A, 890B and the rails 892A, 892B form a guide during movements of a magazine 270 to and from a storage location and a support for a magazine 270 during transport of a magazine 270 and during movements of a magazine 270 to and from a storage location. Receptacles 896A, 896B are respectively associated with the rail mounting plates 890A, 890B and engage the detents 296A, 296B located on the bottom side 278 of a magazine 270 to inhibit undesired movement of a magazine 270, especially during transportation of a magazine 270 from one storage location to another storage location.

The magazine transport 212 comprises a magazine transport device 900 for moving a magazine 270 between the support formed by the rail mounting plates 890A, 890B and the rails 892A, 892B and a storage location in the library 202. The magazine transport device 900 comprises: (a) a magazine engagement device 902 that is capable of selectively engaging a magazine 270 and disengaging from a magazine 270; and (b) a displacement device 904 for moving the magazine engagement device 902.

The displacement device 904 comprises: (a) a linear rail 906; (b) a bearing block 908 that is mounted to the linear rail 906, capable of moving along the linear rail 906, and supports the magazine engagement device 902; (c) a lead screw 910 that is supported by bearings 911A, 911B associated with the brackets 888C, 888D; (d) a lead screw nut 912 for applying a motive force to the magazine engagement device 902 to move the device 902 to a desired location along the linear rail 906, (e) a DC motor 914 that is supported by the bracket 888C and provides the rotational motive force that causes the lead screw nut 912 to move along the lead screw 910; (f) a first gear 916 and a second gear 918 that are used to transfer the rotational force produced by the DC motor 914 to the lead screw 910, and (g) a center position flag 920 that cooperates with a detector that is associated with the magazine engagement device 902 to indicate when the displacement device 904 has positioned the magazine engagement device 902 over the center of the linear rail 906.

As can be appreciated, when the magazine engagement device 902 is attached to the bearing block 908 and the lead screw nut 912 engages the magazine engagement device 902, the production of a rotational force by the DC motor 914 causes the lead screw nut 912 to move along the lead screw 910 and, as a consequence, the magazine engagement device 902 to move along the linear rail 906. The location of the magazine engagement device 902 is determined using an encoder associated with the motor 914 or other position sensing device known in the art.

Generally, the magazine engagement device 902 operates so as to "hook" a magazine 270 by rotating a toggle plate 928 with pins 938A, 938B that are located so as to pass through one of the pair of engagement holes 298A, 298B associated with a magazine 270. Disengagement or "unhooking" of the magazine 270 is accomplished by counter-rotating the toggle plate 928.

With the foregoing general description in mind, the magazine engagement device 902 comprises a toggle base 924 that is mounted to the bearing block 908 and a drive block 926 with a hole 927 for receiving a post 925 associated with the lead screw nut 912. The magazine engagement device 902 further comprises: (a) a toggle plate 928 that is pivotally mounted to the toggle base 924 with a toggle axle 930; and (b) a toggle actuator system 932 for rotating the toggle plate 928 so as to engage a magazine 270 and disengage from a magazine 270. The toggle plate 928 has a first end 934 and a second end 936 with the axis of rotation for the toggle plate 928 located between the first and second ends 934, 936. Associated with the first end 934 is a first pair of engagement pins 938A, 938B for passing through a pair of engagement holes 298A, 298B associated with a magazine 270. Likewise, a second pair of engagement pins 940A, 940B are associated with the second end 936 and also serve to engage a magazine 270 via a pair of engagement holes 298A, 298B associated with the magazine 270. Also associated with the first end 934 is a first sensor assembly 942 that operates to detect the engagement flag structure 300 associated with a pair of engagement holes 298A, 298B. To elaborate, when the engagement pins 938A, 938B pass through the engagement holes 298A, 298B of a magazine 270 (i.e., when a magazine 270 has been "hooked"), the sensor 942 detects the engagement flag structure 300, thereby confirming that the magazine 270 has been captured. A second sensor assembly 944 is associated with the second end 936 of the toggle plate 928 and operates in substantially the same manner as the first sensor assembly 942. In an alternative embodiment, an optical sensor system is used to detect the presence or absence of the exterior of the bottom side 278 of the magazine 270 to determine whether or not a magazine 270 has been engaged. The optical sensor system comprises a beam producing element and a reflected beam detecting element. If the magazine 270 has been engaged, the beam produced by the beam producing element is reflected by the exterior of the bottom side 278 of the magazine 270 and detected by the detecting element. If the magazine 270 has not been engaged, the beam produced by the beam producing element is not detected by the detecting element. One optical sensing system is associated with each of the first end 934 and second end 936 of the toggle plate 928. Also associated with the toggle plate 928 is a rotational position flag 946 that is used with a detector to indicate the rotational position of the toggle plate 928.

The toggle actuator system 932 comprises: (a) a stepper motor 950 that is attached to the toggle base 924; (b) a pinion 952 that is attached to the spindle of the motor 950; (c) a cluster gear 954 that is attached to attached to the toggle base 924 and has a first gear 956 that engages the pinion 952 and a second gear 958; (d) a driven gear 960 that engages the second gear 958, (e) an overdrive arm 962, (f) a first spring assembly 964 for connecting the driven gear 960 and the overdrive arm 962; and (g) a second spring assembly 966 for connecting the overdrive arm 962 and the toggle plate 928. In normal operation, the stepper motor 950 produces a rotation force for rotating one of the first and second ends 934, 936 into position to engage a magazine 270. The rotation force is transmitted to the toggle plate 928 by the pinion 952, cluster gear 954, driven gear 960, first spring assembly 964, overdrive arm 962 and the second spring assembly 964. If, however, the rotation of the toggle plate 928 is inhibited such that the toggle plate 928 cannot reach the desired rotational position, one of the spring assemblies 964 or 966 comes into play to allow the toggle plate 928 to cease rotating before the desired rotational position is reached. By allowing the toggle plate 928 to cease rotating damage to the motor 950 and engagement pins 940A, 940B is avoided, as well as damage to whatever is inhibiting the rotation of the toggle plate 928. For example, if the stepper motor 950 is applying a force to produce a clockwise rotation of the toggle plate 928, as viewed from the stepper motor side of the engagement device 902, and an obstruction is causing a counter-clockwise force to be applied to the toggle plate 928, the second spring assembly 966 elongates to permit the toggle plate 928 to cease rotating. When the obstruction is no longer present, the energy stored in the elongated spring assembly 966 causes the toggle plate 928 to rotate to the desired position. The first spring assembly 964 operates in a similar fashion when an obstruction prevents rotation of the toggle plate 928 in the counter-clockwise direction.

Also attached to the toggle base 924 is a sensor block 970 that includes: (a) a first sensor assembly 972 for cooperating with the center position flag 920 to provide an indication as to when the rotational axis of the toggle plate 928 is positioned over the center of the linear rail 906; and (b) a second sensor assembly 974 for cooperating with the rotational position flag 946 to provide a signal indicative of the rotational position of the toggle plate 928. The electrical signals produced at the sensor block 970 are conveyed to a plug 976 by a flex cable 978. The plug 976 extends through the carriage 882 and receives a plug (not shown) that is connected to a controller located on the opposite side of the carriage 882 from the magazine picker 880.

A first detector 982 is attached to bracket 888A and is used to detect, on one side of the magazine picker 880, the end surface 532 of a cleat associated with a shelf storage location for a magazine 270 and the reference flag 632 associated with a sled, such as sled 548A, in a drive bay assembly 540 located on the one side of the magazine picker 880. A second detector 984 is attached to the bracket 888B and serves the same purpose as the first detector 982 but with respect to any cleats and/or reference flags located on the other side of the magazine picker 880.

With reference to FIGS. 31A–31L, the operation of the magazine picker 880 is described with respect to the moving of a magazine 270 from a first shelf 990 that is associated with the two columns of shelving 528B to a second shelf 992 that is associated with the five columns of shelving 528A is described. For clarity, the only elements of the magazine picker 880 that are substantively shown in the noted figures are the base plate 886, rail mounting plate 890A, rail 892A, and the magazine engagement device 902. Associated with the first shelf 990 is a cleat 994 that is functionally equivalent to the cleat 522A that was previously discussed. Likewise, a cleat 996 is associated with the second shelf 992. The magazine 270 is shown in cross-section so that the interaction of the magazine engagement device 902 with the engagement holes 298A, 298B of the magazine 270 can be seen.

Figure 31A:
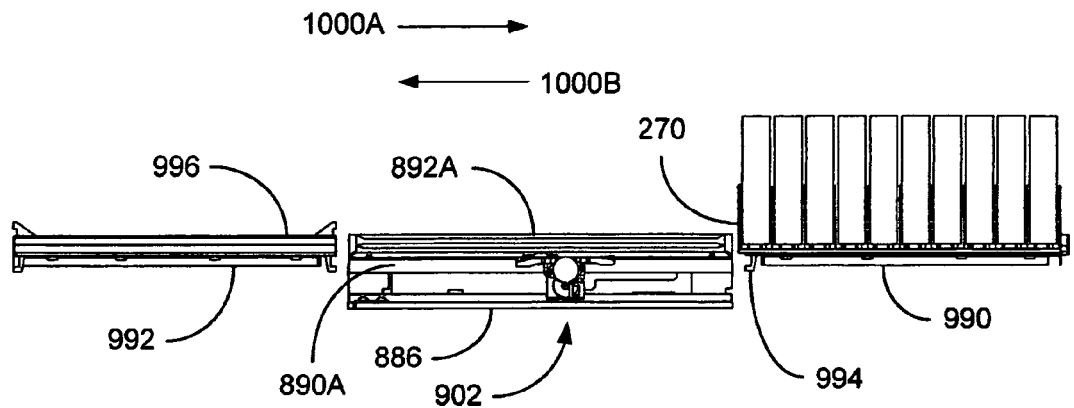
Figure 31B:
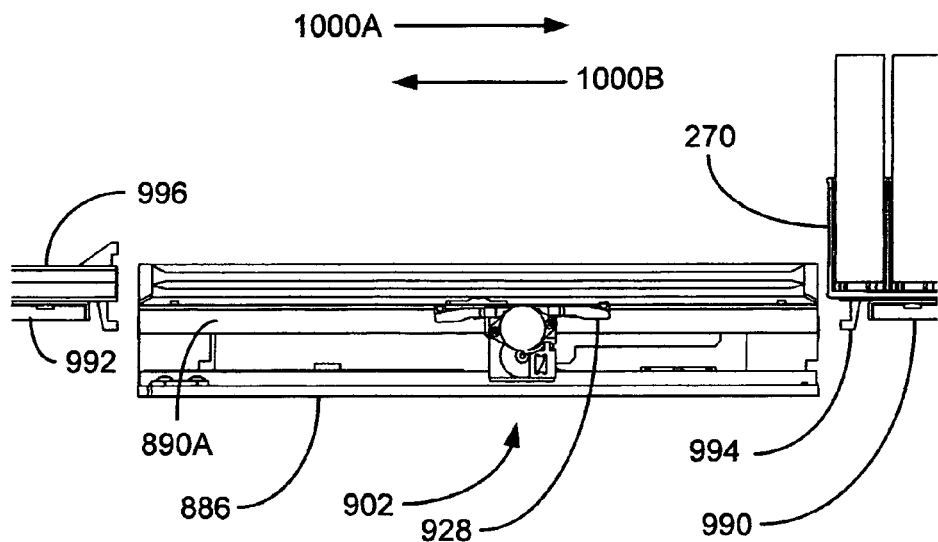

FIGS. 31A–31B illustrate a preferred idle state for the magazine picker 880, namely, with the rotational axis of the toggle plate 928 of the magazine engagement device 902 disposed over the center of the linear rail 906 and the toggle plate 928 in a neutral position. Before describing the movement of the magazine 270, it should be appreciated that the elevator 750 has been used to position the magazine picker 880 adjacent to the first shelf 990. In this regard, the detector 984 has been used to produce a signal that is used to cause the elevator 750 to position the magazine picker 880 so that the magazine picker 880 can remove the magazine 270 from the first shelf 990.

Figure 31C:
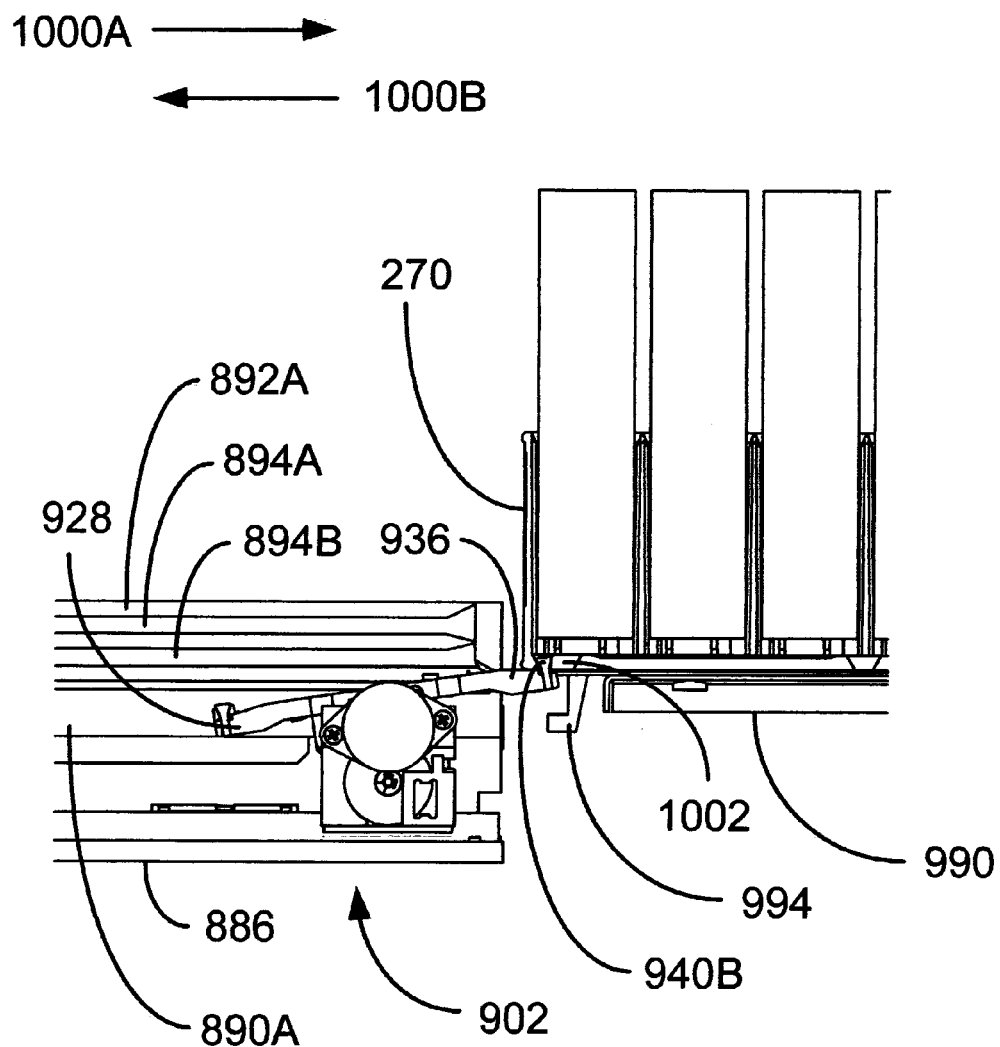

With reference to FIG. 31C, movement of the magazine 270 commences with the magazine displacement device 904 moving the magazine engagement device 902 from the idle state location illustrated in FIGS. 31A–31B and in direction 1000A to a location sufficiently adjacent to the magazine 270 for the magazine engagement device 902 to engage the magazine 270. Engagement of the magazine 270 by the magazine engagement device 902 is accomplished by rotating the toggle plate 928 such that the engagement pins 940A, 940B associated with the second end 936 of the toggle plate 928 can pass through first engagement holes 1002 (e.g., engagement holes 298A, 298B) of the magazine 270 to engage the magazine 270. The engagement of the magazine 270 is confirmed by the interaction of the second sensor assembly 944 with the engagement flag structure (e.g., engagement flag structure 300) of the magazine 270. Alternatively, the optical sensor system that detects a signal reflected by the exterior of the bottom side 278 of the magazine 270 is used to confirm the engagement.

Figure 31D:
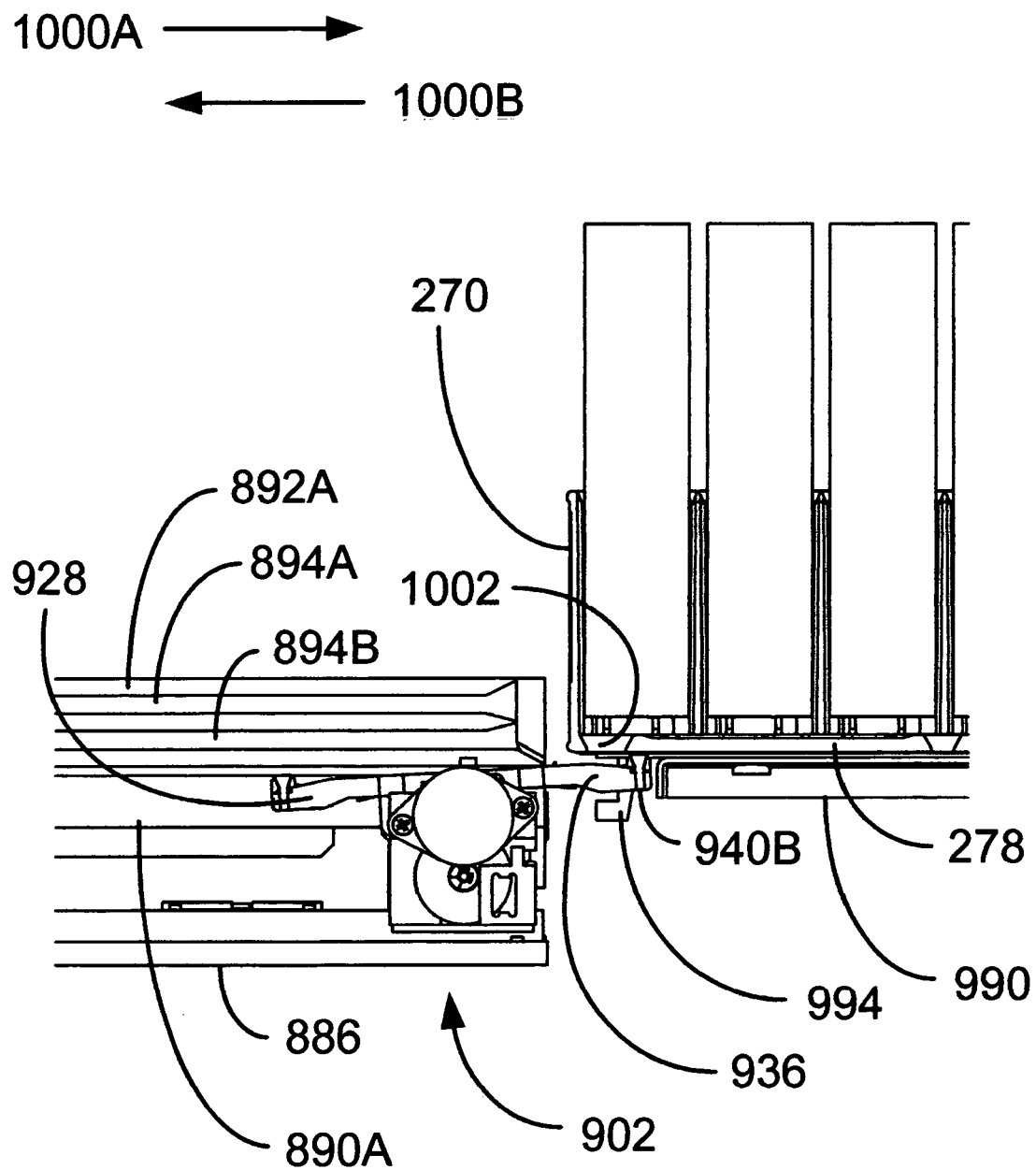

FIG. 31D illustrates an "over travel" condition that may occur in the course of using the magazine engagement device 902 to engage the magazine 270 as shown in FIG. 31C. In an "over travel" situation, the magazine displacement device 904 has moved the magazine engagement device 902 in the direction that is opposite to the direction in which the magazine 270 is to be moved and has moved the magazine engagement device 902 so far in this direction that the magazine engagement device 902 cannot engage the magazine 270. In the illustrated case, the magazine displacement device 904 has moved the magazine engagement device 902 too far in the direction 1000A for the magazine engagement device 902 to engage the magazine 270. As a consequence, when the toggle plate 928 is rotated, the engagement pins 940A, 940B contact the bottom surface 278 of the magazine 933, rather than pass through the engagement holes 1002. In this situation, the spring assembly 964 allows the toggle plate 928 to cease rotating, thereby preventing potential damage to at least the stepper motor 950 and the magazine 270.

In one embodiment of the present invention, the "over travel operation" can have the desired effect of the engagement device 902 engaging the magazine 270 in a first attempt. In an over travel operation, the magazine displacement device 904 purposely moves the magazine engagement device 902 in a direction 1000A that is opposite to the direction 1000B in which the magazine 270 is to be moved and moves the magazine engagement device 902 so far in this direction 1000A that the engagement pins 940A, 940B of the magazine engagement device 902 cannot engage the magazine 270 and instead, upon rotation of the toggle plate 928, contact the bottom surface 278 of the magazine 270. When the engagement pins 940A, 940B of the toggle plate 928 contact the bottom surface 278 of the magazine 270, one of the spring assemblies 964A, 964B allows the toggle plate 928 to cease rotating. Subsequently, when the magazine displacement device 904 moves the magazine engagement device 902 in the direction that the magazine 270 is to be moved and the engagement pins 940A, 940B reach the engagement holes 1002 of the magazine 270, the energy stored in one of the spring assemblies 964A, 964B causes the toggle plate 928 to rotate and the engagement pins 940A, 940B to enter the engagement holes 1002 of the magazine 270 and thereby positively engage the magazine 270 on the first try.

To illustrate the use of the over travel operation, assume the magazine 270 is positioned further in the direction 1000B than is illustrate in FIG. 31C. In such a situation, the magazine engagement device 902 may not be able to engage the magazine 270 if the magazine engagement device 902 is operated in a manner that assumes that the engagement holes 1002 are in the location illustrated in FIG. 31C. If the magazine 270 is not engaged or cannot be engaged with the magazine engagement device 902 in this position, the magazine engagement device 902 will have to be repositioned and the engagement operation repeated. Altenatively, should an over travel operation be performed so that the magazine engagement device 902 is positioned further in direction 1000A than is shown in FIG. 31C, the magazine engagement device 902 can then contact the bottom side 278 of the magazine 270 as shown in FIG. 31D. Once the magazine 270 is contacted in this manner, movement of the magazine engagement device 902 in direction 1000B (which is the direction in which the magazine 270 is to be moved anyway) and the operation of the first spring assembly 964 will cause the engagement pins 940A, 940B to pass through the first engagement holes 1002 of the magazine 270, thereby engaging the magazine 270.

Figure 31E:
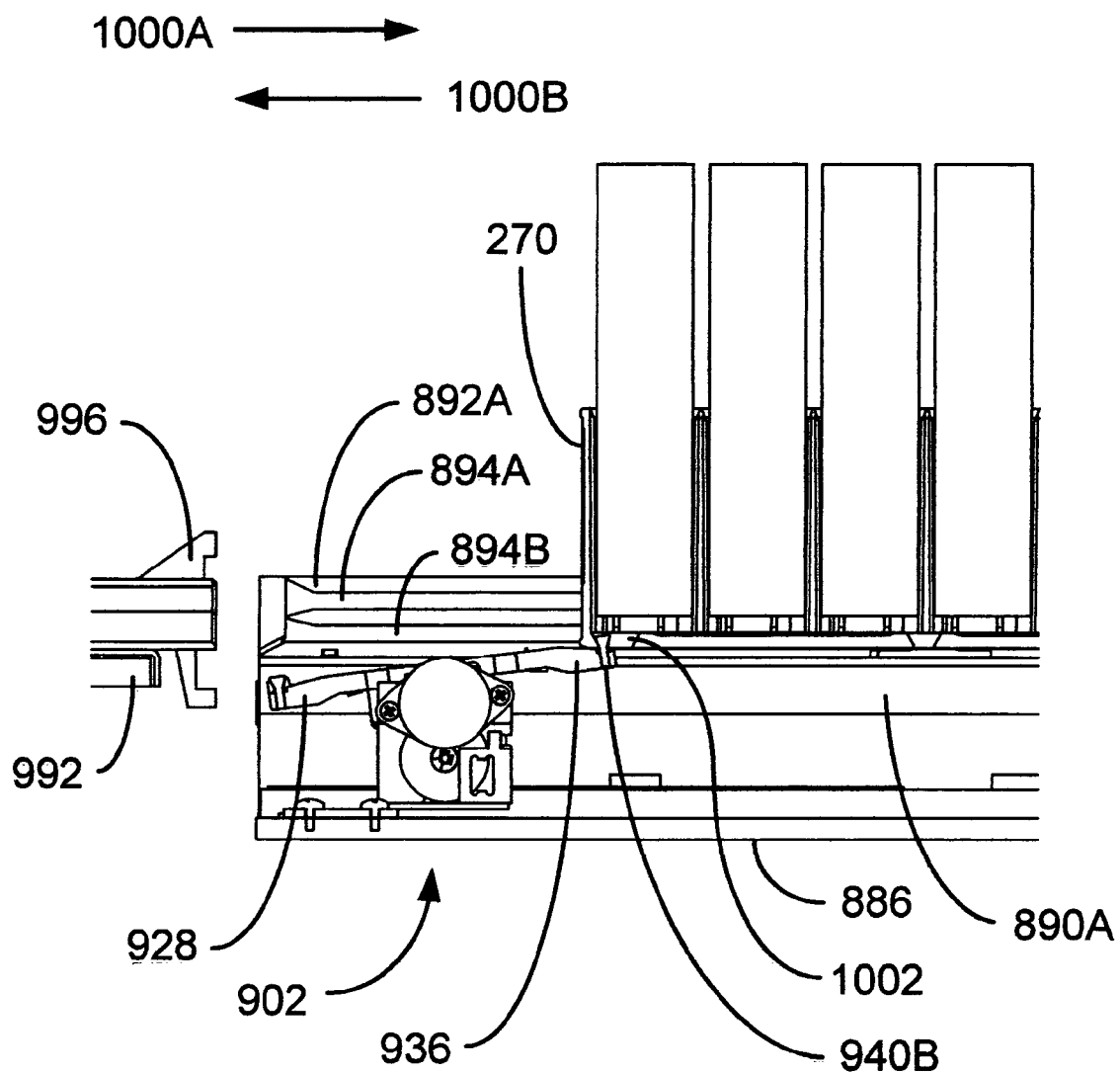

With reference to FIG. 31E, once the magazine 270 has been engaged, the magazine displacement device 904 is used to pull the magazine engagement device 902 and the engaged magazine 270 in direction 1000B and onto the support formed by the rail mounting plates 890A, 890B and into engagement with the rails 892A, 892B.

Figure 31F:
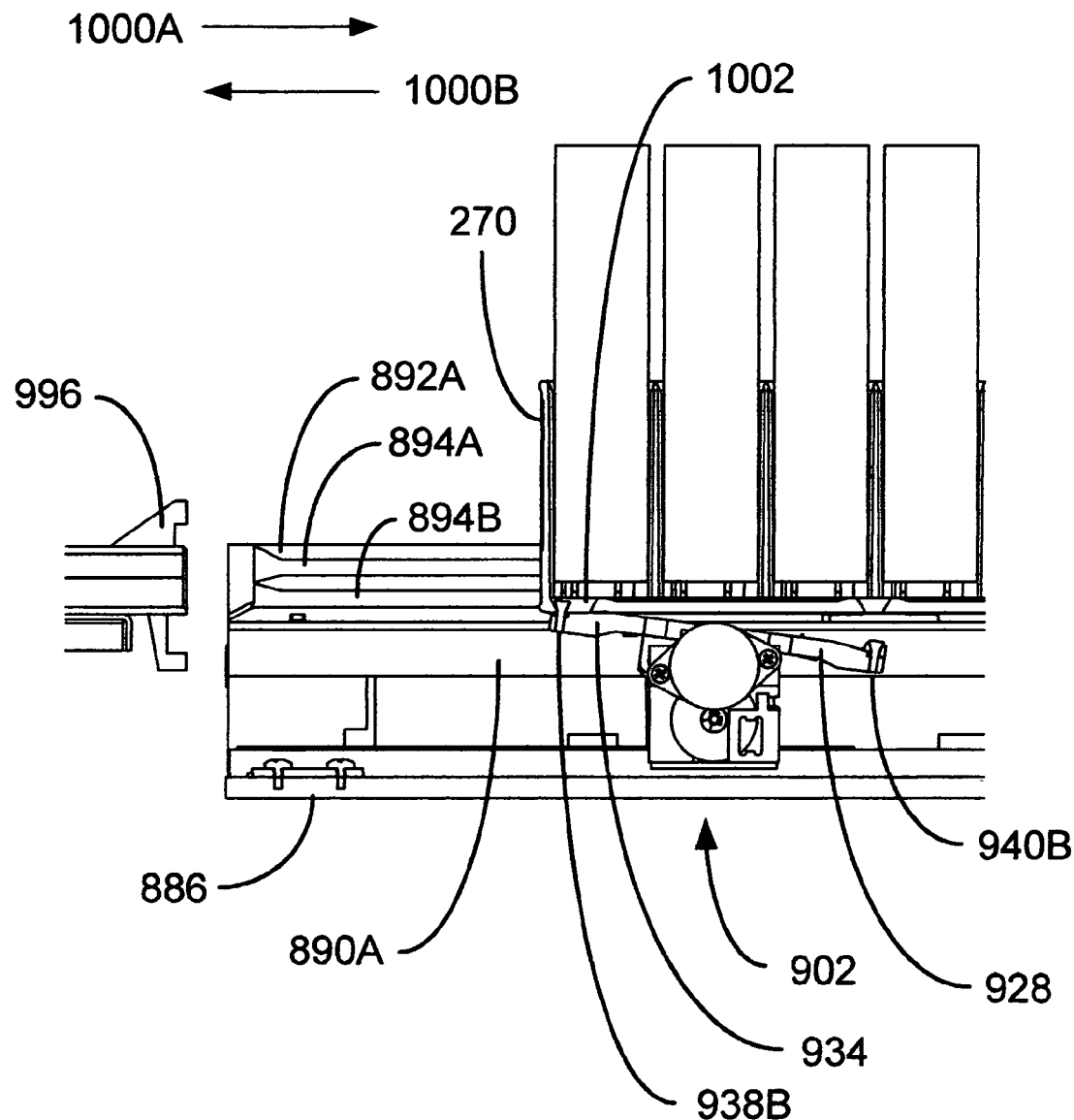

With reference to FIG. 31F, the magazine displacement device 904 is unable to move far enough in the direction 1000B to move the engaged magazine 270 either completely onto the support structure of the magazine picker 880 or completely off of the first shelf 990. Consequently, the following operations have occurred relative to the state of the magazine picker 880 shown in FIG. 31E: (a) the toggle plate 928 has been rotated in the counter-clockwise direction to disengage the toggle pins 940A, 940B from the magazine 270; (b) after disengagement, the magazine displacement device 904 has been moved in direction 1000A so as to position the magazine engagement device 902 to re-engage the magazine (an "over-travel operation" may be employed); and (c) the toggle plate 928 has been rotated in the clockwise direction so that the engagement pins 938A, 938B associated with the first end 934 of the toggle plate 928 pass through the engagement holes 1002 to re-engage the magazine 270.

Figure 31G:
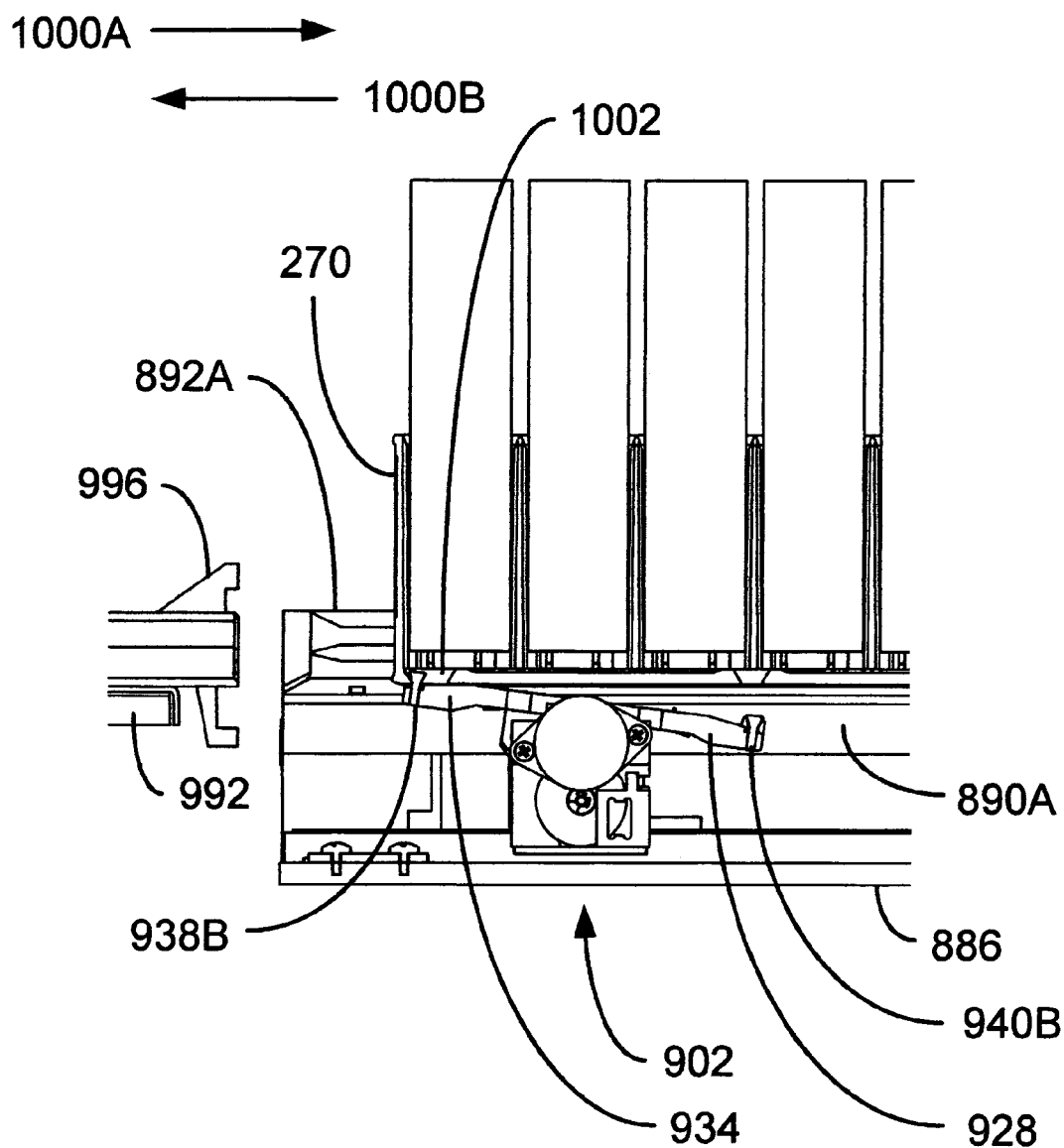

With reference to FIG. 31G, after re-engagement of the magazine 270 by the magazine engagement device 902, the magazine displacement device 904 is used to push the magazine engagement device 902 and the engaged magazine 270 further in the direction 1000B. At this point, the magazine 270 is completely supported by the magazine picker 880 and completely removed from the first shelf 990.

At this point, it should be appreciated that: (a) the steps associated with moving the magazine 270 from the first shelf 270 to the magazine picker 880 are exemplary of the steps associated with moving a magazine from any shelf in the library or from the entry/exit port to the magazine picker 880; (b) the movement of the magazine 270 from the first shelf 990 to the magazine picker 880 required two separate displacements that were separated from one another by an amount of time associated with the disengagement and re-engagement of the magazine; (c) with the magazine 270 fully supported by the magazine picker 880 and completely removed from the first shelf 990, the elevator 750 can be used to move the magazine picker 880 and the magazine 270 to other locations in the library; and (d) the magazine 270 could be moved back onto the first shelf 990 or any other shelf associated with the two columns of shelving 528B.

Figure 31H:
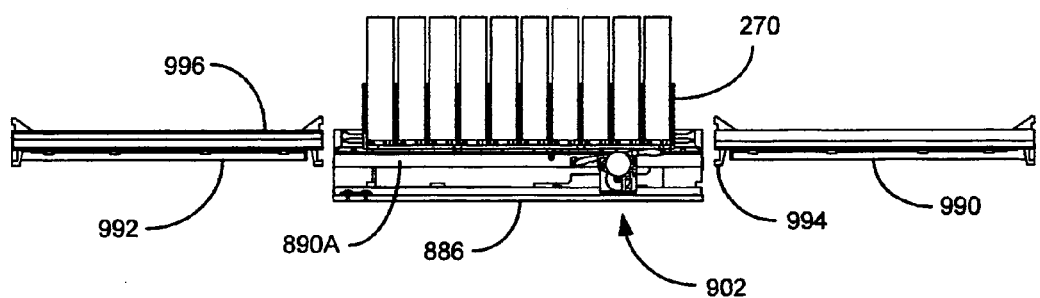
Figure 31I:
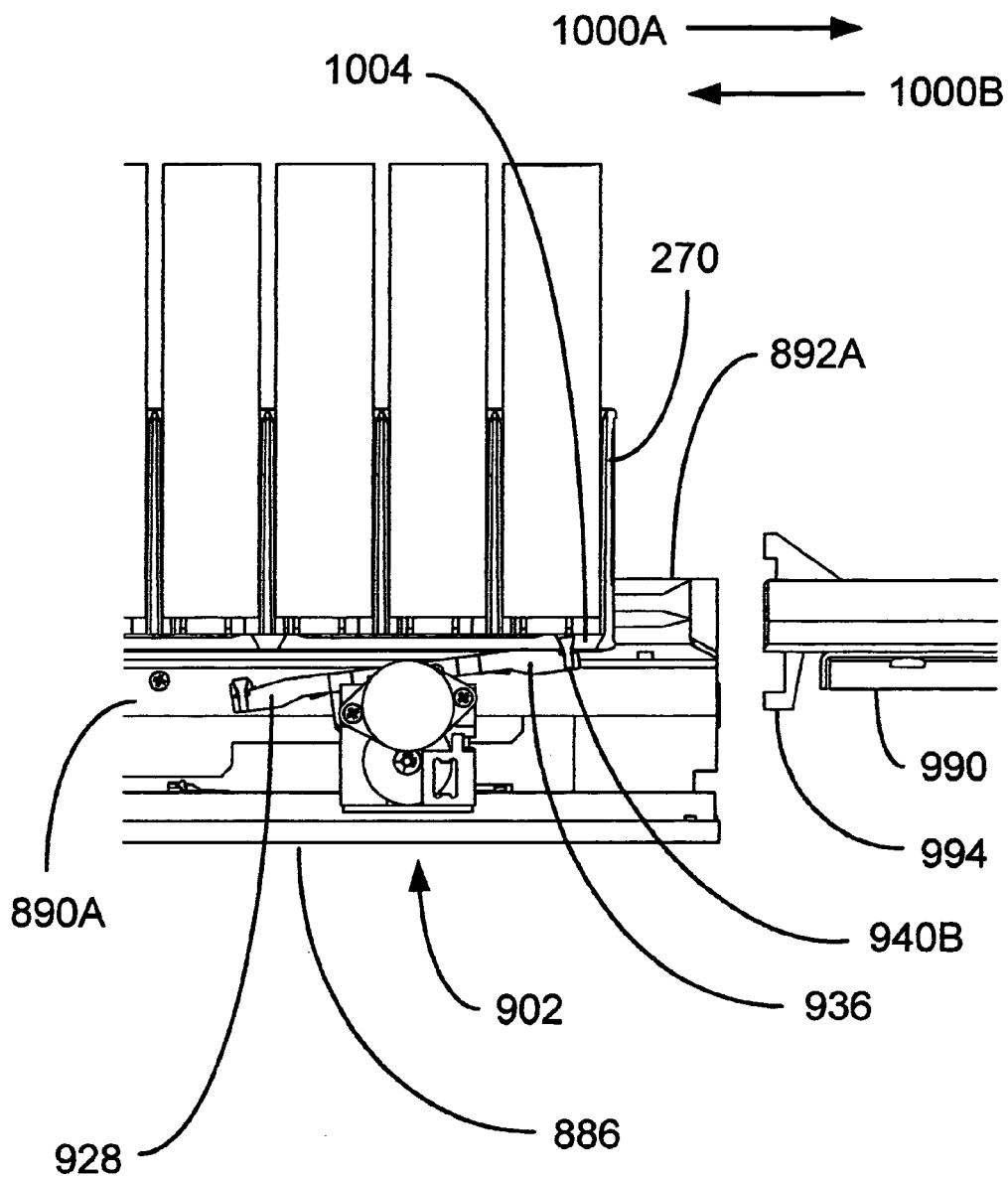

With reference to FIGS. 31H–31I, the use of the magazine picker to move the magazine 270 from the magazine picker 880 to the second shelf 992 is described. It should be appreciated that the movement of the magazine 270 to any shelf of the shelf system 208 involves similar operations to those described hereinafter. Relative to the state of the magazine picker 880 shown in FIG. 31G, the following operations have occurred: (a) the toggle plate 928 has been rotated counter-clockwise to disengage the magazine engage device 902 from the engagement holes 1002; (b) after disengagement, the magazine displacement device 904 has moved the magazine engagement device 902 in the direction 1000A to position the magazine engagement device 902 for engaging the magazine 270; and (c) the toggle plate 928 has been rotated in a counter-clockwise direction so that the engagement pins pass through engagement holes 1004 (e.g., engagement holes 306A, 306B) and thereby engage the magazine 270. An "under travel operation" may be performed so that it is unlikely that engagement of the magazine will require more than one attempt. In an under travel operation, the magazine displacement device 904 purposely moves the magazine engagement device 902 in a direction that is opposite to the direction in which the magazine is to be moved and before the magazine engage device 904 is at a location at which the magazine can be engaged, rotates the toggle plate 928 so that the engagement pins contact the bottom surface 278 of the magazine. When the engagement pins of the toggle plate 928 contact the bottom surface 278 of the magazine, one of the spring assemblies 964A, 964B allows the toggle plate 928 to cease rotating. Subsequently, when the magazine displacement device 904 moves the magazine engagement device 902 further in the direction that is opposite to the direction in which the magazine is to be moved, the engagement pins reach the engagement holes of the magazine and the energy stored in one of the spring assemblies 964A, 964B causes the toggle plate 928 to rotate and the engagement pins to enter the engagement holes of the magazine and thereby positively engage the magazine on the first try.

Figure 31J:
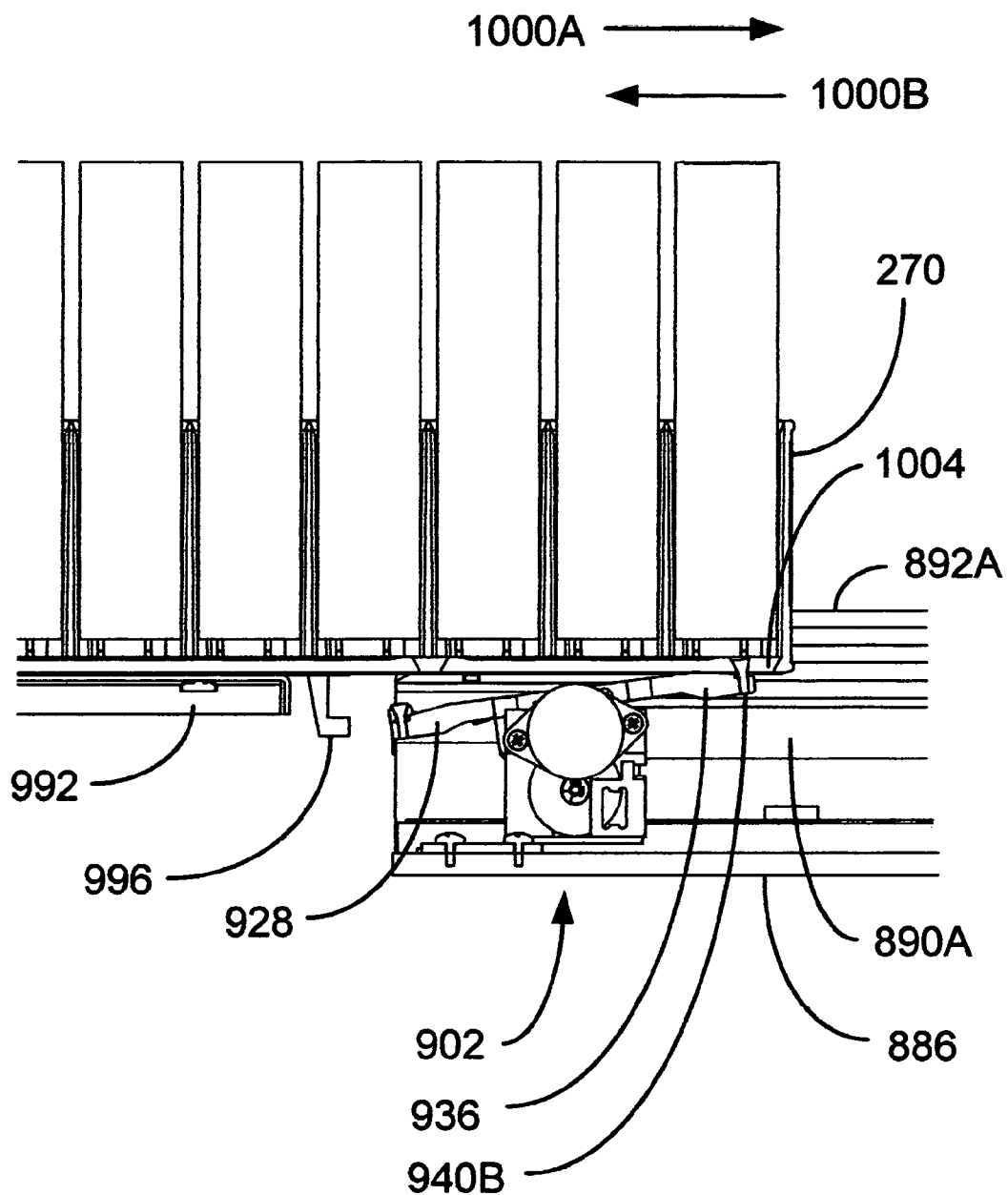

With reference to FIG. 31J, the magazine displacement device 904 is used to pull the magazine engagement device 902 and the engaged magazine 270 in direction 1000B. At this point, the magazine 270 is supported partially by the second shelf 992 and partially by the magazine picker 880.

Figure 31K:
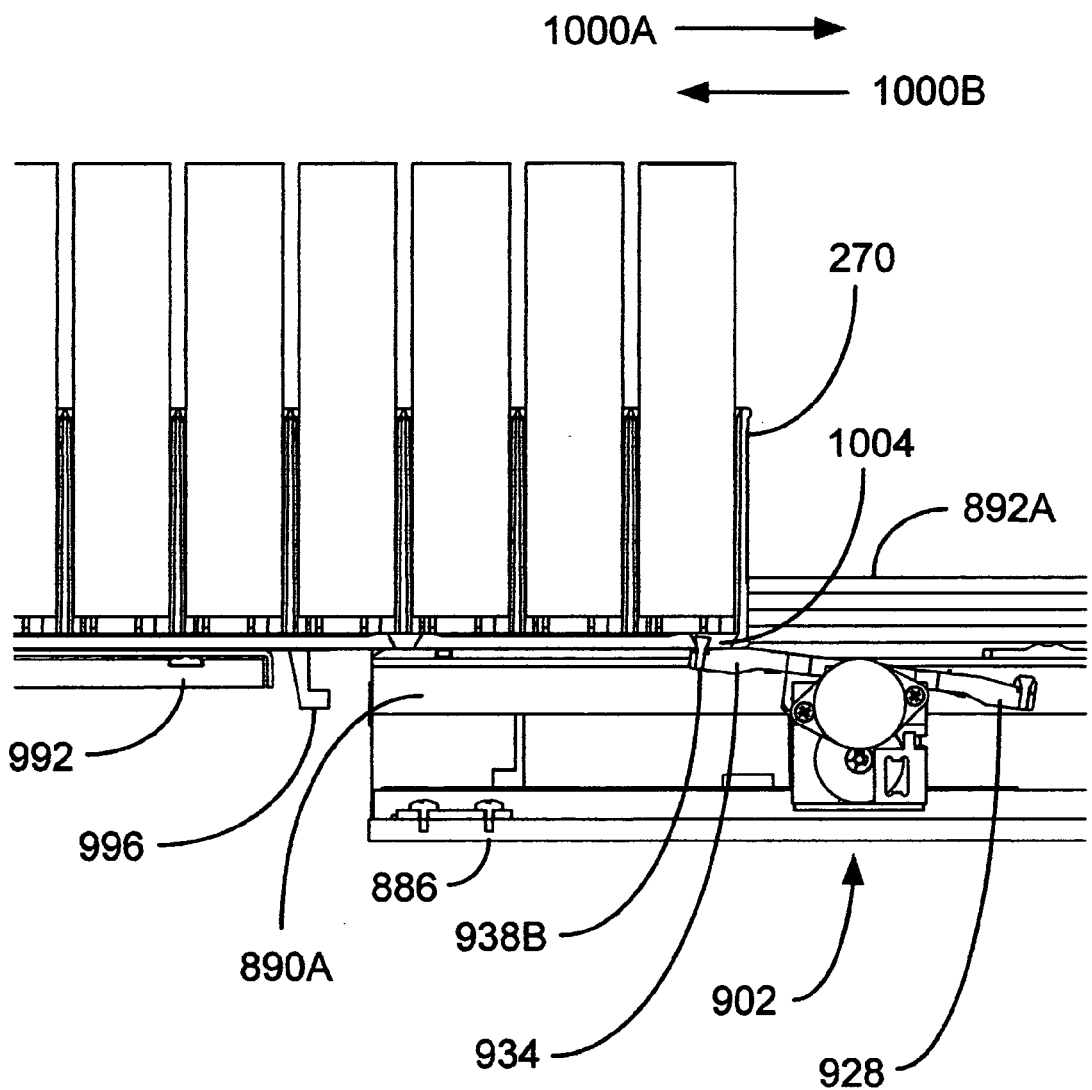

With reference to FIG. 31K, the magazine displacement device 904 is unable to move far enough in the direction 1000B to move the engaged magazine 270 either completely off of the support structure 884 of the magazine picker 880 or completely on to the second shelf 992. Consequently, the following operations have occurred relative to the state of the magazine picker 880 shown in FIG. 31J: (a) the toggle plate 928 has been rotated in the clockwise direction to disengage the toggle pins 940A, 940B from the magazine 270; (b) after disengagement, the magazine displacement device 904 has been moved in direction 1000A so as to position the magazine engagement device 902 to re-engage the magazine 270(an "under-travel operation" may be employed); and (c) the toggle plate 928 has been rotated in the clockwise direction so that the engagement pins 938A 938B associated with the first end 934 of the toggle plate 928 pass through the engagement holes 1002 to re-engage the magazine 270.

Figure 31L:
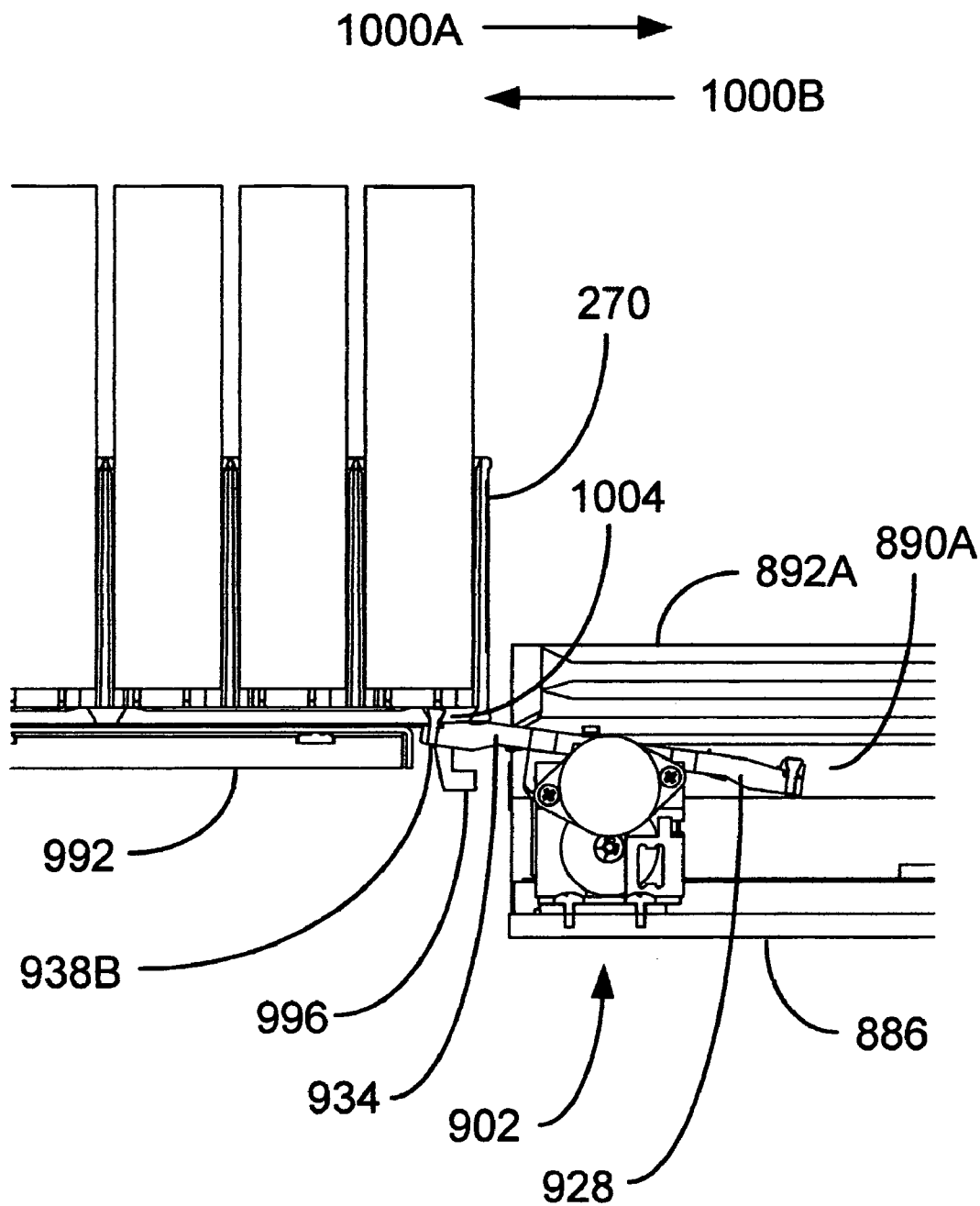

With reference to FIG. 31L, the magazine displacement device 904 has pushed the magazine engagement device 902 and the engaged magazine 270 in direction 1000B so that the magazine 270 is completely supported by the second shelf 992.

At this point, it should be appreciated that: (a) the steps associated with moving the magazine 270 from the magazine picker 880 to the second shelf 992 are exemplary of the steps associated with moving a magazine 270 from the magazine picker 880 to any shelf of the shelf system 208 in the library 202 or to the entry/exit port 206; and (b) the movement of the magazine 270 from the magazine picker 880 to the second shelf 992 required two separate displacements that were separated from one another by an amount of time associated with the disengagement and re-engagement of the magazine 270.

At this point, the toggle plate 928 can be rotated in a counter-clockwise direction to disengage the magazine 270. After any disengagement, the magazine 270 displacement device 904 can then be used to move the magazine engagement device 902 in direction 1000A and return the magazine engagement device 902 to the preferred idle position.

Figure 32:
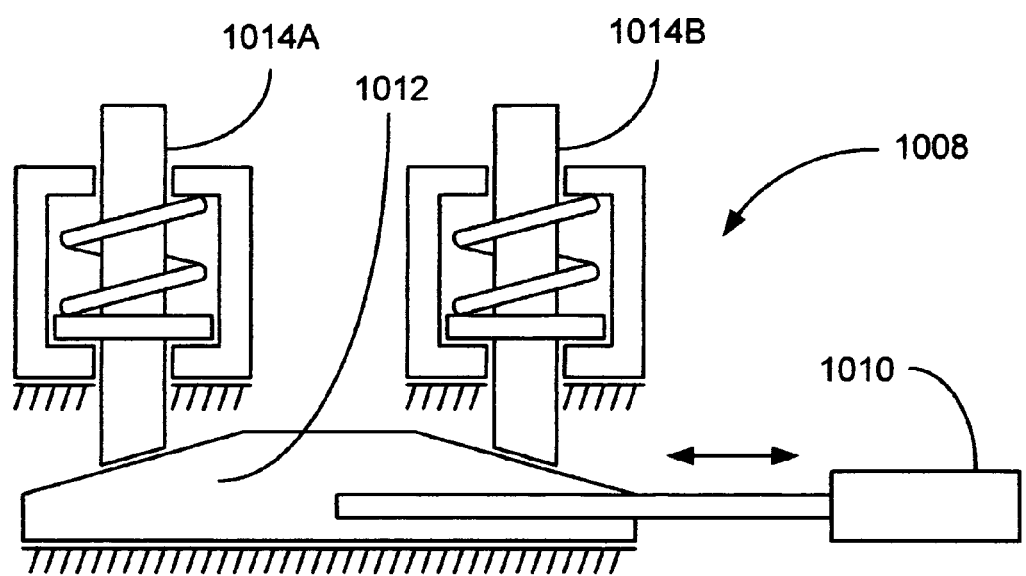

The foregoing has described the magazine transport device 212 used in the library 202. It should, however, be appreciated that other the invention is not limited to the particular design of the elevator 750. For example, an elevator that operates based on a counter-weight principle is also feasible. Further, the invention is not limited to the design of the magazine picker 880. For instance, a magazine engagement device that operates by grasping oppositely situated surfaces of a magazine 270 between two members, with either one member moving towards the other member to grasp the magazine 270 or each member moving towards the other member to grasp a magazine 270, is possible. A magazine engagement device that operates by linearly translating one or more engagement pins to engage a magazine 270 and disengage from a magazine 270 is also feasible. For example, FIG. 32 illustrates a magazine engagement device 1008 that uses a linear actuator 1010 to displace a camming device 1012 that, in turn, causes engagement pins 1014A, 1014B to be linearly translated to engage a magazine 270 and disengage from a magazine 270. Yet another approach is to use a conveyor belt to engage and move a magazine 270 between a support structure 884 and a shelf of the shelf system 208.

Figure 33A:
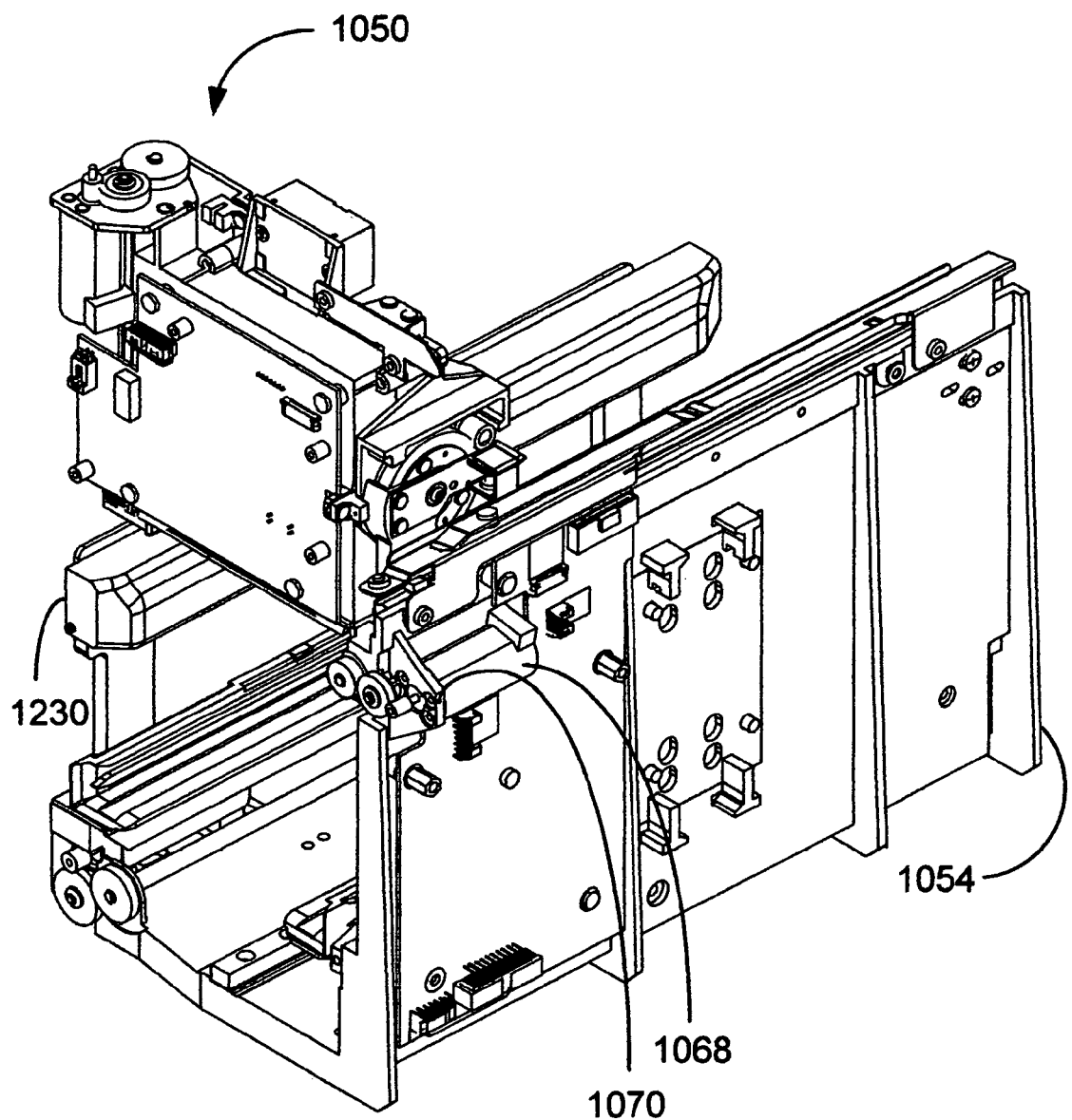
Figure 33B:
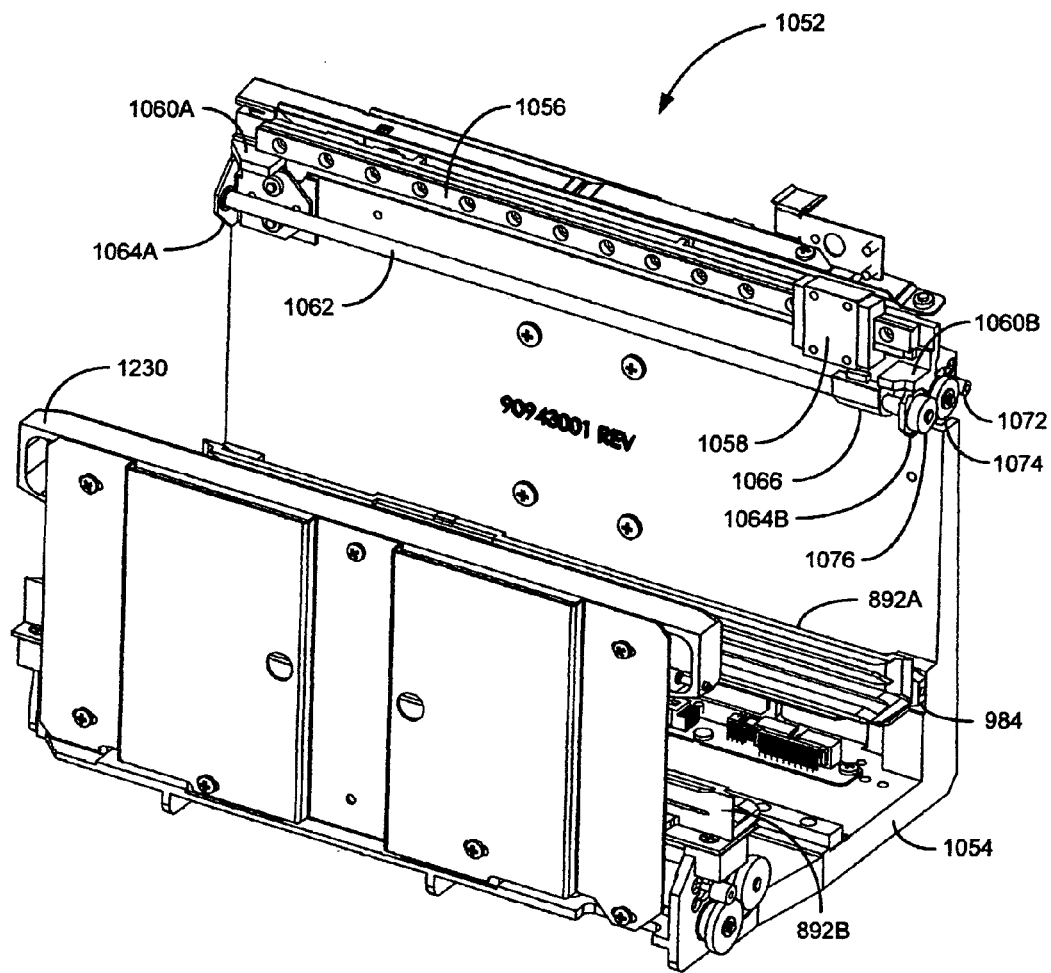

Generally, the cartridge transport 214 operates to move a data cartridge 224 between a magazine 270 and a drive 180. With reference to FIGS. 33A–33B, the cartridge transport 214 is comprised of: (a) a cartridge transport unit 1050; (b) a horizontal transport unit 1052 for horizontally displacing the cartridge transport unit 1050; and (c) the elevator 750.

With continuing reference to FIGS. 33A–33B, the horizontal transport unit 1052 is attached to a transport chassis 1054 that is, in turn, attached to the vertical axis assembly 752 of the elevator 750. The transport chassis 1054, in this embodiment, is an integration of the carriage 882, the base plate 886, and the brackets 888A–888D, previously described with respect to the magazine transport 212. It should also be noted that the rail 892A comprises a spring-loaded detent 1055 for engaging one of the notches 295A, 295B associated with a magazine 270 to secure a magazine 270 on the transport chassis 1054. A second spring-loaded detent (not shown) is associated with the rail 892B and is used to engage the other of the notches 295A, 295B associated with a magazine 270.

The horizontal transport unit 1052 comprises: (a) a linear rail 1056 that is attached to the transport chassis 1054; (b) a rail block 1058 that is mounted to the linear rail 1056, capable of moving along the linear rail 1056, and supports the cartridge transport unit 1050; (c) a pair of stop blocks 1060A, 1060B for limiting the range over which the rail block 1058 can move along the linear rail 1056; (d) a lead screw 1062 that is supported by a pair of brackets 1064A, 1064B that are attached to the transport chassis 1054; (e) a lead screw nut 1066 for applying a motive force to the cartridge transport unit 1050 to move the unit 1050 to a desired location along the linear rail 1056; (e) a DC motor 1068 that provides the rotational motive force that causes the lead screw nut 1066 to move along the lead screw 1062, and is supported by bracket 1070 that is attached to the transport chassis 1054; (f) a pinion 1072 that is attached to the spindle of the DC motor 1068; and (g) first gear 1074 and a second gear 1076 that are used to transfer the rotational force produced by the DC motor 1068 to the lead screw 1062.

Figure 33C:
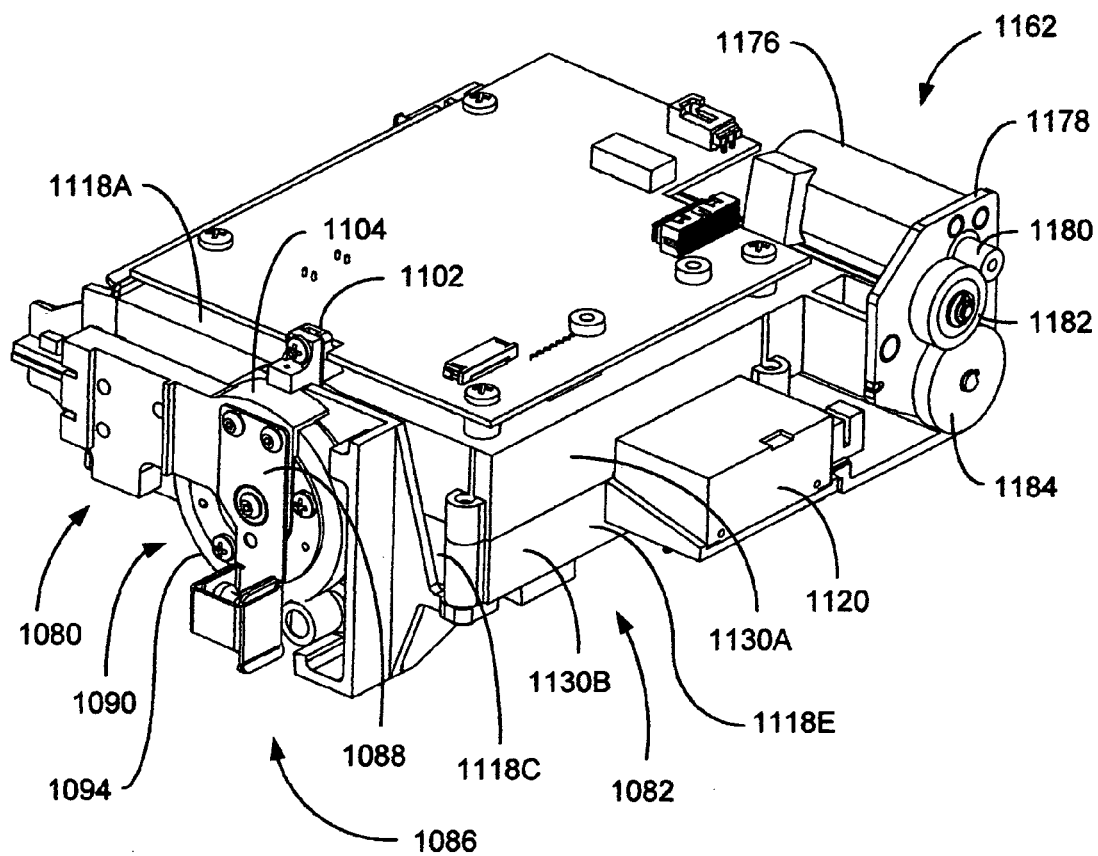
Figure 33D:
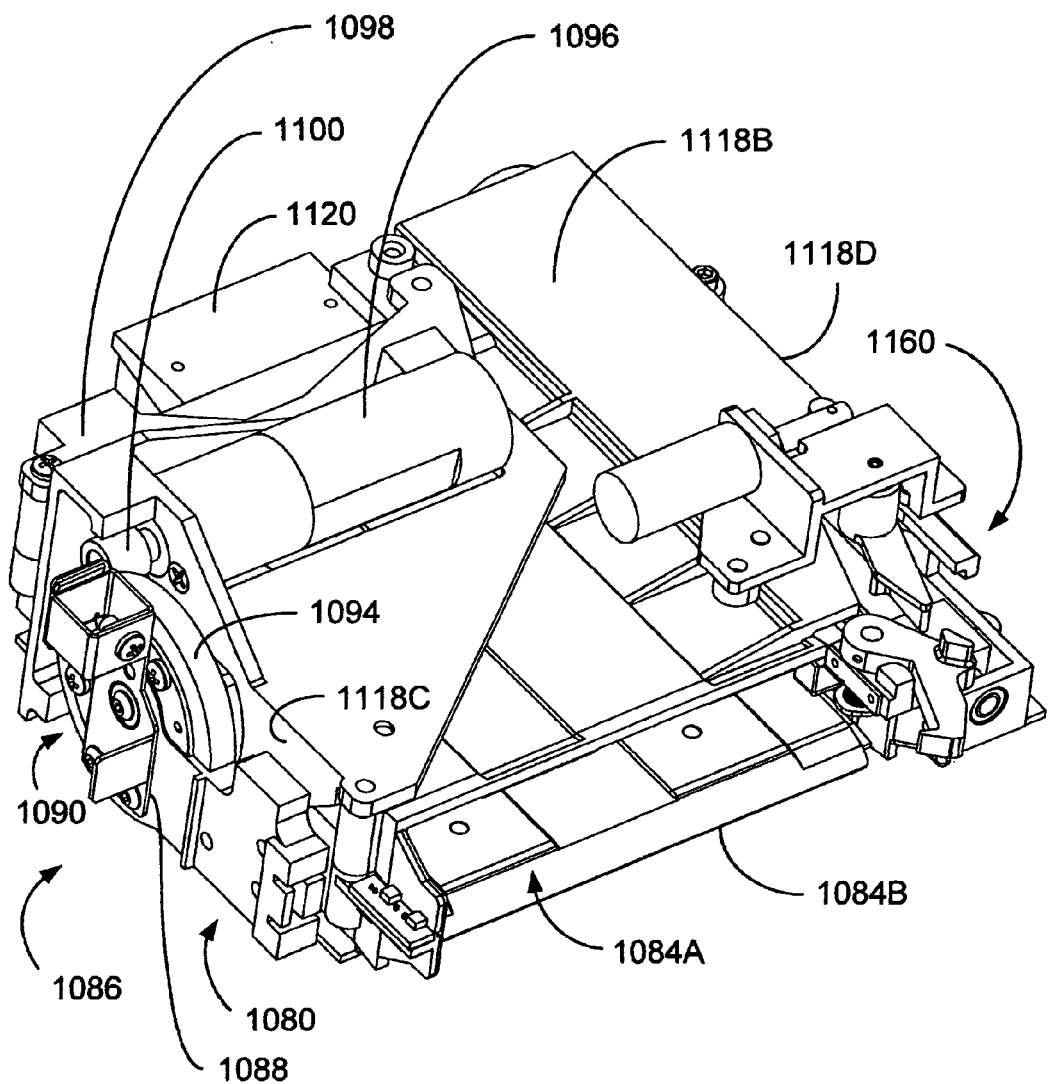
Figure 33E:
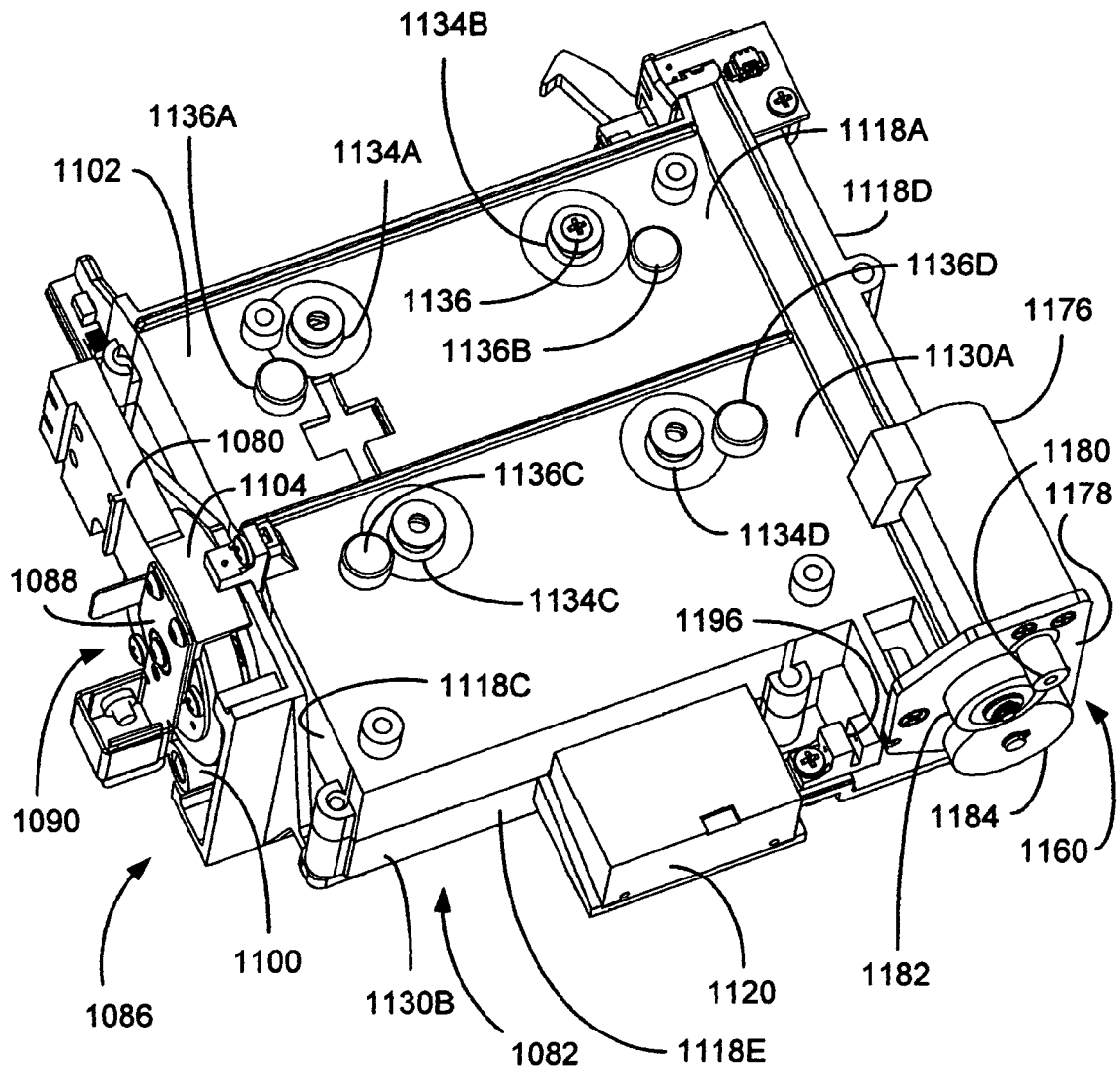
Figure 33F:
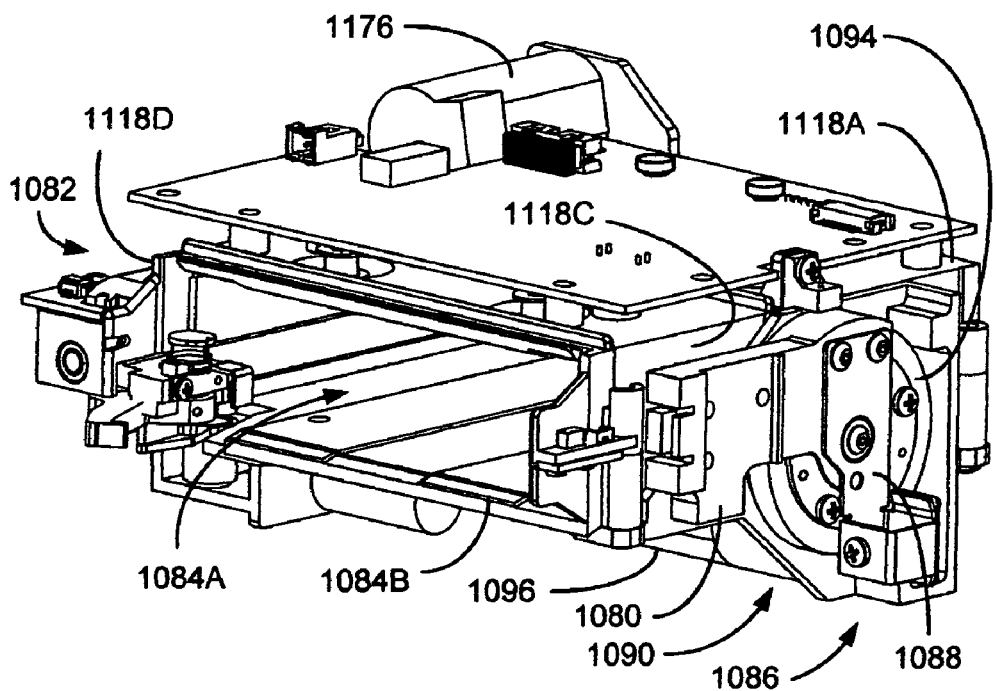
Figure 33G:
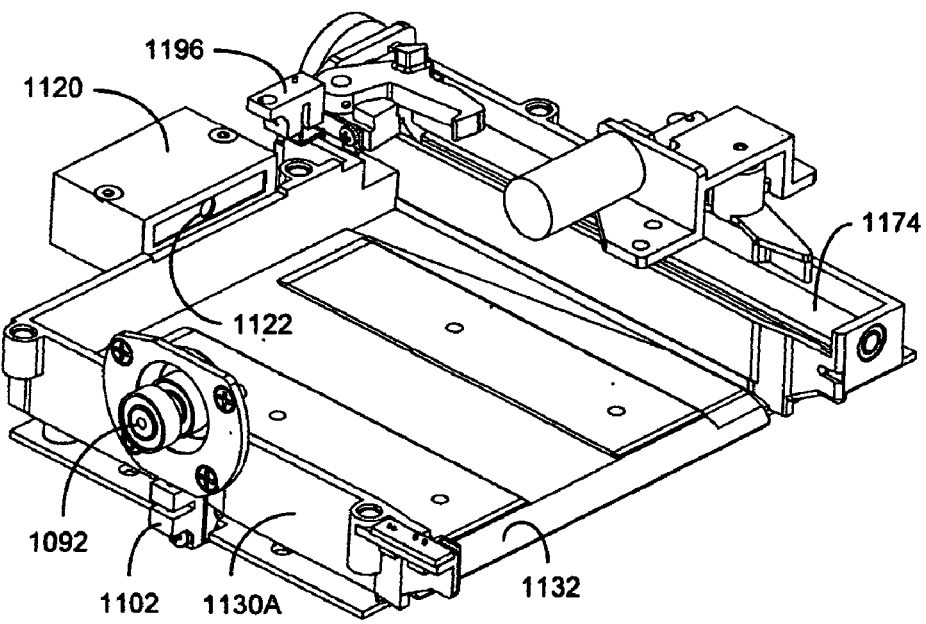
Figure 33H:
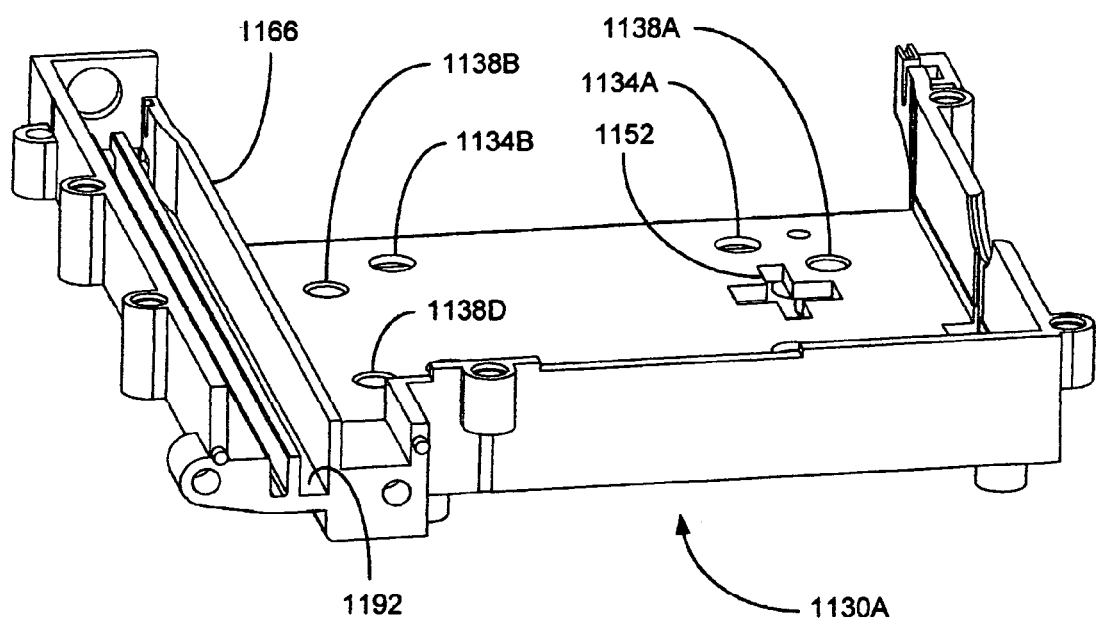
Figure 33I:
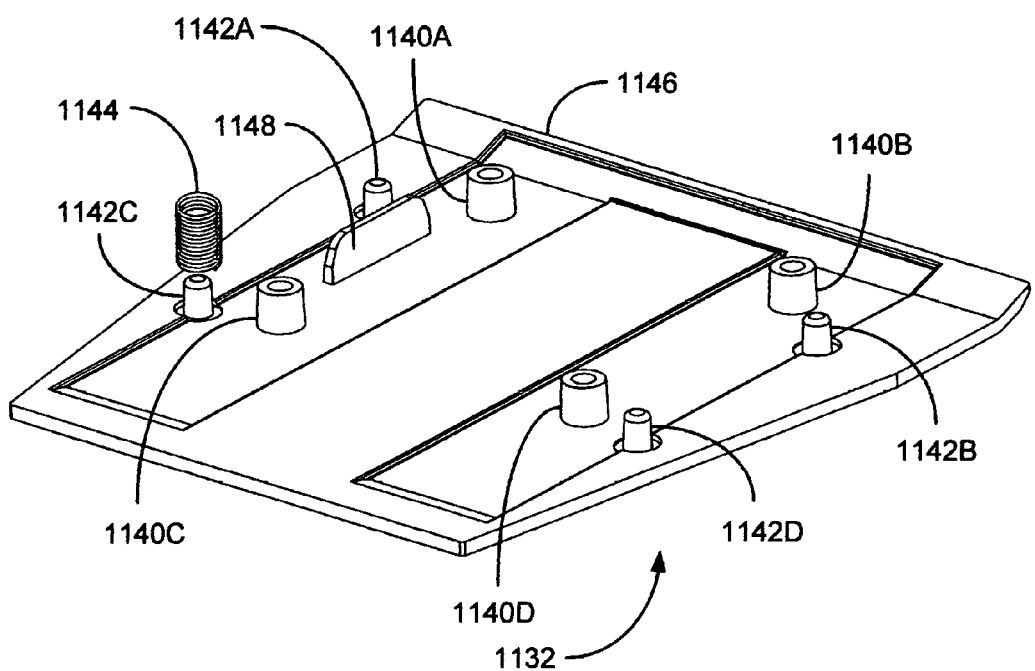
Figure 33J:
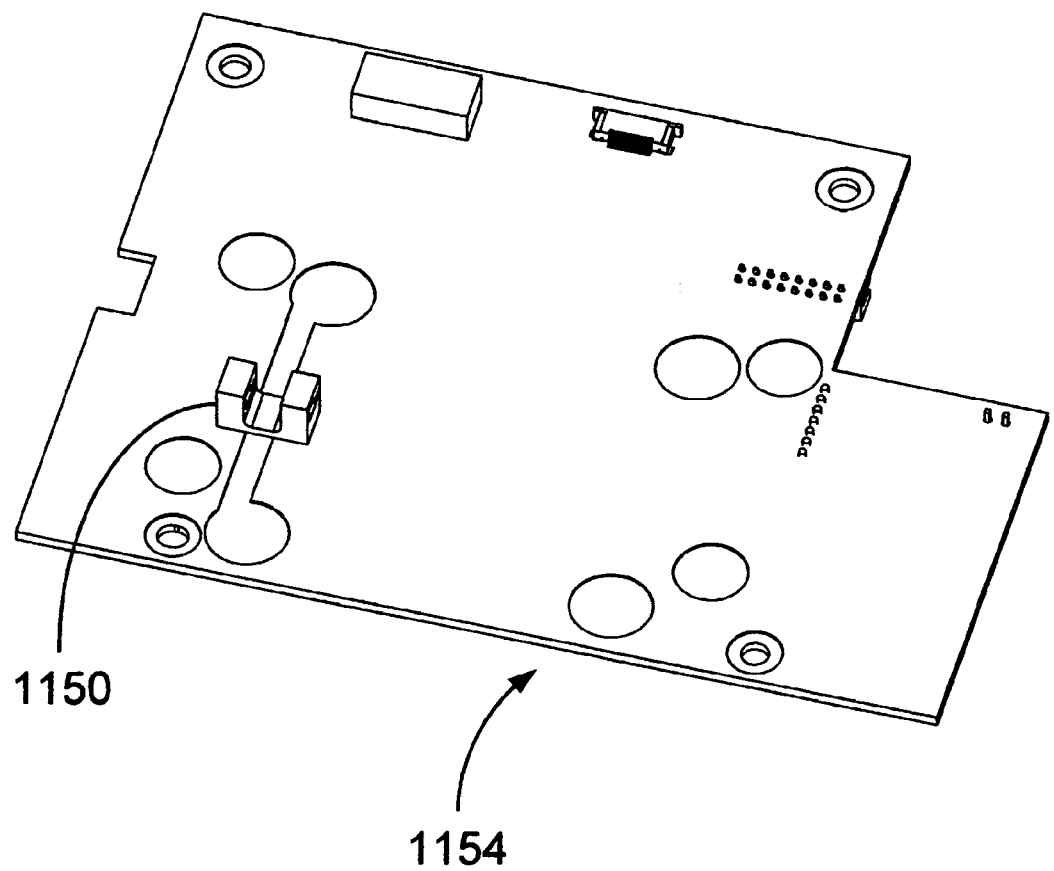
Figure 33K:
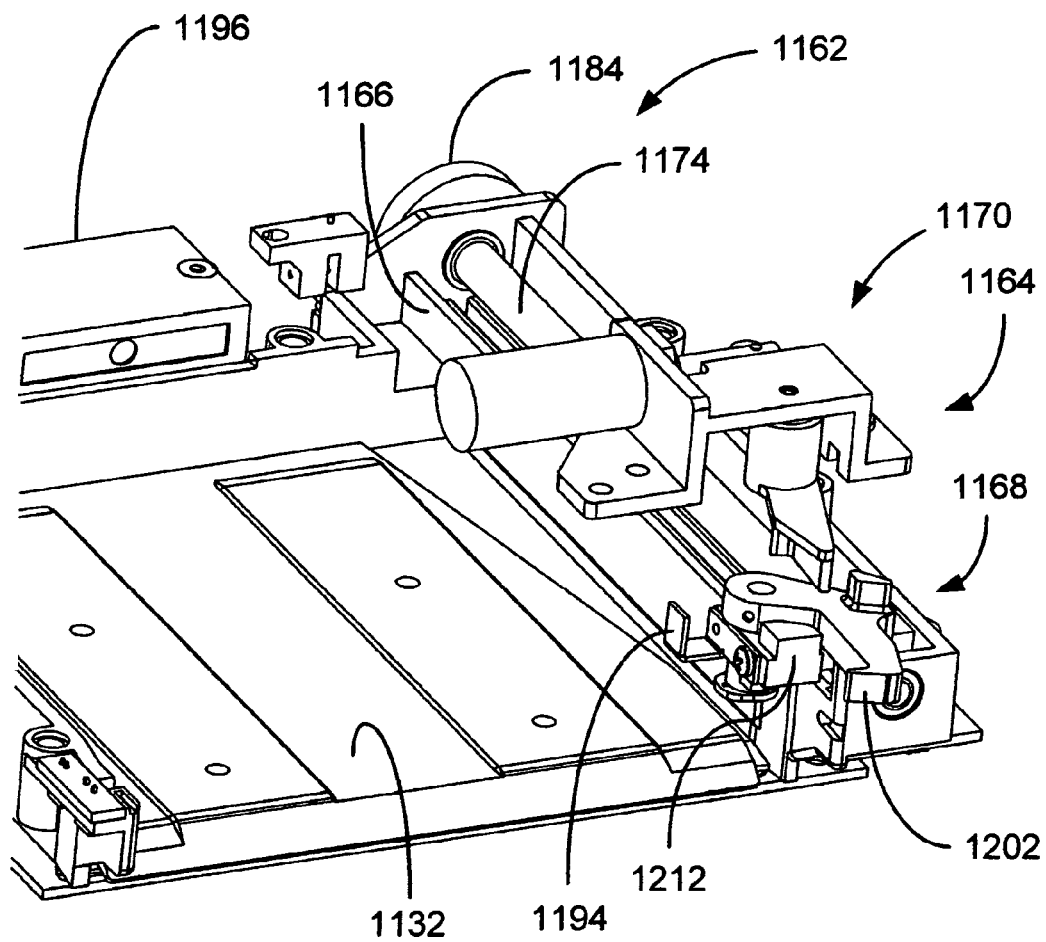
Figure 33L:
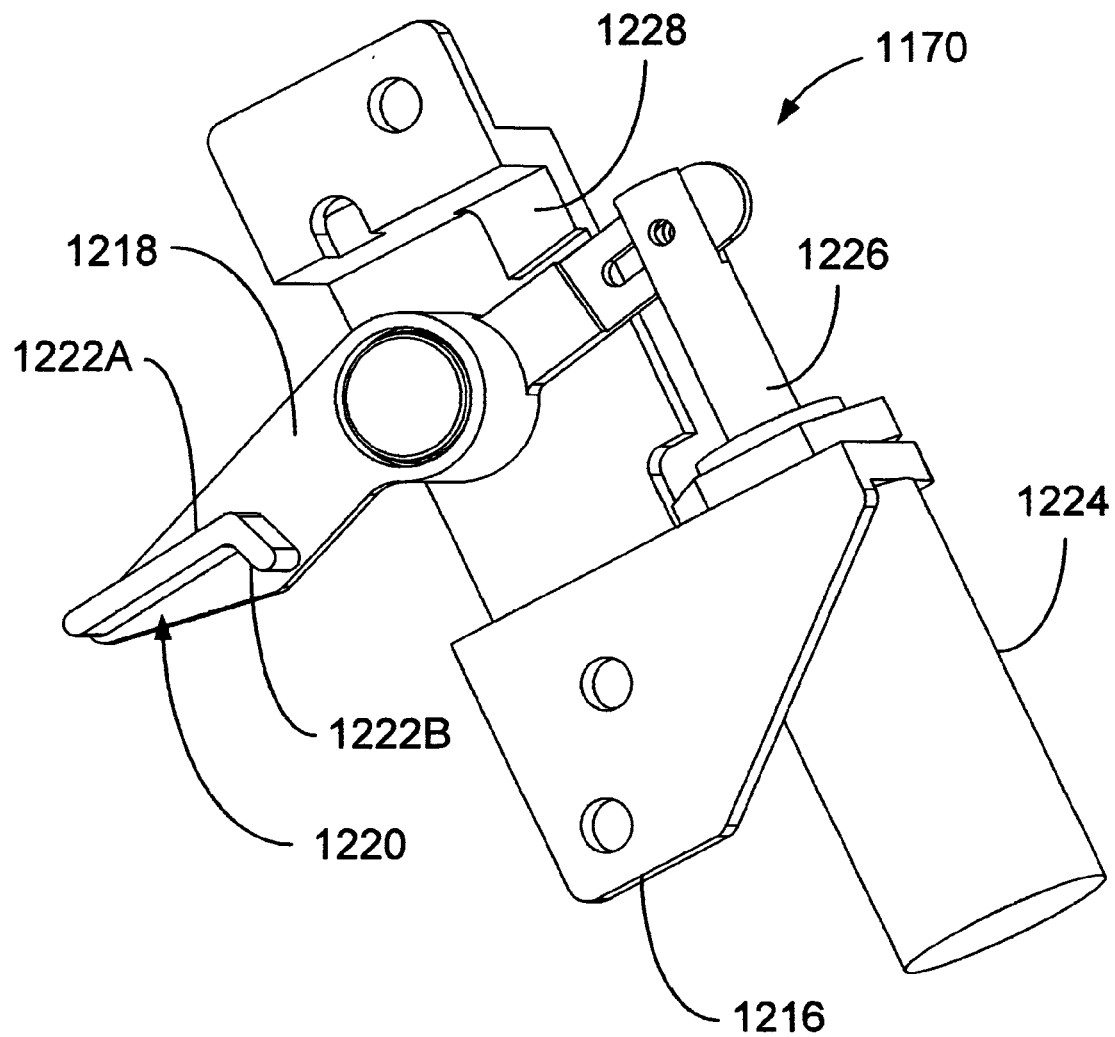
Figure 33M:
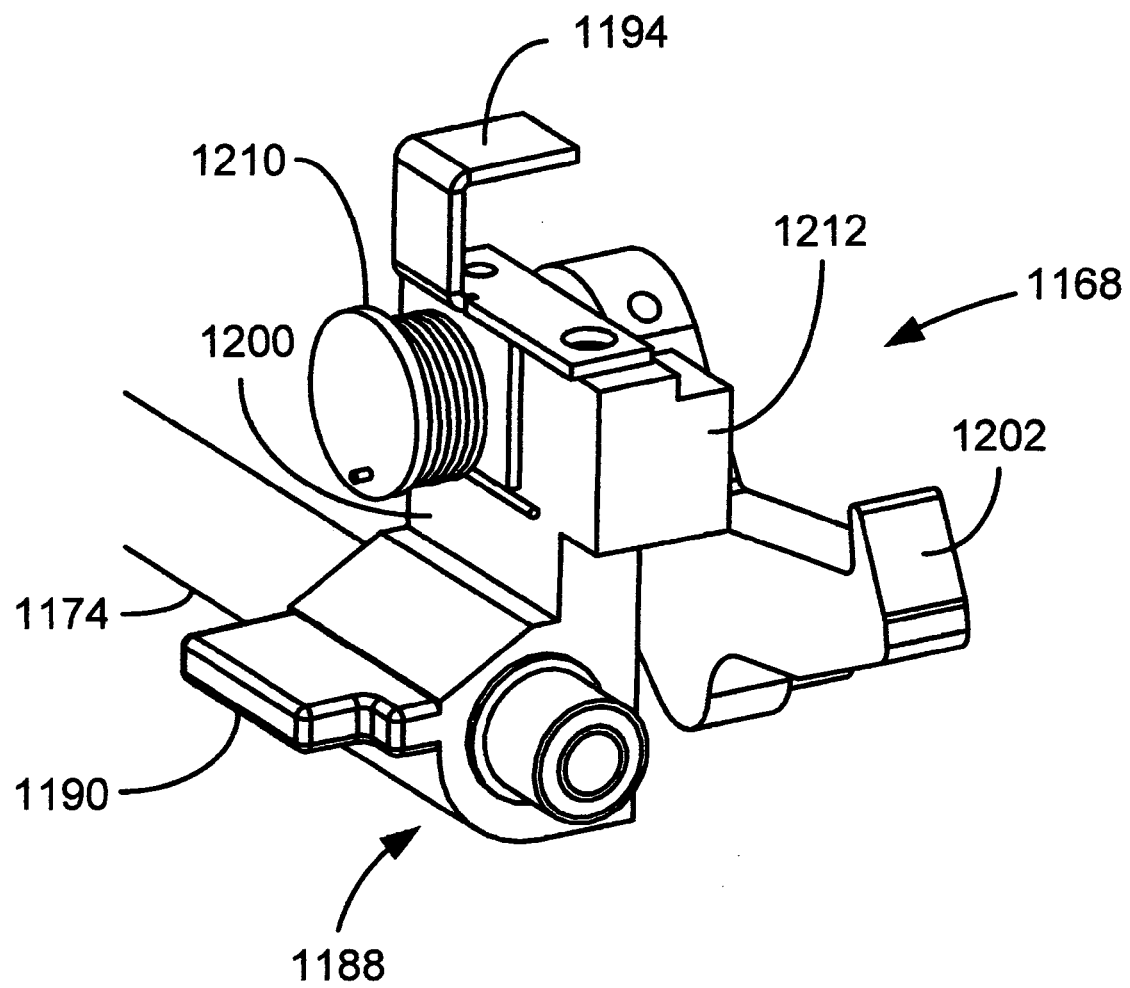
Figure 33N:
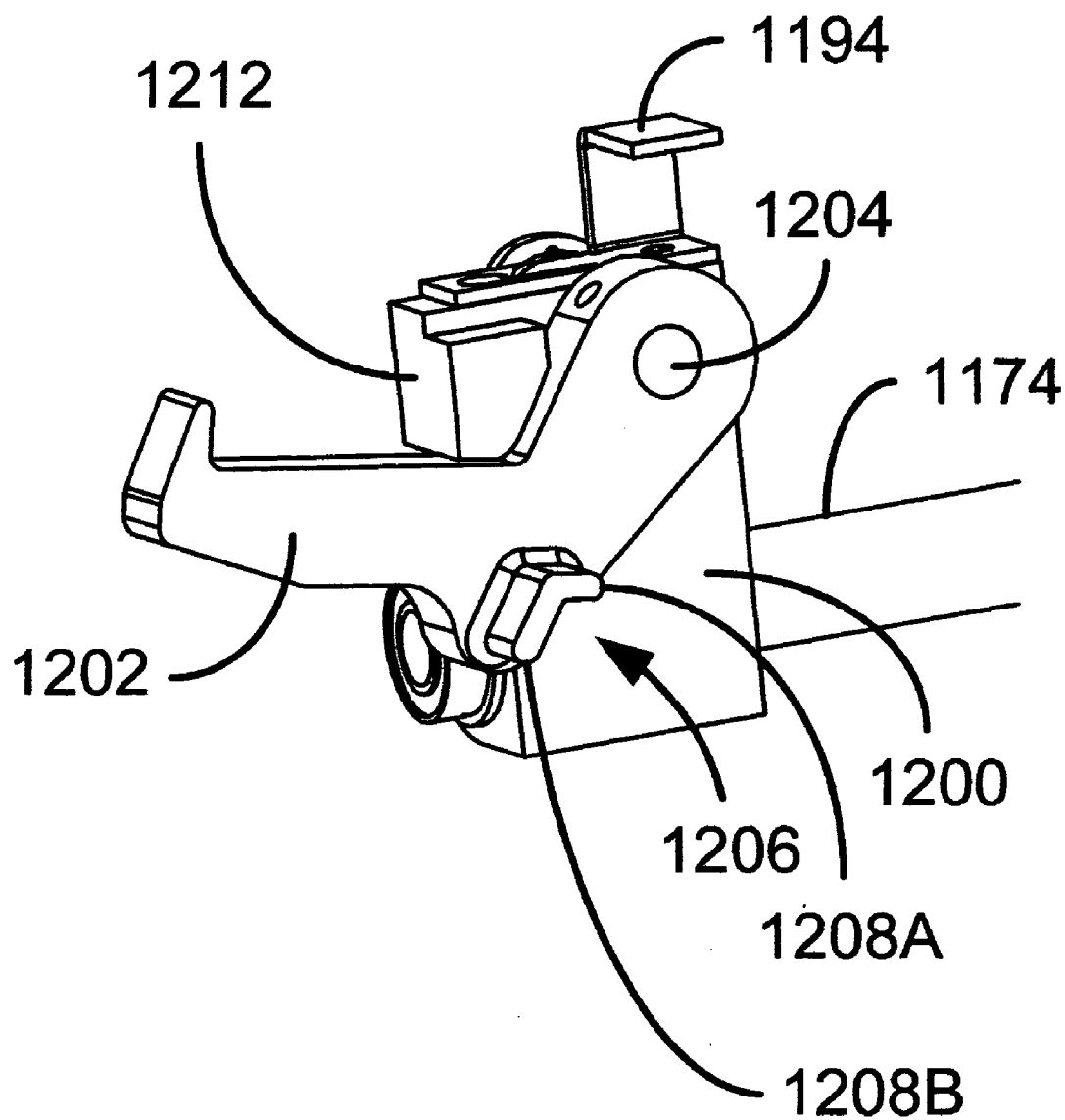

With reference to FIGS. 33C–33D, the cartridge transport unit 1050 comprises a carriage block 1080 that is attached to the rail block 1058 and engages the lead screw nut 1066. As can will be appreciated by one skilled in the art, upon the application of a rotational motive force by the DC motor 1068, the lead screw nut 1066 is displaced along the lead 1062 and, as a consequence, the cartridge transport unit 1050 is horizontally displaced along the linear rail 1056. Horizontal displacement of the cartridge transport unit 1050 along the linear rail 1056 facilitates: (a) positioning of the cartridge transport unit 1050 over a particular slot of a magazine 270 supported by the magazine picker 880 so that a data cartridge 224 can be inserted into the slot of the magazine 270 or a data cartridge 224 can be extracted from the slot of the magazine 270; and (b) moving the cartridge transport unit 1050 towards and away from a drive 180 during the transfer of a data cartridge 224 between a magazine 270 and the drive 180. The location of the cartridge transport unit 1050 is determined using an encoder associated with the DC motor 1068 or other position sensor known in the art.

With reference to FIGS. 33C–33F, the cartridge transport unit 1050 further comprises: (a) a housing 1082 that defines an interior space 1084A for receiving a data cartridge 224 and an opening 1084B through which a cartridge 224 is received into the interior space 1084A and through which a cartridge 224 is expelled from the interior space 1084A (sensor is located adjacent to the opening 1084B for use in determining whether a data cartridge 224 has been grasped and for determining whether a cartridge 224 is in a magazine 270); and (b) a rotary assembly 1086 for selectively rotating the housing 1082. The rotary assembly 1086 comprises: (a) a bracket 1088 that is attached to the carriage block 1080; (b) a gear 1090 with a center bearing 1092 for attaching the bracket 1088 to the gear 1090 so as to allow relative rotational movement between the bracket 1088 and the gear 1090, and with an outer gear ring 1094 that is fixed to the housing 1082; (c) a DC motor 1096 for providing a rotational motive force that is used to rotate the housing 1082 about an axis defined by the center bearing 1092, the DC motor 1096 is attached the housing 1082 by a bracket 1098; (d) a pinion 1100 that is attached to the spindle of the DC motor 1096 and engages the outer gear ring 1094. As will be appreciated by one skilled in the art, a rotational motive force produced by the DC motor 1096 is transmitted to the outer gear ring 1094 by the pinion 1100. As a consequence, the housing 1082 rotates relative to the carriage block 1080 and about the axis 1096. A rotational sensor 1102 that is attached to the housing 1082 cooperates with a flag 224 that is associated with the bracket 1088 to providing information on the rotational position of the housing 1082.

Figure 34A:
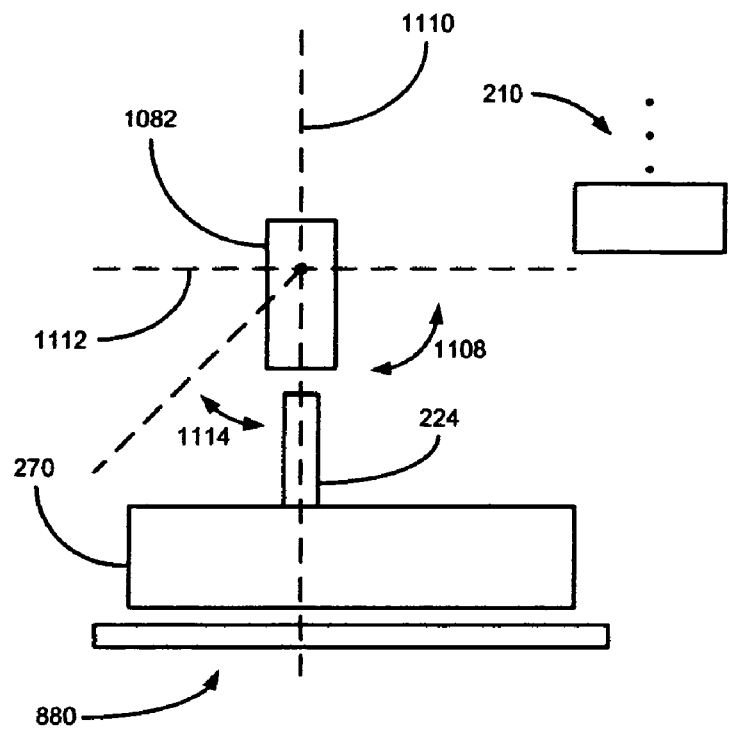

With reference to FIG. 34A, due to orientation of the drives 180 and the orientation of a cartridge 224 in a magazine 270 supported by the magazine picker 880, the rotary assembly 1086 must be able to rotate the housing 1082 through a range 1108 of a least ninety degrees located between a vertical plane 1110 and a horizontal plane 1112 to transfer a cartridge 224 between one of the drives 180 and a magazine 270 supported by the magazine picker 880. In the illustrated embodiment, the rotary assembly 1086 is able to rotate the housing 1082 through an additional range 1114 of about forty-five degrees. The ability to traverse a total range of approximately 135 degrees allows a bar-code reader 1120 associated with the housing 1082 to read bar codes associated with magazines 270 located on shelves 328A and shelves 328B, i.e., magazines 270 located on both sides of the magazine transport 212 and cartridge transport 214. The range of the rotary assembly 1086 can be further increased if, for example, an additional drive or drives 180 were located on the opposite side of the library 202 from the drives 180.

Figure 34B:
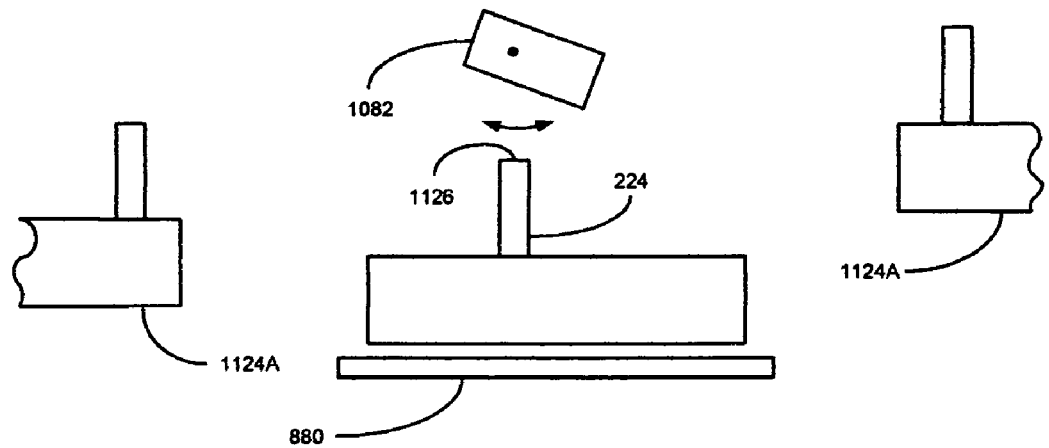

The housing 1082 comprises a top side 1118A, bottom side 1118B, first side 1118C, second side 1118D, and back side 1118E. Associated with the back side 1118E is a bar code reader 1120 that is used to read a bar code label that is associated with and identifies a magazine 270 that is located on a shelf in the shelf system 208 and a bar label that is associated with a data cartridge magazine 270 located in a magazine 270. The barcode reader 1120 has an aperture 1122 with a field of view that extends through the interior space 1084A of the housing 1082 and out through the opening 1084B defined by the housing 1082. FIG. 34B illustrates the ability of the rotary assembly 1086 and the bar code reader 1120 to read a bar code that identifies a first magazine 1124A that is associated with the shelving 328A and a bar code that identifies a second magazine 1124B that is associated with the shelving 328B. With respect to the magazines 1124A, 1124B disclosed herein and the common orientation of all of the magazines 270 in the library 202, the bar code label associated with the magazine 1124A is situated in one of the recesses 290A, 290B and the bar code label associated with the magazine 1124B is situated in the other of the recesses 290A, 290B. As FIG. 34B also illustrates, the rotary assembly 1086 and the bar code reader 1120 are also capable of reading a bar code label that is attached to an end face 1126 of a cartridge 224. In some cases, the horizontal transport unit 1052 must also be used to appropriately position the bar code reader 1120 to read a bar code label associated with a magazine 270 or with a cartridge 224. In an alternative embodiment, the bar code reader can be located in a different location on the housing 1082. In yet other embodiments, separate bar code readers can also be employed; one to read a bar code that identifies a magazine 270 and one to read a bar code that identifies a cartridge 224. If two bar code readers are employed, the bar code reader for reading the bar code that identifies a magazine 270 can be located elsewhere than the cartridge transport unit 1050 (e.g., with the magazine picker 880). In other embodiments of the present invention, at least one sensor, such as an alternative reader or readers, can be used to identify alternative identification for cartridges 224 and/or magazines 270. For instance, if an RFID (Radio Frequency Identification) tag is used to identify a magazine 270 or cartridge 224, an appropriately situated sensor or sensors can be associated with the cartridge transport 214, magazine transport 212, or other appropriate element in the library 202.

With reference to FIGS. 33E and 33G–33I, the housing 1082 is capable of accommodating data cartridges of different dimensions. More specifically, the housing 1082 is capable of accommodating cartridges that have different heights, i.e., the perpendicular distance between the two, parallel surfaces of the cartridge with the greatest surface areas. In the illustrated embodiment, the housing 1082 is capable of accommodating an LTO, SAIT or DLT tape cartridge 224, 240 or 254. LTO and SAIT tape cartridges 224, 240 have substantially the same height. The DLT tape cartridge 254, however, has a height that is greater than the heights of the LTO and SAIT tape cartridges 224, 240. With the foregoing in mind, the housing 1082 comprises a top half 1130A and a bottom half 1130B that is attached to the top half 1130A to form the housing 1082. Adaptively attached to the top half 1130A is plate 1132. To elaborate, the top half 1130A comprises: (a) screw holes 1134A, 1134B, 1134C and 1134D each for receiving a screw, such as screw 1136; (b) spring towers 1138A, 1138B, 1138C and 1138D that each house a spring. The plate 1132 comprises: (a) retaining screw posts 1140A, 1140B, 1140C and 1140D that each receive and retain a screw that passes through the corresponding one of the screw holes 1134A–1134D; and (b) spring seats 1142A, 1142B, 1142C and 1142D, each for supporting one end of a spring, such as spring 1144. The other end of each spring is received in the spring towers 1138A–1138D. The plate 1132 also comprises a ramp 1146 that is disposed adjacent to the opening 1084B to facilitate the insertion of data cartridges 224 into the interior space 1084A. In operation, the plate 1132 and the interior surface of the bottom side 1118B are separated from one another when there is no cartridge 224 in the interior space 1084A by a distance that is only slightly greater than the height of an LTO or SAIT tape cartridge 224, 240. When an LTO or SAIT tape cartridge 224, 240 is located in the interior space 1084A, the plate 1132 and the interior surface of the bottom side 1118B remain separated by approximately the same distance as when there was no cartridge 224 in the interior space 1084A. In addition, the plate 1132 and interior surface of the bottom side 1118B operate to constrain the movement of the cartridge 224 in one dimension, i.e., the height dimension. When a DLT cartridge 254 is inserted into the interior space 1084A, the greater height of the cartridge 254 displaces the plate 1132 towards the top side 1118A of the housing and compresses the springs. Again, the plate 1132 and the interior surface of the bottom side 1118B constrain the movement of the cartridge 254 in one dimension, i.e., the height dimension. When the DLT cartridge 254 is removed from the interior space 1084A, the springs operate to return the plate 1118B to the position at which it is separated from the interior surface of the bottom side 1118B by a distance that is slightly greater than the height of an LTO or SAIT cartridge 224, 240.

The plate 1132 further comprises a flag 1148 that cooperates with a detector 1150 to indicates when a DLT tape cartridge 254 has been received in the interior space 1084A. In operation, when a DLT cartridge 254 is received in the interior space 1084A, the displacement of the plate 1132 causes the flag 1148 to pass through a slot 1152 in the top half 1130A and engage the detector 1150. The detector 1150 is located on a circuit board 1154 that is mounted to the top side 1118A of the housing and that includes control circuitry for the rotary assembly 1086 and the picker 880.

With reference to FIGS. 33K–33N, the cartridge transport unit 1050 comprises: (a) a grasper assembly 1160 that is used to grasp a cartridge 224; and (b) a linear drive assembly 1162 for moving a portion of the grasper assembly 1160 to move a cartridge 224 into and out of the interior space 1084A of the housing 1082. The grasper assembly 1160 comprises: (a) the plate 1132 and the interior surface of the bottom side 1118B of the housing 1082, which cooperate with one another to constrain a data cartridge 224 in a first dimension, i.e., the height dimension 226A, 226B; (b) a picker assembly 1164 and the interior surface of the back side 1118E of the housing 1082, which cooperate with one another to constrain a cartridge 224 in a second dimension, i.e., the depth dimension 230A, 230B between the ends of the cartridge 224; and (c) the interior surface of the first side 1118C of the housing 1082 in combination with an interior wall 1166 of the housing 1082 and the picker assembly 1164 to constrain a cartridge 224 in a third dimension, i.e., the width dimension 228A, 228B.

The picker assembly 1164 comprises: (a) a finger/thumb assembly 1168 that is used in grasping a cartridge 224; and (b) a finger actuation assembly 1170 that is used to place a finger 1202 associated with the finger/thumb assembly 1168 in a desired orientation for extracting a data cartridge 224 from a magazine 270, inserting a data cartridge 224 into a magazine 270, extracting a data cartridge 224 from a drive 180, and inserting a data cartridge 224 into a drive 180.

The linear drive assembly 1162 operates to linearly move the finger/thumb assembly 1168 to pull a cartridge 224 into the interior space 1084A of the housing 1082 and to expel a cartridge 224 from the interior space 1084A of the housing 1082. The linear drive assembly 1162 comprises: (a) a lead screw 1174 that is supported by the housing 1082; (b) a DC motor 1176 for providing a rotational motive force for moving the finger/thumb assembly 1168, the motor 1176 is attached to a bracket 1178; (c) a pinion 1180 that is attached to the spindle of the DC motor 1176; (d) an idler gear 1182 that interfaces with the pinion 1180; (e) a lead screw gear 1184 that interfaces with the idler gear 1182 and is attached to one end of the lead screw 1174. The finger/thumb assembly 1168 comprises a nut portion 1188 that resides on the lead screw 1174 and a guide tongue 1190 that is attached to the nut portion 1188 and resides in a groove 1192, a side of which is formed by the interior wall 1166. When the motor 1176 produces a rotational motive force, the finger/thumb assembly 1168 is displaced along the lead screw 1174. Typically, the displacement is associated with moving a cartridge 224 into the interior space 1084A or expelling a cartridge 224 from the interior space 1084A. Associated with the finger/thumb assembly 1168 is a flag 1194 that cooperates with a detector 1196 to indicate when the finger/thumb assembly 1168 has been fully retracted into the interior space 1084A of the housing 1082. In addition, the detector 1196 is used in combination with an encoder associated with the motor 1176 to provide positional information on the finger/thumb assembly 1168.

The finger/thumb assembly 1168 further comprises: (a) mounting block 1200; (b) a finger 1202 that is pivotally attached to the mounting block 1200 via a finger pivot shaft 1204; (c) finger cam 1206 that is attached to the finger 1202 and includes a first and second finger cam legs 1208A, 1208B; (d) a finger return spring assembly 1210 that is attached to the pivot shaft 1204 and operates to bias the finger 1202 towards a data cartridge 224; and a thumb 1212 that limits the movement of the finger 1202 towards a cartridge 224 and also assists in pushing a cartridge 224 out of the interior space 1084A. It should be appreciated that in embodiments of a magazine-based data cartridge library 202 that operate only on cartridges, such as a SAIT tape cartridge 240, with two gripper notches, such as notches 250A and 250B, a cartridge may be grasped between a pair of movable elements.

The finger actuation assembly 1170 comprises: (a) a bracket 1216 that is mounted to the housing 1082; (b) a picker 1218 that is pivotally attached to the bracket 1216; (c) a picker cam 1220 that engages the finger cam surface 1206 to place the finger 1202 in desired orientations for particular insertion and extraction operations, with the picker cam 1220 comprising first and second picker cam legs 1222A, 1222B; (d) a solenoid 1224 that is used to rotate the picker 1218 and comprises a plunger 1226 that is attached to the picker 1218; and (e) a stop 1228 that limits the rotation of the picker 1218 in one direction.

Also associated with the cartridge transport 214 is a wall structure 1230 that serves to counteract the rotation of a cartridge 224 that occurs during extraction of the cartridge 224 from a magazine 270 or insertion the cartridge 224 into the magazine 270 due to the manner in which the picker assembly 880 engages the cartridge 224.

It should also be appreciated that the cartridge transport 214 and the magazine transport 212 both comprise the elevator 750. As a consequence, elements of the cartridge transport 214 other than the elevator 750 and elements of the magazine transport 212 other than the elevator 750 are moved in unison by the elevator 750. This relationship makes possible bulk load and bulk unload operations. However, as will be appreciated by one skilled in the art, in other embodiments a cartridge transport and a magazine transport can each have an elevator that is capable of independent operation. Further, the operational ranges of the elevators can be substantially the same or different. Further, a cartridge transport with fewer actuators than those associated with the cartridge transport 214 is feasible. For example, a cartridge transport with elements that are functionally equivalent to all of the elements of the cartridge transport 214 described above, except for the elevator, could be mounted adjacent to a drive 180. In such an embodiment, a magazine transport would bring a magazine 270 into the operational range of the cartridge transport for the loading of cartridges 224 into the magazine 270 by the cartridge transport and the unloading of a cartridge 224 from the magazine 270 by the cartridge transport. In another possible embodiment, a cartridge transport with elements that are functionally equivalent to all of the elements of the cartridge transport 214 described above, except the elevator 750 and the horizontal transport 1052, could be mounted adjacent to a drive 180. In such an embodiment, the magazine transport would operate to bring magazines into the general operational range of the cartridge transport and the magazine picker would be used to position a specific slot of a magazine 270 for the loading and unloading of cartridges 224 by the cartridge transport. In any event, a cartridge transport is a device that is capable of moving a data cartridge 224 between a magazine 270 and a drive 180.

Figure 35A:
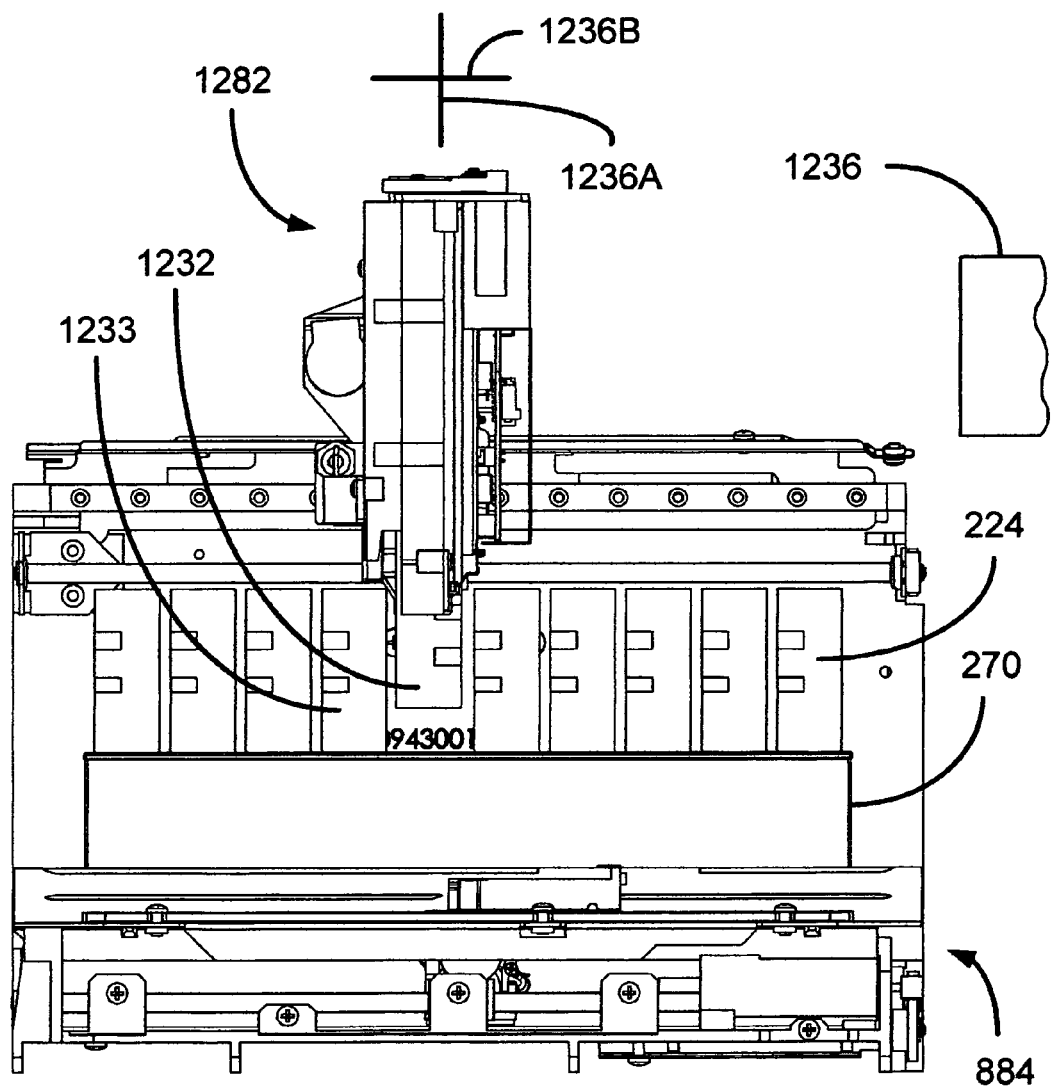
Figure 35B:
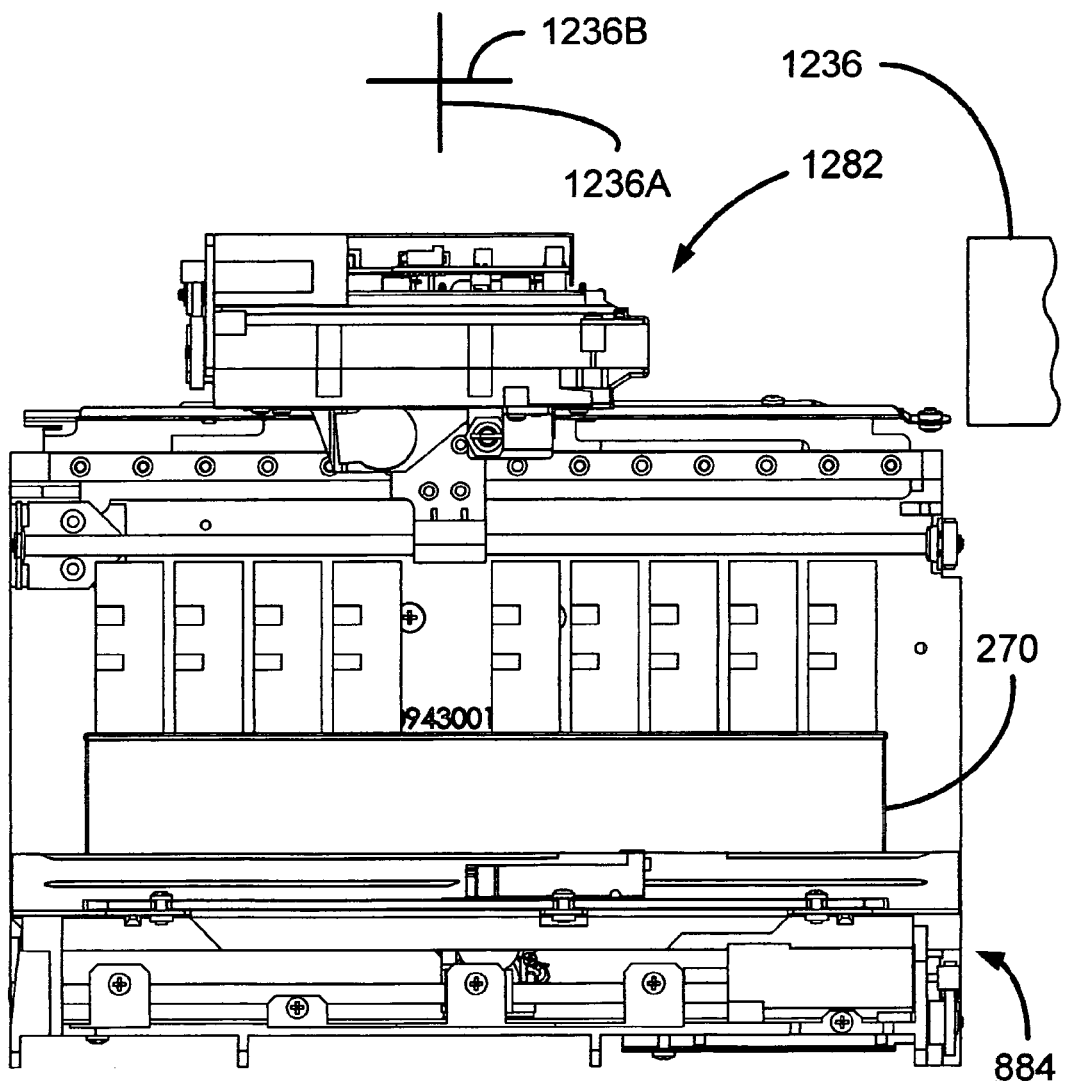
Figure 35C:
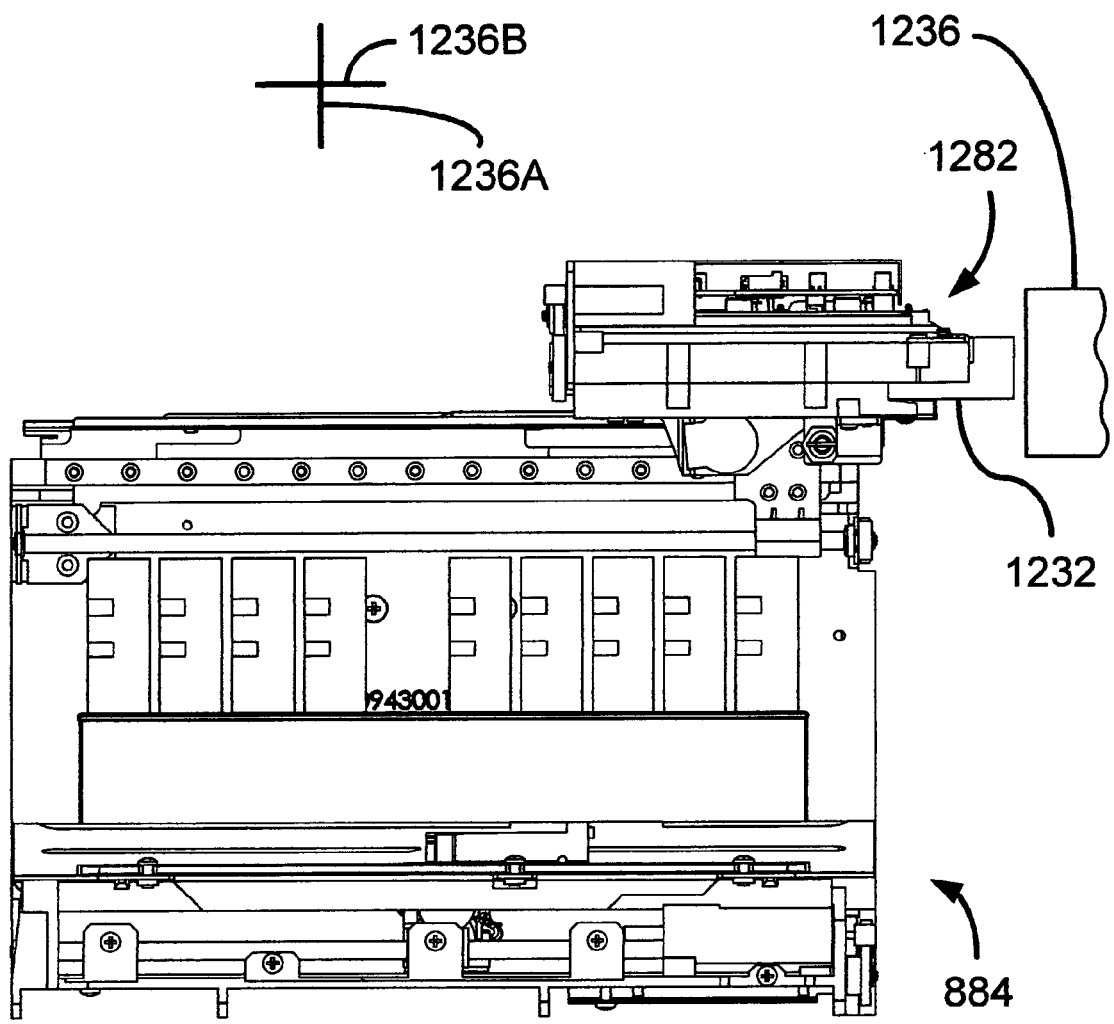

With reference to FIGS. 35A–35C, the operation of the cartridge transport 214 in moving a data cartridge 1232 from a magazine 270 to a drive 1236 is generally described. With reference to FIG. 35A, the magazine transport 212 has been used to move the magazine 270 from a storage location, such as a shelf of the shelf system 208 or the entry exit port 120, to the support structure 884. To elaborate, the magazine transport 212 has, if necessary, used the elevator 750 to position the magazine picker 880 and the support structure 884 adjacent to the whatever storage location was supporting the magazine 270. In this regard, one of the detectors 982, 984 was used to position the magazine picker 880 and the support structure 884. Further, the rotary assembly 1086 has likely been used to place the housing 1082 and the associated bar-code reader 1120 at an orientation that allows the bar-code reader 1120 to read a bar-code label associated with the magazine 270 to confirm that the appropriate magazine 270 is being accessed. Once the magazine picker 880 and support structure 884 were positioned adjacent to the storage location that was supporting the magazine 270, the magazine picker 880 and support structure 884 were used to move the magazine 270 from the storage location to the support structure 884. During the moving of the magazine 270 onto the support structure 884, the rotary assembly 1086 has been used to place housing 1082 and the associated bar-code reader 1120 at an orientation that allowed the bar code reader 1120 to read the bar-code labels associated with the cartridges 1232 and 224 in the magazine 270 to identify the desired cartridge, namely, cartridge 1232. In this regard, the rotary assembly 1086 is typically used to place the housing 1082 in the vertical orientation shown in FIG. 35A or at an angle that is between the vertical and horizontal planes 1236A, 1236B so that the bar-code reader 1120 can read the bar-codes associated with cartridges 1232 and 224 in the magazine 270.

With reference to FIG. 35A, after the magazine 270 has been positioned on the support structure 884 as shown in FIG. 35A or during the time when the magazine 270 is being positioned on the support structure 884, the horizontal transport unit 1052 and the rotary assembly 1086 are used, as needed, to position the opening 1084B of the housing 1082 to receive the data cartridge 1232. The linear drive assembly 1162 and the picker assembly 1164 are then used to draw the cartridge 1232 into the interior space 1084A of the housing 1082. The detector 1196 is used to determine when the cartridge 1232 has been fully retracted into the interior space 1084A of the housing 1082. At this point, it should be appreciated that: (a) the magazine 270 has oriented the cartridge 1232 (an LTO magazine 270 and cartridge 224) such that the face 226A of the cartridge 1232 with the greatest surface area lies in a vertical plane; and (b) that in extracting the cartridge 1232 from the magazine 270, the cartridge 1232 has been vertically displaced within the vertical plane.

At some point in retracting the cartridge 1232 into the housing 1082, the cartridge 1232 and elements of the cartridge transport 214 are situated so as not to interfere with any movement of the magazine 270. At this point, the magazine picker 880 can be used to transfer the magazine 270 from the support structure 884 to its original storage location or to another storage location, which may require the use of the elevator 750. Alternatively, the magazine 270 can be left on the support structure 884. Leaving the magazine 270 on the support structure 884 is desirable if, for example, a "bulk load" operation is to be performed.

In any event, after the picker assembly 1164 has engaged the cartridge 1232, the rotary assembly 1086 is used to rotate the housing 1082 and the grasped cartridge 1232 from the vertical orientation shown in FIG. 35A to the horizontal orientation shown in FIG. 35B. Typically, the rotary assembly 1086 rotates the housing 1082 after the cartridge 1232 has been completely retracted into the housing 1082. However, in certain circumstances, it is possible for the rotary assembly 1086 to rotate the housing 1082 during the period of time when the cartridge 1232 is being retracted into the housing 1082. For cartridges 224 located in the slots at or near the ends of the magazine 270, rotation of the housing 1082 to the horizontal orientation shown in FIG. 35B may also require that the horizontal transport unit 1052 horizontally and linearly translate the housing 1082 towards the center of the magazine 270 to prevent the housing 1082 from coming into contact with a shelf of the shelf system 208 or other element of the library 202. At this point, it should be appreciated that the cartridge 1232 has been rotated about a horizontal axis and about a horizontal axis that is parallel to the face of the cartridge 1232 with the greatest surface area, such as the face 226A.

With reference to FIG. 35C, the horizontal transport unit 1052 is used, as needed, to linearly and horizontally translate the housing 1082 and the cartridge 1232 in the direction required to insert the cartridge 1232 into the drive 1236. In addition, the elevator 750 and detector 984 (which operates in this instance to detect the flag 632 associated with the drive 1236) have been used, as needed, to position the housing 1082 so that when the housing 1082 is horizontally disposed as shown in FIGS. 35B and 35C, the opening of the housing 1082 is aligned with the receptacle, such as the receptacle 186 from FIG. 5A, of the drive 1236. The elevator 750 and detector 984 can be used to position the housing 1082 for insertion of the cartridge 1232 into the drive 1236 at any time after the magazine 270 has been loaded onto the support structure 1084. Once the opening 1084B of the housing 1082 has been aligned with the receptacle of the drive 1236, the cartridge 1232 is inserted into the drive 1236. In this regard, the linear drive assembly 1162 is used to expel the cartridge 1232 from the housing 1082 and into the drive 1236. The linear drive assembly 1162 typically begins expelling the cartridge 1232 after the opening 1084B has been disposed substantially adjacent to the receptacle of the drive 1236. However, the expulsion process can commence earlier. However, there may be risks associated with commencing the expulsion process earlier.

At this point, if the magazine 270 is still associated with the support structure 884, a bulk load operation can be performed, if desired. In a bulk load operation, the housing 1082 is repositioned using the horizontal transport unit 1052 and the rotary assembly 1056, as needed, so that a second cartridge 1233 in the magazine 270 can be grasped. The second cartridge 1233 is grasped and then oriented for insertion into a second drive (not shown) in the same manner as previously described with respect to the cartridge 1232. Further, the elevator 750 is used to position the housing 1082 for insertion of the second cartridge 1233 into the second drive. The disclosed bulk load operation can be used to transfer a desired number of cartridges 224 from a magazine 270 for use with a commensurate number of drives 180.

It should also be noted at this point that the process for moving a data cartridge, such as cartridge 1232, from a magazine 270 to a drive, such as drive 1236, involved the use of the magazine picker 880 to move a magazine 270 onto the support structure 884 such that the magazine 270 was no longer associated with a storage location and completely supported by the support structure 884. If only one cartridge 1232 is to be moved from a magazine 270 to a drive 1236, an alternative process potentially avoids the need to fully extract the magazine 270 from its storage location. In this process, the magazine picker 880 terminates the extraction of a magazine 270 from a storage location after the desired cartridge 1232 has been exposed and is capable of being grasped. In one embodiment, the horizontal transport unit 1052 is used to position the housing 1082 as close to the storage location from which the magazine 270 is to be extracted as is feasible. Further, the rotary assembly 1086 places the housing 1082 in the vertical orientation shown in FIG. 35B. With the housing 1082 positioned by the horizontal transport unit 1052 and the rotary assembly 1086 in this manner, the desired cartridge 1232 can be grasped quickly once it is exposed. To elaborate, the signal provided by the bar-code reader 1120 once the desired cartridge 1232 is exposed and detected is used to terminate the operation of the magazine picker 880 such that the desired cartridge 1232 is positioned underneath the opening 1084B of the housing 1082. It should be appreciated that if the slot in the magazine 270 in which the desired cartridge 1232 is located is known beforehand, this information can be used to terminate the operation of the magazine picker 880 such that the desired cartridge 1232 is positioned underneath the opening 1084B of the housing 1082. In any event, extraction of the cartridge 1232 from the magazine 270 proceeds as previously described. However, if the magazine 270 has not been completely extracted from its storage location, a decision must be made as to whether to proceed with the extraction of the magazine 270 from its storage location or proceed to reinsert the magazine 270 into its storage location because the elevator 750 cannot be used to move the grasped cartridge 1232 to a drive 1236 until the magazine 270 is substantially removed from its storage location or substantially inserted into its storage location. In either case, once the magazine 270 has been substantially removed from its storage location or substantially returned to its storage location, the grasped cartridge 1232 is moved to a drive 1236 as previously described.

The operation of the cartridge transport 214 in moving the data cartridge 1232 from a drive 1236 to a magazine 270 is generally described with reference to FIGS. 35A–35C. With reference to FIG. 35C, the elevator 750 and the detector 984 have been used to grossly position the housing 1082 adjacent to the drive 1236, which holds the cartridge 1232. Further, the horizontal transport unit 1052 and the rotary assembly 1086 have been used, as needed, to orient the housing 1082 as shown in FIG. 35C. Consequently, through the operation of the elevator 750, horizontal transport 1052 and the rotary assembly 1086, as needed, the housing 1082 has been positioned to receive the cartridge 1232 from the drive 1236. Although FIG. 35C shows the magazine 270 on the support structure 884, the magazine 270 may or may not be associated with the support structure 884 when the housing 1082 is positioned to receive the cartridge 1232 from the drive 1236. If the magazine 270 is associated with the support structure 884, a "bulk unload" operation can be performed, if desired. In any event, the linear drive assembly 1162 and picker assembly 1164 operate to extract the cartridge 1232 from the drive 1236.

With reference to FIGS. 35B and 35C, once the cartridge 1232 is substantially clear of the drive 1236, the horizontal transport unit 1052 (as needed) and the rotary assembly 1086 are used to position the housing 1082 and the grasped cartridge 1232 for insertion into the magazine 270. Even though the housing 1082 and the grasped cartridge 1232 are being position for insertion of the cartridge 1232 into the magazine 270, it should be appreciated that the magazine 270 may or may not be associated with the support structure 1084 during this positioning of the housing 1082 and the grasped cartridge 1232. At this point, it should be appreciated that the cartridge 1232 has been rotated about a horizontal axis and about a horizontal axis that is parallel to the face, such as the face 226A, of the cartridge 1232 with the greatest surface area. After the cartridge 1232 is substantially clear of the drive 1236, the elevator 750 and one of the detectors 982, 984 is used to position the magazine picker 880 and the support structure 884 adjacent to the storage location of the magazine 270.

After the housing 1082 and the grasped cartridge 1232 have been positioned as shown in FIG. 35A, the cartridge 1232 is positioned for insertion into the magazine 270. Although FIG. 35A shows the magazine 270 as being on the support structure 884, the magazine 270 may not yet be associated with the support structure 884. In any event, before insertion of the cartridge 1232 into the magazine 1236 can be accomplished, the magazine 270 is positioned on the support structure 884 as shown in FIG. 35A. If the magazine 270 was not associated with the support structure 884 when the housing 1082 was positioned to receive the cartridge 1232 from the drive 1236, the magazine 270 is extracted from its storage location after the elevator 750 has appropriately positioned the support structure 884 adjacent to the storage location of the magazine 270. Once the housing 1082 and grasped cartridge 1232 and the magazine 270 are positioned as shown in FIG. 35A, the linear drive assembly 1162 and the picker assembly 1164 operate to expel the cartridge 1232 from the housing 1082 into the magazine 270. It should be noted at this point that in inserting the cartridge 1232 into the magazine 270: (a) the cartridge 1232 was oriented such that the face, such as the face 226A, of the cartridge 1232 with the greatest surface area lay in a vertical plane; and (b) that the cartridge 1232 was vertically displaced within the vertical plane.

It should be noted that if the magazine 270 was associated with the support structure 884 when the housing 1082 was positioned to receive the cartridge 1232 from the drive 1236, a "bulk unload" operation can be performed in which the cartridge 1232 is returned to the magazine 270 as described except that before the elevator 750 and magazine picker 880 are used to return the magazine 270 to its storage location, the elevator 750, horizontal transport unit 1052, rotary assembly 1086 and grasper assembly 1160 are used to move additional cartridges 224 from other drives 180 to the magazine 270.

It should also be noted that in the situation in which the magazine 270 is not associated with the support structure 884 when the housing 1082 is positioned to receive a cartridge 224 from a drive 180, a process in which a cartridge 224 can be returned to a magazine 270 in many cases without fully extracting the magazine 270 from its storage location can be implemented. To elaborate, the if the magazine 270 was not associated with the support structure 884 when the housing 1082 was positioned to receive the cartridge 1232, the magazine 270 must be extracted from its storage location after the cartridge 1232 has been extracted from the drive 1236 and the elevator 750 has positioned the support structure 884 adjacent to the storage location for the magazine 270. In this process, the magazine picker 880 terminates the extraction of a magazine 270 from a storage location after the desired cartridge 1232 has been exposed and is capable of being grasped. In one embodiment of the process, the magazine picker 880 terminates the extraction of a magazine 270 from its storage location after the slot in the magazine 270 that is to store the cartridge 1232 has been exposed. In one embodiment, the horizontal transport unit 1052 is used to position the housing 1082 as close to the storage location from which the magazine 270 is to be extracted as is feasible. Further, the rotary assembly 1086 places the housing 1082 in the vertical orientation shown in FIG. 35B. With the housing 1082 positioned by the horizontal transport unit 1052 and the rotary assembly 1086 in this manner, the cartridge 1232 can be inserted into the magazine 270 shortly after the slot in the magazine 270 that is to retain the cartridge 1232 is exposed. To elaborate, signals provided by the operation of the center position flag 920 in conjunction with the first sensor assembly 942 and an encoder associated with the motor 914 are used to determine when the slot in the magazine 270 in which the magazine 270 is to be placed is exposed and uses these signals to terminate the operation of the magazine picker 880 such that the desired cartridge 1232 is positioned underneath the opening 1084B of the housing 1082. At this point, the linear drive assembly 1162 and the picker assembly 1164 operate to insert the cartridge 1232 into the magazine 270. Once the cartridge 1232 is sufficiently inserted into the magazine 270, the magazine picker 880 operates to return the magazine 270 to its storage location.

It should also be appreciated that the magazine 270 from which a cartridge 224 is extracted does not have to be the magazine 270 to which the cartridge 224 is later returned.

If desired, the cartridge transport 214 can also be used to move the cartridge 1232 from one drive 180 to another drive 180. To move the cartridge 1232 from one drive 180 to another drive 180, the elevator 750, horizontal transport unit 1052, and rotary assembly 1086 are used to position the housing 1082 as shown in FIG. 35C to receive the data cartridge 1232 from the drive 1236. Once the housing 1082 has been positioned to receive the data cartridge 1232 from the drive 1236, the linear drive assembly 1162 and the picker assembly 1164 are used to extract the cartridge 1232 from the drive 1236. After the cartridge 1232 has been extracted from the drive 1236, the elevator 750 is used to position the housing 1082 and the grasped cartridge 1232 for insertion into another one of the drives 180.

Figure 36A:
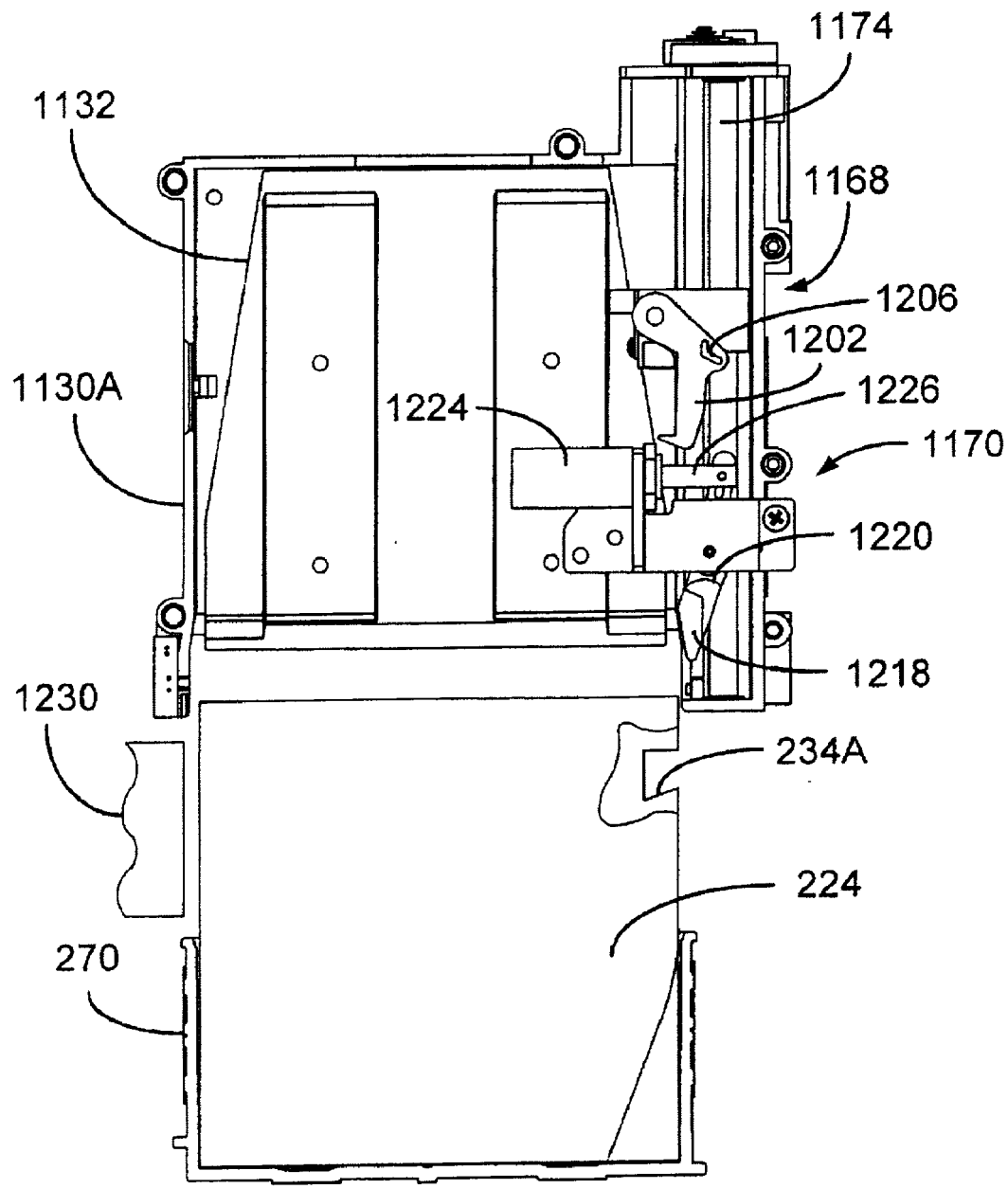

With reference to FIGS. 36A–36G, having generally described the use of the cartridge transport 214 in moving a data cartridge 224 between a magazine 270 and a drive 180, the operation of the picker assembly 1164 (which is comprised of the finger/thumb assembly 1168 and the finger actuation assembly 1170) and the linear drive assembly 1162 is described with respect to the: (a) picking or removing of a cartridge 224 from a magazine 270; and (b) loading of a previously grasped cartridge 224 into the magazine 270. FIGS. 36A–36F, when viewed in sequence, illustrate the operation of the picker assembly 1164 and the linear drive assembly 1162 in picking an LTO cartridge magazine 270 with a picker notch 234A from a magazine 270. With reference to FIG. 36A, (a) the elevator 750, horizontal transport unit 1052, and rotary assembly 1086 have, as needed, positioned the housing 1082 so that the opening 1084B is adjacent to the cartridge 1240; (b) the linear drive assembly 1162 has positioned the finger/thumb assembly 1168 within the housing 1082; and (c) the finger actuation assembly 1164 has positioned the picker 1218 so that the picker 1218 essentially has no effect upon the finger 1202 during the extraction operation. More specifically, the solenoid 1224 has fully extended the plunger 1226. As a consequence, the picker 1218 is positioned such that further rotation is prevented by the stop 1228.

Figure 36B:
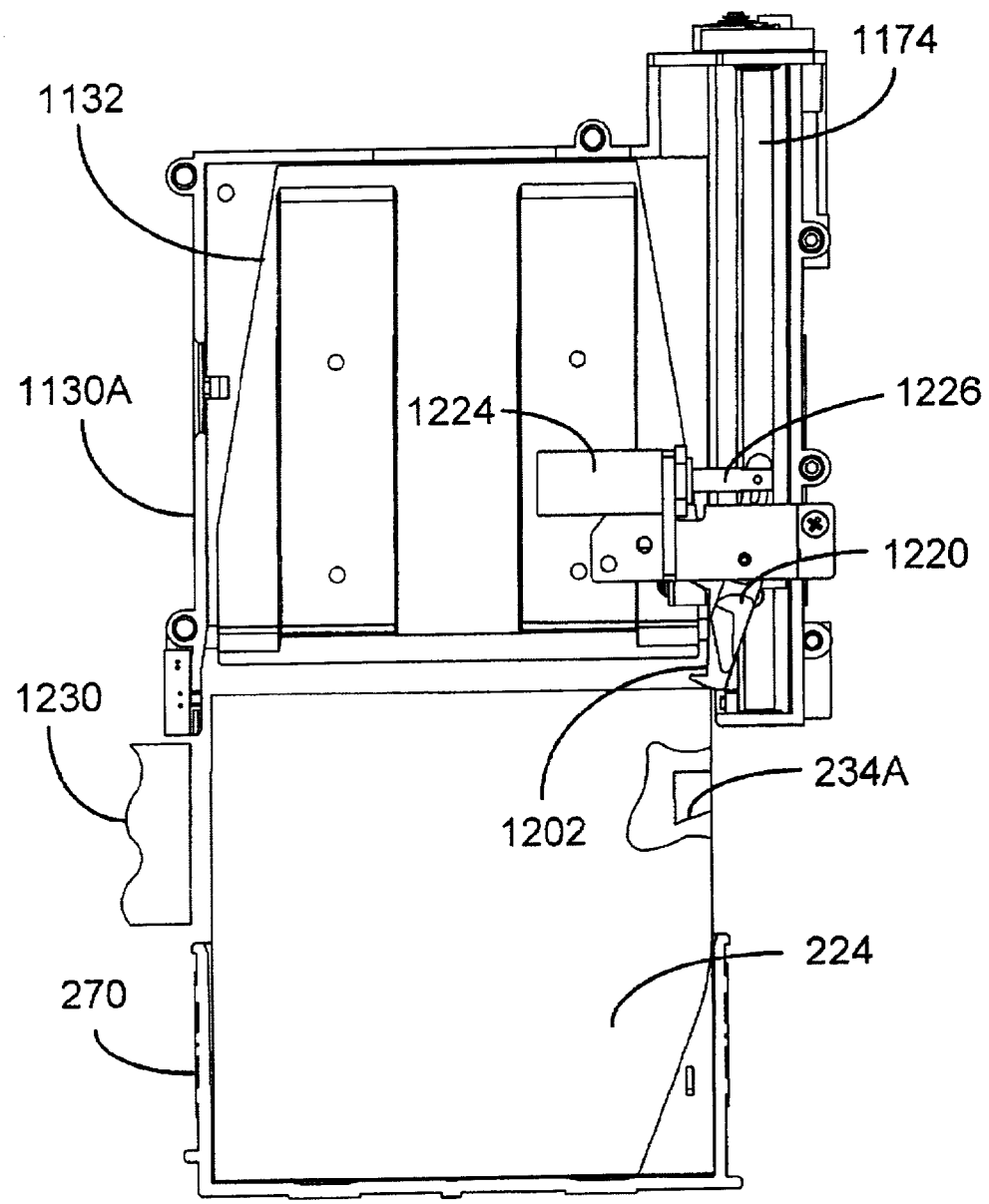
Figure 36C:
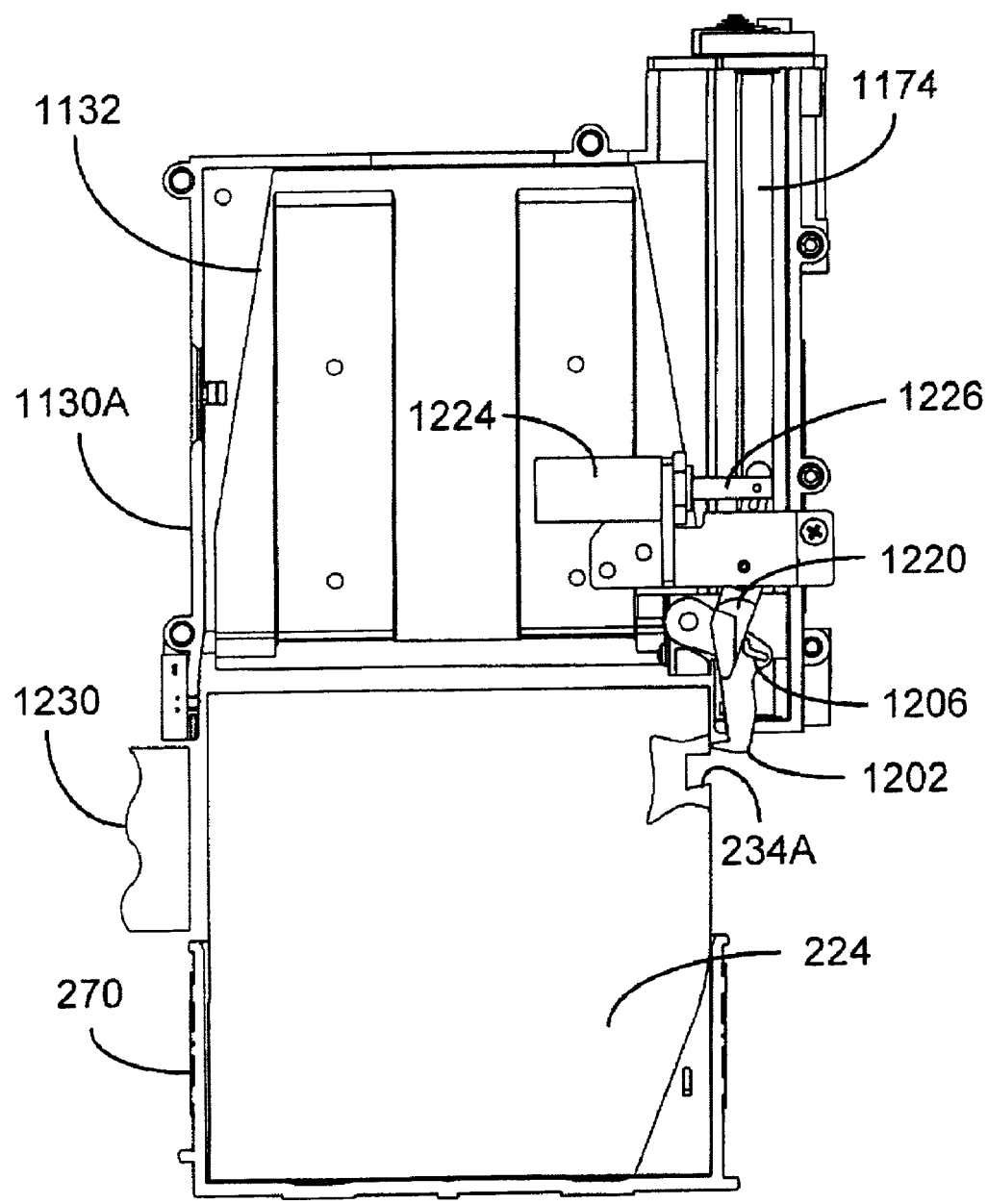
Figure 36D:
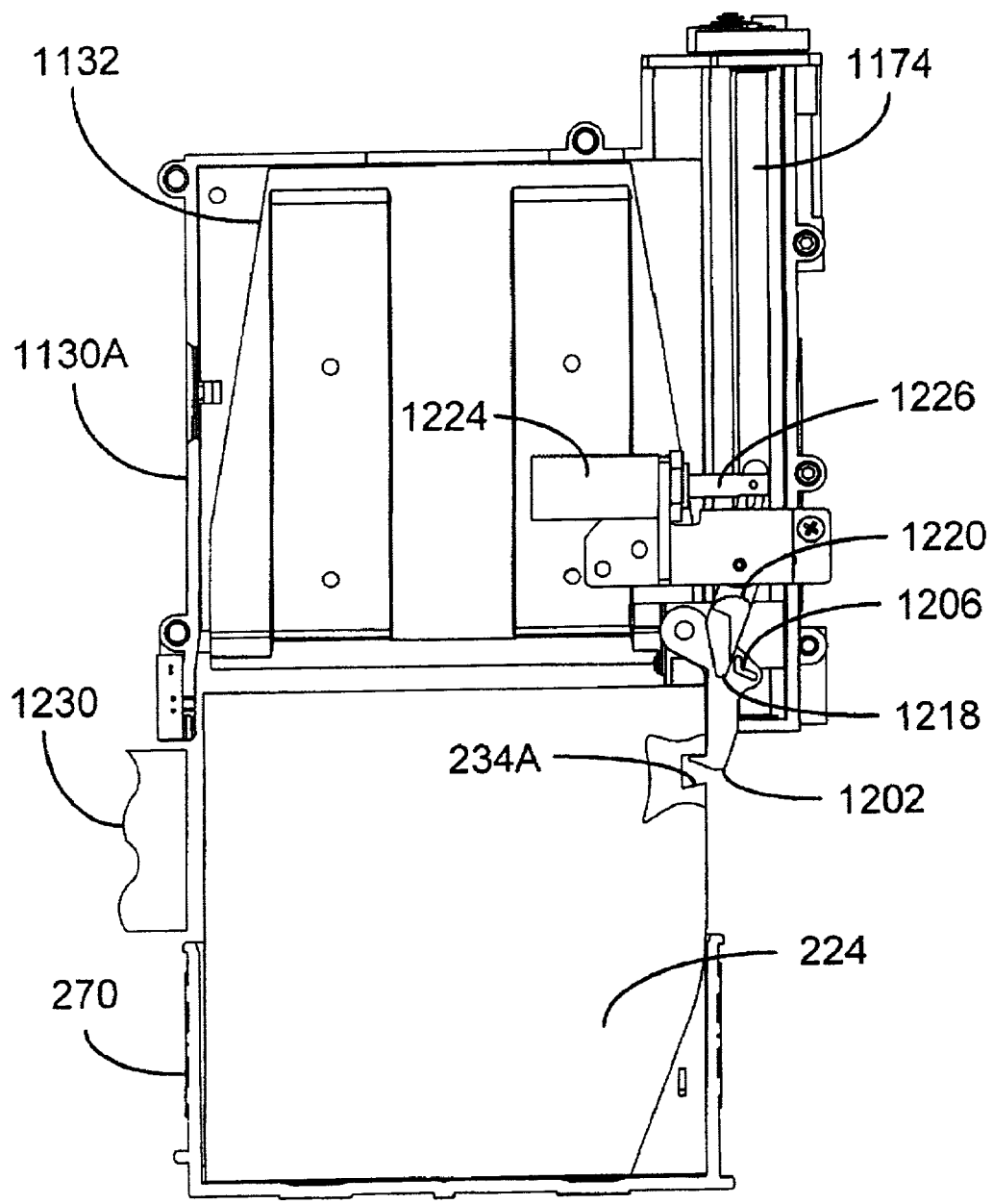
Figure 36E:
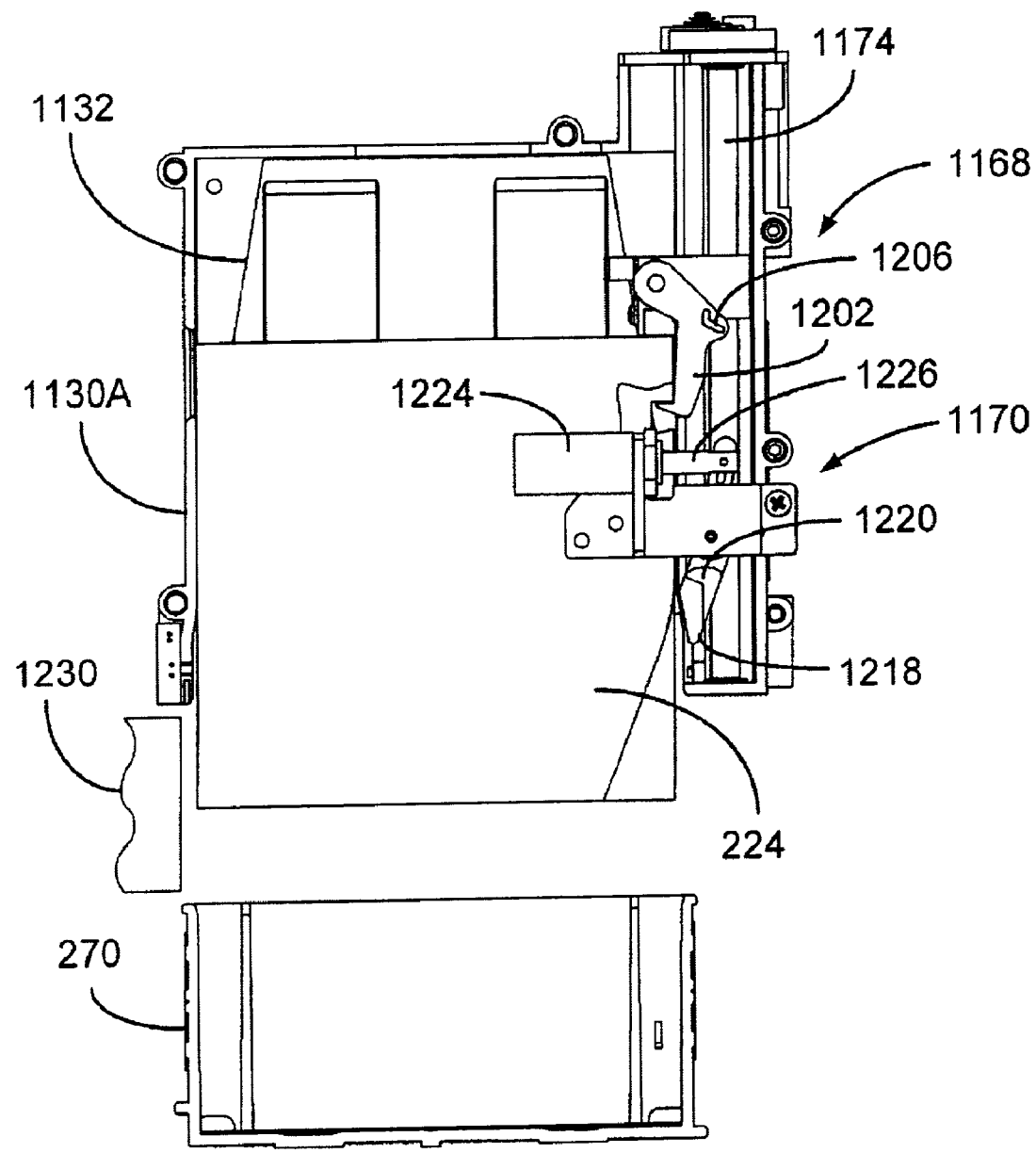

With reference to FIG. 36B, the DC motor 11.76 of the linear drive assembly 1162 has been used to displace the finger/thumb assembly 1168 along the lead screw 1174 and towards the cartridge 1240. At this point, the finger 1202 has engaged the top end 230A of the cartridge 1240. With reference to FIG. 36C, as the linear drive assembly 1162 displaces the finger/thumb assembly 1168 further towards the cartridge 1240, the interaction of the finger 1202 with the surfaces of the cartridge 1240 causes the finger 1202 to rotate away from the cartridge 1240 such that energy is stored in the return spring 1210. With reference to FIGS. 36C and 36D, further displacement of the finger/thumb assembly 1168 towards the cartridge 1240 eventually results in the finger 1202 reaching the notch 234A. At this point, the energy stored in the return spring 1210 causes the finger 1202 to engage the notch 234A. With the notch 234A engaged, the cartridge 1240 can now be extracted from the magazine 270. With reference to FIG. 36E, after the notch 234A has been engaged, the linear drive assembly 1162 operates so as to displace the finger/thumb assembly 1168 and the cartridge 1240 away from the magazine 270. The wall 1230 serves to counteract rotation of the cartridge 1240 during the extraction. The linear drive assembly 1162 continues the displacement of the finger/thumb assembly 1168 and the cartridge 1240 away from the magazine 270 until the cartridge 1240 is fully within the housing 1082, as shown in FIG. 36F.

Figure 36F:
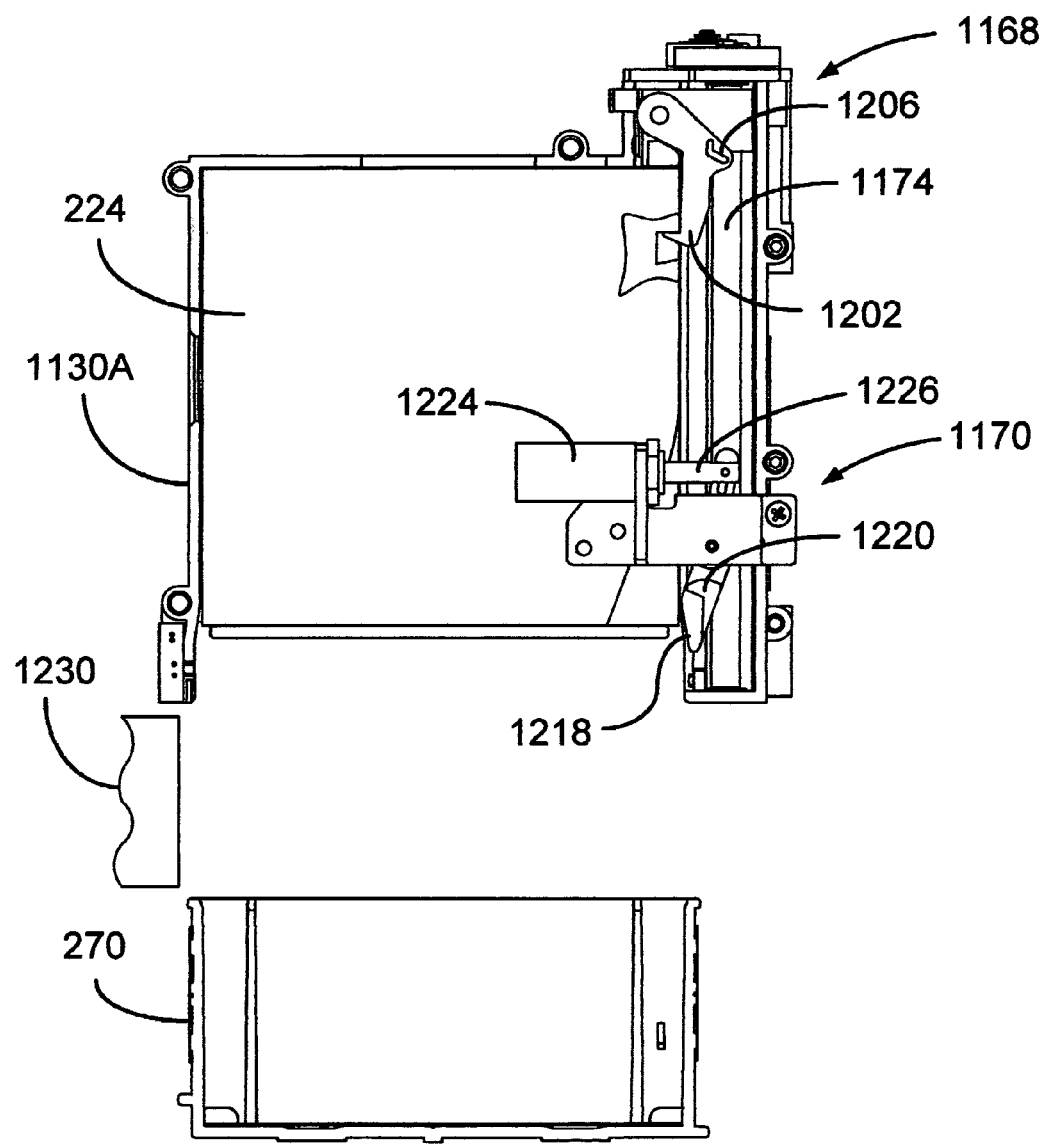

FIGS. 36F, 36E, 36D and 36G illustrate the operation of the picker assembly 1164 and the linear drive assembly 1162 in loading the LTO cartridge 270 into the magazine 270. With reference to FIG. 36F, (a) the elevator 750, horizontal transport unit 1052, and rotary assembly 1086 have, as needed, positioned the housing 1082 so that the opening 1084B is adjacent to the slot of the magazine 270 which is to hold the cartridge 1240; (b) the linear drive assembly 1162 and the finger/thumb assembly 1168 are operating to retain the cartridge 1240 within the housing 1082; and (c) the finger actuation assembly 1164 has positioned the picker 1218 so that the picker 1218 will not have an effect upon the finger 1202 during insertion of the cartridge 1240 into the magazine 270. More specifically, the solenoid 1224 has fully extended the plunger 1226. As a consequence, the picker 1218 is positioned such that further rotation is prevented by the stop 1228.

Figure 36G:
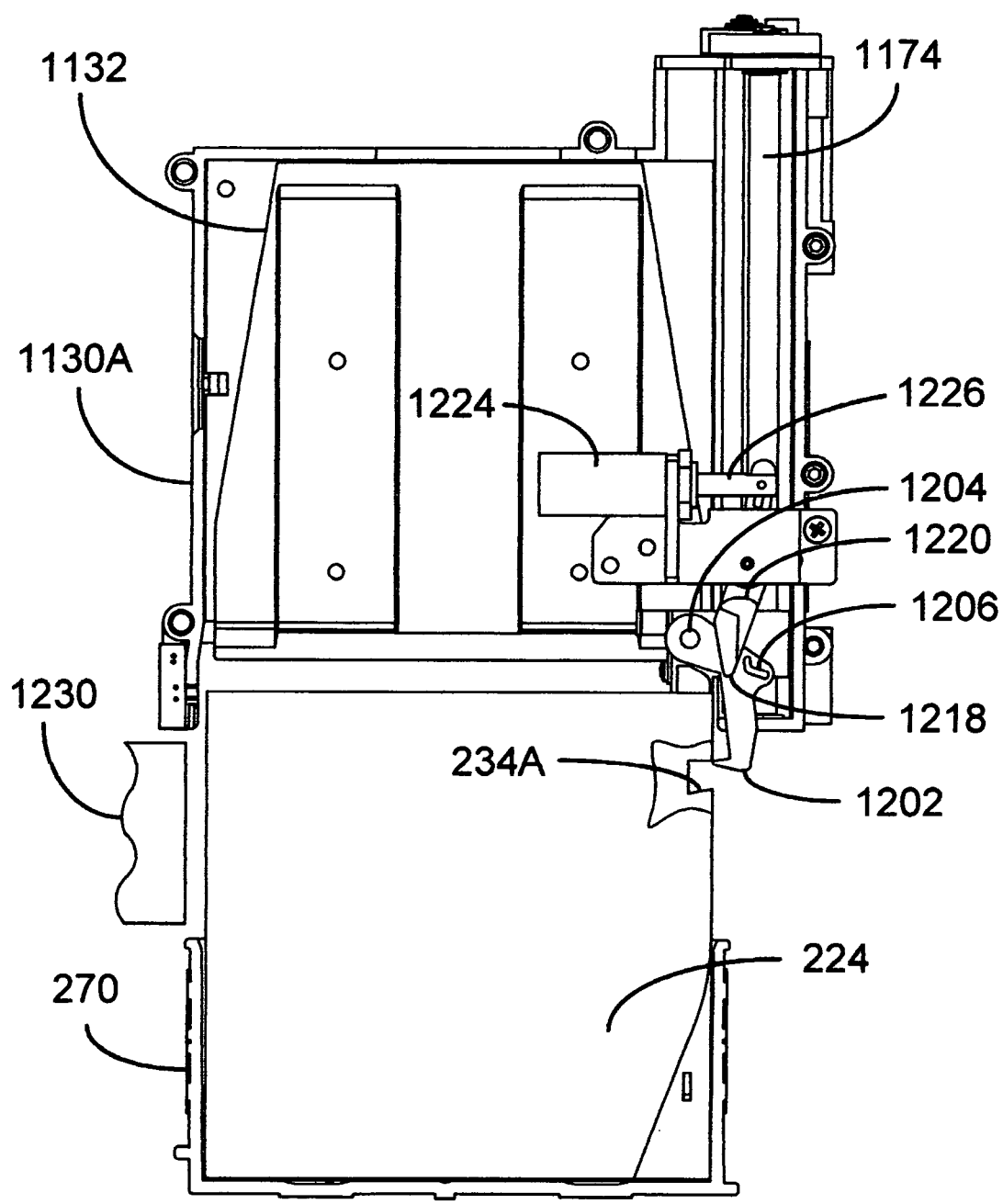

With reference to FIG. 36E, the linear drive assembly 1162 has been used to displace the finger/thumb assembly 1168 and the cartridge 1240 along the lead screw 1174 and towards the magazine 270. With reference to FIG. 36D, the linear drive assembly 1162 has continued to displace the finger/thumb assembly 1168 and the cartridge 1240 along the lead screw 1174 and towards the magazine 270 until the cartridge 1240 is fully loaded into the magazine 270. During the displacement of the cartridge 1240 towards the magazine 270, the wall 1230 has served to counteract rotation of the cartridge 1240. At this point, the picker cam surface 1220 of the picker 1218 is disposed between the finger cam 1206 of the finger 1202 and the pivot shaft 1204 of the finger 1202. To disengage the finger 1202 from the notch 234A of the cartridge 1240 and release the cartridge 1240, the solenoid 1224 is operated so as to retract the plunger 1226 and thereby rotate the picker 1218. Rotation of the picker 1218 pushes the finger 1202 away from the cartridge 1240 as shown in FIG. 36G. At this point, loading of the cartridge 1240 into the magazine 270 is complete.

Figure 37A:
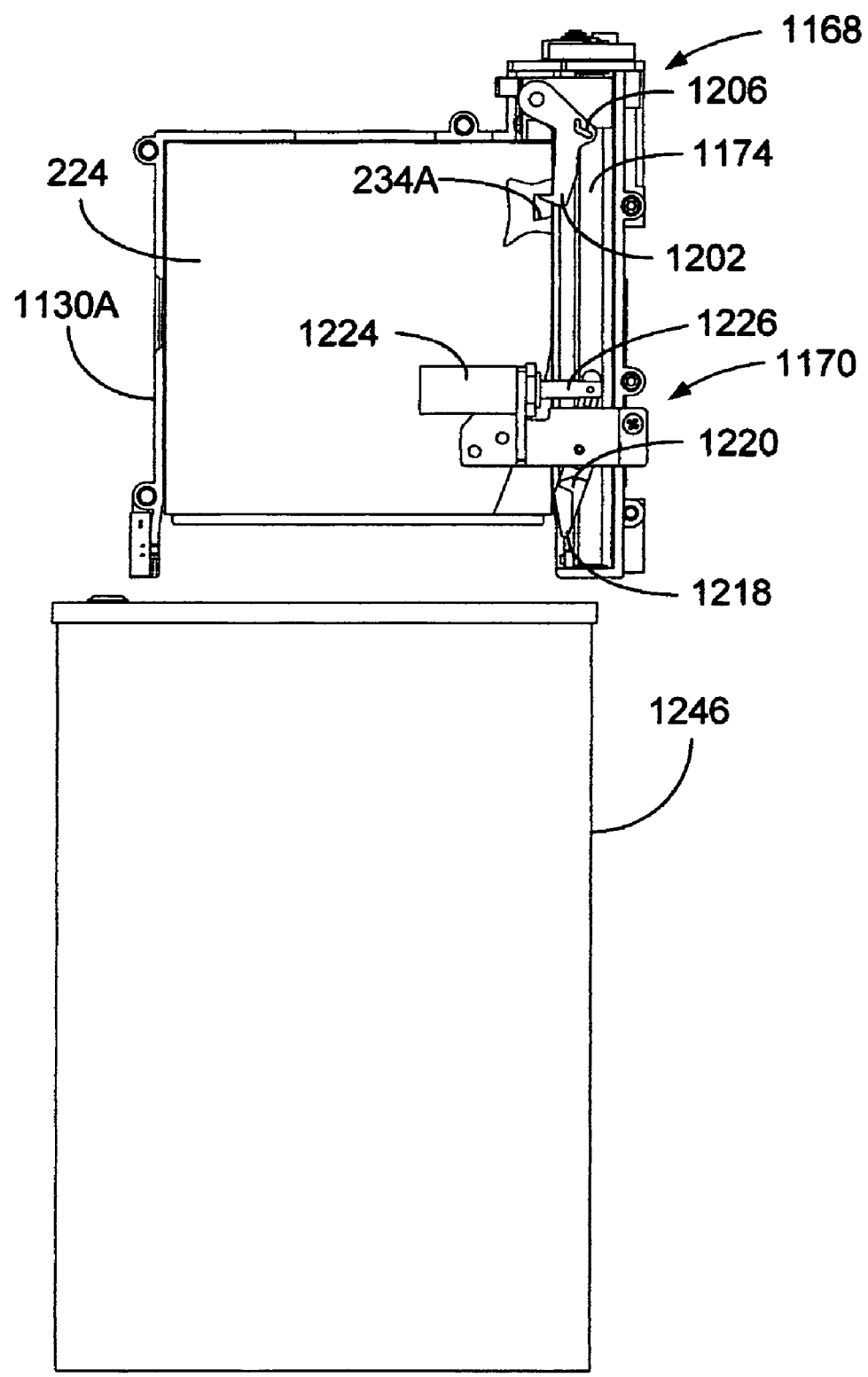

FIGS. 37A–37D, when viewed in sequence, illustrate the operation of the picker assembly 1164 and the linear drive assembly 1162 in loading the LTO cartridge 1240 into a drive 1246. With reference to FIG. 37A, (a) the elevator 750, horizontal transport unit 1052, and rotary assembly 1086 have, as needed, positioned the housing 1082 so that the opening 1084B is adjacent to the receptacle, such as the recepticle 186 from FIG. 5A, of the drive 1246; (b) the linear drive assembly 1162 and the finger/thumb assembly 1168 are operating to retain the cartridge 1240 within the housing 1082; and (c) the finger actuation assembly 1164 has positioned the picker 1218 so that the picker 1218 will not have an effect upon the finger 1202 at this point in time. More specifically, the solenoid 1224 has fully extended the plunger 1226. As a consequence, the picker 1218 is positioned such that further rotation is prevented by the stop 1228.

Figure 37B:
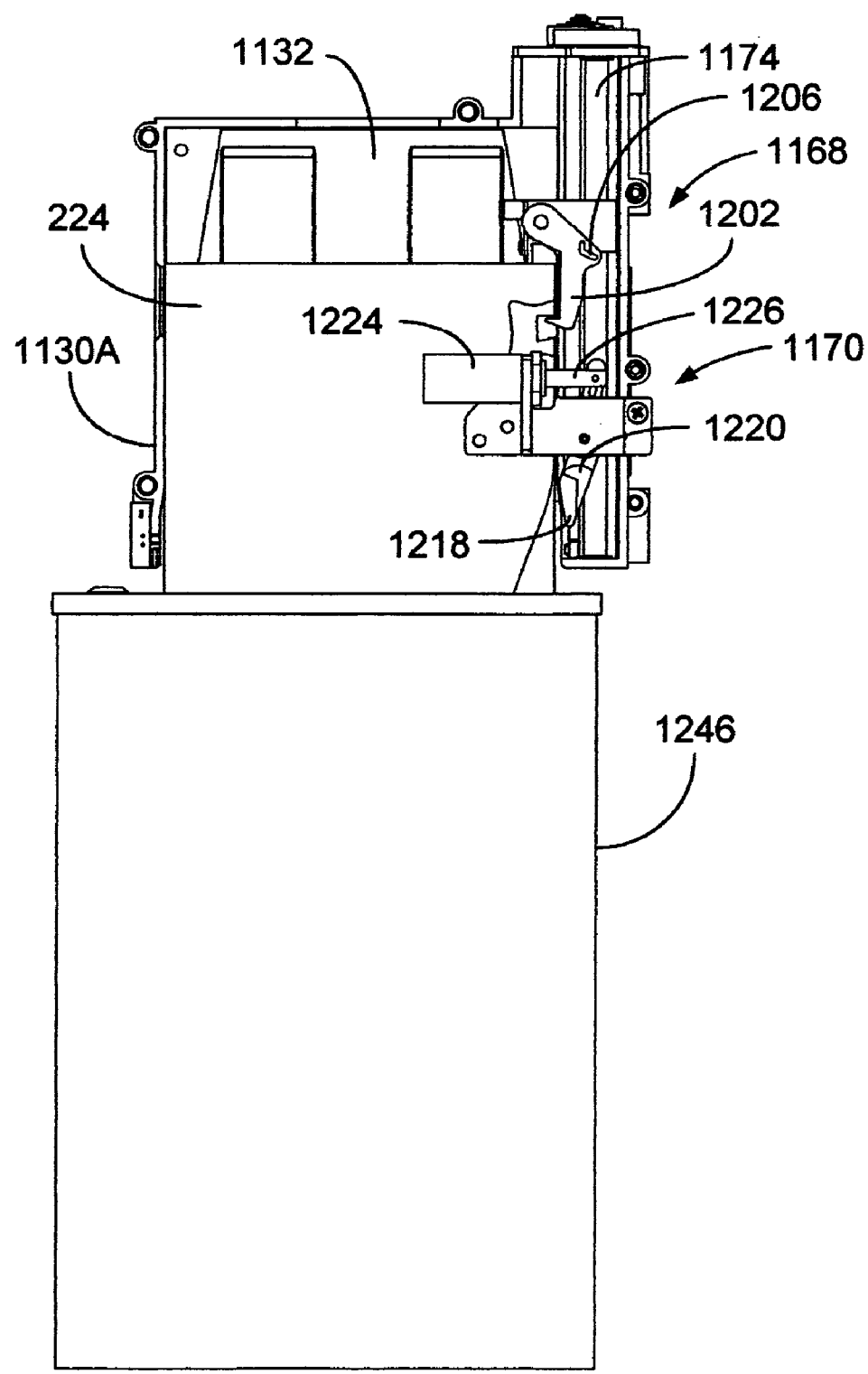
Figure 37C:
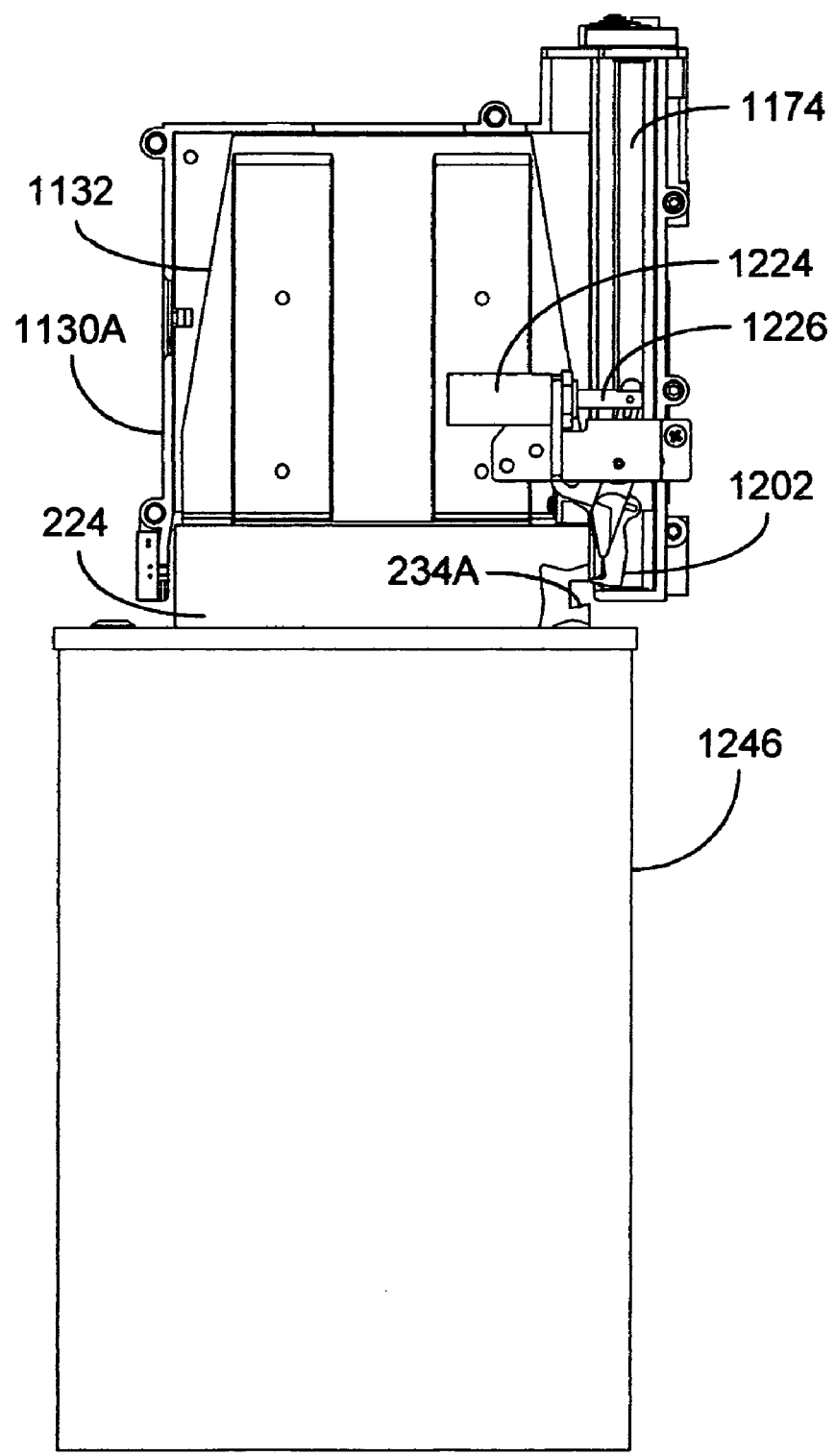
Figure 37D:
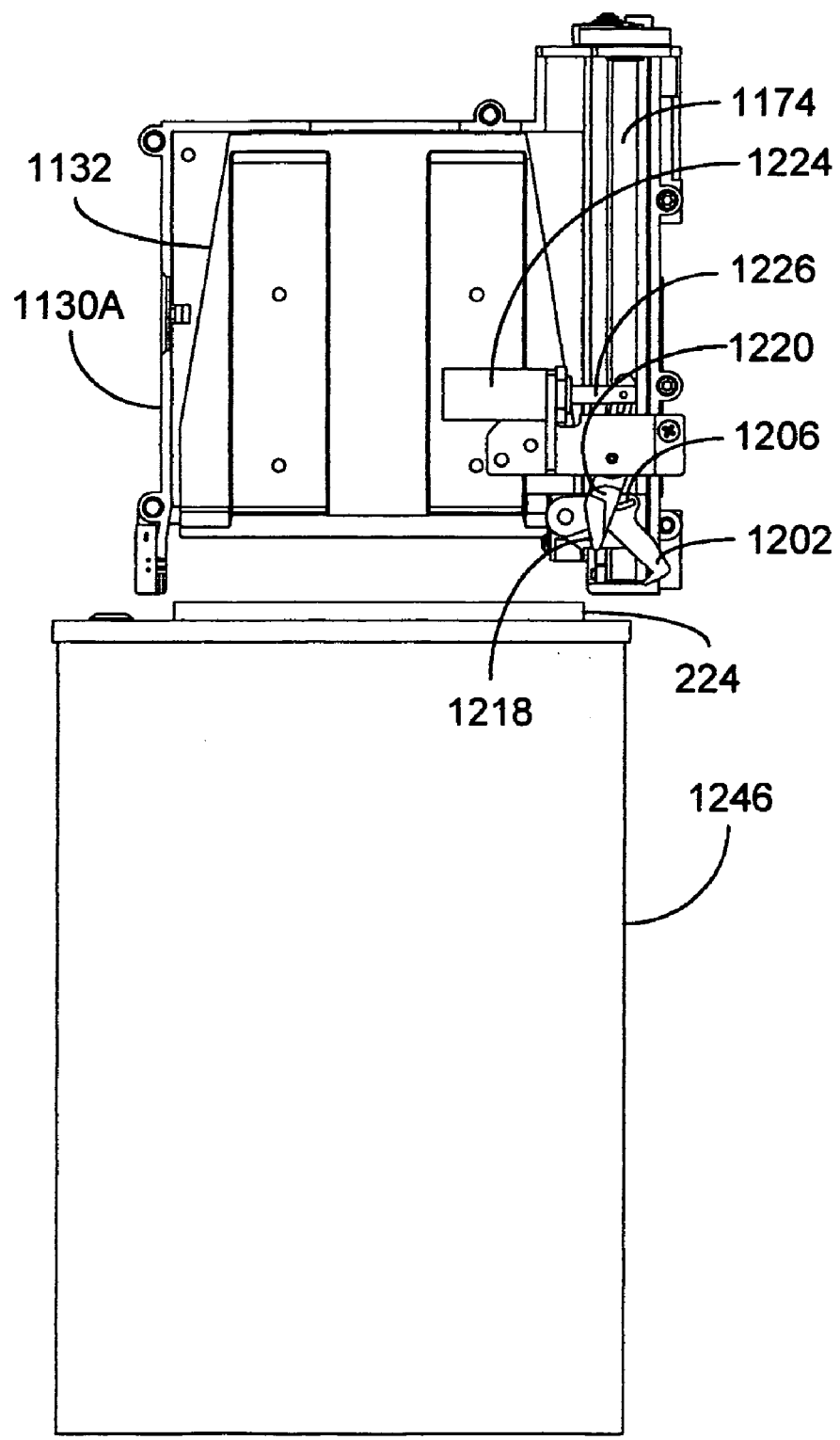

With reference to FIG. 37B, the linear drive assembly 1162 has been used to displace the finger/thumb assembly 1168 and the cartridge 1240 along the lead screw 1174 and towards the drive 1246. In addition, before the displacement of the finger/thumb assembly 1168 along the lead screw 1174 by the linear drive assembly 1162 reaches a point at which the finger cam 1206 of the finger 1202 could contact with the picker cam surface 1220, the finger actuation assembly 1164 has positioned the picker 1218 the picker 1218 so that the picker cam surface 1220 will cause the finger 1202 to rotate away from the cartridge 1240 and release the cartridge 1240 earlier than occurs during the loading of a cartridge 1240 into a magazine 270. More specifically, the solenoid 1224 has been operated so as to fully retract the plunger 1226 and thereby position the picker cam surface 1220 of the picker 1218 to interact with the finger cam 1206 of the finger 1202 to release the cartridge 1240 earlier than in the magazine loading operation. With reference to FIGS. 37C and 37D, further displacement of the picker/thumb assembly 1168 by the linear drive assembly 1162 eventually causes the picker cam surface 1220 to engage the finger cam 1206. After the picker cam surface 1220 has engaged the finger cam 1206, further displacement of the picker/thumb assembly 1168 towards the drive 1246 results in the picker cam surface 1220 applying a force to the finger 1202, via the finger cam 1206, that causes the finger 1202 to rotate about the pivot shaft 1204 and away from the cartridge 1240, thereby releasing the cartridge 1240 to the drive 1246. Comparison of FIG. 37C to FIG. 36G shows that the operation of the finger actuation assembly 1164 in the loading of the cartridge 1240 into the drive 1246 causes the finger 1202 to release the cartridge 1240 earlier than in the case of loading the cartridge 1240 into the magazine 270.

Figure 37E:
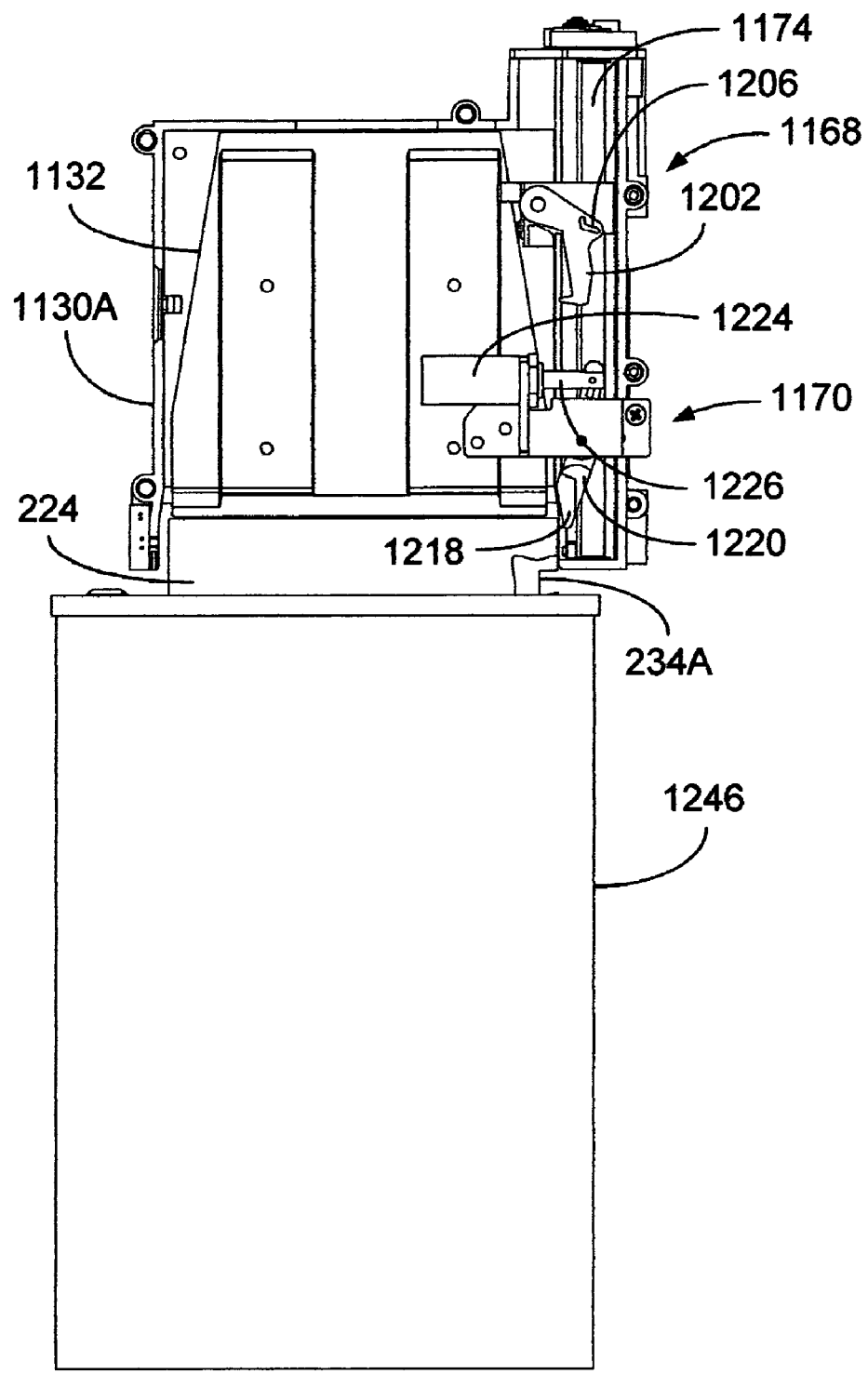

FIGS. 37E, 37F, 37G and 37A, when viewed in sequence, illustrate the operation of the picker assembly 1164 and the linear drive assembly 1162 in picking an LTO cartridge 1244 with a picker notch 234A from the drive 1246. With reference to FIG. 37E, (a) the elevator 750, horizontal transport unit 1052, and rotary assembly 1086 have, as needed, positioned the housing 1082 so that the opening 1084B is adjacent to the drive 1246; (b) the linear drive assembly 1162 has positioned the finger/thumb assembly 1168 within the housing 1.082; and (c) the finger actuation assembly 1164 has positioned the picker 1218 so that the picker 1218 essentially has no effect upon the finger 1202 during the extraction operation. More specifically, the solenoid 1224 has fully extended the plunger 1226. As a consequence, the picker 1218 is positioned such that further rotation is prevented by the stop 1228.

Figure 37F:
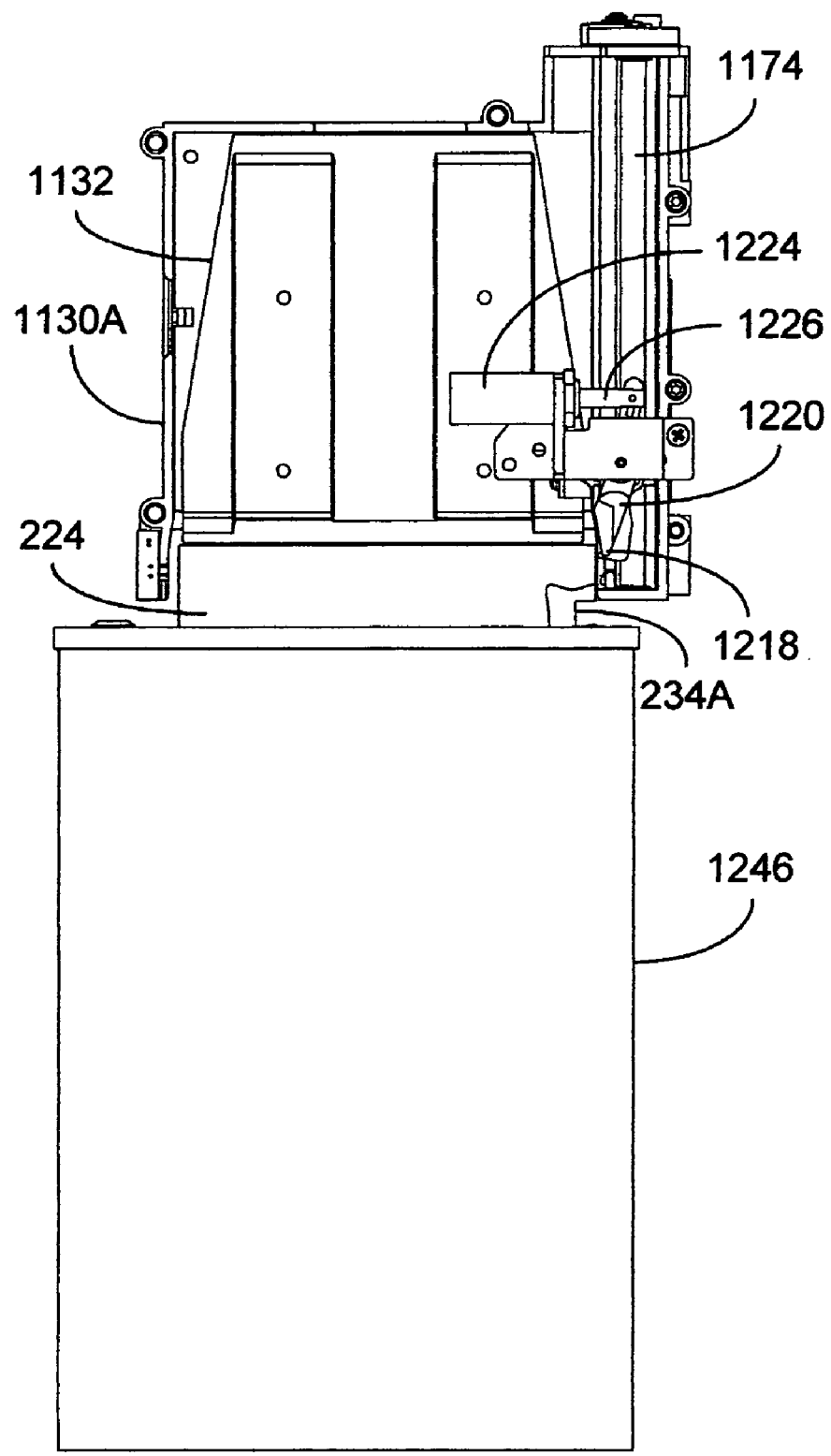
Figure 37G:
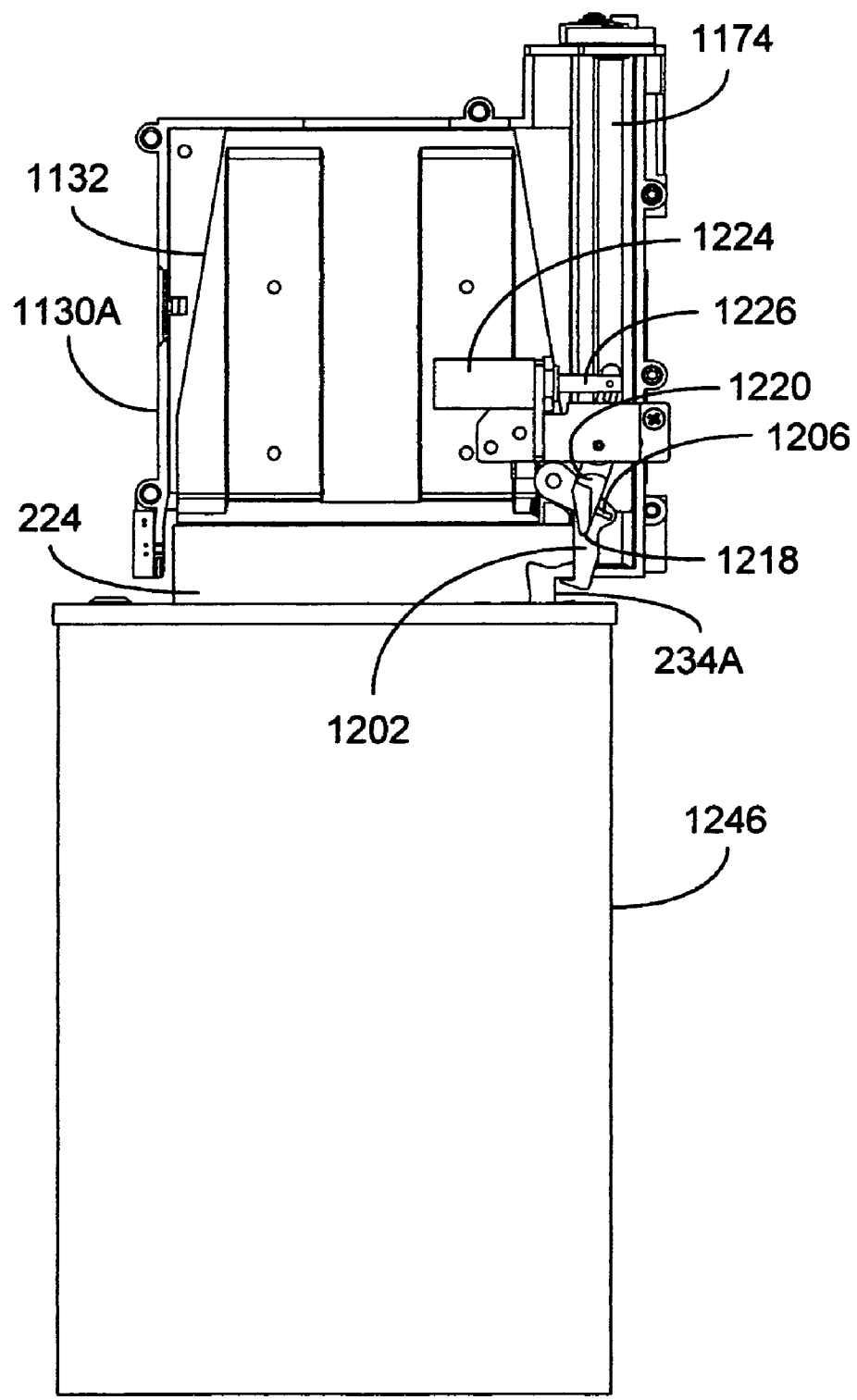

With reference to FIG. 37F, the DC motor 1176 of the linear drive assembly 1162 has been used to displace the finger/thumb assembly 1168 along the lead screw 1174 and towards the drive 1246. At this point, the finger 1202 has engaged the cartridge 1240 and the interaction of the finger 1202 with the surfaces of the cartridge 1240 has caused the finger 1202 to rotate away from the cartridge 1240 such that energy is stored in the return spring 1180. With reference to FIG. 37G, further displacement of the finger/thumb assembly 1168 towards the cartridge 1240 eventually results in the finger 1202 reaching the notch 234A. At this point, the energy stored in the return spring 1180 causes the finger 1202 to engage the notch 234A. With the notch 234A engaged, the cartridge 1240 can now be extracted from the drive 1246. With reference to FIG. 37A, after the notch 234A has been engaged, the linear drive assembly 1162 operates so as to displace the finger/thumb assembly 1168 and the cartridge 1240 away from the drive 1246. The linear drive assembly 1162 continues the displacement of the finger/thumb assembly 1168 and the cartridge 1240 away from the magazine 270 until the cartridge 1240 is fully within the housing 1082, as shown in FIG. 37A.

It should be appreciated that many of the elements of the library 202 employ linear or rotary actuators. Generally, for elements that employ a linear actuator, designs are feasible that employ a rotary actuator. Similarly, for elements that employ a rotary actuator, designs are feasible that employ a linear actuator. Further, the elements of the library 202 that employ linear or rotary actuators are capable of employing electrical actuators. Other embodiments of the present invention can employ actuators that utilize hydraulic or pneumatic actuators. In addition, many of the electrical motors utilized in the library 202 are DC motors. As one skilled in the art will appreciate, other types of electrical motors are feasible.

Figure 38:
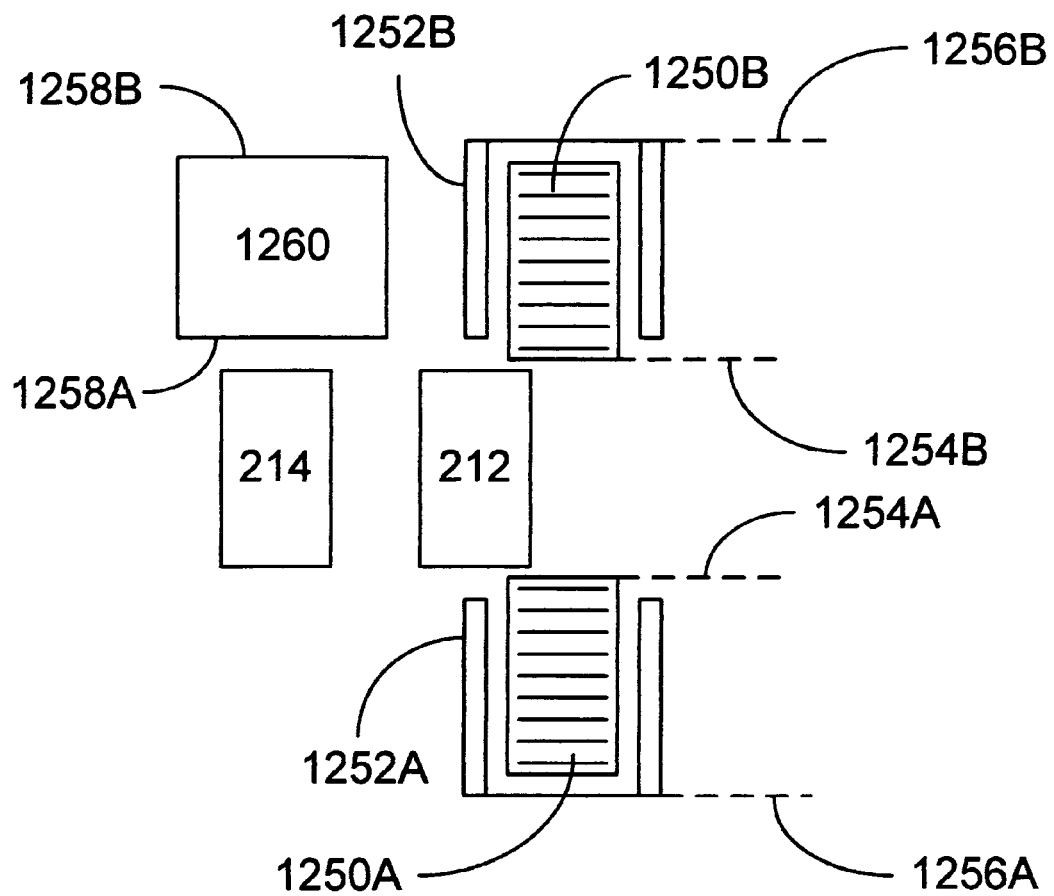

With reference to FIG. 38, the relationship between the space occupied by shelved magazines 270 in the library 202 to the other elements of the library 202 is described. A first magazine 1250A associated with a first shelf 1252A of any one of the five columns of shelving 328A resides in a vertical plane that is bounded by a first face 1254A that corresponds with the front face of the first magazine 1250A and a second face 1256A that corresponds with the rear face of the first magazine 1250A and is substantially parallel to the first face 1254A (a first magazine space). The first shelf 1252A is accessible for loading and unloading the first magazine 1250A at substantially where the first face 1254A is defined. The first magazine 125A is loaded and unloaded to and from the first shelf 1252A via the magazine transport 212 and magazine picker 880. Similarly, a second magazine 1250B associated with a second shelf 1252B of any one of the two columns of shelving 328B resides in a vertical plane that is bounded by a first face 1254B and a second face 1256B that respectively correspond to the front and rear surfaces of the second magazine 1250B (a second magazine space). As disclosed in FIGS. 28A and 28B, the second shelf 1252B can reside in compartments 544A–544F within the user definable space 336. The second shelf 1252B is accessible for loading and unloading the second magazine 1250B at substantially where the first face 1254B is defined. The user definable space 336 can also comprise a drive 1260 wherein data cartridges can be loaded to and from the drive 1260 substantially where the first face 1254B is defined. The distance between the first and second planes 1254A, 1256A (or between the first and second planes 1254B, 1256B) defines the minimum distance that is needed between the first planes 1254A, 1254B (at least a portion of the space between these two planes 1254A, 1256A defining a magazine transport space) for the magazine transport 212 to move a magazine within the library 202 without re-orienting a magazine, such as the first magazine 1250A for example. Hence, the magazine transport space is bounded between the first face 1254A corresponding to the first shelf 1252A, which is the interface of the magazine transport space and the face where the first shelf 1252A can receive the first magazine 1250A, and the first face 1254B corresponding to the second shelf 1252B, which is the interface of the magazine transport space and the face where the user definable space 336 can receive the second magazine 1250B. The closer the distance between the first planes 1254A, 1254B to the minimum distance for the magazine transport 212, the more volume there is within the library 202 to accommodate more magazines 270 and/or more drives 180. In the illustrated embodiment, the distance between the planes 1254A, 1254B is less than twice the distance between the planes 1254A, 1256A and approaches 130% of the distance of the distance between the planes 1254A, 1256A. Further, the distance between the first and second planes 1254A, 1256A (or the distance between the first and second planes 1254B, 1256B) is roughly equal to the distance between the front and rear surfaces 1258A, 1258B of the drive 1260, of the two columns of drives 180. This allows the two columns of drives 180 and shelving 1252B to be positioned within the library 202 so as to efficiently utilize the available space within the library 202. It should also be appreciated that the magazine transport space overlaps with the magazine spaces or can be slightly greater than the width of a magazine 270, such as the first magazine 1250A defined by the first and second face 1254A, 1256A.

In a magazine-based library 100 with a circular/cylindrical type layout, the magazine transport 108 travels in a space that is located between two concentric "planes" or surfaces. Further, the magazines 270 are typically located in one or more spaces that are each located between two planes.

Figure 39:
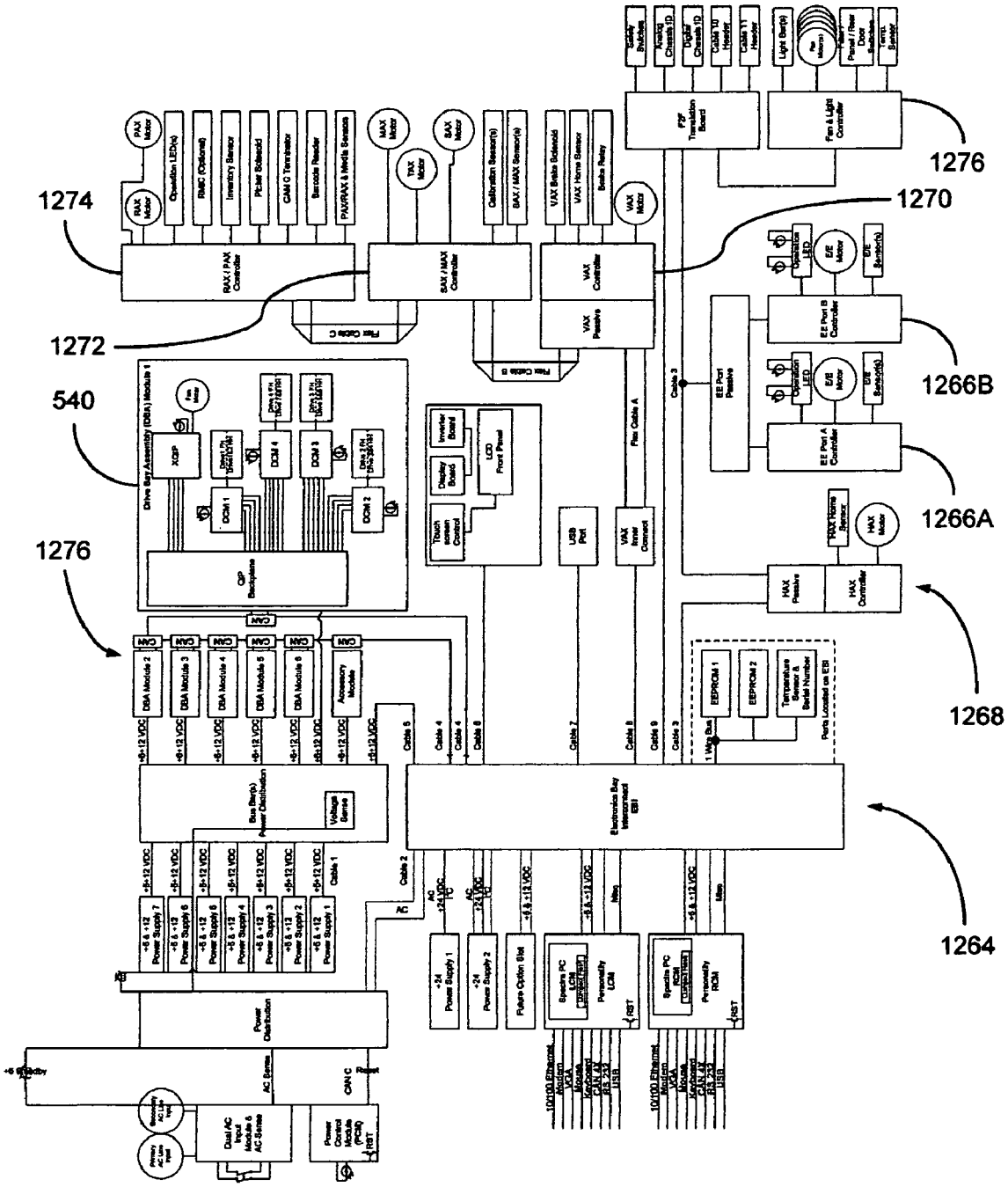

FIG. 39 illustrates the control system 218 for the library 202. Generally, the control system 218 is comprised of controller 1264 that is capable with communicating with other controllers in the library 202 that are associated with various electrical elements within the library 202. More specifically, the controller 1264 is capable of communicating with: (a) a first and second entry/exit port controllers 1266A, 1266B that respectively control electrical elements associated with the first and second entry/exit ports 368, 370; (b) a horizontal axis controller 1268 that controls electrical elements associated with the horizontal axis assembly 754 of the elevator 750; (c) a vertical axis controller 1270 that controls electrical elements associated with the vertical axis assembly 752 of the elevator 750; (d) a short axis/magazine controller 1272 that controls electrical elements associated with the horizontal transport unit 1052, magazine picker 880, and magazine transport device 900; (e) a rotation axis/picker axis controller 1274 that controls electrical elements associated with the rotary 1086, the linear drive assembly 1162, and the picker assembly 1164; and (f) an environmental controller 1276 that controls, among other things, the fans 220. In addition, the controller 1264 also communicates with elements associated with the operator interface 342. Further, the controller 1264 also communicates with the QIP 668 associated with an drive bay assembly 540 in the library via a Controller Area Network (CAN). Other control systems are also feasible.

The library 202 operates to read and/or write data on a recording medium that is located in a cartridge 224 that is stored in a magazine 270 that is, in turn, stored on a shelf of the shelf system 208 or in another storage location. Further, when the cartridge 224 is stored in the magazine 270, the cartridge 224 is oriented in the library 202 such that the face of the cartridge 224 with the greatest surface area, such as the surface 226A used herein for illustrative purposes lies in a substantially vertical plane. Moreover, the cartridge 224 is oriented so that the surface vector of the face 226A of the cartridge 224 with the greatest surface area is substantially parallel to the direction in which the magazine picker 880 displaces the magazine 270. Further, when the cartridge picker 214 extracts/inserts the cartridge 224 from/into the magazine 270, the cartridge picker 214 displaces the cartridge 224 vertically within the noted vertical plane.

It should be appreciated that other embodiments of a magazine-based data cartridge library 202 are capable of operating on cartridges 224 that are oriented when in storage so that the face 226A of the cartridge 224 with the greatest surface area lies in a vertical plane, but the surface vector of the face 226A lies substantially perpendicular to the direction in which a magazine picker 880 displace the magazine 270 storing the cartridge 224 and/or a cartridge picker 214 extracts/inserts the cartridge 224 from/into the magazine 270 such that the magazine 270 is displaced horizontally within the vertical plane.

Figure 40A:
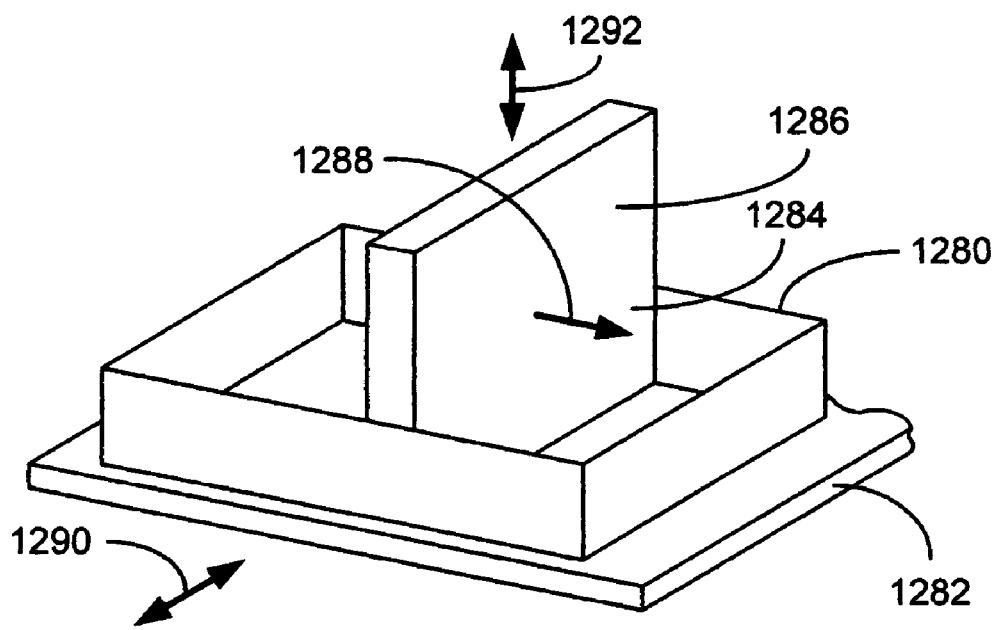

FIG. 40A illustrates an alternative embodiment of a magazine 1280 suitable for use in an alternative embodiment of a magazine-based data cartridge library relative to library 202. When the magazine 1280 is operationally disposed on a shelf 1282 of the library 202, the magazine 1280 holds a cartridge 1284 such that: (a) a face of the cartridge 1284 with the greatest surface area 1286 lies in a vertical plane; (b) the surface vector 1288 of the face 1286 is substantially perpendicular to a direction 1290 that the magazine 1280 is displaced by a magazine picker 880; and (c) the cartridge 1284 is displaced in a vertical direction 1292 by a cartridge picker 214 to insert/extract the cartridge 1284 into/from the magazine 1280.

Figure 40B:
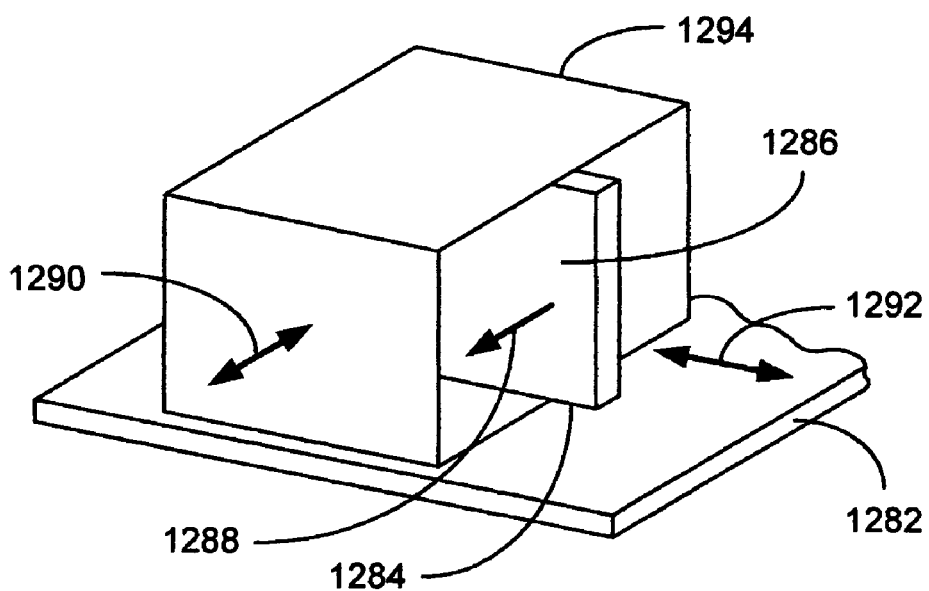

FIG. 40B illustrates an alternative embodiment of a magazine 1294 suitable for use in an alternative embodiment of a magazine-based data cartridge library relative to library 202. Each of the features in FIG. 40B that is substantially identical to a feature in FIG. 40A has been give the same reference number as the feature in FIG. 40A. When the magazine 1294 is operationally disposed on a shelf 1282 of the library 202, the magazine 1294 holds a cartridge 1284 such that: (a) a face 1286 of the cartridge 1284 with the greatest surface area lies in a vertical plane; (b) the surface vector 1288 of the face 1286 is substantially parallel to a direction 1290 that the magazine 1294 is displaced by a magazine picker 880; and (c) the cartridge is displaced in a direction 1292, a horizontal direction in the vertical plane in which the face 1286 of the cartridge 1284 with the greatest surface area lies, by a cartridge picker 214 to insert/extract the cartridge 1284 into/from the magazine 1294.

Figure 40C:
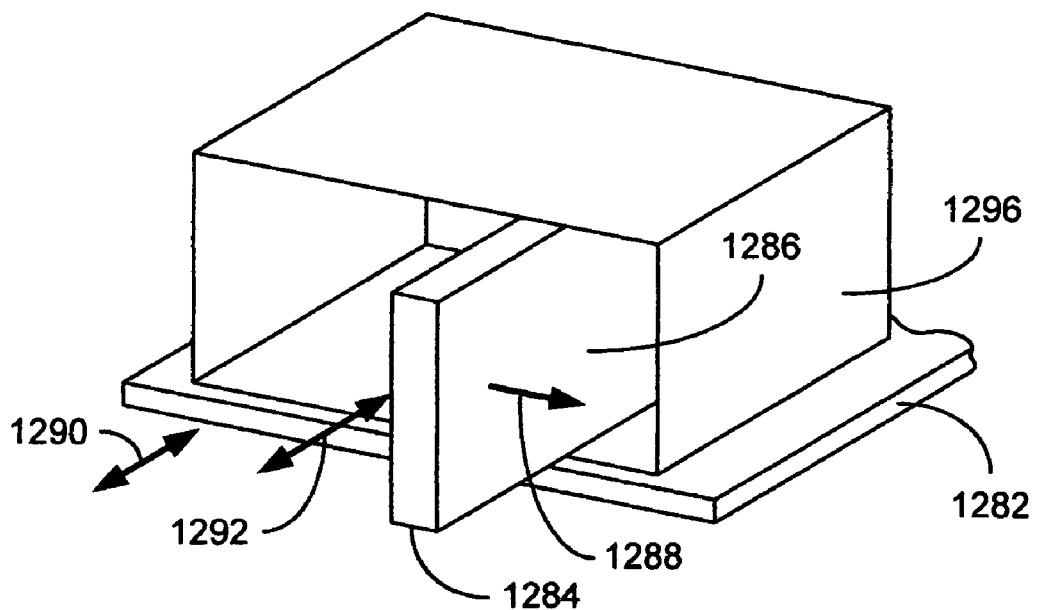

FIG. 40C illustrates an alternative embodiment of a magazine 1296 suitable for use in an alternative embodiment of a magazine-based data cartridge library relative to library 202. Each of the features in FIG. 40C that is substantially identical to a feature in FIG. 40A has been give the same reference number as the feature in FIG. 40A. When the magazine 1296 is operationally disposed on a shelf 1282 of the library 202, the magazine 1296 holds a cartridge 1284 such that: (a) a face 1286 of the cartridge 1284 with the greatest surface area lies in a vertical plane, (b) the surface vector 1288 of the face 1286 is substantially perpendicular to a direction 1290 that the magazine 1296 is displaced by a magazine picker 880, and (c) the cartridge 1284 is displaced in a horizontal direction 1292 in the vertical plane in which the face 1286 of the cartridge 1284 with the greatest surface area lies, by a cartridge picker 214 to insert/extract the cartridge 1284 into/from the magazine 1296.

Figure 40D:
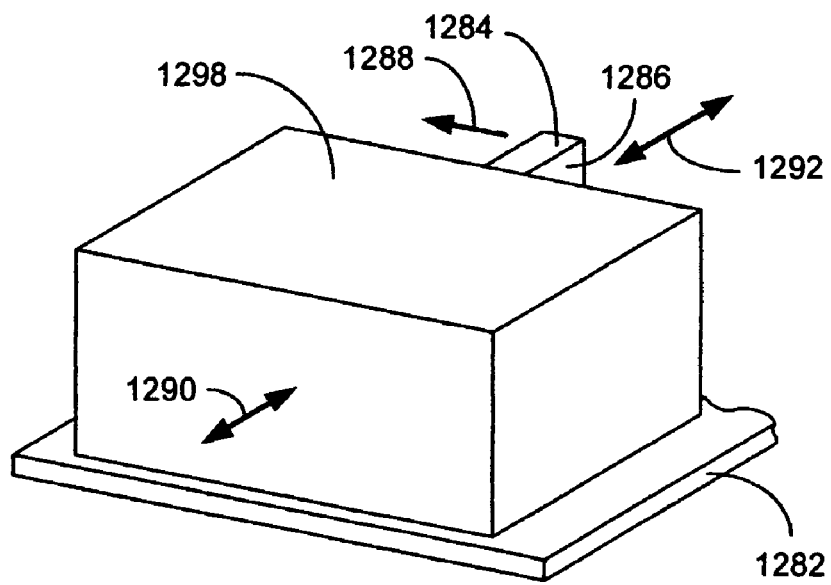

FIG. 40D illustrates an alternative embodiment of a magazine 1298 suitable for use in an alternative embodiment of a magazine-based data cartridge library relative to library 202. Each of the features in FIG. 40D that is substantially identical to a feature in FIG. 40A has been give the same reference number as the feature in FIG. 40A. When the magazine 1298 is operationally disposed on a shelf 1282 of the library 202, the magazine 1298 holds a cartridge 1284 such that: (a) a face 1286 of the cartridge 1284 with the greatest surface area lies in a vertical plane; (b) the surface vector 1288 of the face 1286 is substantially perpendicular to a direction 1290 that the magazine 1298 is displaced by a magazine picker 880, and (c) the cartridge 1284 is displaced in a direction 1292, a horizontal direction in the vertical plane in which the face 1286 of the cartridge 1284 with the greatest surface area lies, by a cartridge picker 214 to insert/extract the cartridge 1284 into/from the magazine 1298.

Figure 40E:
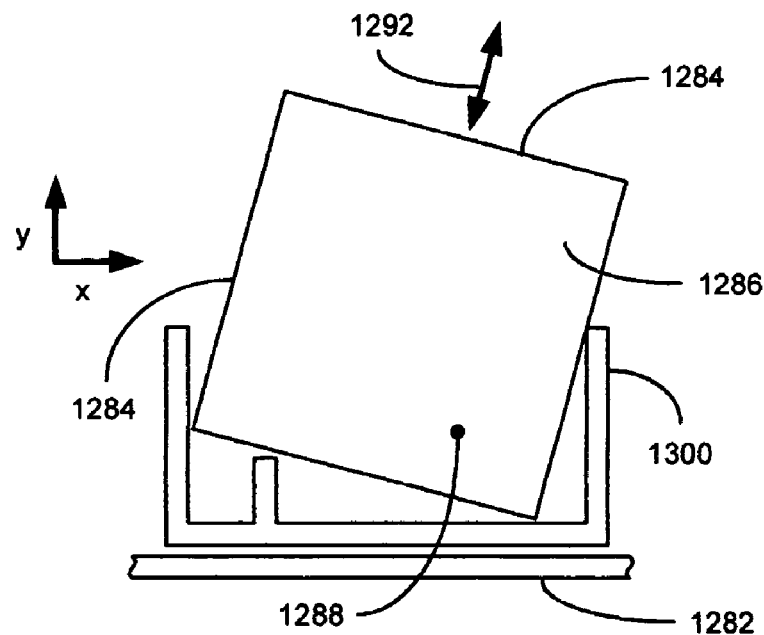

FIG. 40E illustrates a cross-section of alternative embodiment of a magazine 1300 suitable for use in an alternative embodiment of a magazine-based data cartridge library relative to library 202. Each of the features in FIG. 40E that is substantially identical to a feature in FIG. 40A has been give the same reference number as the feature in FIG. 40A. When the magazine 1300 is operationally disposed on a shelf 1282 of the library 200, the magazine 1300 holds a cartridge 1284 such that: (a) a face 1286 of the cartridge 1284 with the greatest surface area lies in a vertical plane, (b) the surface vector 1288 of the face 1286 is substantially perpendicular to or substantially parallel to a direction that the magazine 1300 is displaced by a magazine picker 880, and (c) the cartridge 1284 is displaced in a direction 1292 in the vertical plane in which the face 1286 of the cartridge 1284 with the greatest surface area lies that has both vertical and horizontal components, by a cartridge picker 214 to insert/extract the cartridge 1284 into/from the magazine 1300.

Figure 40F:
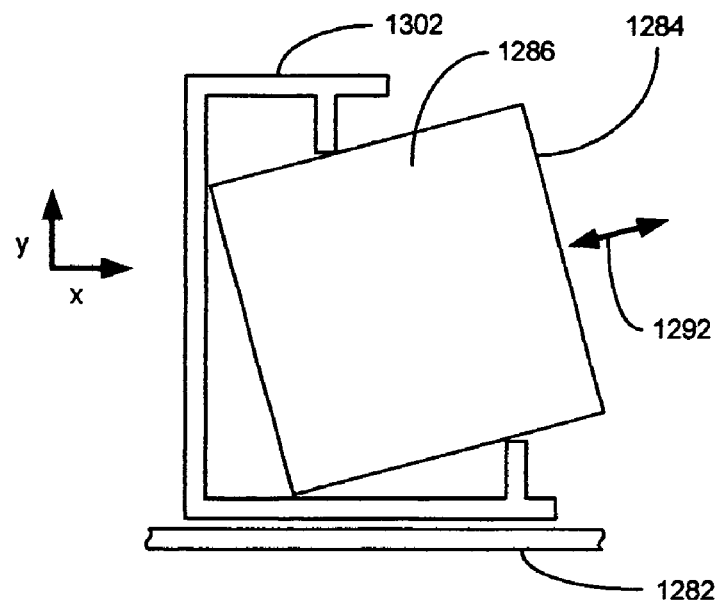

FIG. 40F illustrates a cross-section of alternative embodiment of a magazine 1302 suitable for use in an alternative embodiment of a magazine-based data cartridge library relative to library 202. Each of the features in FIG. 40F that is substantially identical to a feature in FIG. 40A has been give the same reference number as the feature in FIG. 40A. When the magazine 1302 is operationally disposed on a shelf 1282 of the library 202, the magazine 1302 holds a cartridge 1284 such that: (a) a face 1286 of the cartridge 1284 with the greatest surface area lies in a vertical plane; (b) the surface vector 1288 of the face 1286 is substantially perpendicular or substantially parallel to a direction that the magazine 1302 is displaced by a magazine picker 880; and (c) the cartridge 1284 is displaced in a direction 1292, a direction in the vertical plane in which the face 1286 of the cartridge 1284 with the greatest surface area lies that has both vertical and horizontal components, by a cartridge picker 214 to insert/extract the cartridge 1284 into/from the magazine 1302.

Figure 41A:
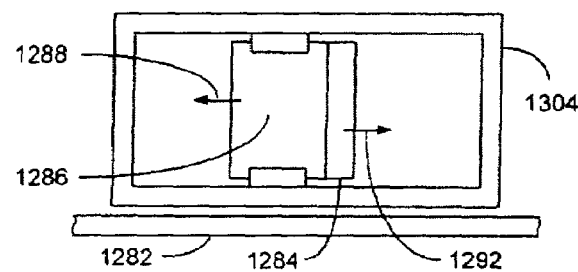
Figure 41B:
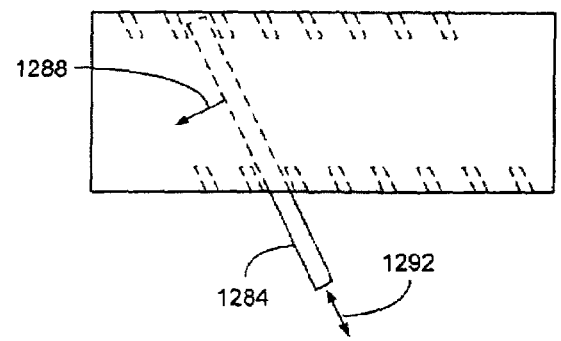

With reference to FIGS. 41A–41B, an alternative embodiment of a magazine 1306 is suitable for use with an alternative embodiment of a magazine-based data cartridge library relative to library 202. Each of the features in FIGS. 41A–41B that is substantially identical to a feature in FIG. 40A has been give the same reference number as the feature in FIG. 40A. When the magazine 1304 is operationally disposed on a shelf 1282 of the library 202, the magazine 1304 holds a cartridge 1284 such that: (a) a face 1286 of the cartridge 1284 with the greatest surface area lies in a vertical plane; (b) the surface vector 1288 of the face 1286 is neither perpendicular or parallel to a direction that the magazine 1304 is displaced by a magazine picker 880; and (c) the cartridge 1284 is displaced in a direction 1292, a horizontal direction in the vertical plane in which the face 1286 of the cartridge 1284 with the greatest surface area lies, by a cartridge picker 214 to insert/extract the cartridge 1284 into/from the magazine 1304.

Also feasible is a magazine that holds cartridge 1284 in a vertical plane and in an orientation that is a combination of the orientations that magazine 1300 or magazine 1302 and magazine 1304 hold a cartridge 1284.

As one skilled in the art will appreciate, the foregoing magazine designs are only exemplary of magazine designs that operatively hold magazines in a magazine-based data cartridge library 202 in an orientation such that the face, such as the face 1286, of the cartridge, such as cartridge 1284, with the greatest surface area lies in a vertical plane.

Figure 42:
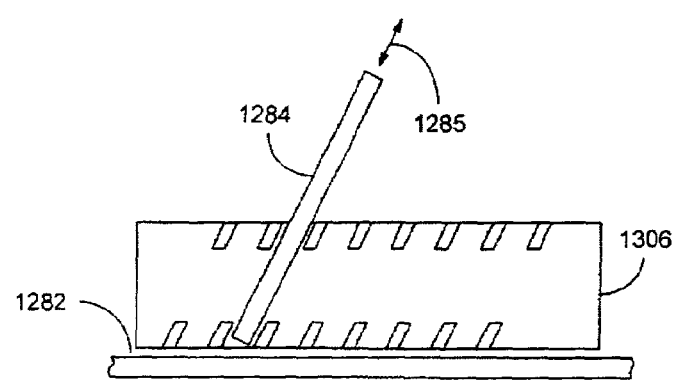

It will also be appreciated by one skilled in the art that the library 202 is also operable with magazines that hold cartridges, for example cartridge 1284, such that the face, such as the face 1286, of a cartridge with the greatest surface area does not lie in a vertical plane. With reference to FIG. 42, the library 202 is operable with a magazine 1306, shown in cross-section, that when supported on a shelf 1282 in the library 202, the cartridge 1284 resides in a plane that is between a vertical plane and a horizontal plane, shown by the arrow 1285. Further, the cartridge transport 214 displaces the cartridge 1284 in this plane during insertion/extraction into/from the magazine 1306. As side loading/unloading embodiment of the magazine 1306 is also feasible but would not be operable with the library 202 without modification. These magazine 1306 designs are only exemplary of magazine 1306 designs suited for use magazine-based data cartridge library 202.

Figure 43A:
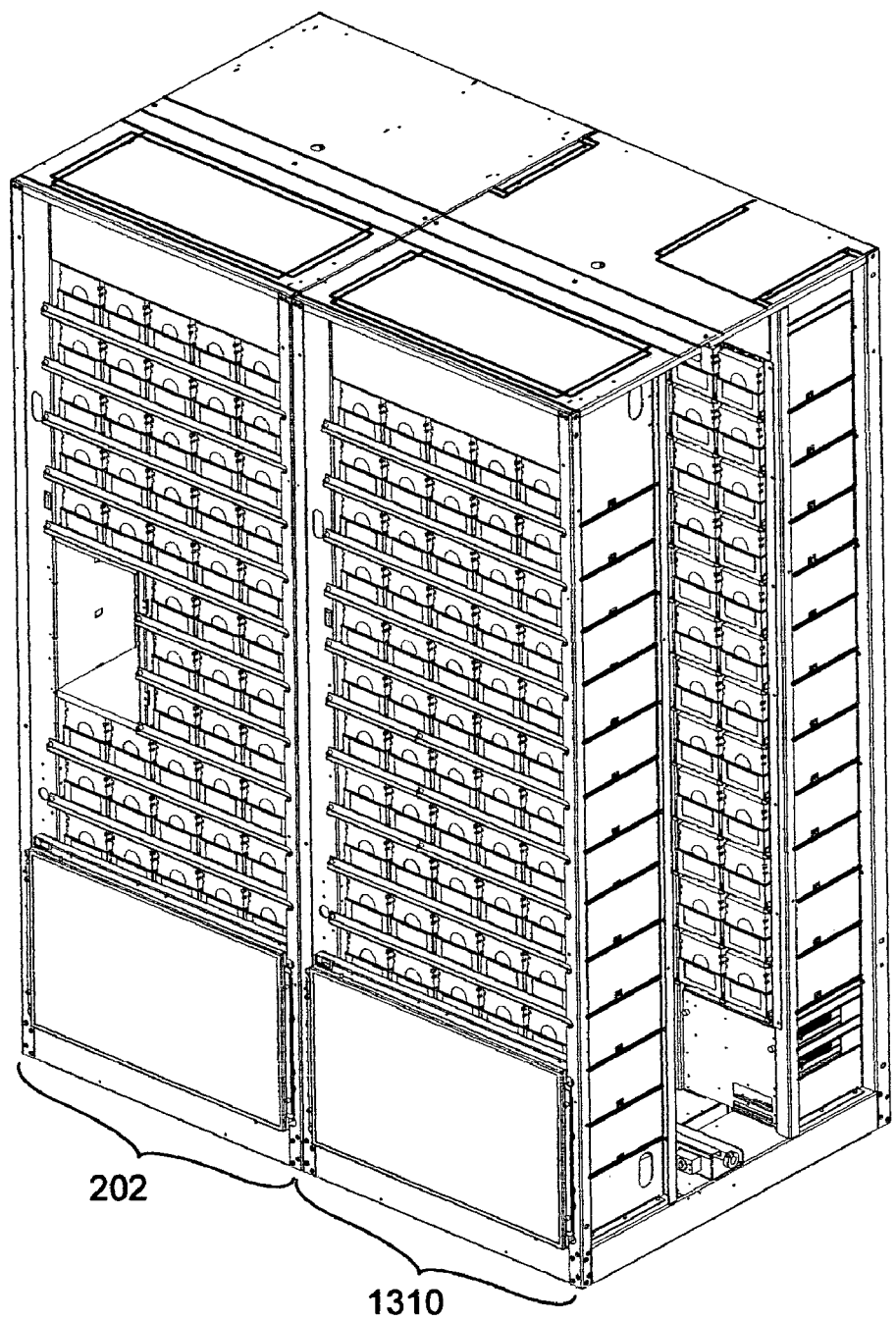
Figure 43B:
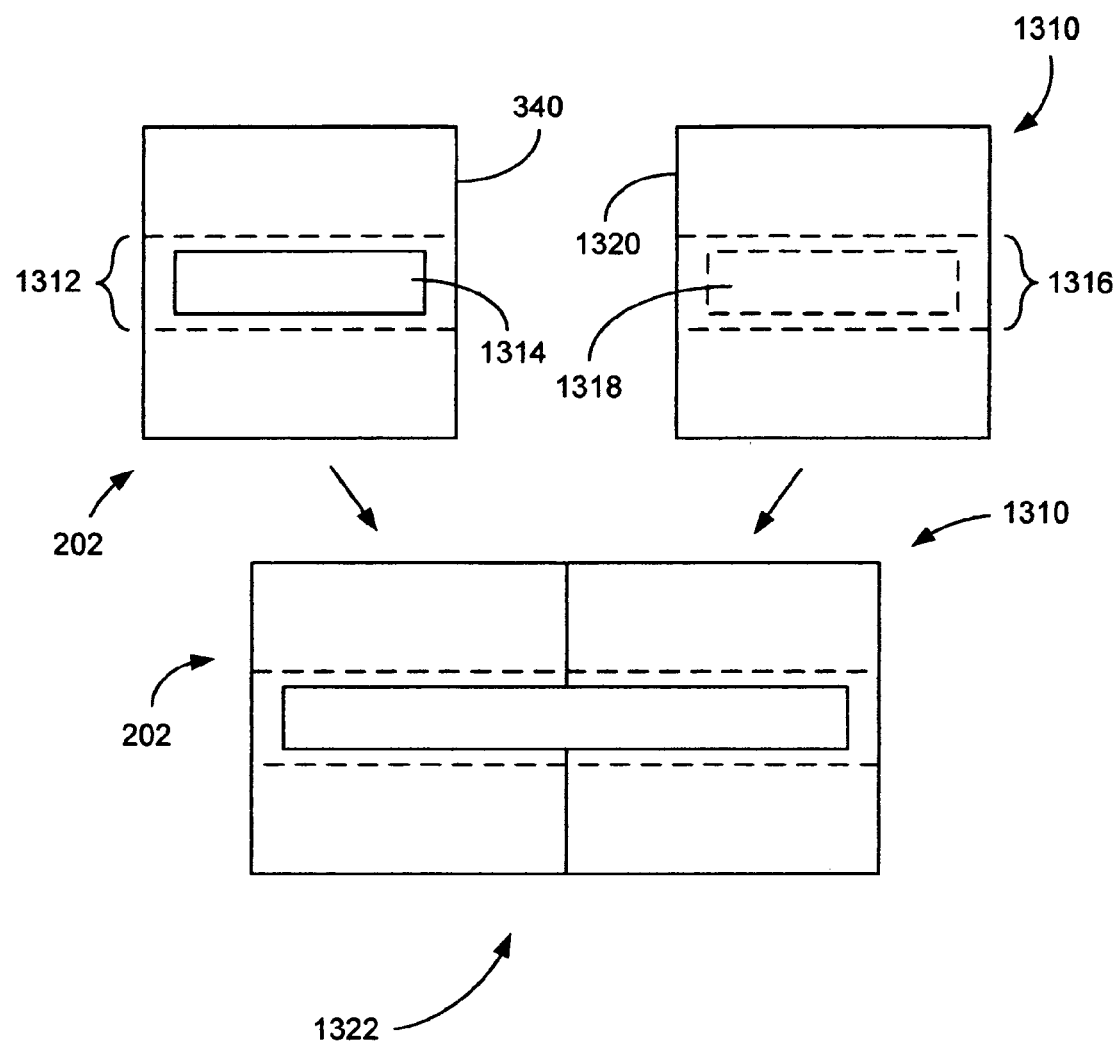

With reference to FIGS. 43A–43B, the expansion of the magazine-based data cartridge library 202 to include an add-on unit 1310 is discussed. Generally, the library 202 is capable of being expanded to include drive 180 and/or magazine 270 storage capability beyond that available in the library 202. The process of expanding the library 202 comprises obtaining the add-on unit 1310. The add-on unit 1310 can have any of a number of combinations of elements. For example, the add-on unit 1310 may be comprised entirely of shelving for storing magazines 270, entirely of drives 180 or drive bay assemblies 540 for accommodating drives 180, and various combinations of shelving and drives 180 or drive bay assemblies 540. The add-on unit 1310 can also comprise an entry/exit port, such as the entry/exit port 206 of the library 202. The add-on unit 1310 can also be another magazine-based data cartridge library that is capable of functioning independently of the library 202.

With reference to FIG. 43B, the process of making the expanded library 1322 is described from a schematic perspective. The library 202 has a magazine transporter space 1312 and a side 340 that is capable of being removed or modified so as to provide a path for transporting magazines 270 between the library 202 and the add-on unit 1310. Located within the magazine transporter space 1312 are horizontally extending components that are associated with the magazine transporter 212 and are cumulatively represented as horizontal components 1314. One horizontally extending component is the guide shaft 780. Other embodiments may employ a different type of rail or use a rack in a rack-and-pinion type of device for moving a magazine picker 880. The add-on unit 1310 has a magazine transporter space 1316 and may or may not have horizontally extending components. If the add-on unit 1310 has such components they are cumulatively represented by horizontal components 1318. Generally, the add-on unit 1310 also has a side 1320 that is either removable or capable of being altered to expose the magazine transport space 1312. Alternatively, the add-on unit 1310 may be built or designed so that the magazine space is exposed and no removal or alteration of a side is necessary.

The process of expanding the library 202 further comprises: (a) removing or modifying the side 340 of the library 202 to expose the magazine transporter space 1312 of the library 202; (b) removing or altering, if necessary, the side 1320 of the add-on unit 1300 to expose the magazine transporter space 1316; (c) aligning the magazine transporter space 1312 of the library 202 with the magazine transporter space 1316 of the add-on 1310; and (d) replacing the horizontal components 1314 of the elevator of the library 202 that limit the horizontal movement of the magazine transport 212 and any horizontal components 1318 associated with the add-on 1310 that limit the horizontal movement of a magazine 270 transported within the add-on 1310 with components that allow the magazine transport 212 to move within the magazine transporter space 1312 of the library 202, as well as the magazine transporter space 1316 of the add-on 1310. With respect to the replacing step, the guide shaft 780 is replaced with a single, continuous guide shaft that allows the magazine transport 212 to function in the magazine transporter space 1312 of the library 202 and the magazine transporter space 1306 of the add-on 1310, and thereby form an expanded library 1322.

Figure 44A:
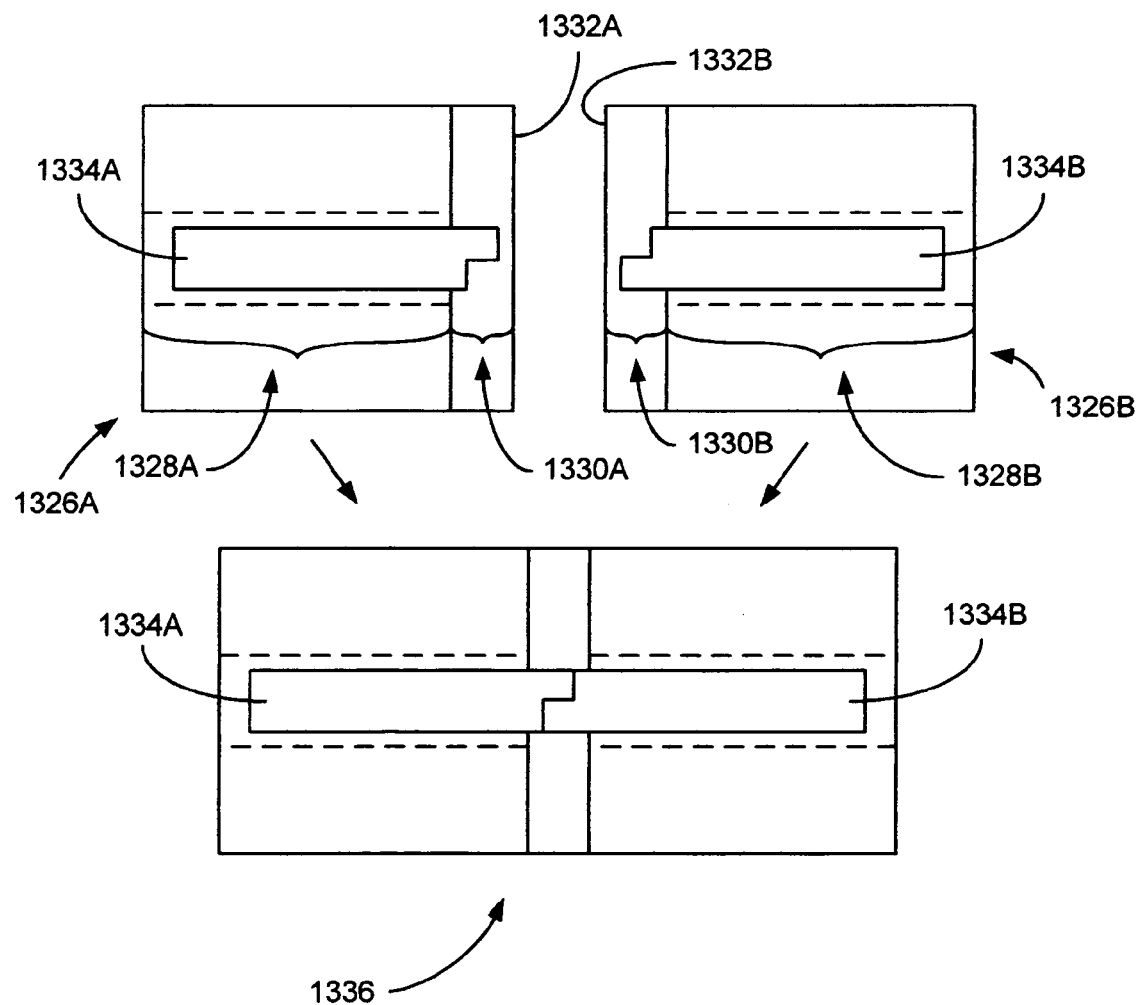

With reference to FIG. 44A, an alternative approach to replacing a guide shaft, such as the guide shaft 780, or other member that is used to horizontally displace a magazine picker 880 is to effectively lengthen the rod or other member by adding one or more segments to the guide shaft 780 or member. As shown in FIG. 44A, a magazine-based library 1326A comprises a magazine transport space 1328A, a first magazine transport add-on space 1330A that is typically not used when the library 1326A is configured as a stand-alone device, a first side 1332A that is either removable or modifiable to provide a path for a magazine transport 212 to move between the first library 1326A and an add-on unit 1326B, and first horizontal magazine transport components 1334A that are adapted to mate with comparable components 1334B associated with the add-on unit 1326B. An add-on unit 1326B comprises a magazine transport space 1328B, a second magazine transport add-on space 1330B, a second side 1332B that is either removable or modifiable to provide a path for a magazine transport 212, and second horizontal magazine transport components 1334B that are adapted to mate with the first horizontal magazine components 1334A. In this embodiment, the first and second sides 1332A, 1332B are either removed or appropriately modified, the first and second magazine transport spaces 1328A, 1328B are aligned, and the first and second horizontal magazine transport components 1334A, 1334B are mated, thereby forming an expanded library 1336.

Figure 44B:
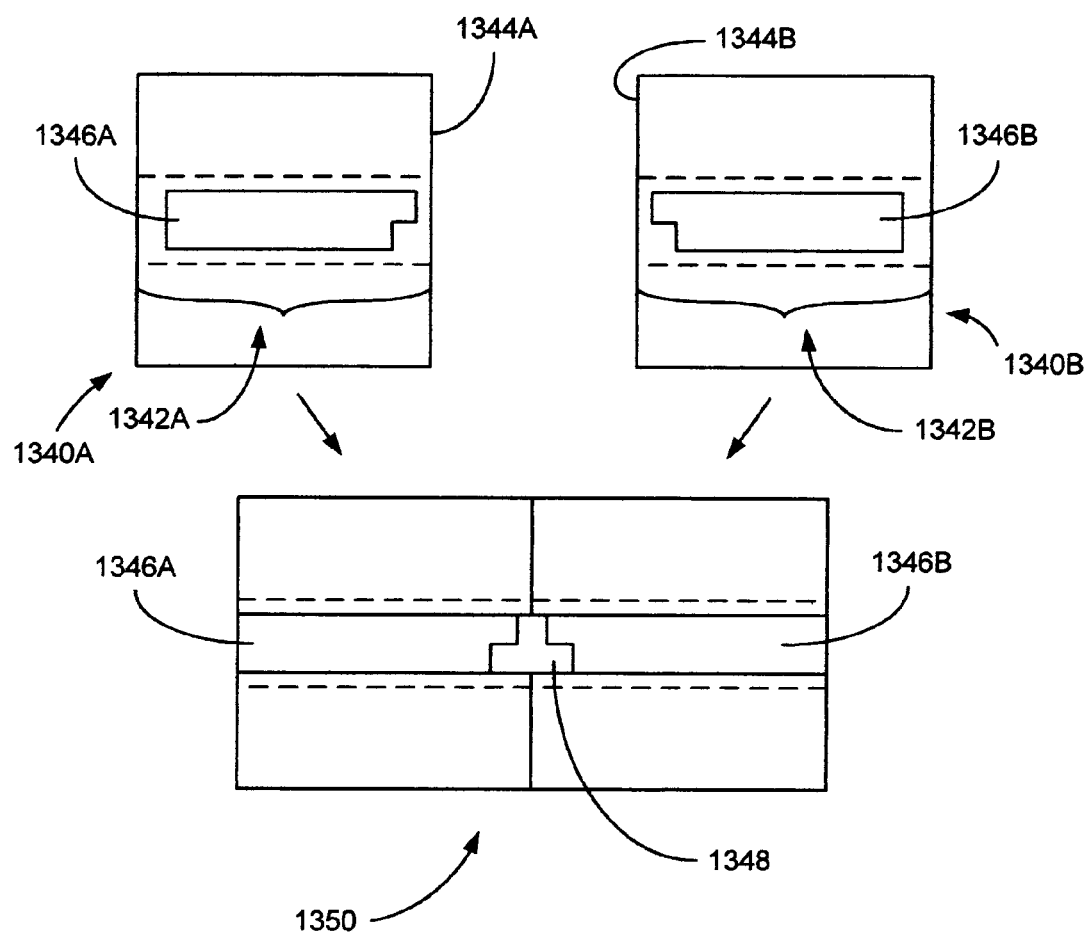

With reference to FIG. 44B, another approach to replacing a guide shaft, such as the guide shaft 780, or other member that is used to horizontally displace a magazine picker 880 is to effectively lengthen the rod or other member by adding one or more segments to the guide shaft 780 or member. As shown in FIG. 44B, a magazine-based library 1340A comprises a magazine transport space 1342A, a first side 1344A that is either removable or modifiable to provide a path for a magazine transport 212 to move between the library 1340A and an add-on unit 1340B, and first horizontal magazine transport components 1346A that are adapted to mate with bridge components that, in turn, are adapted to mate with comparable components associated with the add-on unit 1340B. An add-on unit 1340B comprises a magazine transport space 1342B, a second side 1344B that is either removable or modifiable to provide a path for a magazine transport 212, and second horizontal magazine transport components 1346B that are adapted to mate with the bridge components. In this embodiment, the first and second sides 1344A, 1344B are either removed or appropriately modified, the first and second magazine transport spaces 1342A, 1342B are aligned, and the first and second horizontal magazine transport components 1346A, 1346B are mated to one another by an intermediate bridge component 1348, thereby forming the expanded library 1350.

It will be appreciated by one skilled in the art that with respect to the various methods for expanding a magazine-based data cartridge library exemplified in FIGS. 43B, 44A and 44B further expansion of a magazine-based data cartridge library with additional add-on units is feasible.

Figure 45A:
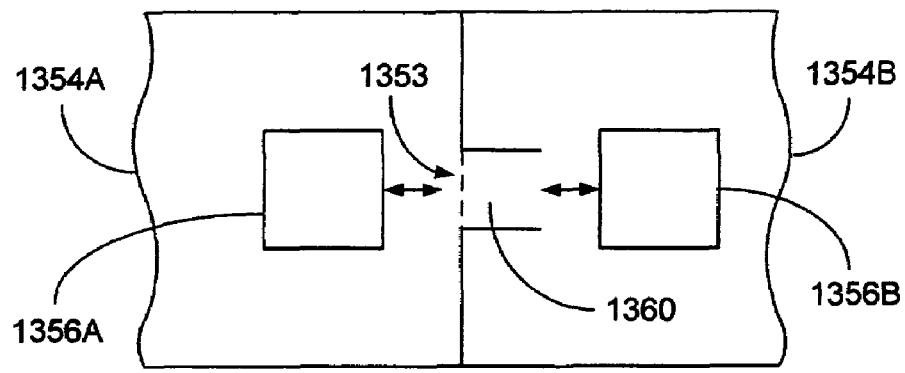

FIGS. 45A–45E illustrate various embodiments of magazine pass-though ports that are each capable of passing a magazine 270 between a first magazine-based library 1354A with a first magazine transporter 1356A and a second magazine-based library 1354B with a second magazine transporter 1356B. With reference to FIG. 45A, a magazine pass-through port 1358 is provided that allows the first magazine transporter 1356A to move a magazine 270 to and from a magazine storage space 1360 that is associated with the second magazine-based library 1354B and accessible by the second magazine transport 1356B.

Figure 45B:
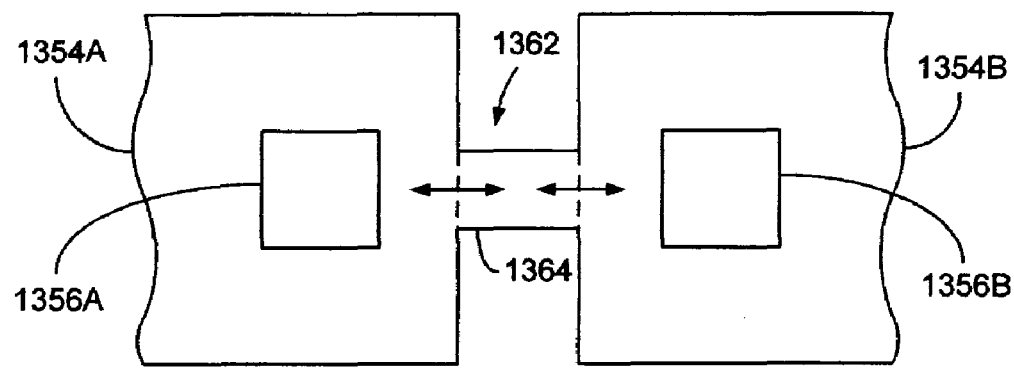

With reference to FIG. 45B, a magazine pass-through port 1362 is provided in which first and second magazine transporters 1356A, 1356B are each able to access a space 1364 that is located between the first and second libraries 1354A, 1354B and pass a magazine 270 from one 1354A to the other 1354B using the space 1364.

Figure 45C:
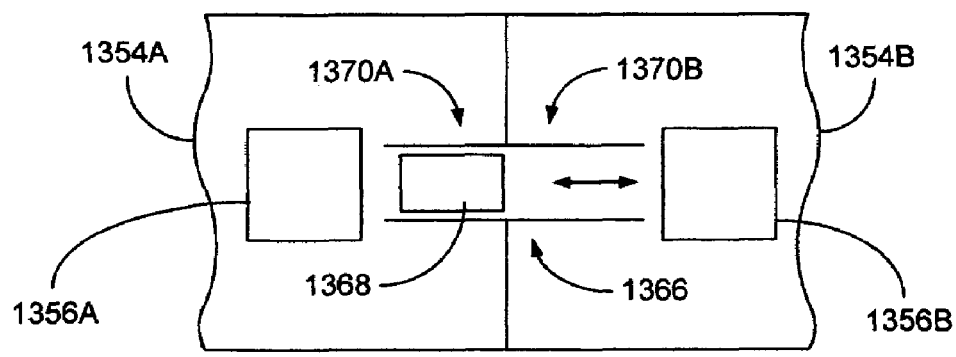

With reference to FIG. 45C, a magazine pass-through port 1366 is provided that utilizes an intermediate transport device 1368 to move a magazine 270 between a first space 1370A that is accessible to a first magazine transporter 1356A and a second space 1370B that is accessible to a second magazine transporter 1356B. Another embodiment uses a chute to pass a magazine 270 from a first space associated with one library, such as the first space 1370A associated with library 1354A, to a second space associated with another library, such as the second space 1370B associated with library 1354B.

Figure 45D:
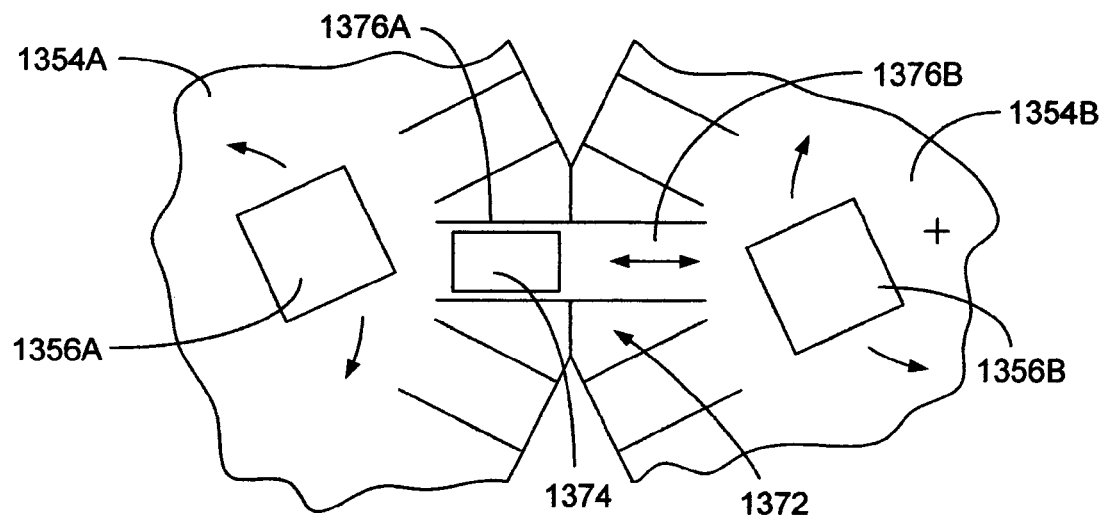

With reference to FIG. 45D, the first and second magazine-based libraries 1354A, 1354B are each magazine-based libraries with circular or cylindrical layouts. A magazine pass-through port 1372 is provided that utilizes an intermediate transport device 1374 to move a magazine 270 between a first space 1376A that is accessible to a first magazine transporter 1356A and a second space 1376B that is accessible to the second magazine transporter 1356B. Alternatively, a magazine chute that extends from the library 1354A to library 1354B can be used. In another embodiment, a second magazine chute from library 1354B to library 1354A is also feasible.

Figure 45E:
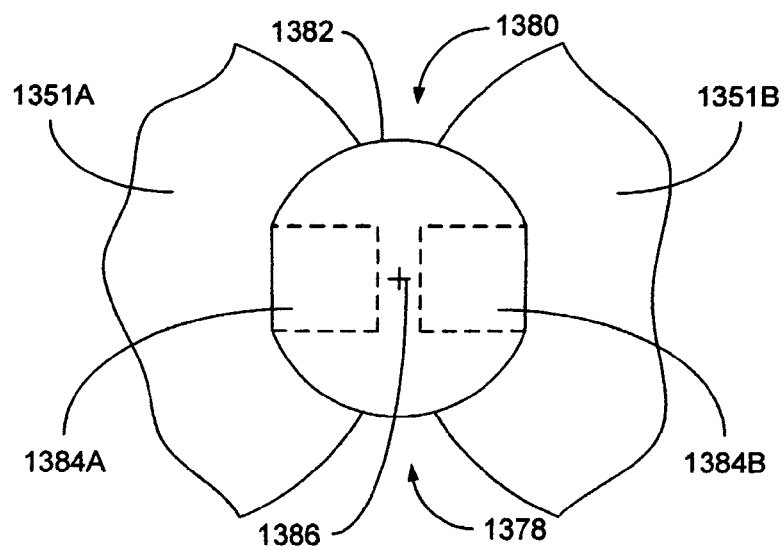

With reference to FIG. 45E, the first and second magazine-based libraries 1354A, 1354B are each magazine-based libraries with circular or cylindrical layouts. A magazine pass-through port 1378 is provided that utilizes an intermediate transport device in the form of a carousel device 1380 that is comprised of: (a) a carousel body 1382; and (b) a pair of magazine bays 1384A, 1384B that are capable of accommodating a magazine 270 and are each accessible to the first magazine transporter 1356A and the second magazine transporter 1356B depending upon the rotational position of the carousel 1380. In an alternative embodiment, a carousel with one or more than two bays is feasible. The carousel device 1380 also comprises an electric motor (not shown) that is used to rotate the carousel body 1382 about an axis 1386 as needed.

The invention claimed is:

1. A data cartridge magazine for use in a magazine-based data cartridge library that is capable of transporting data cartridge magazines within the library, the data cartridge magazine comprising: a box structure with an interior space for accommodating a plurality of data cartridges; wherein said box structure comprises a bottom wall with a bottom wall interior surface and a bottom wall exterior surface; wherein said box structure comprises a side wall that is operatively attached to said bottom wall, extends from said bottom wall to a side wall terminal edge, and has a side wall interior surface and a side wall exterior surface; wherein said bottom wall interior surface and said side wall interior surface define said interior space; wherein said side wall terminal edge defines a top opening for the insertion/extraction of data cartridges into/from said interior space; a plurality of partitioning structures for dividing said interior space into a plurality of slots with each of said plurality of slots capable of accommodating one of said plurality of data cartridges; and a magazine transport means for being engaged by a portion of a magazine transport device that is associated with said magazine-based data cartridge library and used to displace said data cartridge magazine towards and away from a storage location within said magazine-based data cartridge library.

2. The data cartridge magazine, as claimed in claim 1, wherein: said magazine transport means comprises a hole that is associated with one of said bottom wall and said side wall.

3. The data cartridge magazine, as claimed in claim 1, wherein: said magazine transport means comprises a protrusion that is associated with one of said bottom wall and said side wall.

4. The data cartridge magazine, as claimed in claim 1, wherein: said magazine transport means comprises an indentation that is associated with one of said bottom wall and said side wall.

5. The data cartridge magazine, as claimed in claim 1, wherein: said magazine transport means comprises a pair of holes, with each of said pair of holes associated with one of said bottom wall and said side wall.

6. The data cartridge magazine, as claimed in claim 1, wherein: said magazine transport means comprises a pair of protrusions, with each of said pair of protrusions associated with one of said bottom wall and said side wall.

7. The data cartridge magazine, as claimed in claim 1, wherein: said magazine transport means comprises a pair of indentations, with each of said pair of indentations associated with one of said bottom wall and said side wall.

8. The data cartridge magazine, as claimed in claim 1, further comprising: an engaged/disengaged structure for use with a sensor that is used to determine if said magazine transport device associated with said magazine-based data cartridge library is engaged/disengaged to/from the data cartridge magazine.

9. The data cartridge magazine, as claimed in claim 1, further comprising: a magazine orientation structure for ensuring that the data cartridge magazine has a desired orientation within said magazine-based data cartridge library.

10. The data cartridge magazine, as claimed in claim 9, wherein: said magazine orientation structure comprises an asymmetric structure this is asymmetric relative to a plane that vertically bisects the data cartridge magazine.

11. The data cartridge magazine, as claimed in claim 10, wherein: said asymmetric structure comprises a pair of parallel rails.

12. The data cartridge magazine, as claimed in claim 1, further comprising: a retaining structure for use in holding the data cartridge magazine in association with a shelf within said magazine-based data cartridge library but releasing the data cartridge magazine when a force is applied to the data cartridge magazine by said magazine transport device associated with the magazine-based data cartridge library.

13. The data cartridge magazine, as claimed in claim 12, wherein: said retaining structure comprises a notch for engaging a notch-engaging structure associated with said shelf.

14. The data cartridge magazine, as claimed in claim 12, wherein: said retaining structure comprises a detent for use in engaging a notch associated with said shelf.

15. The data cartridge magazine, as claimed in claim 12, wherein: said retaining structure comprises: a detent for engaging a notch associated with said shelf; and a spring for applying a force to said detent.

16. The data cartridge magazine, as claimed in claim 1, further comprising: a data cartridge orientation structure associated with each of said slots to ensure that when one of said data cartridges is inserted into one of said slots, the data cartridge has a desired orientation.

17. The data cartridge magazine, as claimed in claim 1, further comprising: label means for use in identifying the data cartridge magazine.

18. The data cartridge magazine, as claimed in claim 17, wherein: said label means comprises an indentation in said side wall for accommodating a label for identifying the magazine.

19. The data cartridge magazine, as claimed in claim 17, wherein: said label means comprises: a first indentation in said side wall exterior surface for accommodating a first label for identifying the magazine; and a second indentation in said side wall exterior surface for accommodating a second label for identifying the magazine.

20. The data cartridge magazine, as claimed in claim 19, wherein: said side wall comprising a first wall and a second wall that is substantially parallel to said first wall; wherein said first indentation is located in said first wall; and wherein said second indentation is located in said second wall.

21. The data cartridge magazine, as claimed in claim 17, wherein: said label means comprises a sleeve for holding a label.

22. The data cartridge magazine, as claimed in claim 17, wherein: said label means comprises a radio-frequency identifier.

23. The data cartridge magazine, as claimed in claim 1, further comprising: a label that identifies the data cartridge magazine and is attached to said box structure at a location that is discernable by a label reader located within said magazine-based data cartridge library.

24. A data cartridge magazine for use with a magazine-based data cartridge library comprising:
    a frame structure comprising a closed-loop side wall which extends to a terminal edge from an end attached to a bottom surface wherein said frame structure defines an interior space;
    a top opening to said interior space defined by said terminal edge where through data cartridges are capable of being inserted and extracted;
    a partitioning structure for dividing said interior space into a plurality of slots each capable of accommodating one of said data cartridges;
    said data cartridge magazine capable of being transported to and from a storage local within said library by a magazine transport means wherein said magazine transport means is adapted to be engaged by a portion of a magazine transport device associated with said library.

25. The data cartridge magazine, as claimed in claim 24, wherein: said closed-loop side wall comprises: a first pair of parallel side surfaces; and a second pair of parallel side surfaces that are perpendicular to said first pair of parallel side surfaces.

26. The data cartridge magazine, as claimed in claim 24, wherein: said magazine transport means comprises at least one hole that is associated with said frame structure.

27. The data cartridge magazine, as claimed in claim 24, wherein: said magazine transport means comprises at least one protrusion that is associated with said frame structure.

28. The data cartridge magazine, as claimed in claim 24, wherein: said magazine transport means comprises at least one indentation that is associated with said frame structure.

29. The data cartridge magazine, as claimed in claim 24, further comprising: an engaged/disengaged structure for use with a sensor that is used to determine if said magazine transport device associated with said magazine-based data cartridge library is engaged/disengaged to/from the data cartridge magazine.

30. The data cartridge magazine, as claimed in claim 24, further comprising: a magazine orientation structure for ensuring that the data cartridge magazine has a desired orientation within said magazine-based data cartridge library.

31. The data cartridge magazine, as claimed in claim 30, wherein: said magazine orientation structure comprises an asymmetric structure this is asymmetric relative to a plane that vertically bisects the data cartridge magazine.

32. The data cartridge magazine, as claimed in claim 31, wherein: said asymmetric structure comprises a pair of parallel rails.

33. The data cartridge magazine, as claimed in claim 24, further comprising: a retaining structure for use in holding said data cartridge magazine in association with a shelf within said magazine-based data cartridge library but releasing the data cartridge magazine when a force is applied to the data cartridge magazine by said magazine transport device associated with the magazine-based data cartridge library.

34. The data cartridge magazine, as claimed in claim 33, wherein: said retaining structure comprises a notch for engaging a notch-engaging structure associated with said shelf.

35. The data cartridge magazine, as claimed in claim 33, wherein: said retaining structure comprises a detent for use in engaging a notch associated with said shelf.

36. The data cartridge magazine, as claimed in claim 33, wherein: said retaining structure comprises: a detent for engaging a notch associated with said shelf; and a spring for applying a force to said detent.

37. The data cartridge magazine, as claimed in claim 24, further comprising: a data cartridge orientation structure associated with each of said plurality of slots to ensure that when one of said data cartridges is inserted in a one of said plurality of slots, the data cartridge is in a predetermined orientation.

38. The data cartridge magazine, as claimed in claim 24, further comprising: label means for use in identifying the data cartridge magazine.

39. The data cartridge magazine, as claimed in claim 38, wherein: said label means comprises an indentation located in a portion of said frame structure that would be considered a side wall when the data cartridge magazine has an operational orientation with respect to a shelf within said magazine-based data cartridge library, wherein said indentation is for accommodating a label for identifying the magazine.

40. The data cartridge magazine, as claimed in claim 38, wherein: said label means comprises: a first indentation located in a first portion of said frame structure; and a second indentation in a second portion of said frame structure that is separated from said first portion; wherein said first indentation is for accommodating a first label for identifying the magazine; wherein said second indentation is for accommodating a second label for identifying the magazine; wherein said first and second portions are each located on a section of said frame structure that would be considered a side wall when the data cartridge magazine has an operational orientation with respect to a shelf within said magazine-based data cartridge library.

41. The data cartridge magazine, as claimed in claim 40, wherein: said first portion being located on a first side wall; and said second portion being located on a second side wall that is parallel to said first side wall.

42. The data cartridge magazine, as claimed in claim 38, wherein: said label means comprises a sleeve for holding a label.

43. The data cartridge magazine, as claimed in claim 38, wherein: said label means comprises a radio-frequency identifier.

44. The data cartridge magazine, as claimed in claim 24, further comprising: a label that identifies the data cartridge magazine and is attached to said frame structure at a location that is discernable by a label reader located within said magazine-based data cartridge library.

45. A method for using a data cartridge magazine in a magazine-based data cartridge library comprising:
inserting a data cartridge in one of a plurality of accommodating slots comprised by said magazine through an opening in said magazine wherein said magazine comprises a base attached to a closed loop wall and wherein said magazine is only capable of receiving said data cartridge from one direction;
transporting said magazine within said library with a magazine transport means adapted to be engaged by a portion of a magazine transport device; and
moving said magazine to and from a shelf of a shelf system within said library.

46. The method of claim 45 wherein said closed loop wall comprises two pair of substantially parallel surfaces.

47. The method of claim 46 wherein said magazine base is substantially rectangular.

48. The method of claim 46 wherein said closed loop wall comprises two pair of substantially rectangular substantially parallel surfaces.

49. The method of claim 45 further comprising extracting said data cartridge from a resting position on said base in an orthogonal extracting direction from said base through said opening wherein said extracting path is opposite an insertion path in said inserting step.

* * * * *